US011616545B2

(12) United States Patent
Chen et al.

(10) Patent No.: US 11,616,545 B2
(45) Date of Patent: Mar. 28, 2023

(54) DISTRIBUTED MOBILITY FOR RADIO DEVICES

(71) Applicant: IPLA Holdings Inc., New York, NY (US)

(72) Inventors: Wei Chen, San Diego, CA (US); Pascal M. Adjakple, Great Neck, NY (US); Joseph M. Murray, Schwenksville, PA (US); Qing Li, Princeton Junction, NJ (US); Qian Zhang, Basking Ridge, NJ (US); Lakshmi R. Iyer, King of Prussia, PA (US); Tianyi Xu, San Jose, CA (US); Guodong Zhang, Woodbury, NY (US); Allan Y. Tsai, Boonton, NJ (US)

(73) Assignee: IPLA HOLDINGS INC., New York, NY (US)

( * ) Notice: Subject to any disclaimer, the term of this patent is extended or adjusted under 35 U.S.C. 154(b) by 270 days.

(21) Appl. No.: 17/125,234

(22) Filed: Dec. 17, 2020

(65) Prior Publication Data
US 2021/0175945 A1    Jun. 10, 2021

Related U.S. Application Data

(63) Continuation of application No. 16/996,364, filed on Aug. 18, 2020, now Pat. No. 10,924,171, which is a (Continued)

(51) Int. Cl.
*H04B 7/06* (2006.01)
*H04W 16/28* (2009.01)
(Continued)

(52) U.S. Cl.
CPC ......... *H04B 7/0617* (2013.01); *H04B 7/0639* (2013.01); *H04W 16/28* (2013.01); *H04W 48/20* (2013.01); *H04W 72/046* (2013.01)

(58) Field of Classification Search
CPC ............... H04B 7/0617; H04B 7/0639; H04B 7/0628; H04B 7/0695; H04B 7/088; H04W 16/28;
(Continued)

(56) References Cited

U.S. PATENT DOCUMENTS

| 9,935,700 B2 | 4/2018 | Kim et al. |
| 10,396,873 B2 | 8/2019 | Guey et al. |

(Continued)

FOREIGN PATENT DOCUMENTS

| CN | 103875271 A | 6/2014 |
| KR | 20100031431 A | 3/2010 |

(Continued)

OTHER PUBLICATIONS

3GPP TR 22.891 V1.3.2, "Technical Specification Group Services and System Aspects; Feasibility Study on New Services and Markets Technology Enablers; Stage 1 (Release 14)", Feb. 2016, 95 pages.

(Continued)

*Primary Examiner* — Juan A Torres
(74) *Attorney, Agent, or Firm* — Xsensus LLP

(57) ABSTRACT

Multiple mobility sets are maintained for nodes of radio networks. The sets comprise information such as: transmit and receive point identities; cell identities; beam identities; frequency channels; channel bandwidth; and black lists. The sets may be defined at different levels, such as network and physical (PHY) level. A network mobility set, e.g., a new-radio (NR) mobility set may, be determined by the gNB, the cell, the UE, or another device. Multiple radio access network nodes and UEs may exchange mobility set information to achieve a distributed mobility solution. A UE may monitor its orientation relative to a TRP, e.g., via use of an onboard MEMS gyroscope, and alter its beamforming parameters in response to changes in orientation and/or (Continued)

changes in TRP connection strength. Cell selection and reselection for beam based networks may use Single Frequency Network (SFN) broadcast of initial access signals without beam sweeping.

7 Claims, 90 Drawing Sheets

Related U.S. Application Data continuation of application No. 16/318,768, filed as application No. PCT/US2017/043083 on Jul. 20, 2017, now Pat. No. 10,804,989.

(60) Provisional application No. 62/364,478, filed on Jul. 20, 2016, provisional application No. 62/401,078, filed on Sep. 28, 2016, provisional application No. 62/421,667, filed on Nov. 14, 2016.

(51) Int. Cl.
*H04W 48/20* (2009.01)
*H04W 72/044* (2023.01)

(58) Field of Classification Search
CPC ............ H04W 48/20; H04W 72/046; H04W 24/08; H04W 24/10
USPC ........................................ 375/262
See application file for complete search history.

(56) References Cited

U.S. PATENT DOCUMENTS

| | | | |
|---|---|---|---|
| 2013/0051364 | A1 | 2/2013 | Seol et al. |
| 2014/0055302 | A1 | 2/2014 | Jia |
| 2014/0073329 | A1 | 3/2014 | Kang et al. |
| 2015/0349863 | A1 | 12/2015 | El et al. |
| 2017/0311217 | A1* | 10/2017 | Jung .................... H04W 36/30 |

FOREIGN PATENT DOCUMENTS

| | | | |
|---|---|---|---|
| KR | 20130017932 | A | 2/2013 |
| KR | 20140113642 | A | 9/2014 |
| KR | 20160021702 | A | 2/2016 |
| KR | 20160081742 | A | 7/2016 |
| WO | WO-2013028023 | A2 | 2/2013 |
| WO | 2015/020966 | A1 | 2/2015 |
| WO | 2015/183472 | A1 | 12/2015 |

OTHER PUBLICATIONS

3GPP TR 36.912 V13.0.0, "Technical Specification Group Radio Access Network; Feasibility Study for Further Advancements for E-UTRA (LTE-Advanced) (Release 13)", Dec. 2015, 62 pages.
3GPP TR 38.804 V0.2.1, "Technical Specification Group Radio Access Network; Study on New Radio Access Technology; Radio Interface Protocol Aspects (Release 14)", Aug. 2016, 22 pages.
3GPP TR 38.913 V0.3.0, "Technical Specification Group Radio Access Network; Study on Scenarios and Requirements for Next Generation Access Technologies (Release 14)", Mar. 2016, 30 pages.
3GPP TS 23.122 V14.0.0, "Technical Specification Group Core Network and Terminals; Non-Access-Stratum (NAS) functions related to Mobile Station (MS) in idle mode (Release 14)", Sep. 2016, 50 pages.
3GPP TS 36.133 V13.2.0, "Technical Specification Group Radio Access Network; Evolved Universal Terrestrial Radio Access (E-UTRA); Requirements for Support of Radio Resource Management (Release 13)", Jan. 2016, 45 pages.
3GPP TS 36.211 V13.0.0, "Technical Specification Group Radio Access Network; Evolved Universal Terrestrial Radio Access (E-UTRA); Physical Channels and Modulation (Release 13)", Dec. 2015, 141pages.
3GPP TS 36.213 V13.0.0, "Technical Specification Group Radio Access Network; Evolved Universal Terrestrial Radio Access (E-UTRA); Physical Layer Procedures (Release 13)", Dec. 2015, 6 pages.
3GPP TS 36.300 V13.3.0, "Technical Specification Group Radio Access Network; Evolved Universal Terrestrial Radio Access (E-UTRA) and Evolved Universal Terrestrial Radio Access Network (E-UTRAN): Overall Description", Mar. 2016, 295 pages.
3GPP TS 36.304 V13.0.0, "Technical Specification Group Radio Access Network; Evolved Universal Terrestrial Radio Access (E-UTRA); User Equipment (UE) procedures in idle mode (Release 13)", Dec. 2015, 42 pages.
3GPP TS 36.321 V13.0.0, "Technical Specification Group Radio Access Network; Evolved Universal Terrestrial Radio Access (E-UTRA) Medium Access Control (MAC) Protocol Specification (Release 13)", Dec. 2015, 82 pages.
3GPP TS 36.331 V13.0.0, "LTE; Evolved Universal Terrestrial Radio Access (E-UTRA); Radio Resource Control (RRC); Protocol Specification", Jan. 2016, 507 pages.
3GPP TSG RAN Meeting #71, RP-160671, "New SID Proposal: Study on New Radio Access Technology", NTT Docomo, Mar. 2016, 8 pages.
3GPP TSG RAN Meeting #72, RP-161214, "Revision of SI: Study on New Radio Access Technology", NTT Docomo, Jun. 2016, 8 pages.
3GPP TSG RAN WG1 #85, R1-164013, "Framework for Beamformed Access" May 2016, 4 pages.
3GPP TSG RAN WG1 #86, R1-168468, "Definitions supporting beam related procedures", Aug. 2016, 3 pages.
3GPP TSG RAN WG2 Meeting #93bis, R2-162571, "Introduction of Virtual Cell" Apr. 2016, 3 pages.
3GPP TSG-RAN WG2 #94 Tdoc R2-164006, "Requirements for System Information Distribution", May 2016, 4 pages.
3GPP TSG-RAN WG2 Meeting #93bis, R2-162210 "Beam Level Management <-> Cell Level Mobility", Apr. 2016, 4 Pages.
3GPP TSG-RAN WG2 Meeting #94, R2-163730, "Use Cases and RAN2 Issues of Beam Tracking in a Beamforming Based High Frequency NR", May 2016, 5 pages.
3GPP TSG-RAN WG2 Meeting #95, R2-165722, "Discussion on new RRC state in NR", Aug. 2016, 9 pages.
3GPP TSG-RAN Working Group 2 meeting #95bis, R2-166001, "Draft Report of 3GPP TSG RAN WG2 meeting #95", Aug. 2016, 223 pages.
Ericsson, TSG-RAN WG1 meeting #83, R1-167055, "Overview of initial access and mobility", Aug. 2016, 3 pages.
IEEE P802.11 Wireless LANs "Comment Resolutions on UL Mu Operation", Jul. 2016,27 pages.
International Telecommunication Union ITU-R Radiocommunication Sector of ITU Recommendation ITU-R M2083-0"IMt vision—Framework and Overall Objectives of the Future Development of IMT for 2020 and Beyond", Sep. 2015, 21 pages.

\* cited by examiner

DISTRIBUTED MOBILITY FOR RADIO DEVICES

CROSS-REFERENCE TO RELATED APPLICATIONS

This application is a continuation of U.S. patent application Ser. No. 16/996,364 filed Aug. 18, 2020 which is a continuation of U.S. patent application Ser. No. 16/318,768 filed Jan. 18, 2019 now U.S. Pat. No. 10,804,989 issued Oct. 13, 2020 which is the National Stage Application of International Patent Application No. PCT/US2017/043083 filed Jul. 20, 2017 which claims the benefit of priority to U.S. Provisional Patent Application No. 62/364,478 filed Jul. 20, 2016, U.S. Provisional Patent Application No. 62/401,078 filed Sep. 28, 2016 and U.S. Provisional Patent Application No. 62/421,667 filed Nov. 11, 2016, the disclosures of which are incorporated by reference in their entireties.

BACKGROUND

Machine-To-Machine (M2M), Web-of-Things (WoT), and Internet-of-Things (IoT) network deployments may support M2M/IoT service layers such as oneM2M, ETSI M2M, and OMA LWM2M operating across nodes such as M2M/IoT servers, gateways, and devices which host M2M/IoT applications and services.

SUMMARY

A distributed mobility solution includes a network device, such as a user equipment (UE) or another node in an NR/5G network or other network, that maintains multiple mobility sets, with each set containing one or more of the following types of information: transmit and receive point (TRP) identities; cell identities; beam identities; cell/TRP beams and/or UE beams; operating frequency information, e.g. frequency channels or channel bandwidth; or lists of black or forbidden TRPs or cells. The mobility sets may be defined at different levels, such as NR-level and physical-level (PHY-level). For example, an NR-level mobility set may be a set of TRPs or cells or beams within which the UE can move without a next-generation radio access network Node B (gNB) needing to be informed of the move, e.g., without the gNB being involved in providing a connection to the UE. A PHY-level mobility set may be a set of TRPs, cells, or beams within which beam level mobility applies. For example, a PHY mobility set may be maintained as a subset of an NR-level mobility set. The NR mobility set may be determined by the gNB, the cell, the TRP, the UE, or another device. Similarly the PHY mobility set may be determined by the UE, the TRP, the cell, the gNB, or another device. The UE may extend the NR mobility set or PHY mobility set received from the network (e.g. Cell/TRP or gNB) by including into these sets, the beams of the UE (i.e. UL TX beams and DL RX beams). The network (e.g. gNB, TRP or cell) may also include into the NR mobility set or PHY mobility set signaled to the UE, TRP's beams, cell's beams or UE's beam. The network may have knowledge of UE's beams (UL TX beams and DL RX beams) through network UL measurements or UE signaling for e.g. UE configuration or UE capability signaling. Multiple next-generation radio access network nodes and UE may exchange mobility set information to achieve a distributed mobility solution. For example, an inter-NR-level mobility set mobility decision may be made at the gNB level or TRP level, while an intra-NR-level mobility set mobility decision (e.g., inter-PHY or intra-PHY-level mobility set mobility decision) is made in the UE.

A unified solution for cell selection and reselection for single-beam based or multi-beam based new radio (NR) networks may be achieved wherein initial access signal transmission uses Single Frequency Network (SFN) broadcast of initial access signals without beam sweeping. Alternatively, SFN broadcast of initial access signals may be used with beam sweeping, with a multi-beam based deployment with either coordinated or uncoordinated sweep at transmissions and receive points (TRPs).

Cell selection related mechanisms and procedures may include general cell selection procedures and rules and information acquisition mechanisms for cell selection process.

Cell reselection related mechanisms and procedures may include general cell reselection procedures and rules, priority handling and cell ranking mechanisms, information acquisition mechanisms for cell reselection process, and configurability and optimization related mechanisms.

A UE may monitor its orientation relative to a TRP, e.g., via use of an onboard MEMS gyroscope. A UE may alter its beamforming parameters in response to changes in status due to changes in angle or orientation, and/or changes in TRP connection strength and other mobility events. For example, a UE may switch to using a wider beam, a different beam, or multiple beams in response to a change in orientation. The UE may report the new beamforming settings to the TRP, e.g., along with new observations of the quality of various connections options with the TRP. The UE or TRP may then initiate beamforming training, optionally using MCS back off until training is completed. The UE may indicate a limited set of beams to be included in the training, e.g., to include a selected beam and those adjacent to the selected beam.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

Figure 1:
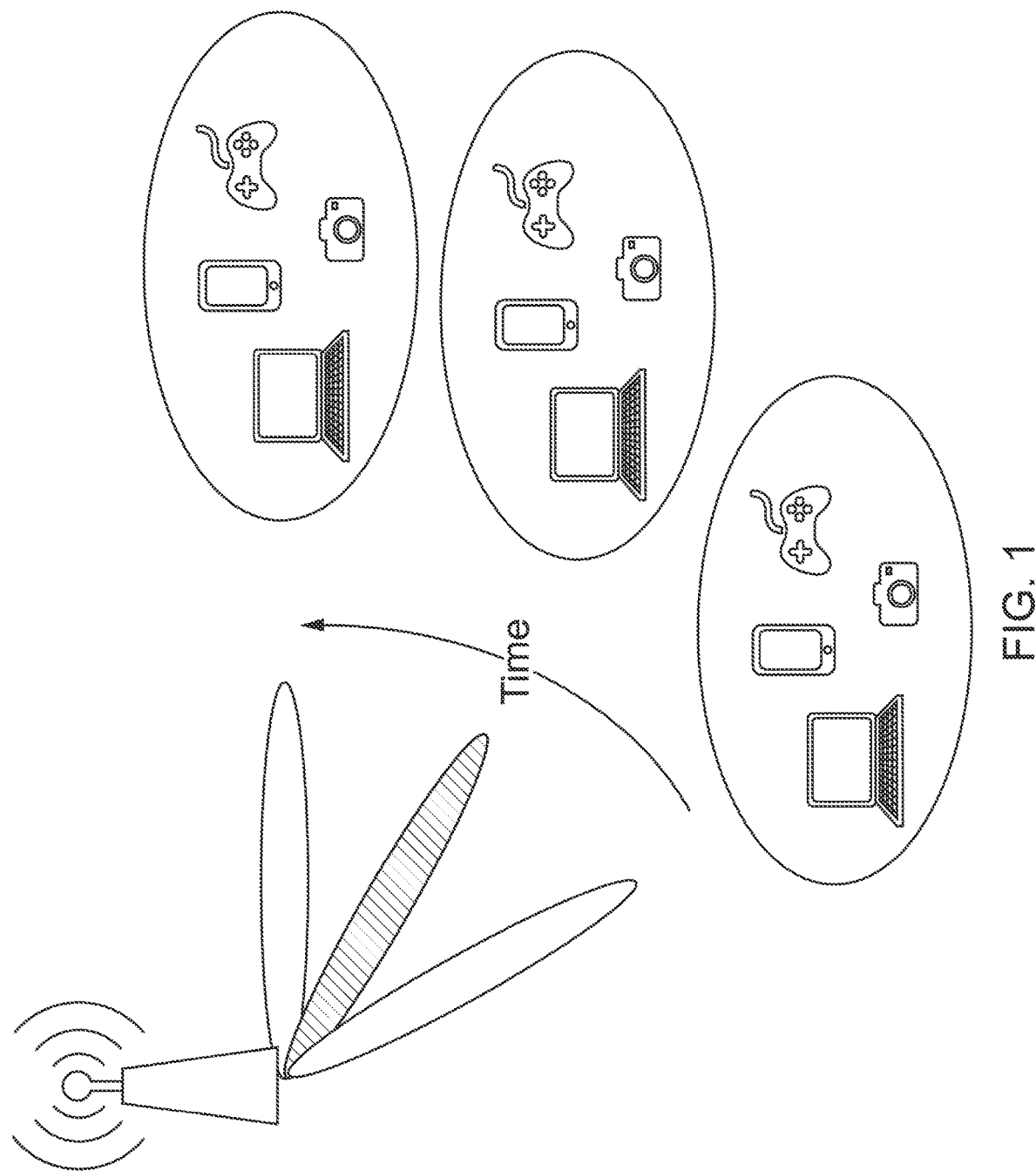
FIG. 1 illustrates an example of beamforming in an HF-NR network.

A network device, such as a user equipment (UE) or another node in a high frequency NR/5G and other network, may maintain multiple mobility sets containing information such as transmit and receive point (TRP) identities, beam strength levels, and availability, beam identities, (Cell/TRP beams and/or UE beams), operating frequency information e.g. frequency channels, channel bandwidth, black or forbidden TRP or cell list. The mobility sets may further be defined in two levels: NR-level Mobility set and physical (PHY) level mobility set. The NR-level mobility set is a set of TRPs or cells or beams within which the UE can move, unknown to the next-generation radio access network Node B (gNB) providing connection to the UE i.e. gNB is not required to be informed. The PHY-level mobility set is a set of TRPs or cells or beams within which beam level mobility applies. For example, a physical level (PHY) mobility set may be maintained as a subset of a general NR-level mobility set. The NR mobility set may be determined by a next-generation radio access network Node B (gNB), the cell, the TRP, the UE, or another device. Similarly the PHY mobility set may be determined by the UE, the TRP, the cell, the gNB, or another device. The UE may extend the NR mobility set or PHY mobility set received from the network (e.g. Cell/TRP or gNB) by including into these sets, the beams of the UE (i.e. UL TX beams and DL RX beams). The network (e.g. gNB, TRP or cell) may also include into the NR mobility set or PHY mobility set signaled to the UE, TRP's beams, cell's beams or UE's beam. The network may have knowledge of UE's beams (UL TX beams and DL RX beams) through network UL measurements or UE signaling for e.g. UE configuration or UE capability signaling. Multiple nodes may exchange mobility set information to achieve a unified mobility set framework.

Use of such mobility sets may provide improved connectivity and operations by facilitating frequency beam changes, better connection options, and lower network overheads, for instance, resulting in better user experience or battery life, for example.

For example, a UE may obtain a general mobility set from an entity managing operations of a first radio access network, such as a gNB. The general mobility set may contain, for example, a list of transmit-and-receive points (TRPs) and/or a list of cells and or a list of beams (UE's beams and/or TRP's beams) within the radio access network. The UE may then make measurements of communications conditions with various beams, e.g., of transmit-and-receive points within the general. The UE may then keep a more specific list of preferred beams (TRP's beams or UE's beams) and/or TRPs. The UE may do so on its own, or in conjunction with the gNB or a TRP or cell. Alternatively, the UE may provide an observation of the communications conditions to the TRP or gNB or cell, and allow the TRP or gNB or cell to adjust either the general or specific mobility sets accordingly. The reporting of the observation of communications conditions may occur in accordance to a policy. For example, the UE may report the change in conditions in response to a signal dropping below, or rising above, a given threshold, or in response to a lost connection.

Similarly, a UE may decide to select a different beam or TRP based on a policy or on a change in communication conditions.

The TRP or gNB may, for example, make a determination of a general or specific mobility set based in part on a core network policy as applied to the UE. A gNB, for instance, may make such a determination based on the context of the UE in the core network.

A UE may maintain multiple mobility sets for each of multiple radio access networks.

The UE, TRP, or gNB may make a decision to change the routing of a connection based on changing network conditions, such as changes in the utilization of network resource.

A UE may monitor its orientation relative to a TRP, e.g., via use of an onboard MEMS gyroscope. A UE may alter its beamforming parameters in response to changes in status due to changes in angle or orientation, and/or changes in TRP connection strength and other mobility events. For example, a UE may switch to using a wider beam, a different beam, or multiple beams in response to a change in orientation. The UE may report the new beamforming settings to the TRP, e.g., along with new observations of the quality of various connections options with the TRP. The UE or TRP may then initiate beamforming training, optionally using MCS back off until training is completed. The UE may indicate a limited set of beams to be included in the training, e.g., to include a selected beam and those adjacent to the selected beam.

A "mobility event" may be generally described as any event that causes or may cause degradation or improvement of the signal quality or signal strength of the communication link at either the device or the network above a certain threshold. Examples of mobility events could be as diverse as change in geolocation of the device or the network node (e.g., gNB or cell within the gNB), change in angle or orientation of the device or the network and more specifically, change in angle or orientation of the TX/RX antennas at the device or at the network, signal blockage or signal attenuation for e.g. by external sources such as surrounding fixed or moving objects, changes in communication channel frequency, change of RAT (Radio Access Technology), radio link failure, beam failure, change in signal quality or signal strength between the device and the serving cell, absolute change in signal quality or signal strength between the device and a neighboring cell, change in signal quality or signal strength between the device and a neighboring cell, relative to the serving cell. A mobility event may be the impact of in-device co-existence issue, for example, as a result of a simultaneous use of cellular and WLAN technologies in the device that may result in a degradation in sensitivity at the device.

A unified solution for cell selection and reselection for single-beam based or multi-beam based new radio (NR) networks may be achieved wherein initial access signal transmission uses Single Frequency Network (SFN) broadcast of initial access signals without beam sweeping. Alternatively, SFN broadcast of initial access signals may be used with beam sweeping, with a multi-beam based deployment with either coordinated or uncoordinated sweep at transmissions and receive points (TRPs).

Cell selection related mechanisms and procedures may include general cell selection procedures and rules and information acquisition mechanisms for cell selection process.

Cell reselection related mechanisms and procedures may include general cell reselection procedures and rules, priority handling and cell ranking mechanisms, information acquisition mechanisms for cell reselection process, and configurability and optimization related mechanisms.

An objective of the Study Item on New Radio (NR) Access Technology is to identify and develop technology components needed for systems operating at frequencies up to 100 GHz. See 3GPP TR 38.913, Study on Scenarios and Requirements for Next Generation Access Technologies (Release 14) V0.3.0 and RP-161214, Revision of SI: Study on New Radio Access Technology (NTT DOCOMO). To compensate for the increased path loss in high-frequency NR (HF-NR) systems, beamforming is expected to be widely used. However, the existing cell selection and reselection, which is based on omnidirectional or sector-based reference signal does not support the functions required for beamforming based access; e.g. how to detect and determine cell quality with beam sweeping, beam pairing, beam training, etc., as shown in FIG. 1. In the example of FIG. 1, narrow high gain beams are swept during sweeping sub-frames.

TABLE 1

Abbreviations

| | |
|---|---|
| ACK | Acknowledgement |
| APN | Access Point Name |
| AS | Access Stratum |
| BS | Base Station |
| CA | Collision Avoidance |
| CD | Collision Detection |
| CFI | Control Format Indicator |
| CN | Core Network |
| CMAS | Commercial Mobile Alert System |
| C-RAN | Cloud RAN |
| C-RNTI | Cell Radio-Network Temporary Identifier |
| CRS | Cell-Specific Reference Signals |
| CSMA | Carrier Sensing Multiple Access |
| CSMA/CD | CSMA with Collision Detection |
| CSMA/CA | CSMA with Collision Avoidance |
| DCA | Dedicated Collision Area |
| DCI | Downlink Control Information |
| DACTI | Dynamic Access Configuration Time Interval |
| DL | Downlink |
| DRX | Discontinuous Reception |
| ECGI | E-UTRAN Cell Global Identifier |
| ECM | EPS Connection Management |
| eMBB | enhanced Mobile Broadband |
| EMM | EPS Mobility Management |
| eNB | Evolved Node B |
| ETWS | Earthquake and Tsunami Warning System |
| E-UTRA | Evolved Universal Terrestrial Radio Access |
| E-UTRAN | Evolved Universal Terrestrial Radio Access Network |
| FDM | Frequency Division Multiplex |
| FFS | For Further Study |
| GERAN | GSM EDGE Radio Access Network |
| gNB | Next Generation Radio Access Network Node |
| GSM | Global System for Mobile communications |
| GUTI | Globally Unique Temporary UE Identity |
| HE | High Efficiency |
| HF | -NR High frequency New Radio |
| HSS | Home Subscriber Server |
| IE | Information Element |
| IMSI | International Mobile Subscriber Identity |
| IMT | International Mobile Telecommunications |
| KPI | Key Performance Indicators |
| LTE | Long Term Evolution |
| MAC | Medium Access Control |
| MAC | CE MAC Control Element |
| MBMS | Multimedia Broadcast Multicast Service |
| MCL | Maximum Coupling Loss |
| MIB | Master Information Block |
| MME | Mobile Management Entity |
| MTC | Machine-Type Communications |
| mMTC | Massive Machine Type Communication |
| NACK | Negative Acknowledgement |
| NAS | Non-access Stratum |
| NFV | Network Functions Virtualization |
| NR | New Radio |
| OFDM | Orthogonal Frequency Division Multiplex |

TABLE 1-continued

Abbreviations

| | |
|---|---|
| PCel | Primary Cell |
| PCI Physical | Cell ID |
| PDCCH | Physical Downlink Control Channel |
| PDSCH | Physical Downlink Shared Channel |
| PHY | Physical Layer |
| PCFICH | Physical Control Format Indicator Channel |
| PDCP | Packet Data Convergence Protocol |
| PHICH | Physical Hybrid ARQ Indicator Channel |
| PPDU | PLCP Protocol Data Unit (802.11) |
| PRACH | Physical Random Access Channel |
| PRB | Physical Resource Block |
| PUCCH | Physical Uplink Control Channel |
| PUSCH | Physical Uplink Shared Channel |
| QoS | Quality of Service |
| RA | Random Access |
| RACH | Random Access Channel |
| RAN | Radio Access Network (3GPP) |
| RMSU | Reachability and Mobility Status Update |
| RB | Resource Block |
| RLC | Radio Link Control |
| RNTI | Radio Network Temporary Identifier |
| RRC | Radio Resource Control |
| RSRP | Reference Signal Received Power |
| RSRQ | Reference Signal Received Quality |
| RU | Resource Unit (802.11) |
| Scell | Secondary Cell |
| SI | System Information |
| SIB | System Information Block |
| SR | Scheduling Request |
| TAI | Tracking Area Indicator |
| TAU | Tracking Area Update |
| TDM | Time Division Multiplex |
| TEID | Tunnel Endpoint ID |
| TRP | Transmission and Reception Point |
| TTI | Transmission Time Interval |
| UCI | Uplink Control Information |
| UE | User Equipment |
| UL | Uplink |
| UR/LL | Ultra-Reliable - Low Latency |
| URLLC | Ultra-Reliable and Low Latency Communications |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 2:
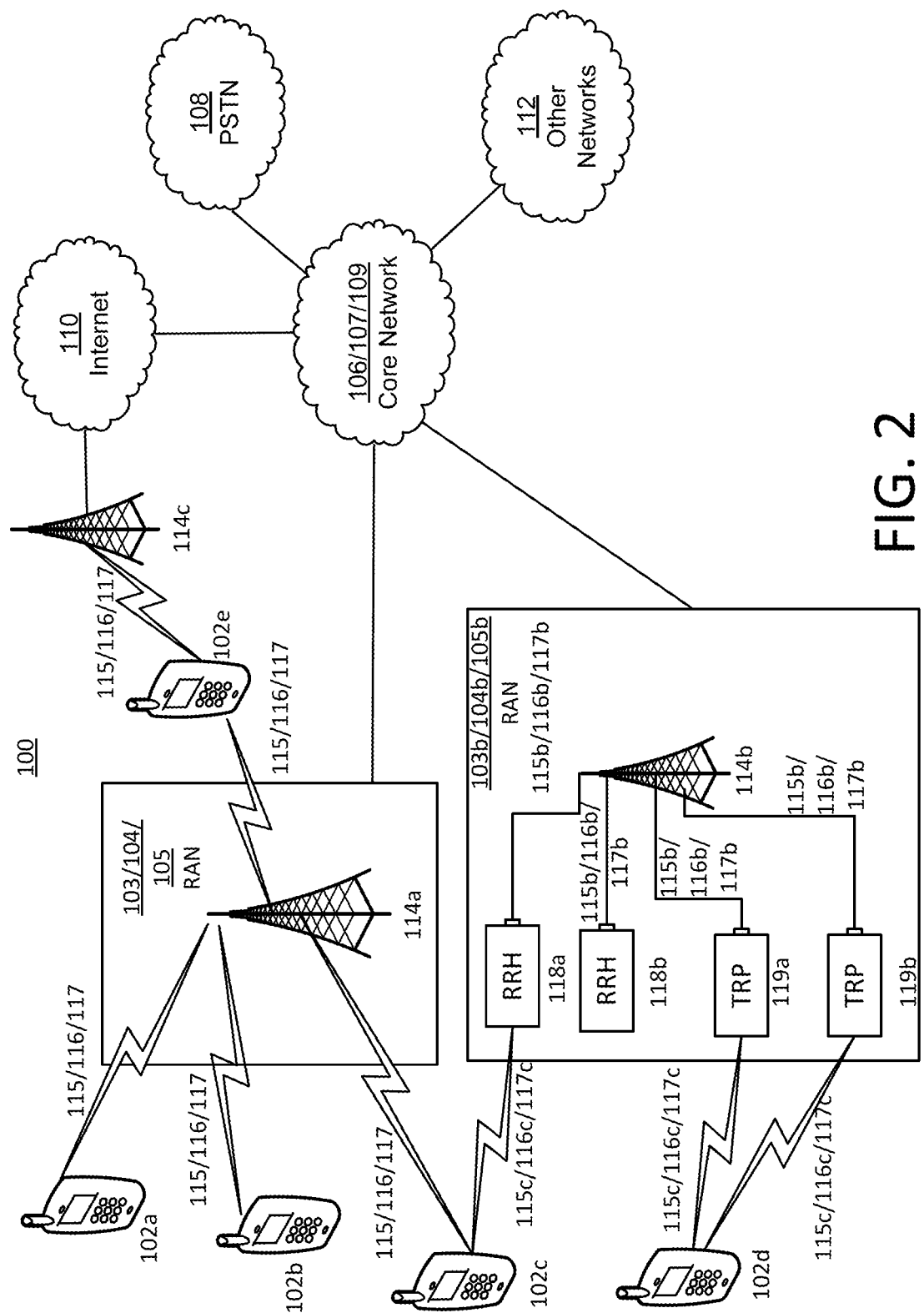
FIG. 2 illustrates an example communications system.

FIG. 2 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 2-6 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 2 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 2, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 2, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 2 may be configured to communicate with the base station 114a, which may employ a cellular-based radio technology, and with the base station 114c, which may employ an IEEE 802 radio technology.

Figure 3:
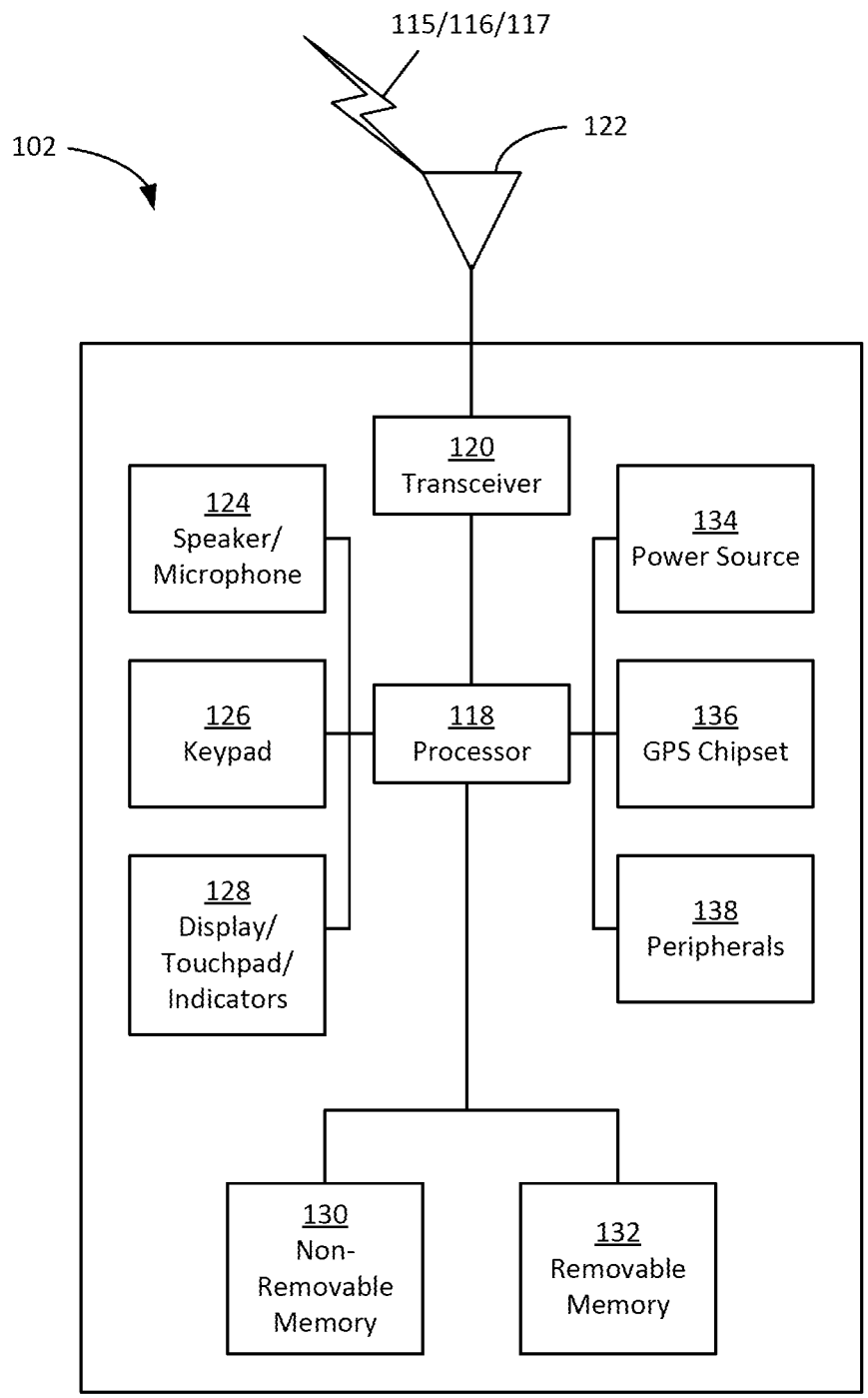
FIG. 3 is a block diagram of an example apparatus or device configured for wireless communications such as, for example, a wireless transmit/receive unit (WTRU).

FIG. 3 is a block diagram of an example apparatus or device configured for wireless communications in accordance with the embodiments illustrated herein, such as for example, a WTRU 102. As shown in FIG. 3, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 3 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 3 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 2, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 2 may be configured to communicate with the base station 114a, which may employ a cellular-based radio technology, and with the base station 114b, which may employ an IEEE 802 radio technology.

FIG. 3 is a block diagram of an example apparatus or device configured for wireless communications in accordance with the embodiments illustrated herein, such as for example, a WTRU 102. As shown in FIG. 3, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 3 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 3 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 3 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 4:
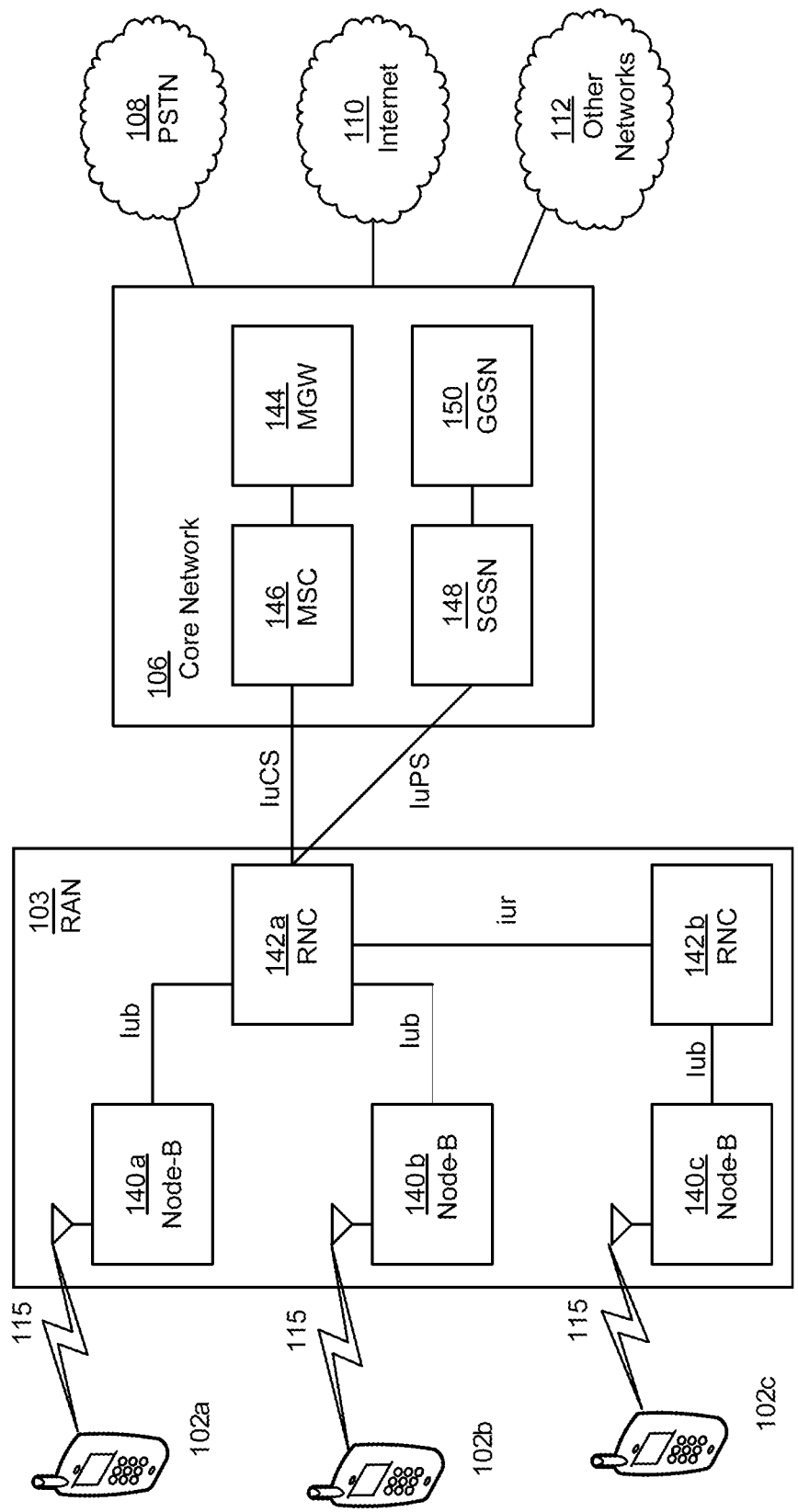
FIG. 4 is a system diagram of a first example radio access network (RAN) and core network.

FIG. 4 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 4, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 4, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 4 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 5:
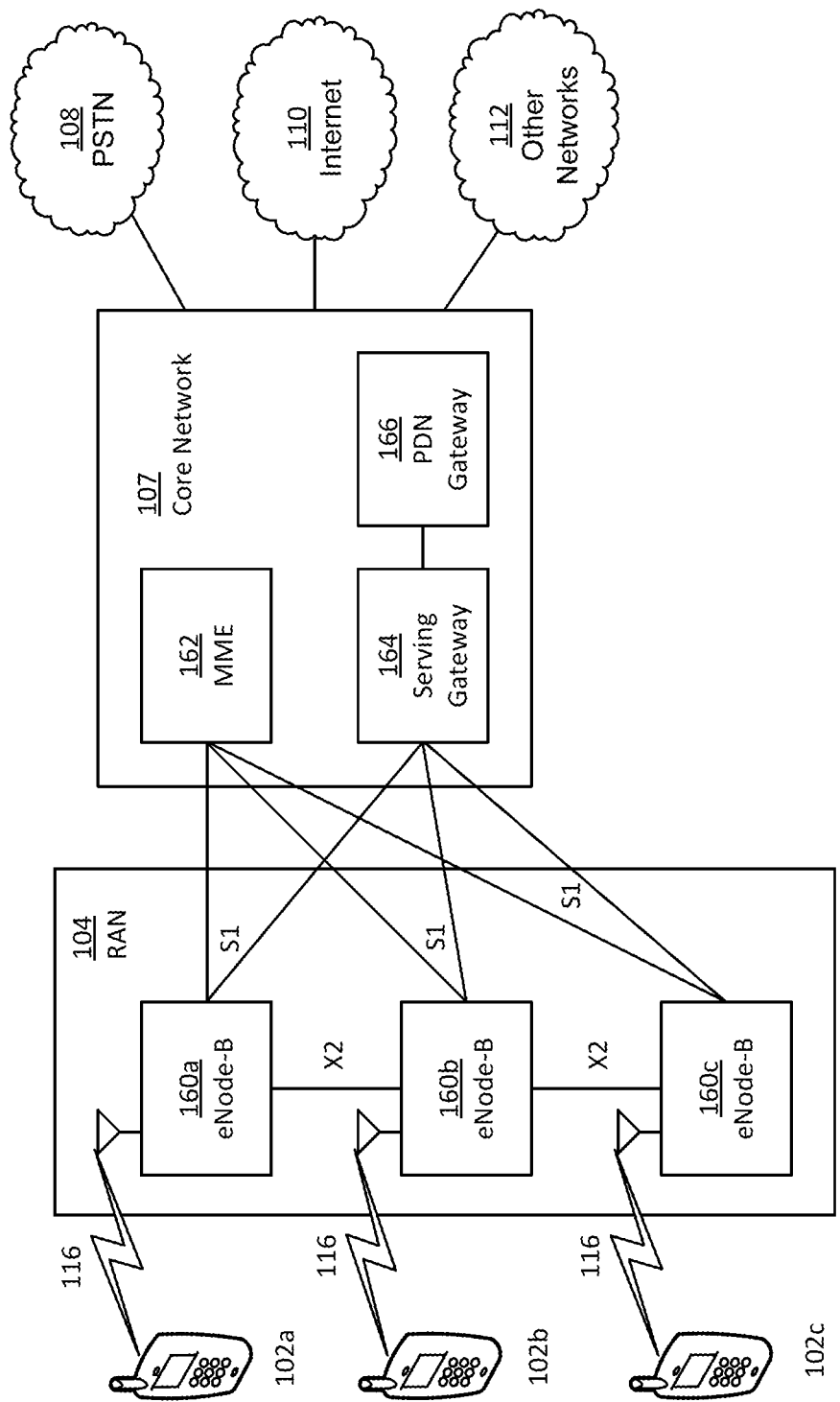
FIG. 5 is a system diagram of a second example radio access network (RAN) and core network.

FIG. 5 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 5, the eNode-Bs 160a, 160b, 160c may communicate with one another over an X2 interface.

The core network 107 shown in FIG. 5 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 6:
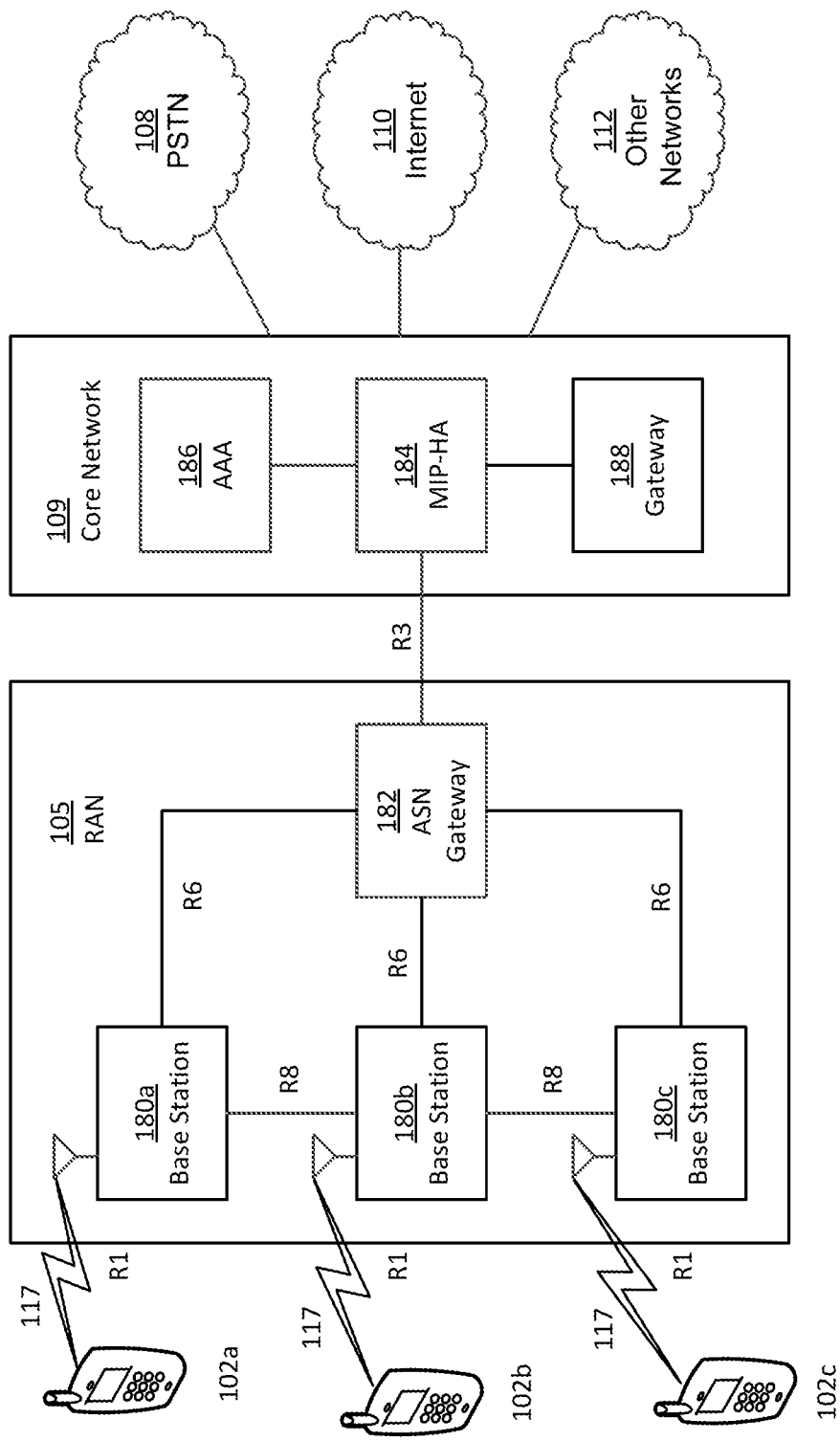
FIG. 6 is a system diagram of a third example radio access network (RAN) and core network.

FIG. 6 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 6, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 6, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 6, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 2-6 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 2-6 are provided by way of example only, and it is understood that the subject matter disclosed and claimed herein may be embodied or implemented in any similar communication system, whether presently defined or defined in the future.

Figure 7:
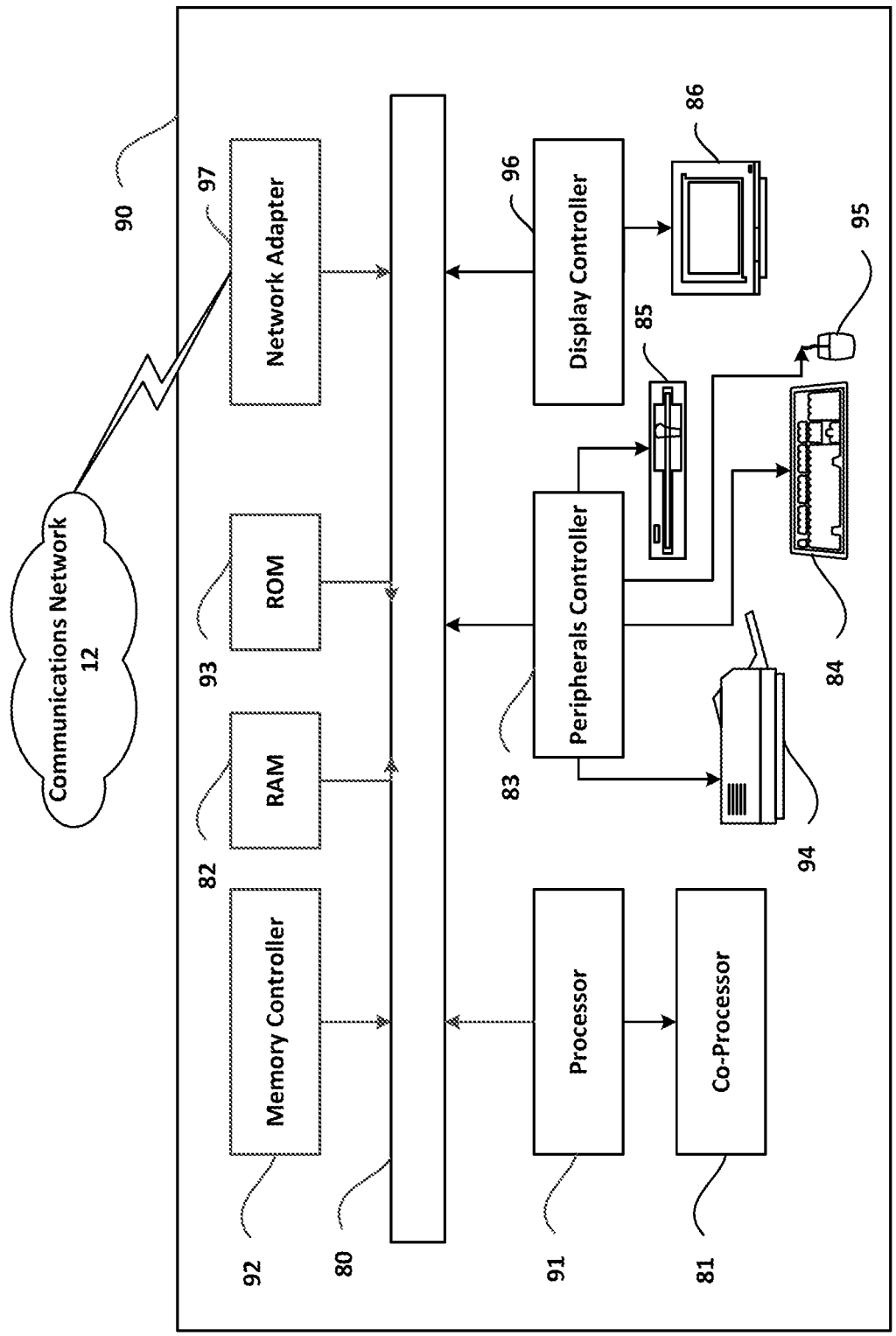
FIG. 7 is a block diagram of an example computing system in which one or more apparatuses of communications networks may be embodied, such as certain nodes or functional entities in the RAN, core network, public switched telephone network (PSTN), Internet, or other networks

FIG. 7 is a block diagram of an exemplary computing system 90 in which one or more apparatuses of the communications networks illustrated in FIGS. 2-6 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 2-6, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

ITU-R M.2083 International Mobile Telecommunications (IMT) for 2020 and Beyond (IMT 2020) describes expansion to support diverse families of usage scenarios and applications beyond the current IMT. A broad variety of capabilities would be tightly coupled with these intended different usage scenarios and applications. The families of usage scenarios envisioned include, for example: eMBB (enhanced Mobile Broadband); URLLC (Ultra-Reliable and Low Latency Communications); and mMTC (massive Machine Type Communications).

TABLE 2

| | Example Usage Families |
|---|---|
| eMBB | Macro and small cells requiring 1 ms latency (air interface), in spectrum allocated at WRC-15 which may lead up to 8 Gbps of additional throughput<br>Support for high mobility |
| URLLC | Low to medium data rates (50 kbps~10 Mbps)<br><1 ms air interface latency<br>99.999% reliability and availability<br>Low connection establishment latency<br>0-500 km/h mobility |
| mMTC | Low data rate (1~100 kbps)<br>High density of devices (up to 200,000/km2)<br>Latency: seconds to hours<br>Low power: up to 15 years battery autonomy<br>Asynchronous access |

TABLE 2-continued

Example Usage Families

| | |
|---|---|
| Network Operation | Network Operation addresses the subjects such as Network Slicing, Routing, Migration and Interworking, Energy Saving, etc. |

3GPP TR 38.913, Study on Scenarios and Requirements for Next Generation Access Technologies; (Release 14), V0.3.0 defines scenarios and requirements for New Radio (NR) technologies. The Key Performance Indicators (KPIs) for eMBB, URLLC and mMTC devices are summarized in Table 3.

TABLE 3

KPIs for eMBB, URLLC and mMTC Devices

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (e.g., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For eMBB value, the evaluation needs to consider all typical delays associated with the transfer of the data packets in an efficient way (e.g., applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes [(1)] within 1 ms, which is the time it takes to deliver a small data packet from the radio protocol layer $2/3$ SDU ingress point to the radio protocol layer $2/3$ SDU egress point of the radio interface, at a certain channel quality (e.g., coverage-edge). NOTE1: Specific value for X is FFS. | $1-10^{-5}$ within 1 mS. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of, perhaps 200 bytes Uplink (UL) per day followed by 20 bytes Downlink (DL) from a specified Maximum Coupling Loss (MCL), assuming a stored energy capacity of 5 Watt-hours, for example. | 15 years |
| | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x % probability. | $10^6$ devices/km$^2$ |

System Information (SI) is the information broadcast by the Evolved Universal Terrestrial Radio Access Network (E-UTRAN) that needs to be acquired by the UE to be able to access and operate within the network. SI is divided into the MasterInformationBlock (MIB) and a number of SystemInformationBlocks (SIBs). A high level description of the MIB and SIBs is provided in 3GPP TS 36.300 Overall description; Stage 2 (Release 13). Detailed descriptions are available in 3GPP TS 36.331 Radio Resource Control (RRC); Protocol specification (Release 13).

TABLE 4

System Information

| Information Block | Description |
|---|---|
| MIB | Defines the most essential physical layer information of the cell required to receive further system information |
| SIB1 | Contains information relevant when evaluating if a UE is allowed to access a cell and defines the scheduling of other system information |
| SIB2 | Radio resource configuration information that is common for all UEs |
| SIB3 | Cell re-selection information common for intra-frequency, inter-frequency and/or inter-RAT cell re-selection (e.g., applicable for more than one type of cell re-selection but not necessarily all) as well as intra-frequency cell re-selection information other than neighboring cell related |
| SIB4 | Neighboring cell related information relevant only for intra-frequency cell re-selection |
| SIB5 | Information relevant only for inter-frequency cell re-selection e.g., information about other E UTRA frequencies and inter-frequency neighboring cells relevant for cell re-selection |
| SIB6 | Information relevant only for inter-RAT cell re-selection e.g., information about UTRA frequencies and UTRA neighboring cells relevant for cell re-selection |
| SIB7 | Information relevant only for inter-RAT cell re-selection e.g., information about GERAN frequencies relevant for cell re-selection |
| SIB8 | Information relevant only for inter-RAT cell re-selection e.g., information about CDMA2000 frequencies and CDMA2000 neighboring cells relevant for cell re-selection |
| SIB9 | Home eNB name (HNB Name) |
| SIB10 | Earthquake and Tsunami Warning System (ETWS) primary notification |
| SIB11 | ETWS secondary notification |
| SIB12 | Commercial Mobile Alert System (CMAS) notification |
| SIB13 | Information required to acquire the MBMS control information associated with one or more MBSFN areas |
| SIB14 | Extended Access Barring (EAB) parameters |
| SIB15 | MBMS Service Area Identities (SAI) of the current and/or neighboring carrier frequencies |
| SIB16 | Information related to GPS time and Coordinated Universal Time (UTC) |
| SIB17 | Information relevant for traffic steering between E-UTRAN and WLAN |
| SIB18 | Indicates E-UTRAN supports the Sidelink UE information method and may contain sidelink communication related resource configuration information |
| SIB19 | Indicates E-UTRAN supports the sidelink UE information method and may contain sidelink discovery related resource configuration information |
| SIB20 | Contains the information required to acquire the control information associated transmission of MBMS using Single Cell-Point to Multi-point (SC-PTM) |

The UE applies the system information acquisition procedure described 3GPP TS 36.331 to acquire the Access Stratum (AS) and Non-access Stratum (NAS) related system information that is broadcasted by the E-UTRAN. The procedure applies to UEs in RRC_IDLE and UEs in RRC_CONNECTED.

Figure 8:
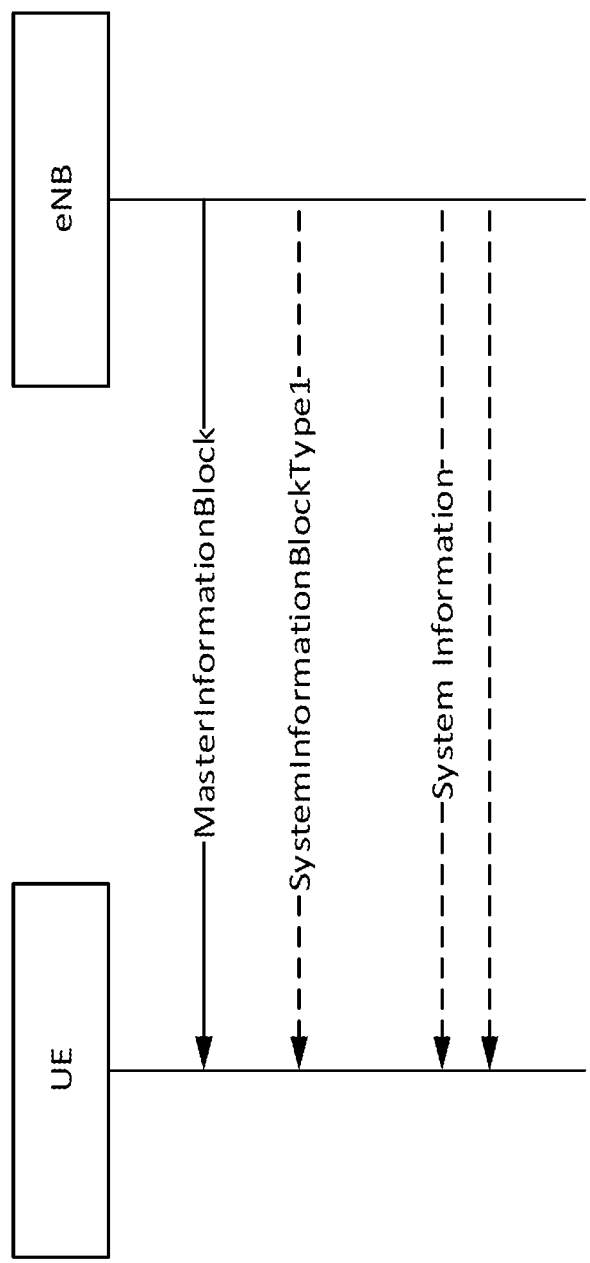
FIG. 8 shows an example of user equipment system information acquisition through data exchange with an eNB.

FIG. 8 provides a high level illustration of the system acquisition procedure. The UE first acquires the MIB, which includes the most essential physical layer information of the cell which is required to receive other system information. After acquiring the MIB, the UE acquires SIB1, which contains information relevant when evaluating if a UE is allowed to access a cell and defines the scheduling of other system information. After acquiring SIB1, the UE acquires the remaining system information according to the SIB schedule included in SIB1.

The UE may apply the system information acquisition procedure in a number of situations, such as: for the following: upon selecting (e.g. upon power on) and upon re-selecting a cell; after handover completion; after entering E-UTRA from another Radio Access Technology (RAT); upon return from out of coverage; upon receiving a notification that the System Information has changed; upon receiving an indication about the presence of an ETWS notification, a CMAS notification and/or a notification that EAB parameters have changed; upon receiving a request from CDMA2000 upper layers; and upon exceeding the maximum validity duration.

Figure 9:
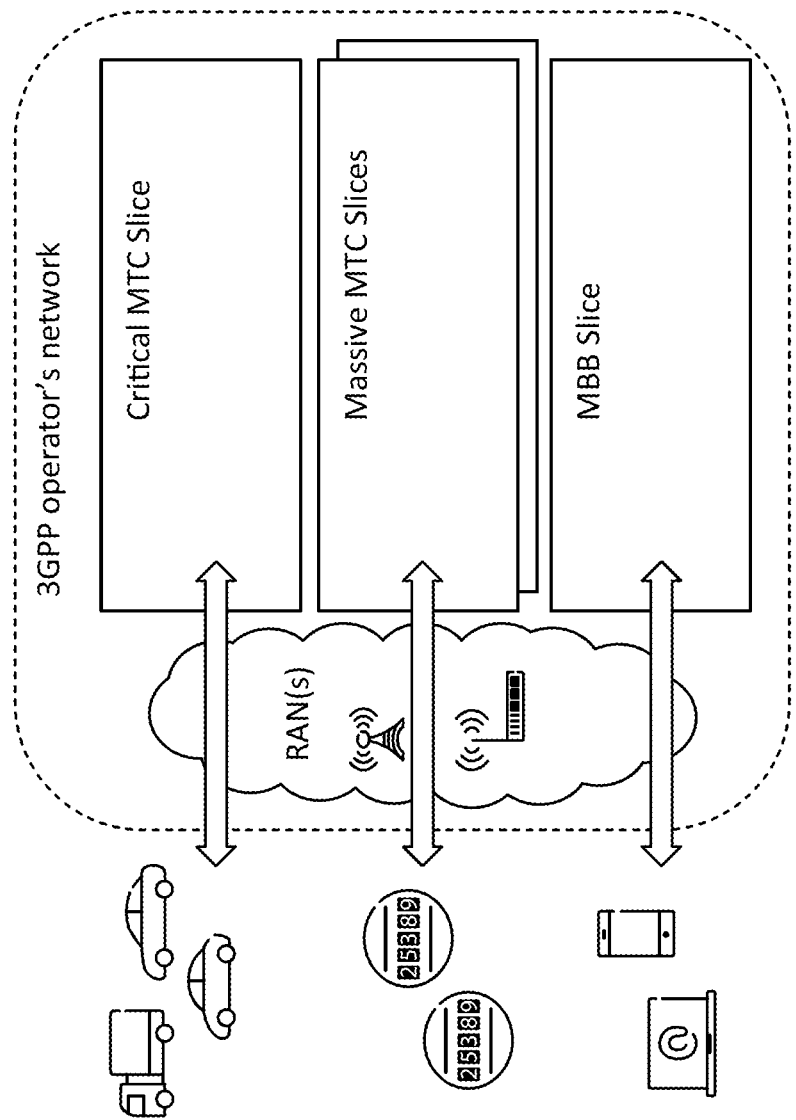
FIG. 9 illustrates a network slicing concept.

FIG. 9 provides a high level illustration of the network slicing concept. A network slice is composed of a collection of logical network functions that supports the communication service requirements of particular use case(s). It shall be possible to direct terminals to selected slices in a way that fulfil operator or user needs, e.g., based on subscription or terminal type. The network slicing primarily targets a partition of the core network, but it is not excluded that Radio Access Network (RAN) may need specific functionality to support multiple slices or even partitioning of resources for different network slices, e.g., as described in 3GPP TR 22.891, Feasibility Study on New Services and Markets Technology Enablers (SMARTER); Stage 1 (Release 14).

Figure 10:
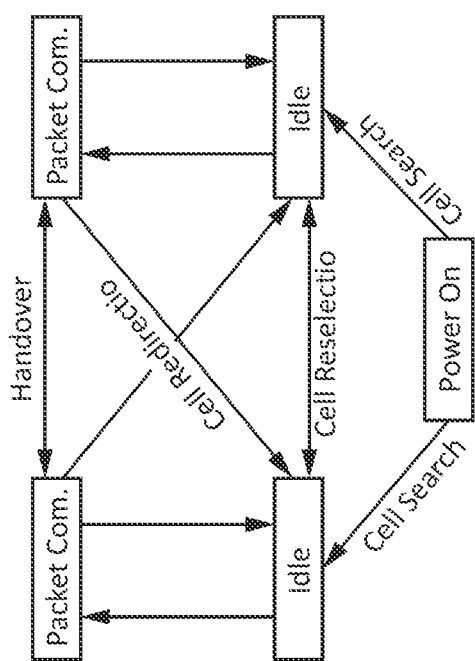
FIG. 10 illustrates state transitions in a user equipment (UE).

A UE can be in two different states after being powered up—"Idle" or "Packet Communication" as shown in FIG. 10. After powering up and performing cell search, the UE selects a cell and transitions to "Idle". Transitions between states are fully managed by EPS Mobility Management (EMM), EPS Connection Management (ECM), and Radio Resource Control (RRC) function. A description of the states associated with each function is summarized in Table 5.

Figure 11:
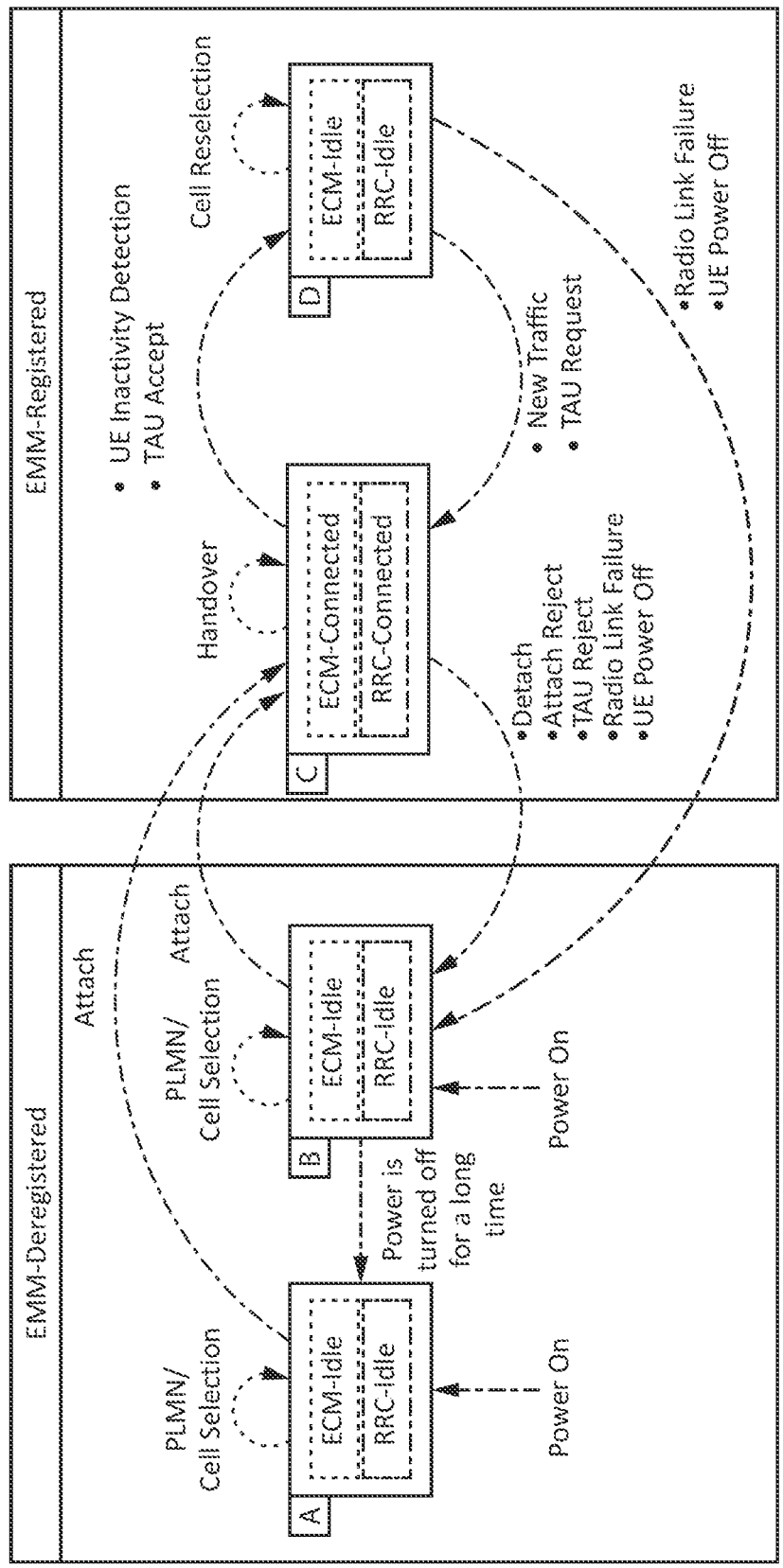
FIG. 11 illustrates EMM and ECM RRC state transitions.

FIG. 11 is an illustration of the EMM, ECM and RRC state machines overlaid on each other. Examples for when a UE is in a given state are provided in Table 6. The UE location information set in each EPS entity for a corresponding state is summarized in Table 7.

TABLE 5

EMM, ECM and RRC States

| Layer | State | Entity | Description |
|---|---|---|---|
| EMM | EMM-Deregistered | UE, MME | UE is not attached to any LTE network. MME does not know the current location of the UE, but may have tracking area (TA) information reported by the UE. |
|  | EMM-Registered | UE, MME | UE has been attached to the LTE network and an IP address has been assigned to the UE. An EPS bearer has been established. The MME knows the current location of the UE with an accuracy of a cell or, at least, a tracking area. |
| ECM | ECM-Idle | UE, MME | No NAS signaling connection (ECM connection) established yet. UE has not been assigned physical resources, e.g., radio resources (SRB/DRB) and network resources (S1 bearer/S1 signaling connection) yet. |
|  | ECM-Connected | UE, MME | NAS signaling connection (ECM connection) is established. UE has been assigned physical resources, e.g., radio resources (SRB/DRB) and network resources (S1 bearer/S1 signaling connection.) |
| RRC | RRC-Idle | UE, eNB | No RRC connection is established. |
|  | RRC-Connected | UE, eNB | RRC connection has been established. |

TABLE 6

UE in EMM, ECM and RRC states

| Case | State | User Experiences (Examples) |
|---|---|---|
| A | EMM-Deregistered + ECM-Idle + RRC-Idle | When a UE is switch on for the first time after subscription. When a UE is switched on after staying turned off for a long time. No UE context in the LTE network. |
| B | EMM-Deegistered + ECM-Idle + RRC-Idle | When a UE is switch on within a certain period of time after being turned off. When ECM connection is lost during communications due to radio link failure. Some UE context from the last attach can still be stored in the network (e.g., to avoid running an AKA procedure during every Attach procedure). |
| C | EMM-Registered + ECM-Connected + RRC-Connected | When a UE is attached to the network (an MME), and is using services (e.g., Internet, VoD, LiveTV, etc) The mobility of a UE is handled by a handover procedure. |
| D | EMM-Registered + ECM-Idle + RRC-Idle | When a UE is attached to the network (an MME), but not using any service. The mobility of a UE is handled by a cell reselection, procedure. |

TABLE 7

UE Location Information Set in Each EPS Entity

| Case | State | UE | eNB | S-GW | P-GW | MME | HSS | PCRF | SPR |
|---|---|---|---|---|---|---|---|---|---|
| A | EMM-Deregistered + ECM-Idle + RRC Idle | — | — | — | — | — | — | — | — |
| B | EMM-Deregistered + ECM-Idle + RRC-Idle | — | — | — | — | TAI of last TAU | MME | — | — |
| C | EMM- Registered + ECM-Connected + RRC-Connected | — | Cell/eNB | Cell/eNB | Cell/eNB | Cell/eNB | MME | Cell/eNB | — |

TABLE 7-continued

UE Location Information Set in Each EPS Entity

| Case | State | UE | eNB | S-GW | P-GW | MME | HSS | PCRF | SPR |
|---|---|---|---|---|---|---|---|---|---|
| D | EMM-Registered + ECM-Idle + RRC-Idle | — | — | TAI of last TAU | TAI of last TAU | TAI of last TAU | MME | TAI of last TAU | — |

Figure 12:
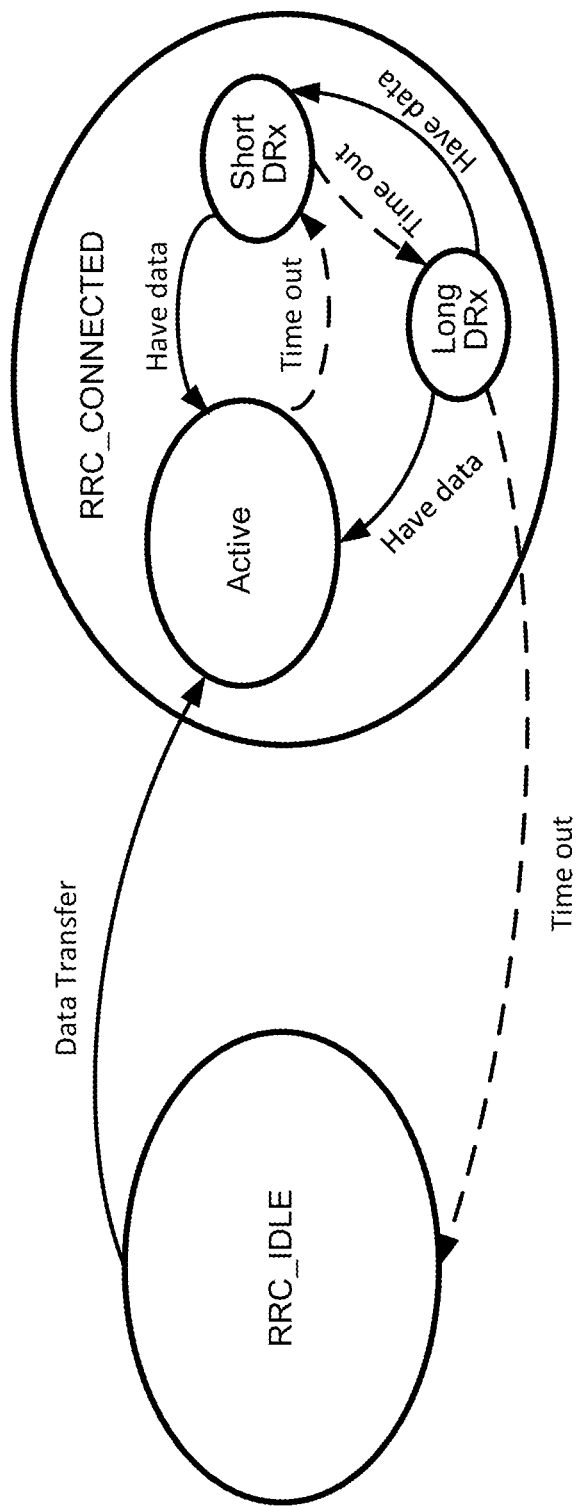
FIG. 12 illustrates an RRC protocol state machine.

FIG. 12 is a more detailed illustration of the RRC state machine. In RRC_IDLE, there is no RRC context in the Radio Access Network (RAN) and the UE does not belong to a specific cell. No data transfer may take place in RRC_IDLE. A UE is in a low-power state and only listening to control traffic-control channel broadcasts, such as paging notifications of inbound traffic and changes to the system information. The UE must first synchronize itself to the network by listening to the network broadcasts and then issue a request to the RRC to be moved to the "connected" state to establish the RRC context between RAN and UE. In LTE-Advanced, the target time was further reduced to 50 ms.

Figure 13:
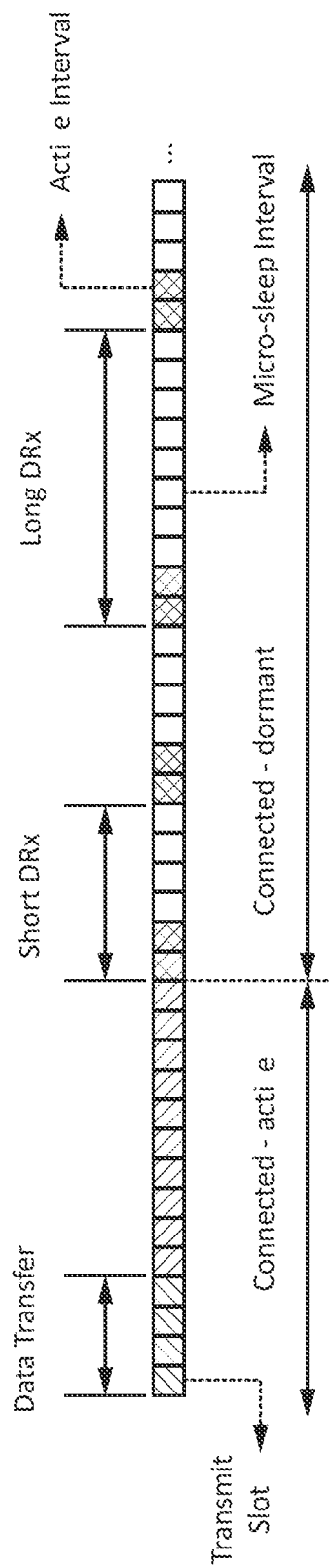
FIG. 13 illustrates an example of timeslots in discontinuous reception.

In RRC_CONNECTED, there is an RRC context and resource assignment for a UE. The cell to which the UE belongs is known and an identity of the UE, the Cell Radio-Network Temporary Identifier (C-RNTI), used for signaling purposes between the UE and the network, has been configured. The UE is in a high-power state and ready to transmit to or receive data from the Evolved Node B (eNB). Discontinuous Reception (DRX) is used to conserve UE power. Every radio transmission, no matter how small, forces a transition to a high-power state. Then, once the transmission is done, the radio will remain in this high-power state until the inactivity timer has expired. The size of the actual data transfer does not influence the timer. Further, the device may then also have to cycle through several more intermediate states before it can return back to idle. The "energy tails" generated by the timer-driven state transitions make periodic transfers a very inefficient network access pattern on mobile networks. See FIG. 13.

In RAN 2 #94 meeting, the concept of "RAN controlled state" (also called as INACTIVE state in some papers—see, e.g., R2-165722, Discussion on new RRC state in NR, by Samsung) for NR has been discussed such that UEs in RAN controlled state should incur minimum signaling, minimize power consumption, minimize resource costs in the RAN/CN making it possible to maximize the number of UEs utilizing (and benefiting from) this state. Moreover, UEs in RAN controlled state shall be able to start data transfer with low delay as required by RAN requirements. In RAN 2 #95, more details about the RAN controlled state have been further studied and the following agreements were reached.

First, a UE has only one NR RRC state at one time. Second, the connection (both CP and UP) between RAN and Core should be maintained in the "new state". Third, for the UE in the "new state", a RAN initiated notification procedure should be used to reach UE. And the notification related parameters should be configured by RAN itself. Fourth, for the UE in the "new state", RAN should be aware whenever the UE moves from one "RAN-based notification area" to another. For further study are the questions of whether the "new state" can be transparent to Core, how the notification will be transmitted (e.g. via a beam, broadcast, etc.), and how CN location updates and RAN updates interact, if needed.

LTE includes Access Stratum (AS) procedures of Idle mode. In LTE, the UE idle mode procedures can be subdivided into four processes 3GPP TS 36.304, User Equipment (UE) procedures in idle mode (Release 13), V13.2.0: PLMN selection; cell selection and reselection; location registration; and support for manual Closed Subscriber Group (CSG) selection.

Figure 14:
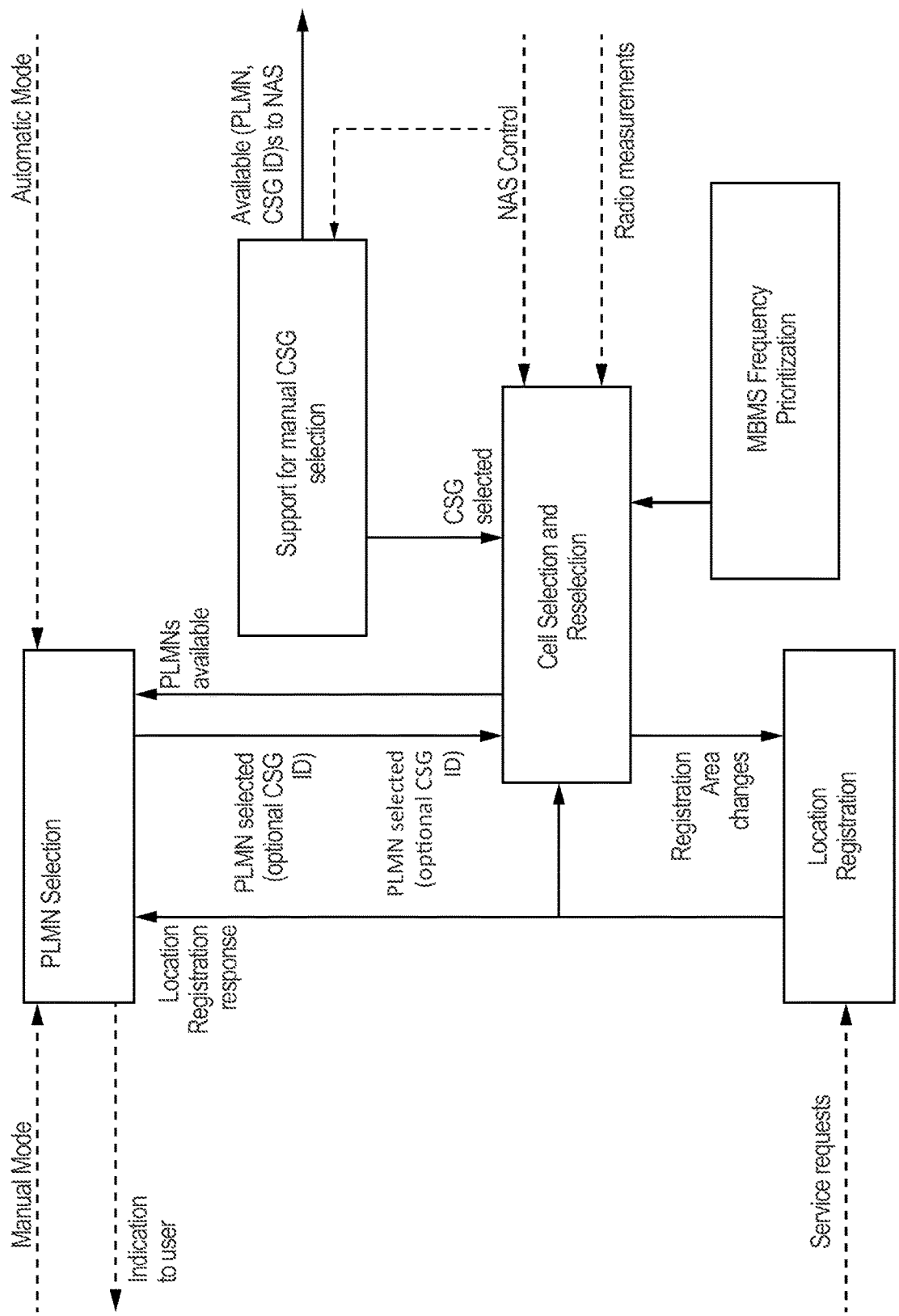
FIG. 14 illustrates an example overall idle mode operations.

The relationship between these processes is illustrated in FIG. 14. When a UE is switched on, a public land mobile network (PLMN) is selected by NAS. For the selected PLMN, associated RAT(s) may be set. See 3GPP TS 23.122, NAS functions related to Mobile Station (MS) in idle mode (Release 14), V14.0.0. The NAS shall provide a list of equivalent PLMNs, if available, that the AS shall be used for cell selection and cell reselection.

With the cell selection, the UE searches for a suitable cell of the selected PLMN and chooses that cell to provide available services, further the UE shall tune to its control channel. This choosing is known as "camping on the cell".

If the UE finds a more suitable cell, according to the cell reselection criteria, it reselects onto that cell and camps on it. If the new cell does not belong to at least one tracking area to which the UE is registered, location registration is performed.

The purpose of camping on a cell in idle mode is fivefold: First, it enables the UE to receive system information from the PLMN. Second, when registered and if the UE wishes to establish an RRC connection, it can do this by initially accessing the network on the control channel of the cell on which it is camped.

Third, if the PLMN receives a call for the registered UE, it knows (in most cases) the set of tracking areas in which the UE is camped. It can then send a "paging" message for the UE on the control channels of all the cells in this set of tracking areas. The UE will then receive the paging message because it is tuned to the control channel of a cell in one of the registered tracking areas and the UE can respond on that control channel.

Fourth, it enables the UE to receive ETWS and CMAS notifications. Fifth, it enables the UE to receive MBMS services.

If the UE is unable to find a suitable cell to camp on or if the location registration failed, it attempts to camp on a cell irrespective of the PLMN identity, and enters a "limited service" state.

LTE includes cell selection and reselection in Idle mode. UE shall perform measurements for cell selection and reselection purposes as specified in 3GPP TS 36.133, Requirements for Support of Radio Resource Management (Release 13) V13.2.0.

The NAS can control the RAT(s) in which the cell selection should be performed, for instance by indicating RAT(s) associated with the selected PLMN, and by maintaining a list of forbidden registration area(s) and a list of equivalent PLMNs. The UE shall select a suitable cell based on idle mode measurements and cell selection criteria.

In order to speed up the cell selection process, stored information for several RATs may be available in the UE.

When camped on a cell, the UE shall regularly search for a better cell according to the cell reselection criteria. If a better cell is found, that cell is selected. The change of cell may imply a change of RAT. Details on performance requirements for cell reselection can be found in 3GPP TS 36.133.

The NAS is informed if the cell selection and reselection results in changes in the received system information relevant for NAS.

For normal service, the UE shall camp on a suitable cell, tune to that cell's control channel(s) so that the UE can receive system information from the PLMN, receive registration area information from the PLMN, e.g., tracking area information, and receive other AS and NAS Information. If registered, the UE can receive paging and notification messages from the PLMN and initiate transfer to connected mode.

Figure 15A:
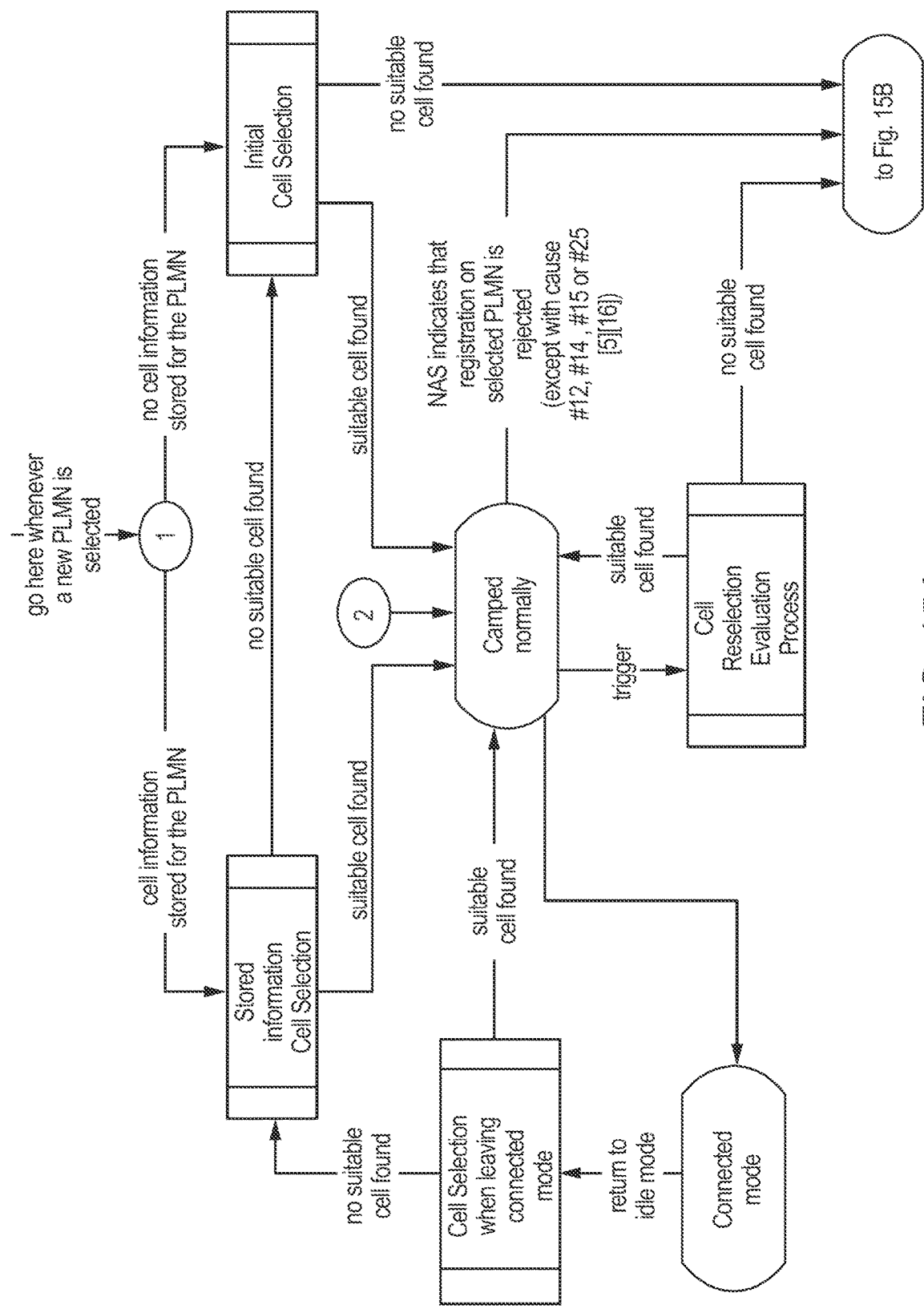
FIGS. 15A and 15B is a flow chart of an example RRC_IDLE UE cell selection and reselection in LTE.
Figure 15B:
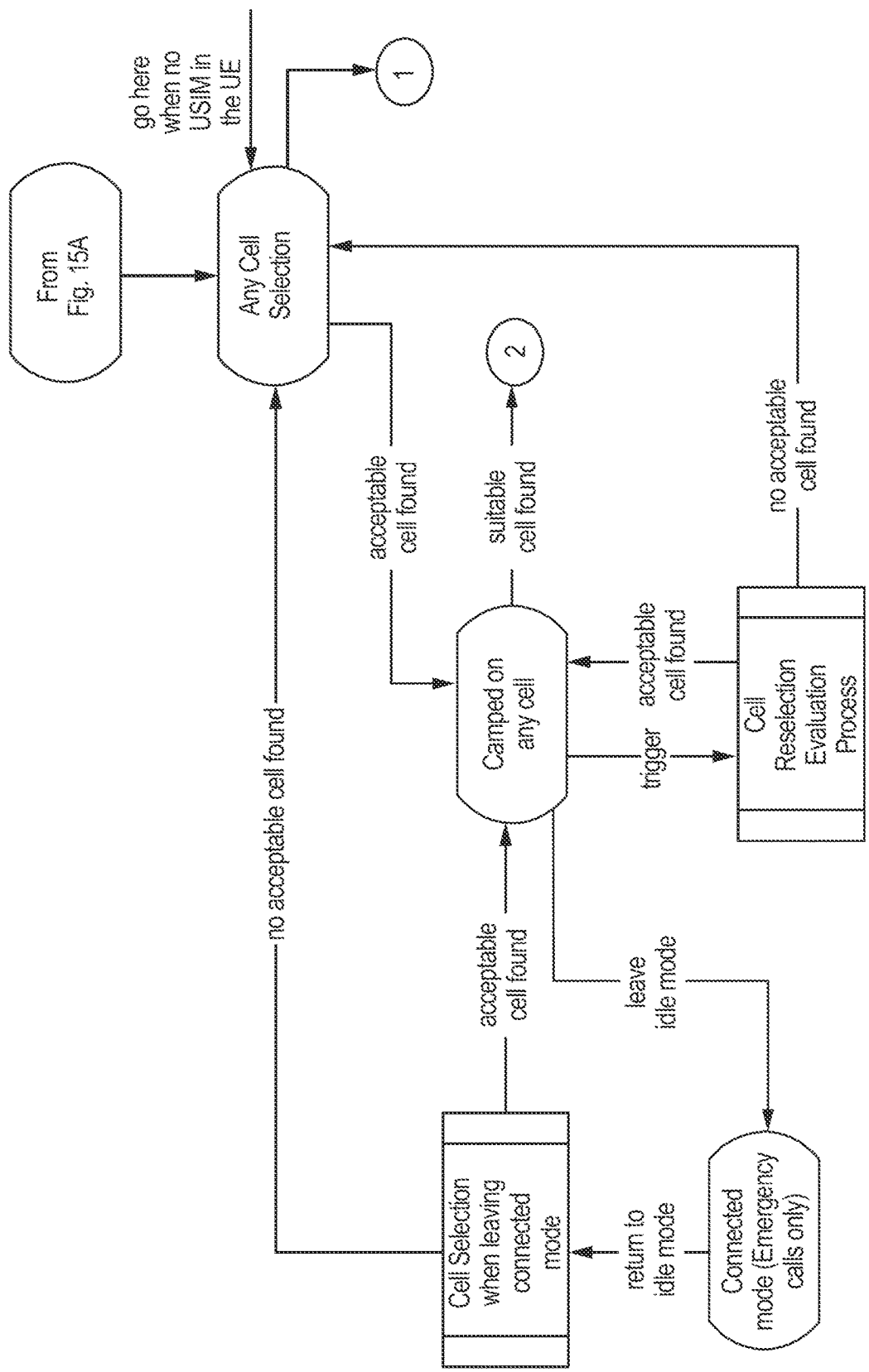

FIGS. 15A and 15B shows the LTE UE states and state transitions and procedures in RRC_IDLE. Whenever a new PLMN selection is performed, it causes an exit to number 1.

In LTE, the random access method is performed for the following events as e.g., as described in 3GPP TS 36.300: initial access from RRC_IDLE; RRC Connection Re-establishment method; handover; DL data arrival during RRC_CONNECTED requiring random access method (e.g., when UL synchronization status is "non-synchronized"); UL data arrival during RRC_CONNECTED requiring random access method (e.g., when UL synchronization status is "non-synchronized" or there are no PUCCH resources for SR available. For positioning purpose during RRC_CONNECTED requiring random access method (e.g., when timing advance is needed for UE positioning.)

Figure 16:
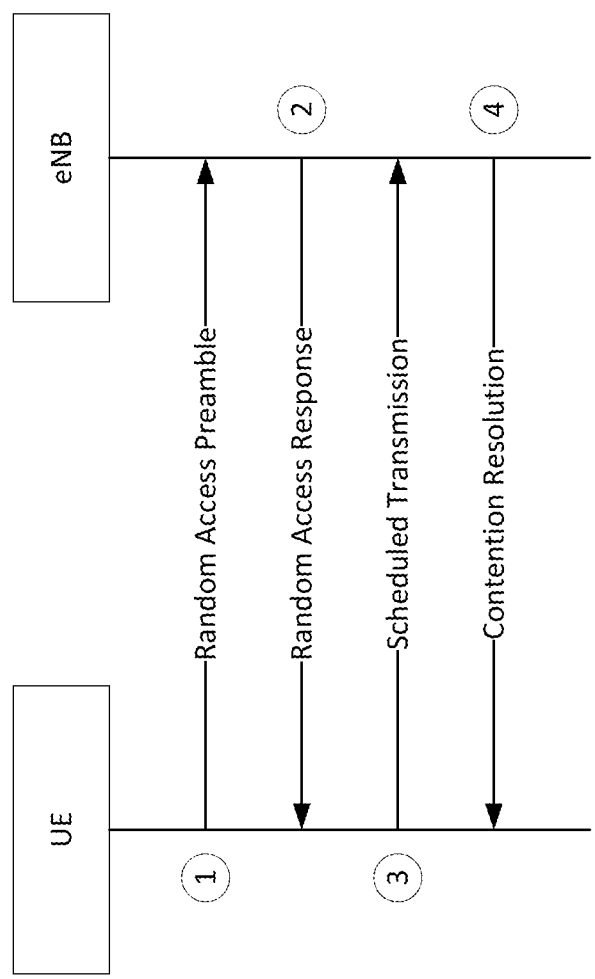
FIG. 16 shows a call flow for an example contention-based random access method.

The random access method takes two distinct forms: contention based (applicable to first five events); and non-contention based (applicable to only handover, DL data arrival, positioning and obtaining timing advance alignment for a Secondary Timing Advance Group (sTAG)). Contention based random access uses a 4 step method, as shown in FIG. 16.

There are four steps of the contention based random access methods. Step 1 is Random Access Preamble on RACH in uplink, including transmission of RACH preamble, allowing eNB to estimate the transmission timing of the UE. Step 2 is Random Access Response generated by MAC on DL-SCH. Network transmits a timing advance command to adjust the UE transmit timing. The network also assigns UL resources to the UE to be used in Step 3, which is the first scheduled UL transmission on UL-SCH. Step 3 includes transmission of the mobile-terminal identity to the network using the UL-SCH. Step 4 is Contention Resolution on DL, including transmission of a contention-resolution message from the network to the UE on the DL-SCH.

Contention-free random access is only used for re-establishing uplink synchronization upon downlink data arrival, handover and positioning. Only the first two steps of the method above are applicable, as there is no need for contention resolution when performing the contention-free random access method. A more detailed description of the random access method from the PHY and MAC layer perspectives is available in 3GPP TS 36.213 Physical Layer Methods (Release 13) and 3GPP TS 36.321 Medium Access Control (MAC) protocol specification (Release 13) respectively.

During RAN #71, a study item (SI) [14] on New Radio Access Technology was approved. In particular, the SI description (SID) includes a statement that the study aims to develop a new RAT to meet a broad range of use cases including enhanced mobile broadband, massive MTC, critical MTC, and additional requirements defined during the RAN requirements study. RAN #71 further states that the new RAT will consider frequency ranges up to 100 GHz (TR38.913).

In order to overcome the larger path loss of such high frequency ranges, beamforming with directional antenna gain is envisioned as a key enabling technique for meeting the spectrum efficiency and coverage requirements at higher frequencies.

NR is different from LTE. One new dimension is the RF beamforming capability at the Transmission/Reception Point (TRP). A gNB may have multiple TRPs (either centralized or distributed). Each TRP can form multiple beams. The number of beams formed for certain coverage and the number of simultaneously active beams in the time/frequency domain depend on the number of antenna elements in the antenna array and the number of RF chains at the TRP. Similarly, the UE may also support beamforming towards the TRP(s). A UE may support a single or multiple transmit and receive beams.

Beam sweeping may be used. Since the directional beam naturally results in a smaller beam width/angular space, the UE and/or TRP may need to form a beam at each direction and conduct beam sweeping until all 360 degrees are covered. For example, assume each beam width is x degrees. If the TRP can only form ONE beam at a time, it will take y beam-sweeps to cover 360 degrees, where y≥[360/x], where [.] is the nearest integer function, ≥is due to possible overlapping of adjacent beams. There are several challenges when using beamforming: a) sending a reference signal (e.g., sending reference signal for each beam may not be energy efficient), b) discovering the TRP (e.g., a TRP may be temporarily not detectable due to beam sweeping), and c) maintaining the serving beam (e.g., potentially very frequent beam changing). So it is good to keep in mind these challenges when designing mobility in NR.

Beam change cases may be used in the intra-cell High Frequency New Radio (HF-NR) system. In a HF-NR system consisting of beamforming with directional antenna gain, the best beams for transmission and reception may be changed among time, due to the radio environment variances, and/or UE mobility. Therefore, in order to maintain connectivity, NR TRP/Node and UE should be able to track and change the serving beam properly. Example possible beam change use cases of a UE in the intra-cell HF-NR system are given in Table 8.

TABLE 8

Example Beam Change Use Cases

| TRP | Use Case | Use Case number | TRP/Node-B beam changed | UE beam changed | Note |
|---|---|---|---|---|---|
| Intra-cell | Intra-TRP (or Node-B if no TRP) | ① | X | X | Maintains the current scheduling beam pair |
| | | ② | ✓ | X | Change the TRP/Node-B scheduling beam |
| | | ③ | X | ✓ | Change UE beam For DL, feedback may not be needed if TRP only needs to know the TRP beam for scheduling (FFS). |
| | | ④ | ✓ | ✓ | Change both TRP/Node-B beam and UE beam |
| Inter-TRP | | ⑤ | ✓ ✓ | ✓ X | Change TRP, TRP scheduling beam, and UE beam (if changed). Here, inter-TRP = TRP beam must also be changed. |

Figure 17:
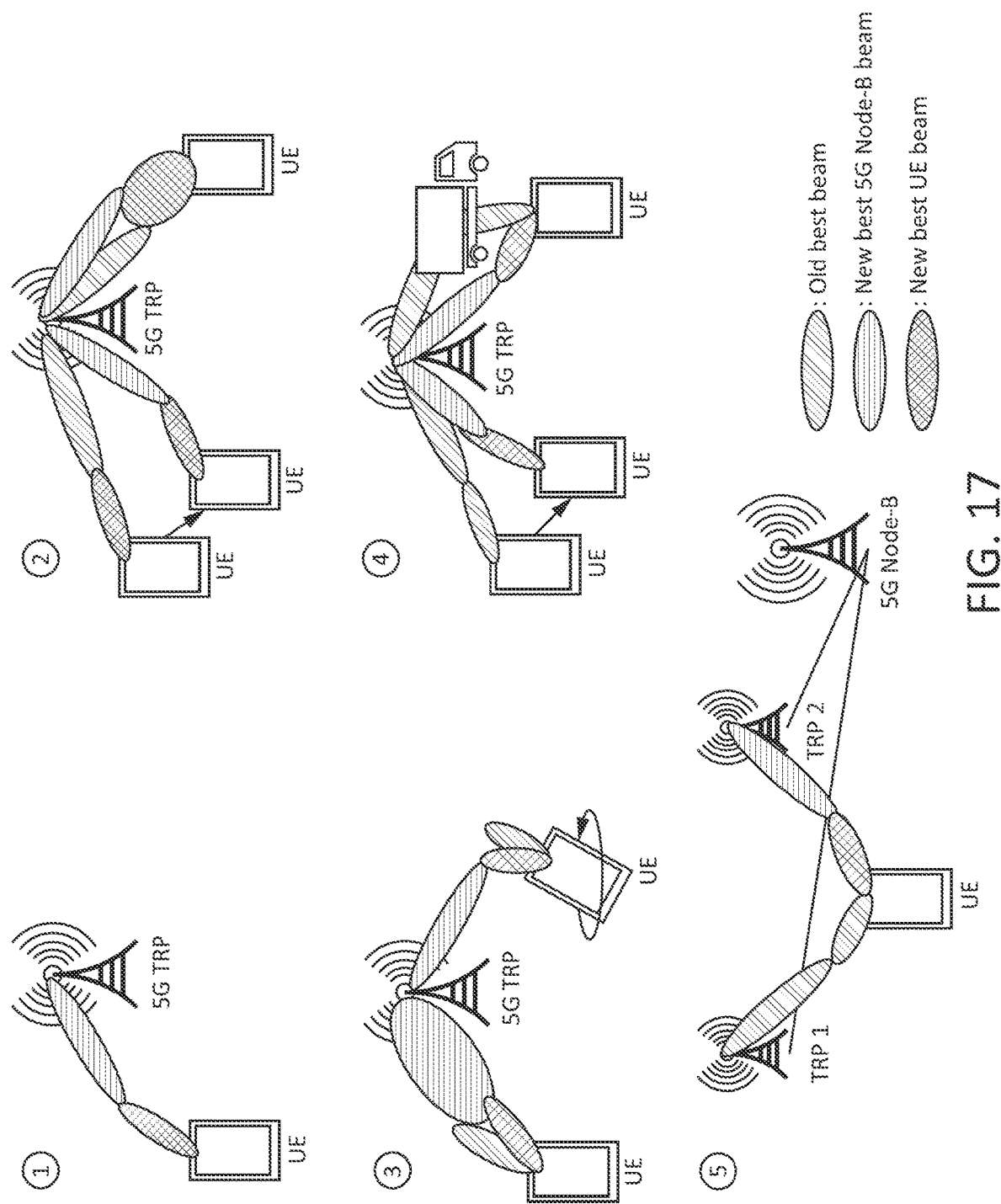
FIG. 17 illustrates example use cases of beam change cases of an intra-cell system.

Note that the above beam change may be considered on both downlink and uplink beams, with different measurement and feedback entity (for DL, UE, and for UL, TRP/Node-B). FIG. 17 shows examples of the various use cases presented in Table 8.

Currently, 3GPP standardization's efforts are underway to design the framework for beamformed access. The characteristics of the wireless channel at higher frequencies are significantly different from the sub-6 GHz channel that LTE is currently deployed on. The key challenge of designing the new Radio Access Technology (RAT) for higher frequencies will be in overcoming the larger path-loss at higher frequency bands. In addition to this larger path-loss, the higher frequencies are subject to an unfavorable scattering environment due to blockage caused by poor diffraction. Therefore, MIMO/beamforming is essential in guaranteeing sufficient signal level at the receiver end R1-164013, Framework for Beamformed Access (Samsung).

Relying solely on MIMO digital precoding used by digital Beam Forming (BF) to compensate for the additional path-loss in higher frequencies seems not enough to provide similar coverage as below 6 GHz. Thus, the use of analog beamforming for achieving additional gain can be an alternative in conjunction with digital beamforming. A sufficiently narrow beam should be formed with lots of antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in a 3-sector configuration. The limiting factors of the number of concurrent high gain beams include the cost and complexity of the transceiver architecture.

Figure 18:
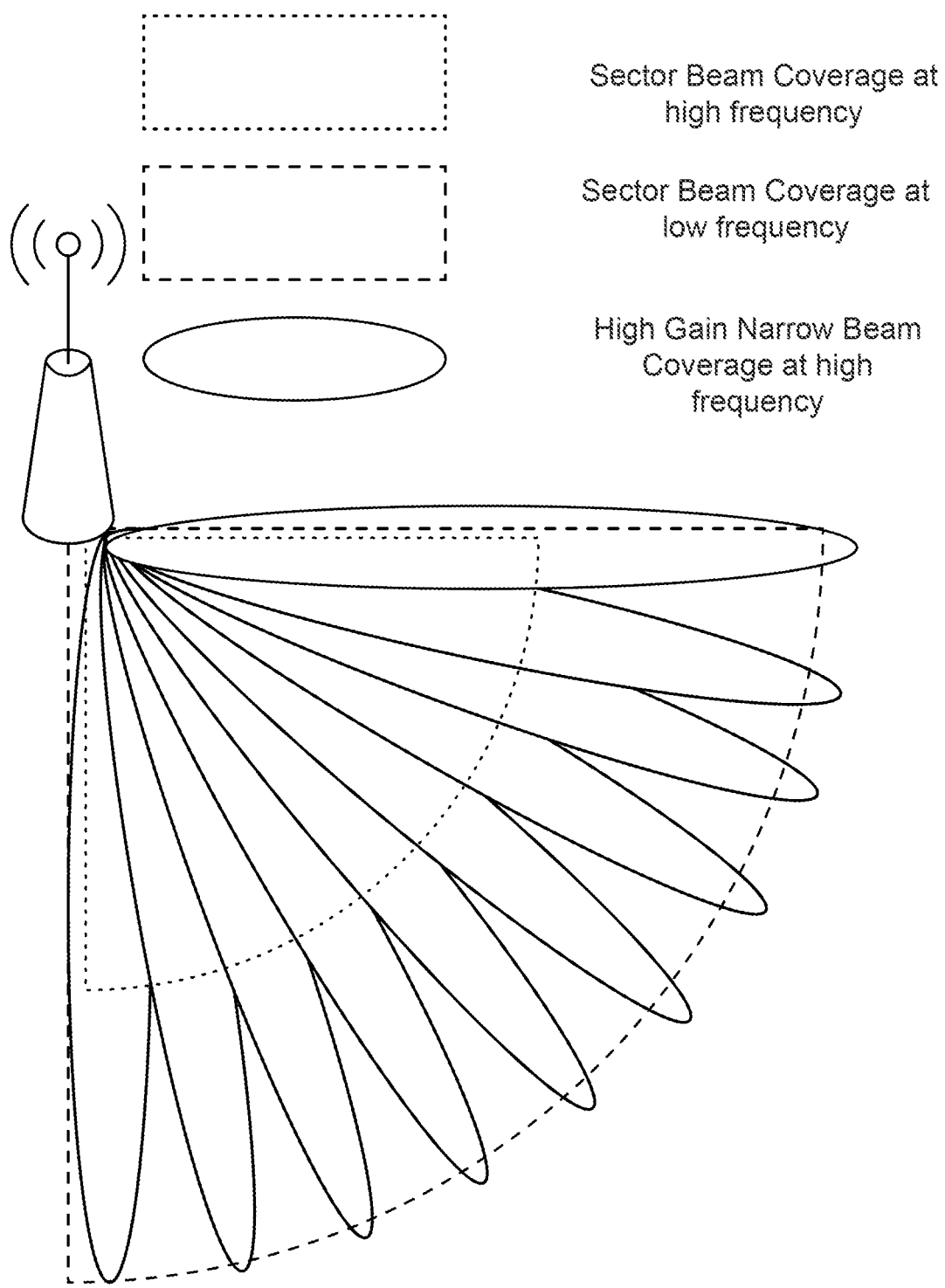
FIG. 18 illustrates an example of the partial overlap of HF sector beam coverage near an access point, LF sector beam coverage extending further from the access point, and high gain narrow beam coverage extending furthest from the access point.

Multiple transmissions in time domain with narrow coverage beams steered to cover different serving areas may be useful. Inherently, the analog beam of a subarray can be steered toward a single direction at the time resolution of an OFDM symbol or any appropriate time interval unit defined for the purpose of beam steering across different serving areas within the cell, and hence the number of subarrays determines the number of beam directions and the corresponding coverage on each OFDM symbol or time interval unit defined for the purpose of beams steering. In some literature, the provision of multiple narrow coverage beams for this purpose has been called "beam sweeping". For analog and hybrid beamforming, the beam sweeping seems to be essential to provide the basic coverage in NR. This concept is illustrated in FIG. 18 where the coverage of a sector level cell is achieved with sectors beams and multiple high gain narrow beams. Also, for analog and hybrid beamforming with massive MIMO, multiple transmissions in time domain with narrow coverage beams steered to cover different serving areas is essential to cover the whole coverage areas within a serving cell in NR.

One concept closely related to beam sweeping is the concept of beam pairing which is used to select the best beam pair between a UE and its serving cell/TRP, which can be used for control signaling or data transmission. For the downlink transmission, a beam pair will consist of UE RX beam and NR-Node/TRP TX beam while for uplink transmission, a beam pair will consist of UE TX beam and NR-Node/TRP RX beam.

Another related concept is the concept of beam training which is used for beam refinement. For example as illustrated in FIG. 18, a coarser sector beamforming may be applied during the beam sweeping and sector beam pairing procedure. A beam training may then follow where for example the antenna weights vector are refined, followed by the pairing of high gain narrow beams between the UE and NR-Node.

In NR, the initial access procedure may include, for example, initial synchronization and cell search, beam training and tacking, and MIB system information delivery. Initial synchronization and cell search may involve DL synchronization channels, such as PSS and SSS. Beam training and tracking may involve the use of beam reference signals. MIB system information delivery may involve a PBCH channel.

Figure 19:
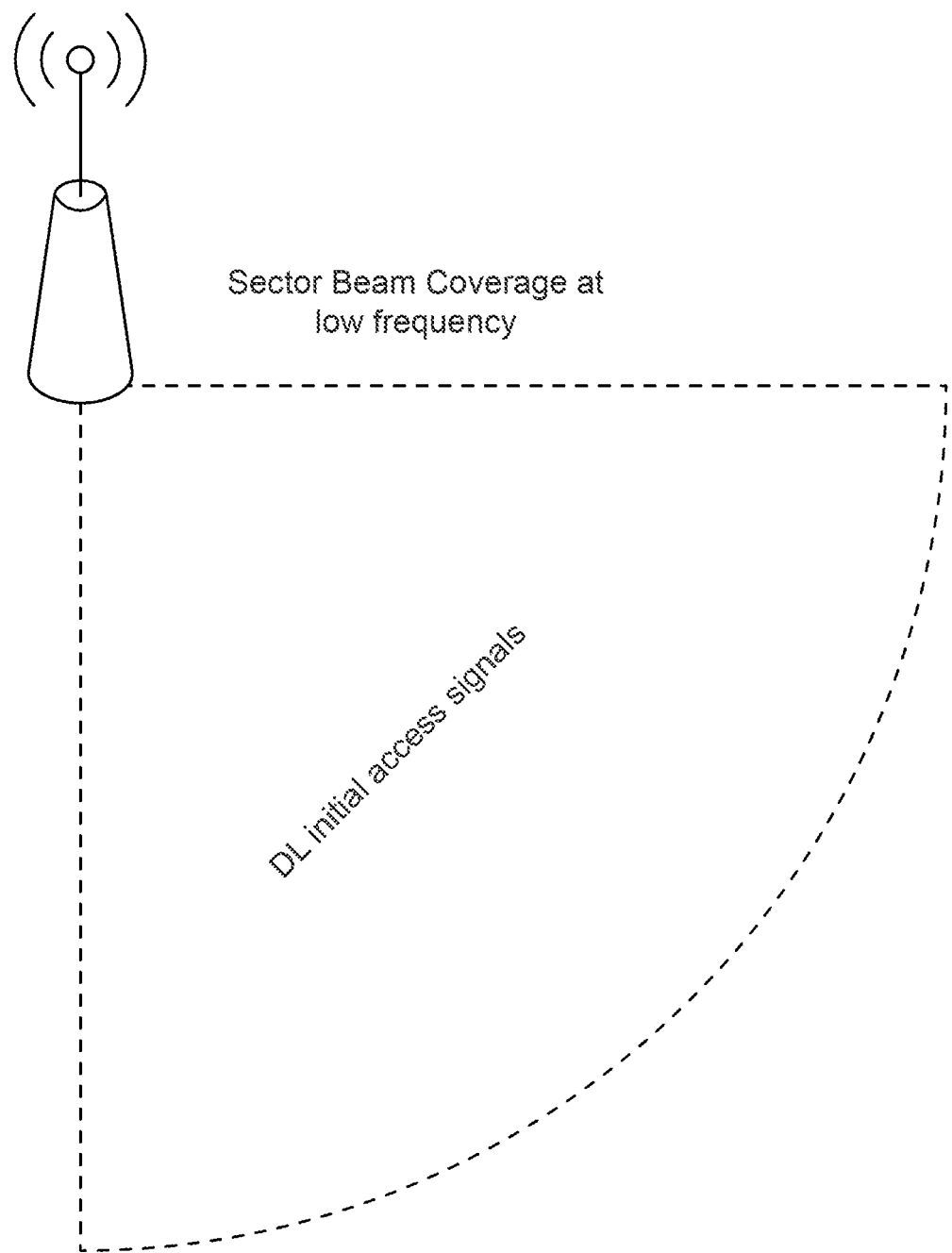
FIGS. 19 and 20 illustrate examples of single-beam and multi-beam coverage from the access point.
Figure 20:
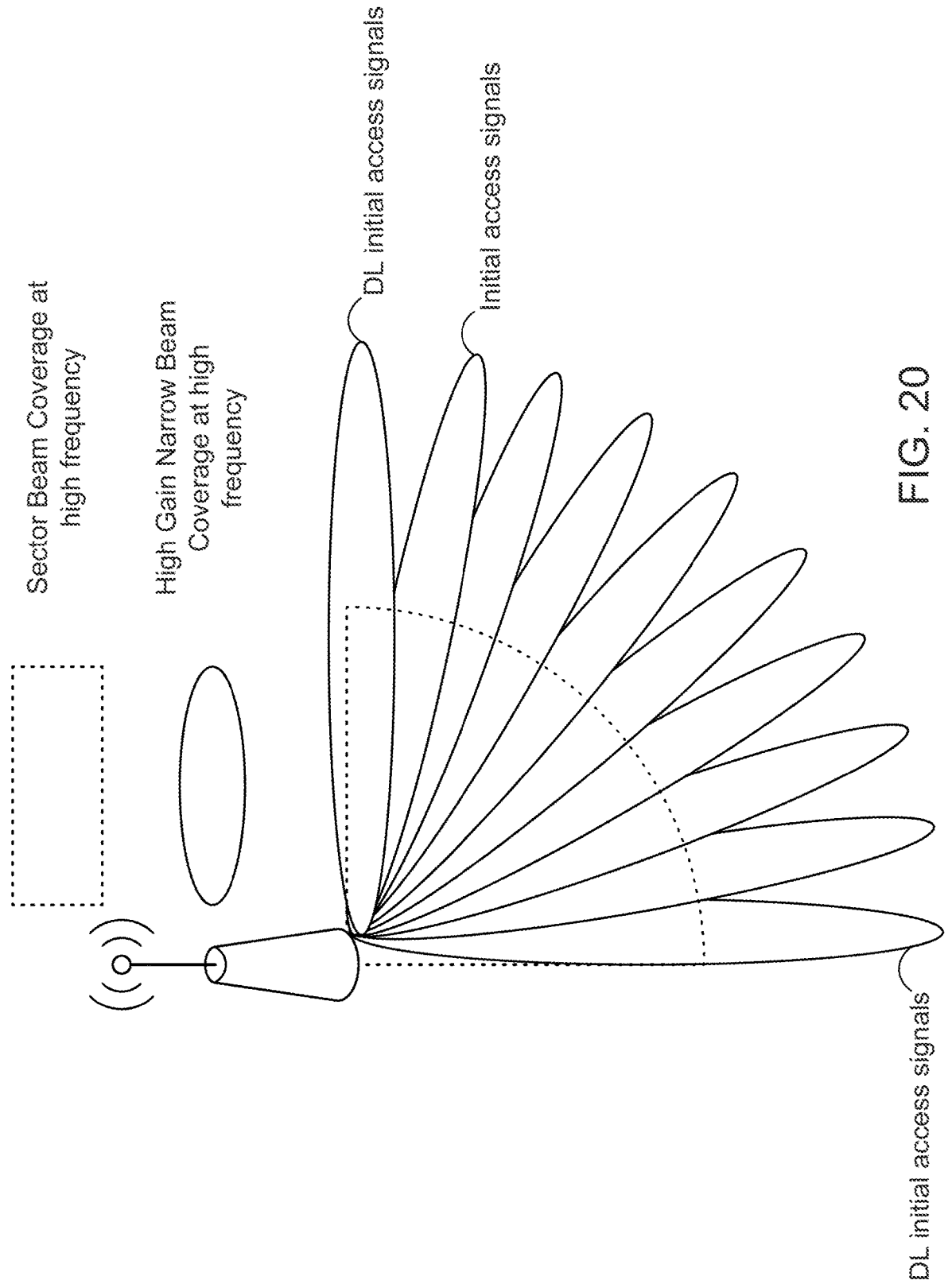

NR supports both Low Frequency NR (LF-NR), i.e., sub 6 GHz and High Frequency NR (HF-NR), i.e., above 6 GHz deployment. In LF-NR, a single wider beam may be sufficient for coverage. However, in HF-NR, a single wider beam might not be sufficient for coverage thus multiple narrow beams are a preferred solution for enhancing the coverage. Hence, NR may support both single beam based (or single sector) and multi-beams (multi-sectors) based approaches for initial access signal transmission. The initial access signal includes DL synchronization channels, i.e. PSS/SSS, beamforming reference signal and PBCH channel. The single and multi-beams for initial access signal transmission is illustrated in FIGS. 19 and 20. In FIG. 19, the DL initial access signals are transmitted with a single wider beam. In FIG. 20, the DL initial access signals are transmitted with each narrow beam and each narrow beam is aiming to different horizontal angels for a 2D beam instant.

Figure 21:
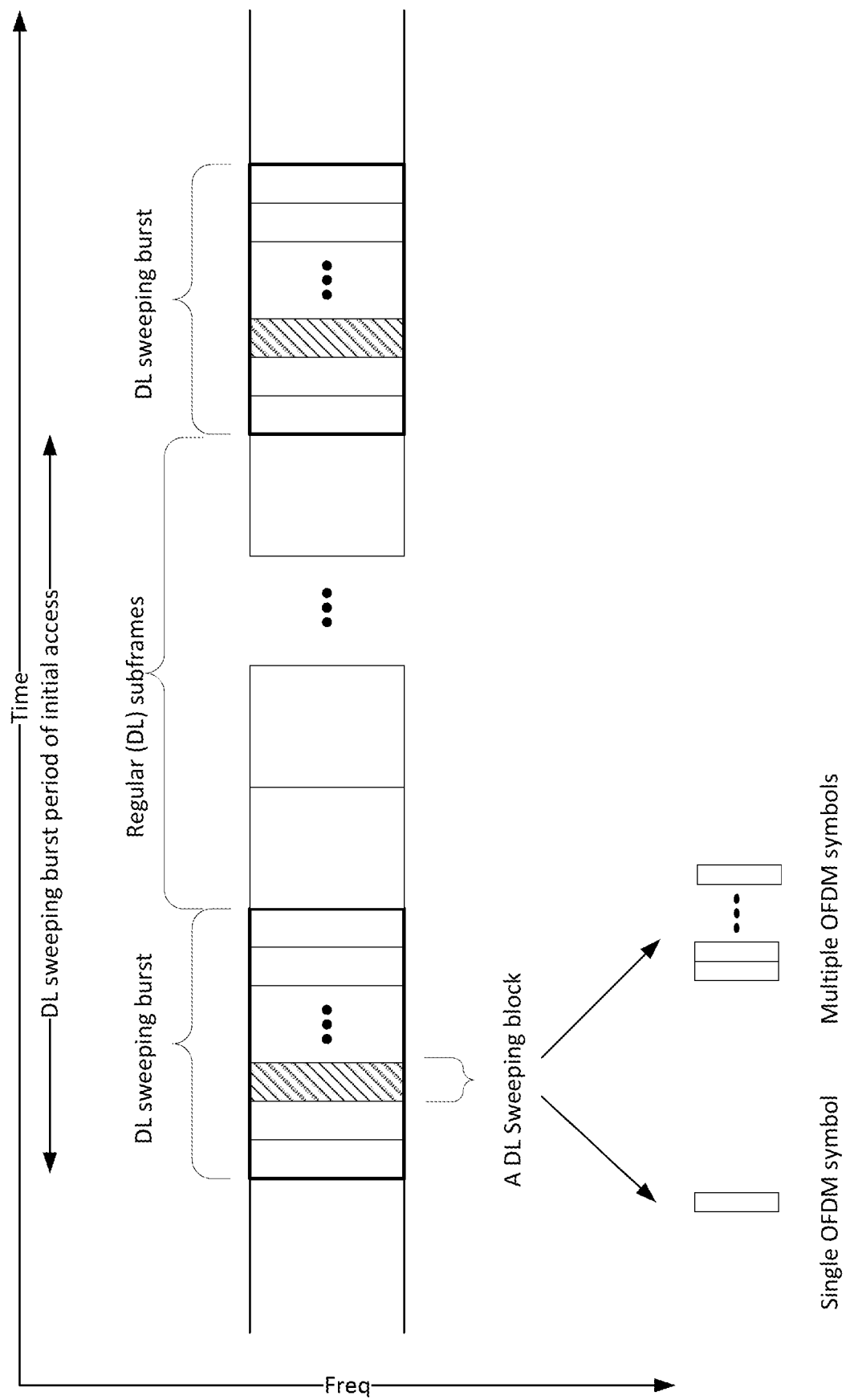
FIG. 21 shows an example DL sweeping block and subframe for DL initial access.

Since simultaneously transmitting large amount of multiple beams may be limited in a NR-node, so one of possible solutions to transmit multi-beams for DL initial access signals can use beam sweeping method. The beam sweeping can be categorized as either single sweeping beam or multi-sweeping beams at a time. Here we define a sweeping block as a unit of beam sweeping time unit. In addition, the beam sweeping subframe consists of multiple sweeping blocks, where each sweeping block may consist of at least one or more OFDM symbols. In FIG. 21, an example of DL sweeping subframe and block are depicted. The DL beam sweeping subframe may be periodically transmitted with a periodic time T. This periodic T may be varied with different applications such as URLLC, mMTC or eMBB services. In addition, single or multiple sweeping subframes can be used in NR system.

For beam sweeping block, it may carry DL initial access signals such as DL synchronization channels (PSS/SSS), beam tracking reference signals and PBCH channel. If an OFDM symbol is used per beam sweeping block then the DL synchronization channels, beam reference signal and PBCH has to co-exist in an OFDM symbol. In this case, the DL synchronization channel, beam reference channel and PBCH are FDMed in an OFDM symbol.

If multiple OFDM symbols are used per sweeping block, then each beam sweeping block can have a number of options. The DL synchronization channels, PSS/SSS may be placed at the different OFDM symbol, for example. Another option where only one DL synchronization channel is in a beam sweeping block, and PSS is either at the last OFDM symbol or the first symbol in a beam sweeping block. Similarly, the beam reference signal and PBCH may use the same OFDM symbol or in different OFDM symbols. Further PBCH might have a different transmission period than DL synchronization channel and beam reference signals.

Figure 22:
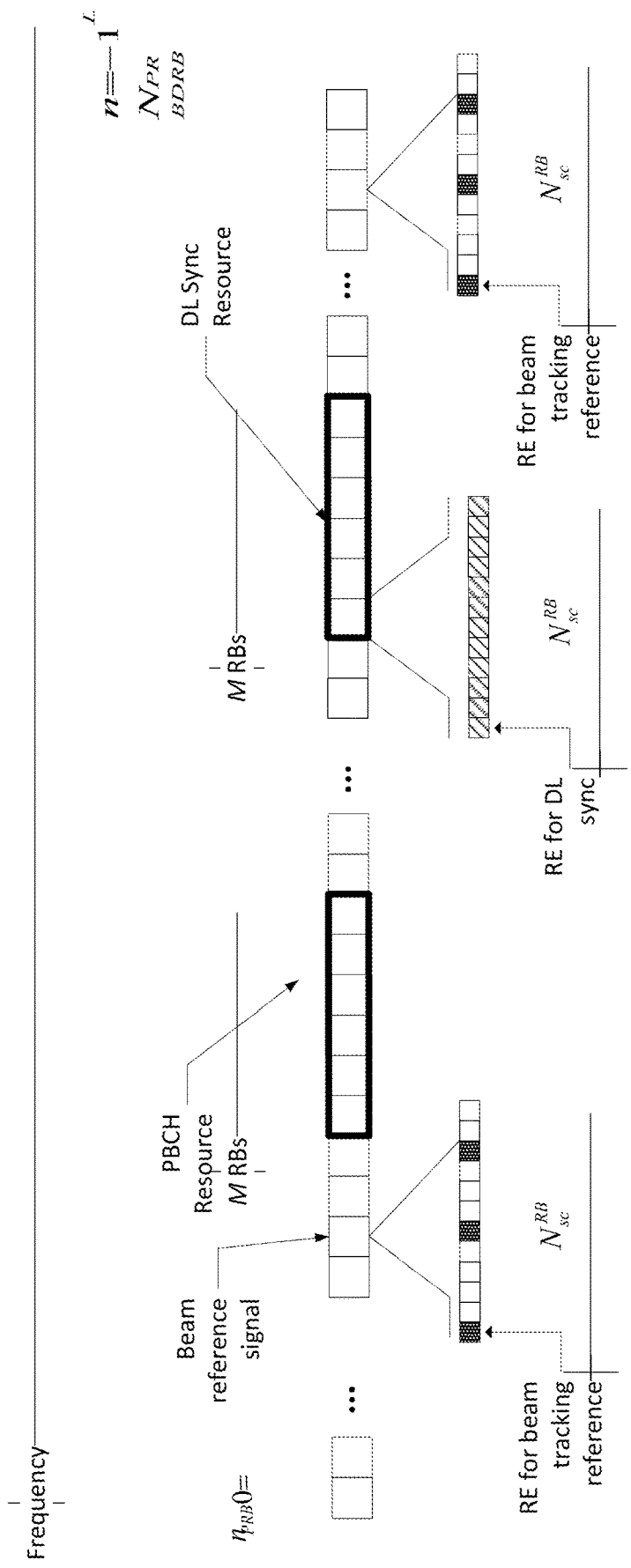
FIG. 22 shows an example DL sweeping block with one OFDM symbol.

FIG. 22, shows an example of a sweeping block where a single OFDM symbol is presented. In the example FIG. 22, the DL synchronization and PBCH co-exist.

Figure 23:
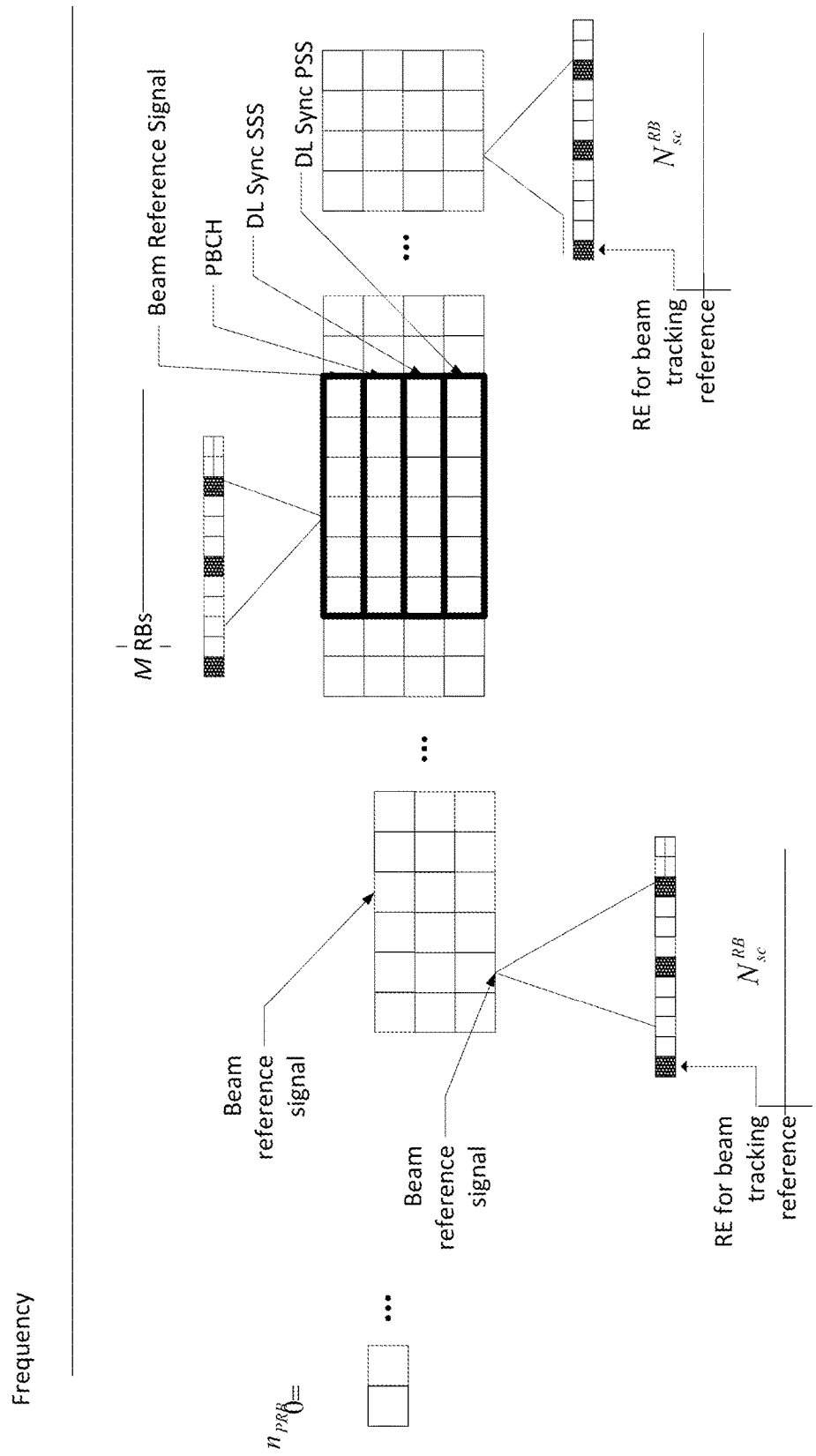
FIG. 23 shows an example DL sweeping block with multiple OFDM symbols.

FIG. 23 shows an example of a sweeping block where multiple OFDM symbols are presented. In the example FIG. 23, DL synchronization, PBCH and beam reference signal can be placed at different OFDM symbols. However, there is generally only one DL synchronization in a beam sweeping block.

Figure 24:
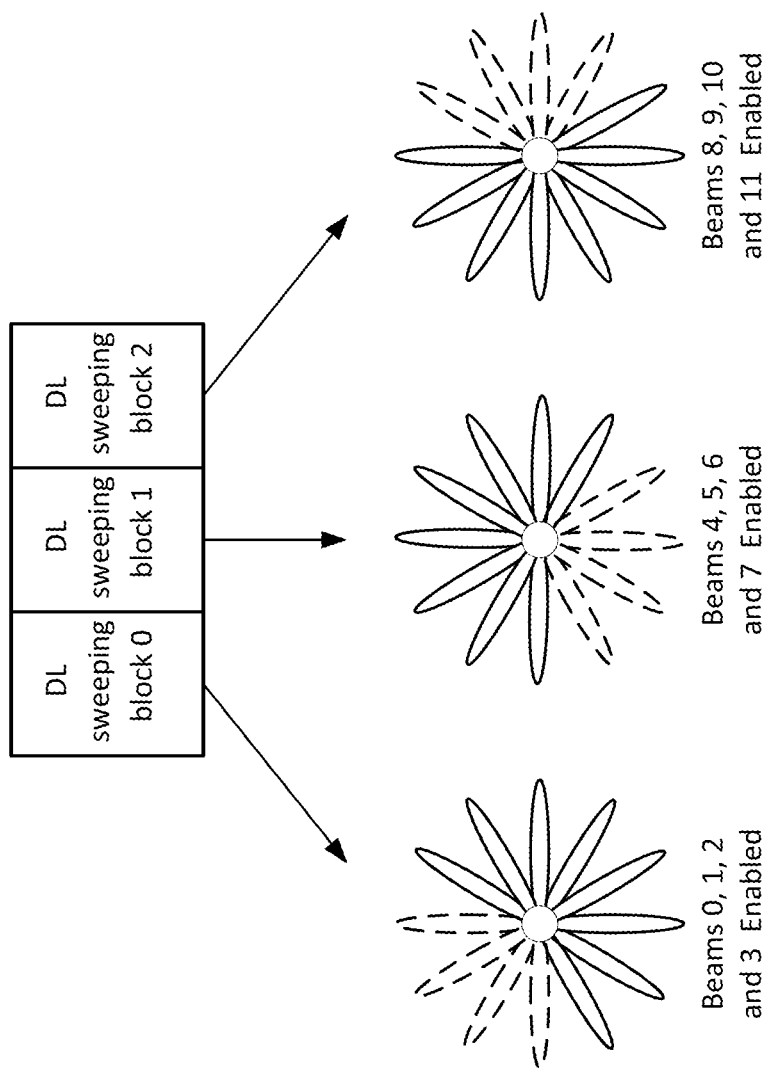
FIGS. 24 and 25 show examples of sweeping subframe with multiple beams enabled per sweeping block.
Figure 25:
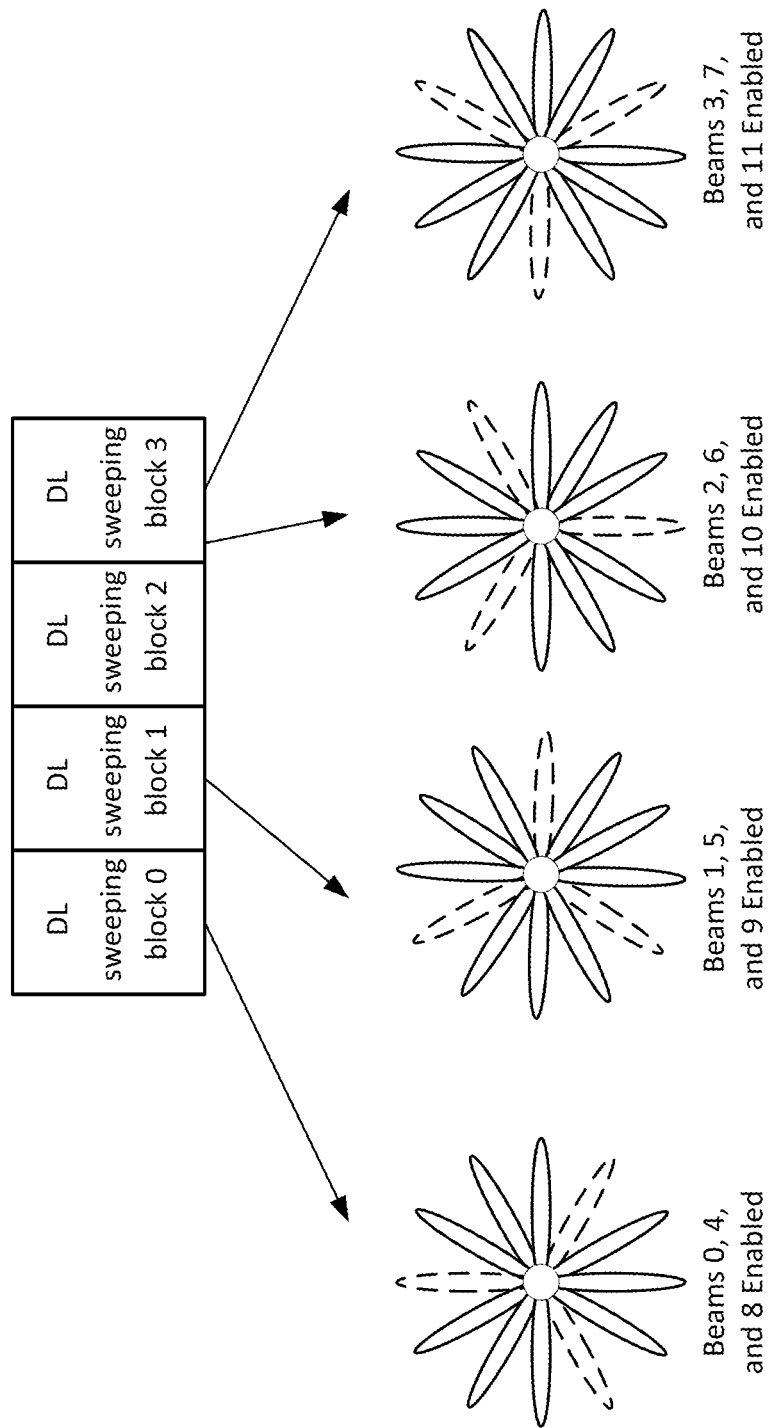

In order to perform beam sweeping, the NR-Node enables a subset of the beams during each sweeping block. Either a single beam or multi-beams can be associated with a beam sweeping block. FIG. 24 shows an example where 1 sector consisting of 4 beams is enabled per sweeping block. In this example, the full set of 12 beams is swept in 3 sweeping blocks. FIG. 25 shows an example where 1 beam in each sector is enabled per sweeping block. In this example, the full set of 12 beams is swept in 4 sweeping blocks.

Figure 26:
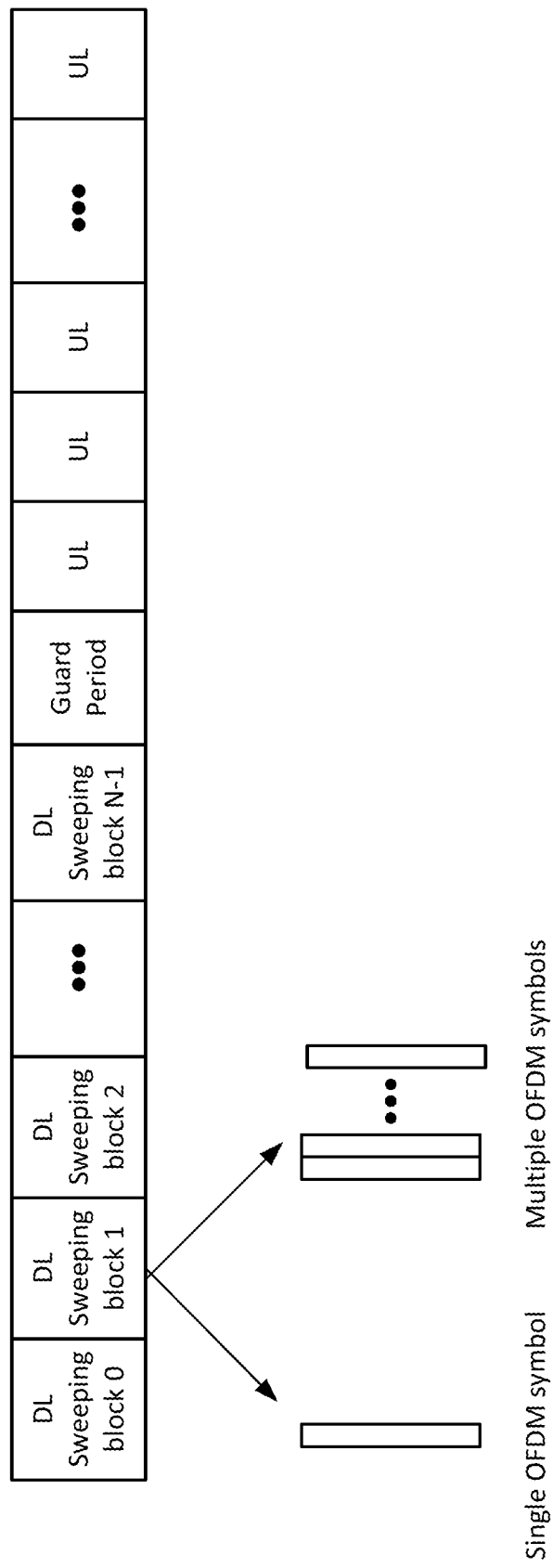
FIG. 26 shows an example of a DL self-contained sweeping subframe structure.

The sweeping block can be adopted for self-contained subframe. FIG. 26 shows an example of a self-contained sweeping subframe structure with DL sweeping blocks, separated by a guard period to allow for Rx/Tx switching.

UE mobility management is discussed in 3GPP TdocR2-162210, Beam level management. LTE Rel-11 supports cells consisting of many TRPs, where the transmissions of the TRPs can be further directed to a specific UE, e.g., transmissions from one TRP do not necessarily have the same coverage area. Which TRP to use for a certain UE is determined by Layer 1 (L1), e.g., Physical Layer, based on UE feedback measured from the CSI-RS transmitted by the TRPs. Although RRC is still involved in informing the UE about CSI-RS configurations and UE feedback configurations, RRC is not directly involved in the switching from one TRP to another TRP in subsequent Transmission Time Interval (TTIs). Similarly, RRC is also not involved in determining the direction of the beam used towards a UE. This TRP or beam forming or selecting is determined based on L1 feedback from the UE, and RRC is not involved in the beam direction to a specific UE although RRC is involved in the configuration of the feedback reporting.

The selection of what TRP to use for a certain UE and how to direct the transmission towards that UE is generally called beam level UE mobility management. In LTE, UE mobility is handled on two levels: cell level mobility; cell selection/reselection in IDLE, and; Handled by RRC in CONN state; Beam level management; L1 handles appropriate selection of the TRP to use for a UE and the optimal beam direction NR systems are expected to rely more heavily on "beam based mobility" to handle UE mobility, in addition to the cell based handover for UE mobility. Technologies like MIMO, front-haul, Cloud-RAN (C-RAN) and Network Functions Virtualization (NFV) will allow the coverage area controlled by one NR Node to grow, thus increasing the possibilities for beam level management and reducing the need for cell level mobility. All mobility within the coverage area of one NR node could be handled at beam level, and the cell level handovers could be used only for mobility management among NR Nodes.

Since there will always be boundaries to an area controlled by one NR Node, cell level mobility is still necessary. For these cases RRC based handover seems an appropriate mechanism. The UE will probably need to perform cell reselection in IDLE state or to measure and report a measurement on cell quality in a CONN state, which could result in an inter-NR node handover.

Beamforming may be impacted by UE rotation in NR. Beamforming is important for higher frequency (>6 GHz) bands to overcome the large path-loss at those bands. Therefore, the UE rotation in above 6 GHz will have much bigger impact than sub-6 GHz bands. In 3GPP tdoc R1-166904, it is shown that UE rotation can use severe performance degradation when UE side beamforming is used.

In RAN1 meeting 86, it was agreed in R1-168308 to study impacts of UE movement, rotation and/or channel/beam blockage with respect to UE/TRP beam change and CSI mismatch from CSI reporting instance to data transmission instance. If was further agreed to study beam management of UE/TRP Tx/Rx beams and transmission/reception techniques to provide more robustness (e.g. semi-OL MIMO transmission, beam cycling, beam broadening).

Regarding NR measurements and mobility, during RAN2 #95, RAN2 discussed R2-166001 Draft Report RAN2 95 Gothenburg v0.1 and agreed that in 5G, the UE camps on the best cell during IDLE mode operation. However, it was not agreed how the UE determines the best cell During RAN2 #95, RAN2 agreed that here is an "xSS" (similar as LTE cell specific RS) and that on the "xSS" there is at least an NR Cell id, and further that the xSS is at least used in idle.

Regarding measurement in NR, initial agreements were made at the 3GPP TSG RAN WG1 Meeting #86 in Gothenburg, Sweden, 22-26 Aug. 2016. Draft Minutes report for RAN1 #86 v020 state that for RRM measurement in NR, at least DL measurement is supported with the consideration on both single-beam based operation and multi-beam based operation. For further study were the questions of the definition of RRM measurement for multi-beam based operation, DL signal for RRM measurement, and when DL measurement is applied. There is no conclusion that DL measurement is a complete solution for RRM measurement in NR at this time The draft minutes report for RAN1 #86 v020 included a number of DL L1/L2 beam management procedures supported within one or multiple TRPs. One procedure is used to enable UE measurement on different TRP Tx beams to support selection of TRP Tx beams/UE Rx beam(s). For beamforming at TRP, it typically includes an intra/inter-TRP Tx beam sweep from a set of different beams. For beamforming at UE, it typically includes a UE Rx beam sweep from a set of different beams. For further study is whether TRP Tx beam and UE Rx beam can be determined jointly or sequentially. A second procedure is used to enable UE measurement on different TRP Tx beams to possibly change inter/intra-TRP Tx beam(s) from a possibly smaller set of beams for beam refinement than in P-1. Thus, the second procedure can be a special case of the first procedure. A third procedure is used to enable UE measurement on the same TRP Tx beam to change UE Rx beam in the case UE uses beamforming.

R1-168468, Definitions Supporting Beam Related Procedures (Nokia, Qualcomm, CATT, Intel, NTT DoCoMo, Mediatek, Ericsson, ASB, Samsung, LG) describes beam management as a set of L1/L2 procedures to acquire and maintain a set of TRP(s) and/or UE beams that can be used for DL and UL transmission/reception, including beam determination, measurement, reporting, and sweeping. Beam determination refers to TRPs or UEs selecting of their own Tx/Rx beams. Beam measurement refers to TRPs or UEs measuring characteristics of received beamformed signals. Beam reporting refers to UEs reporting information regarding beamformed signals based on beam measurement. Beam sweeping refers to an operation of covering a spatial area, with beams transmitted and/or received during a time interval in a predetermined way.

Figure 27:
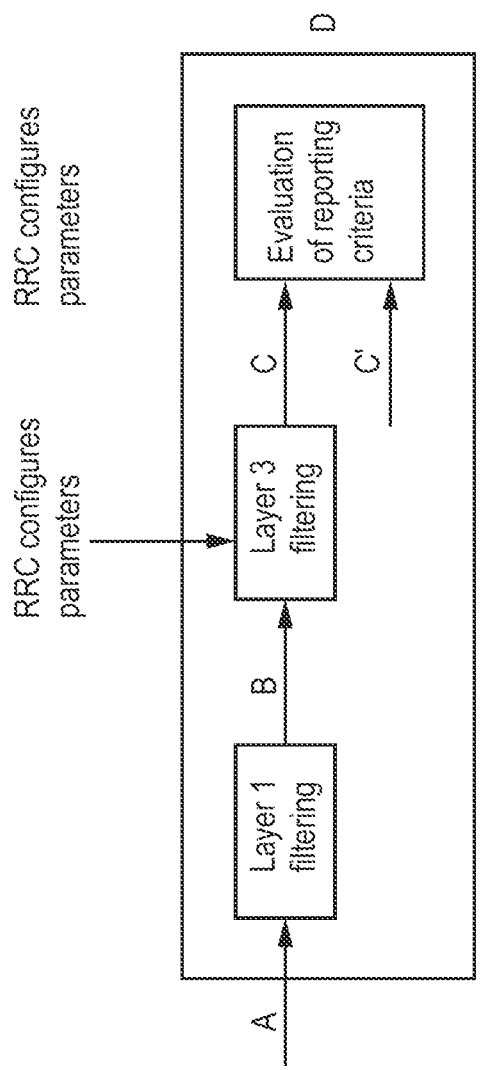
FIG. 27 illustrates an LTE measurement model.

Section 10.6 in 3GPP TR 38.913, Study on Scenarios and Requirements for Next Generation Access Technologies (Release 14), defines the measurement model currently used in LTE. The model is shown in FIG. 27. Inputs A are measurements (samples) internal to the physical layer. Layer 1 filtering is internal filtering of the inputs measured at point A. The exact filtering is implementation dependent. How the measurements are actually executed in the physical layer by an implementation (inputs A and Layer 1 filtering) in not constrained by the standard. Measurements B are reported by layer 1 to layer 3 after layer 1 filtering. Layer 3 filtering is performed on the measurements B. The behaviors of the Layer 3 filters are standardized and the configuration of the layer 3 filters is provided by RRC signaling. Measurements C result from processing in the layer 3 filter. The filtering reporting period for measure C equals is equal to one measurement period at B. The reporting rate is identical to the reporting rate at point B. This measurement is used as input for one or more evaluation of reporting criteria. An evaluation of reporting criteria checks whether actual measurement reporting is necessary at point D. The evaluation can be based on more than one flow of measurements at reference point C, e.g., to compare between different measurements. This is illustrated by inputs C and C'. The UE shall evaluate the reporting criteria at least every time a new measurement result is reported at point C, C'. The reporting criteria are standardized and the configuration is provided by RRC signaling (UE measurements). Measurement D is report information (message) sent on the radio interface.

Layer 1 filtering will introduce a certain level of measurement averaging. How and when the UE exactly performs the required measurements will be implementation specific to the point that the output at B fulfils the performance requirements set in 3GPP TS 36.133: Evolved Universal Terrestrial Radio Access (E-UTRA). Layer 3 filtering and parameters used is specified in 3GPP TS 36.331 and does not introduce any delay in the sample availability between B and C. Measurement at point C, C' is the input used in the event evaluation.

For NR system information, at the RAN2 #95 meeting it was agreed that that UEs should camp on the best cell. Two types of SI are the Minimum SI and Other SI. The content of Minimum SI should at least include information to support cell selection, for acquiring other SI, and for accessing the cell. The following five points were agreed at RAN2 #95, per the Gothenburg meeting chairman notes. First, proposals 1, 4, 5, 6 and 7 from R2-164006, Requirements for System Information Distribution (Ericsson) are to be captured as guidelines for SI design in RAN2 TR, with rephrasing of some proposals if needed. Second, mechanisms other than periodic broadcast of system information should be studied during study item. Third, minimum SI needs to be broadcasted periodically. Fourth, content of minimum SI will at least include information to support cell selection, for acquiring other SI, and for accessing the cell. Fifth, it will be a network decision whether other SI is broadcasted or delivered through UE-specific signaling.

The design of Minimum SI shall consider the efficiency of distribution and the power consumption for access networks and the UEs.

Figure 28:
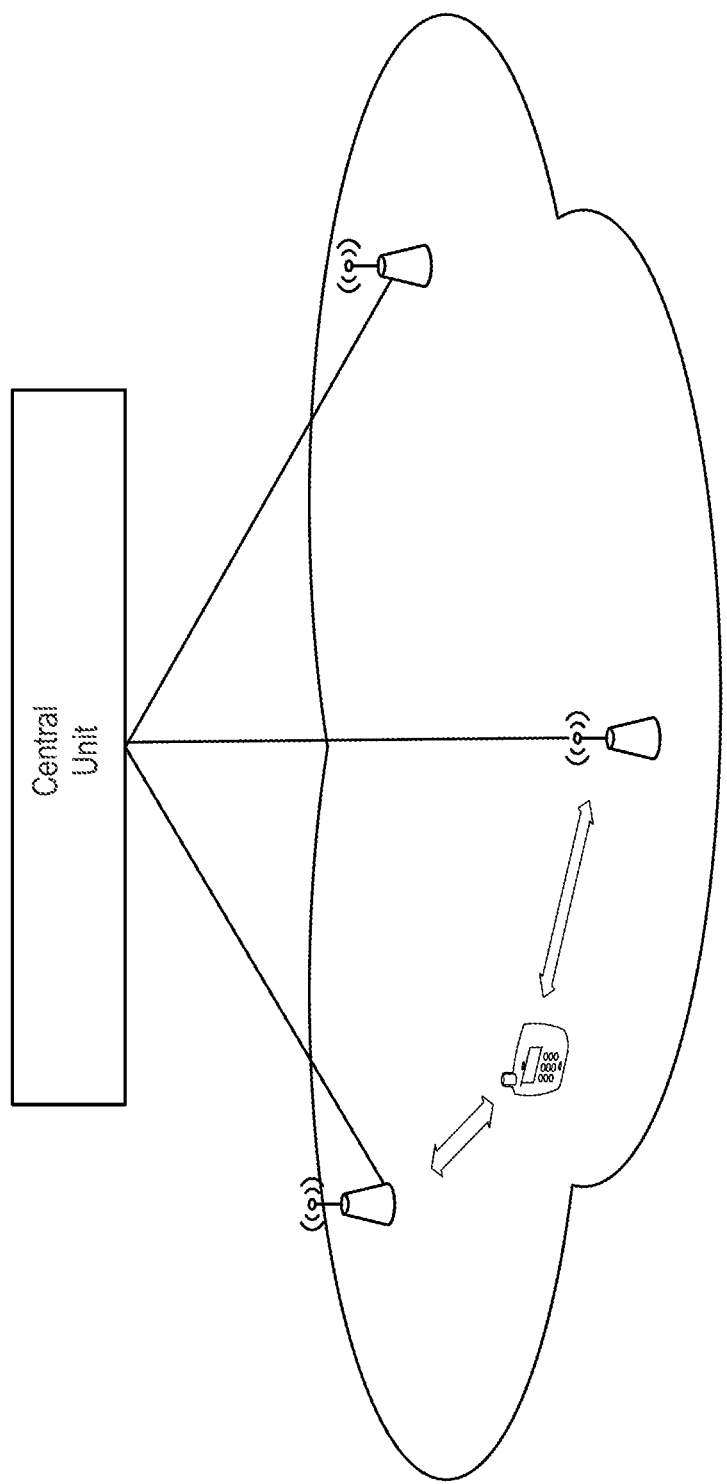
FIG. 28 illustrates a virtual cell including multiple access points.

R2-162571, Introduction of Virtual Cell (CATT) defines a virtual cell as multiple TRPs (Transmission Reception Points) with a same cell ID under the control of a central unit, as shown in FIG. 28. Common information or cell-level information is transmitted in a large cell area and dedicated data is transmitted from adjacent TRPs near the UE with realization of CP/UP split.

Figure 29:
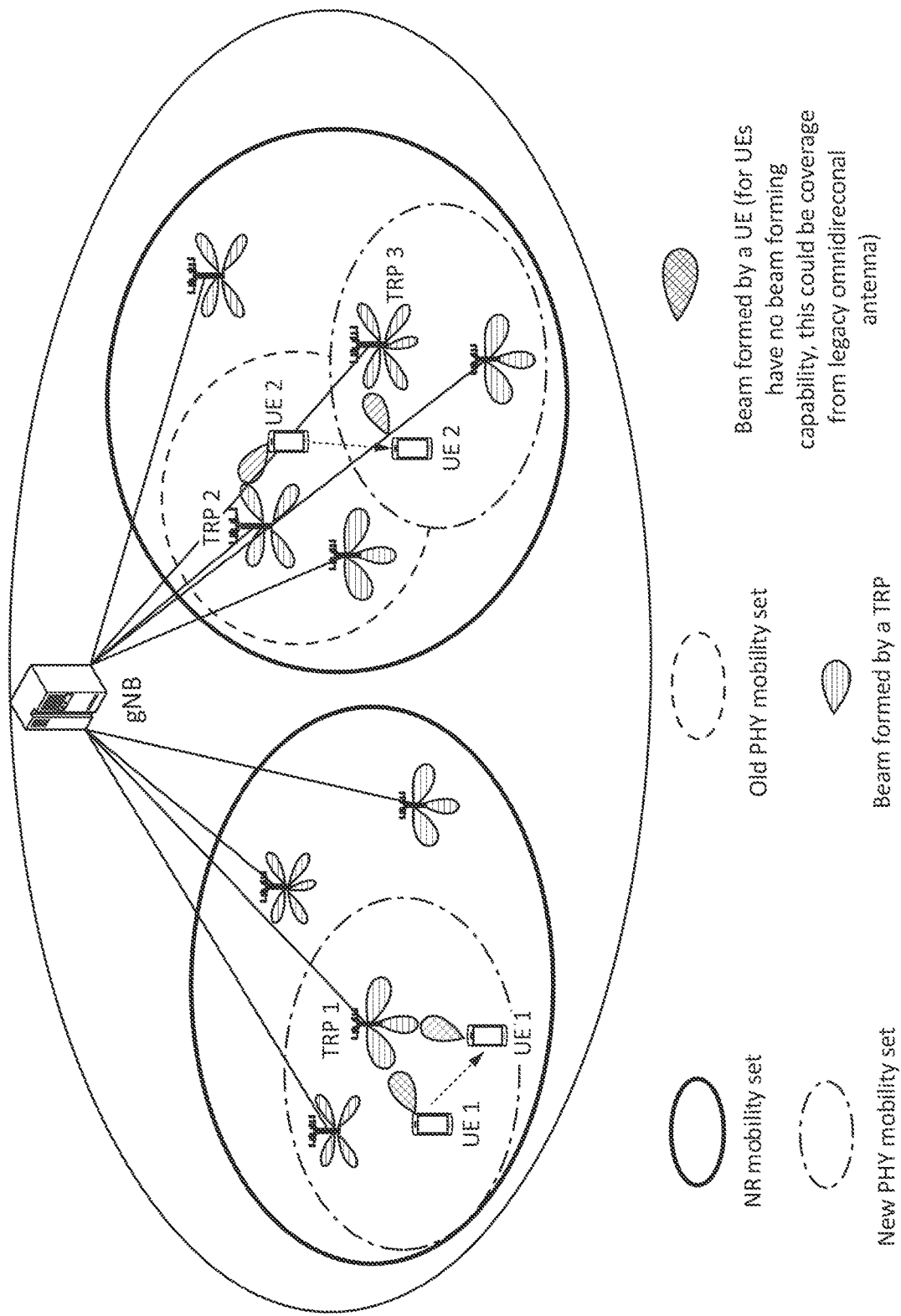
FIG. 29 illustrates an example mobility framework.

A typical use case of this mobility framework is illustrated in FIG. 29. The two UEs defined in FIG. 29 can be eMBB, URLLC or mMTC devices. In the case of mMTC devices, a UE may have limited front-end capabilities, for example, with antenna constraint (e.g., frequency bandwidth constrained, antenna ports, etc.), so the beam formed by the UE could be legacy omni-directional beam. When UE1 moves to a new position, a better beam from the same TRP (TRP1 in FIG. 29) may be available. In this case, intra-TRP beam switching may be performed. When UE2 moves to a new position, there may be no acceptable beams from the TRPs in the current PHY mobility set detected. An update of the current PHY mobility set is needed. After the update, UE2 decides that a beam from TRP3 can be used as the new serving beam. In this case, inter-TRP beam change may be performed. Note that the beam(s) used for downlink and uplink may not be the same. For the convenience of illustration, beam changes may be considered to apply to both uplink and downlink beams herein.

NR may extensively use beamforming for control information such as initial access information, in both UL and DL to compensate for the challenging propagation properties where signal propagation in high frequencies will experience more frequent blockage and/or deafness. A typical beam coverage area is likely to be small which implies the need for beam sweeping to cover a larger coverage area.

Furthermore, different beamforming methods might be supported such as analog beamforming, digital beamforming and hybrid beamforming. These new methods create new needs such as beam training/sweeping, frequent beam changes due to blockage and/or deafness, or due to mobility. For example, a better quality beam may be available but is not detectable temporarily due to beam sweeping. Also, even when a user is merely turning her head or changing the direction of her phone, switching the used beams (e.g., switching TRP/beam direction) might be necessary, leading to much more frequent beam switching than in LTE.

In legacy LTE at intra-cell mobility, RRC will still quite frequently reconfigure L1 beam measurements and L1 beam reporting configurations when different TRPs are to be considered. Given the smaller beam coverage area and the more frequent beam switching, legacy RRC based handover method would not be able to meet the KPI requirements of latency, user experienced data rate and energy efficiency for various NR use cases (eMBB, URLLC, mMTC), because RRC reconfigurations are costly from overhead point of view and are also relatively slow.

Technologies like multi-TRP usage, front-haul, C-RAN and NFV allow the coverage area controlled by one NR Node to grow, thus increasing the possibilities for beam level mobility management and reducing the need for cell level mobility management.

Considering the possibility of much more frequent beam/TRP changing, how to conduct mobility management to meet the latency, user experienced data rate and battery life requirements for URLLC, eMBB and mMTC devices respectively for intra-NR node mobility situation, new solutions may be required.

Existing MIMO techniques in 4G (including precoding, feedback and scheduling) are relatively insensitive to UE's rotation. The existing techniques cannot solve the certain issues caused by UE rotation in the above 6 GHz frequency bands. For example, beamforming mismatch may happen within a very short time period due to UE rotation. Similarly, there may be a dramatic difference in actual CSI and reported CSI due to UE rotation. Therefore, the design of appropriate UE and network channel structure and procedures is needed to deal with the issues caused by UE rotation in NR.

In high frequency New Radio (HF-NR), more frequent beam/TRP changing than legacy LTE is anticipated. In order to meet the latency, user experienced data rate and battery life requirements, a unified mobility framework may effectively and efficiently perform TRP and beam selections/reselections in the case of intra-NR node mobility, with reduced latency, signaling with higher layer involvements. Potential solutions include the construction, configuration, and updating of multi-level mobility sets, including, for example: mechanisms to determine initial configurations; methods to perform initial configurations; determinations and mechanisms of update trigger events; mechanisms to update mobility sets; methods to perform update operations; call flows for UE controlled beam change; and other overall beam-centric architecture unified framework mobility method.

Figure 30:
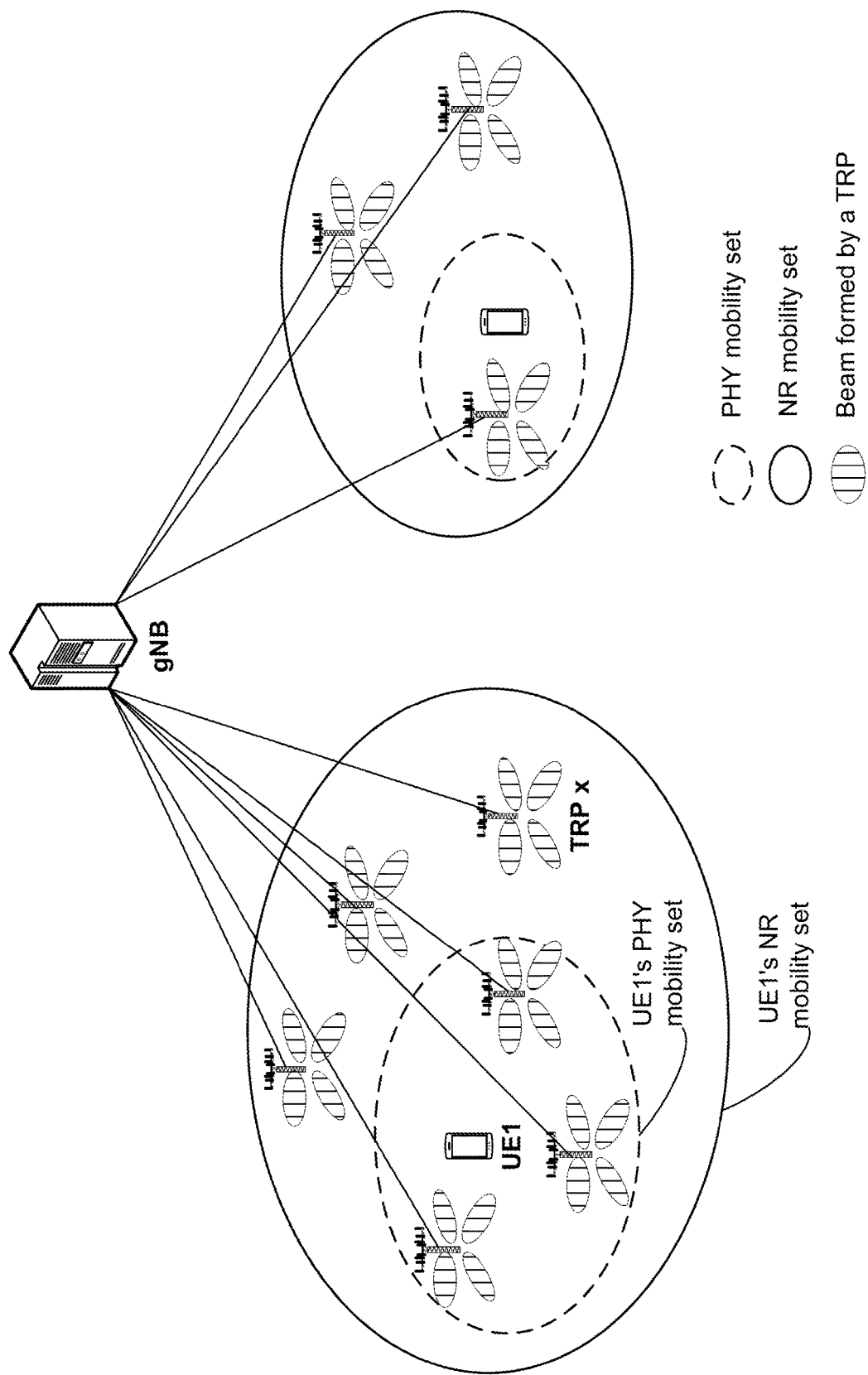
FIG. 30 illustrates an example mobility framework using a PHY-mobility set.

A unified mobility framework may be achieved where a mobility decision is either made by the UE, e.g., "UE controlled mobility," or by the network, e.g., "network controlled mobility," or by both UE and the network. Within the UE, the mobility decision can be made by either the L3 layer (e.g., NR RRC) or by the L2 layer (e.g., MAC) or L1 layer (e.g., PHY layer). The solution introduces and uses the concept of NR-Mobility set and PHY-mobility set as illustrated in FIG. 30. The NR-mobility set is a set of TRPs (or cells) within which the UE can move without being required to inform the next Generation radio access network Node B (gNB) (e.g., intra UE mobility set mobility is UE controlled). The PHY-mobility set is a subset of NR-mobility set within which beam level mobility applies. Both sets are UE specific, e.g., each UE has its own mobility sets, being able to adapt to dynamic requirements from UE, network and operators. NR mobility set is determined by a network entity that has centralized control of RAN, such as gNB. Mobility within NR mobility set is UE controlled. PHY mobility set is a subset of NR mobility set and determined by UE higher layer, such as RRC layer, within which beam level mobility is applied.

This framework has a number of benefits. For example, due to UE controlled mobility, the costly and relatively slow RRC signaling in legacy handover method are avoided, leading to lower latency, battery consumption, and fewer throughput fluctuations. The framework still provides certain levels of flexibility for network control and certain degree of future extensibility as the mobility set configuration and some affecting events and threshold are configurable. QoS requirements, network/RAN slicing and different use cases can be supported by adjusting the configurations of mobility sets and related thresholds and events. The gNB may flexibly configure the solution to allow full network control by setting the NR-mobility set size to only one TRP. The operator may configure the solution to allow full UE controlled mobility by setting the NR-mobility set size to the entire radio access network. For example, the NR-mobility set in this case may be configured to include all TRPs or cells operating on the entire set of frequencies the network operates on. The operator might configure the NR-Mobility set to include a subset of the network where UE controlled mobility is allowed. Mobility between NR-Mobility sets is under RAN control while the mobility within the NR-Mobility set is under UE control. The solution also lends itself to a RAN architecture which includes central controller(s) and distributed unit(s). The NR-mobility set might be configured to map to distributed unit(s) and the UE controlled mobility is restricted to distributed unit(s) level, while the RAN controlled mobility is performed by the centralized controller for mobility between NR-mobility sets.

RRC signaling is used in the examples herein in a generic way, in reference to signaling pertaining to the protocol stack layers above the physical (PHY) layer. Other higher layer signaling may be used instead of RRC for e.g., MAC Control Element (MAC CE) signaling may be used.

Various identifiers, similar to the identities defined in the section 8.2 of 3GPP TS 36.300, may be used for identifying a specific network entity. TRP identifier (TRP ID): used to identify different TRPs within a gNB controlled network. The ID is x bits long (e.g., x can be 16, 32, etc.), and may be contained in a field of a network signaling message. Optionally, multiple TRPs may have same or different ID. Capability flag of the mobility framework (eMobFrameworkFlag): used to indicate if the mobility framework is supported in a network entity. This flag is 1 bit long. If this flag is included and the value is 1, the framework is supported; otherwise, the framework is not supported. Note that, in order to apply this framework, both UE and related RAN entities (e.g., TRPs, gNB, etc.) should be capable.

A NR mobility set is a set of one or more distributed Transmission Reception Points (TRPs) identified by TRP ID, within which a UE may perform UE controlled mobility between different TRPs belonging to the same NR mobility set without being required to inform gNB when the U makes mobility decision.

In LTE, the physical cell id (PCI) determines the Cell-Specific Reference Signals (CRS) resource pattern, the scrambling and descrambling of all transport and control channels including system information and it is used to derive the ciphering keys. Due to these dependencies, a cell change in LTE always enforces a change of the ciphering keys and therefore requires resetting MAC/RLC and re-establishing PDCP. Since the change of a cell also requires a random access to the new target cell, all these functions have been bundled into the so-called "RRCConnectionReconfiguration with mobility control information" method. While the components of this method may be justified and necessary when source and target cell belong to different nodes, it may be considered unnecessarily heavy for intra-gNB handover. The framework is targeting for intra-gNB mobility, so that security credential update may not be required when UE moves and connects to one or more different TRPs within the NR mobility set, which is optional for real implementations. Alternatively, the UE may regenerate a new security credential based on the new serving TRP's ID, other ID and/or specific information of the new serving TRP. Because of the UE controlled mobility and possibly reused security credential within the set, NR mobility set enables UE with abstract mobility by breaking the limit of physical network topology.

UE is configured by the RAN with measurements to be performed and report the results to the gNB on a regular basis or an on-demand basis. gNB takes the measurements report, network related information and/or UE specific requirements into account, then makes decision for the initial formation and later update of the NR mobility set. Therefore, NR mobility set is UE specific (e.g., different UEs have different NR mobility sets) and is supposed to adapt to network conditions as well as specific requirements from operators and UE. Section 5.2.1 will present a detailed description of possible factors that affect the determination and update of mobility sets.

UE mobility to TRPs not belonging to the NR mobility set is controlled by the gNB e.g., updating NR mobility set based on measurements reports provided by the UE. A higher layer involved network controlled method like the legacy handover method may also be used for this case. For example, if a UE wants to change to a TRP outside of the current NR mobility set, the gNB may need to make a handover decision, and go through handover preparation or path switch request, for example. A UE may be configured with more than one NR mobility set in order to enhance inter NR mobility set mobility, for example, TRPs in another NR mobility set may be better prepared ahead of a handover by retrieving UE context and configuration in advance. UE context is typically maintained in the serving TRP. But if TRP changing of a UE is going to happen, gNB may prepare something in advance, so that as much work as possible has been done before the UE disconnects from the current serving TRP. This inter NR mobility set mobility, e.g., UE mobility from one NR mobility set to another UE NR-mobility set, is suggested to be RAN (e.g., gNB) controlled. For example, gNB makes decision for handover from one NR mobility set to another one. Methods can be similar to legacy handover method or activation/de-activation as used in the Carrier Aggregation approach. Herein, inter NR mobility set mobility is not the focus, but some of the inventions may be applicable to inter-NR mobility set mobility.

A UE may be configured with multiple NR mobility sets (For example, for better support of inter-NR mobility set mobility). Here, the focus is on a single NR mobility set. However, inter-NR mobility set mobility is also possible.

The NR-mobility set based mobility may be RRC driven mobility, whereby the mobility decision is made in RRC and supporting methods are RRC methods. Alternatively, the NR-mobility set based mobility might be MAC driven. Further, the NR-mobility set based mobility may be a combination of both RRC and MAC driven mobility.

A PHY mobility set is a subset of NR-mobility set and is also UE specific. The PHY-level mobility set is a set of TRPs or cells or beams (Cell/TRP beams and/or UE beams) within which beam level mobility applies. In contrast to the NR-mobility set, initial formation and later update of the PHY mobility set are both decided by the UE, not gNB. UE uses the surrounding TRPs that have qualified (e.g., average RSRP of N-best beams is above a threshold) beams being detected by UE and also have identifiers matching the ones in the UE's NR mobility set, and put them into the PHY mobility set.

Beam level mobility in the PHY-mobility may be primarily done in PHY or L2 level (MAC Control Element signaling) by the UE, to minimize the involvement of higher layer protocols and network signaling. NW controlled beam change may also be possible because gNB has more information of the whole network and may provide better control of overall performance than UE. UE is not required to transmit or receive simultaneously to or from all the TRPs within a PHY mobility set. Depending on UE's capabilities (e.g., antenna configuration), activation and deactivation (like CA method might be used) of one or more beams within the PHY mobility set could be considered at beam level. A UE may be configured with at most one PHY mobility set at a time.

In one preferred embodiment, the PHY-mobility set based mobility is PHY driven mobility e.g., the mobility decision is made in PHY and supporting methods are PHY methods. In another embodiment, the PHY-mobility set based mobility is MAC driven mobility e.g., the mobility decision is made in MAC and supporting methods are PHY methods. In another alternative, the PHY decision is made in PHY but the supporting signaling methods are MAC methods.

Next generation networks are expected to support a diverse set of use cases. Network/RAN slicing has been proposed to allow operators to meet the diverse and sometimes conflicting use case requirements. To support network/RAN slicing architectures, various factors from different perspectives have to be taken into account when determining the TRP list in the two-level mobility sets. For example, different TRPs may have different capabilities (e.g., antennas, carrier frequencies, etc.), different preferences (e.g., wider beam for stable coverage, narrow beam for higher capacity due to directional gain, etc.), and may be deployed by operators with different levels of density. Factors from the perspectives of the UE, network, and operator may be considered, for example. Some exemplary factors are from the UE's perspective are shown in Table 9.

TABLE 9

Example UE Perspective Factors

| Factor | Examples |
| --- | --- |
| Device type | battery-constrained, antenna-constrained (e.g., frequency bandwidth constrained, spatial constrained), latency constrained, etc. |
| Services | mMTC, URLL or eMBB |
| QoS requirements, | error rates, throughput, transmission delay, jitter, etc. |
| Mobility | static, pedestrian, trajectory or vehicular, etc. |
| Access | grant or grant-less accessing or switchable between grant and grant-less, etc. |
| Measurement report | The TRPs being detected by a UE and associated signal strength. One example of using this report but not limited to is that the entity who decides the NR mobility set may choose to put similar TRPs into the set in terms of similar geographic location and operating frequencies. |
| Preferred geographic area | within a shopping mall, along a railway track or a high way, etc. |

Some exemplary factors from network's perspective are shown in Table 10.

TABLE 10

Example Network Perspective Factors

| Factor | Examples |
| --- | --- |
| Load balancing | Some TRPs close to congestion or already congested should be excluded from the set. |
| Radio link failure avoidance | TRPs that are geographically closed to the TRPs that are experiencing or are going to experience failures are likely to experience failures as well, such as earthquake, out of electricity or terrorist attack, or just predictions of those events. |
| Network topology | the entity who decides the NR mobility set may choose to assign a list of TRPs that are broadly distributed in order to cover a larger area where UE can perform UE controlled mobility; or the entity may assign a list of TRPs that are deployed in a certain geographic area, such as a shopping mall or a group of building, along a physical path, such as railway track to better serve UEs on a train, or high way to serve UEs on cars. |
| RAN slicing | TRPs belonging to the same slicing may be chosen; |
| Interference level | dense deployment of small cells |
| Influence on channel model | concrete wall, moving objects |

Some exemplary factors from the operator's perspective are shown in Table 11.

TABLE 11

Example Operator Perspective Factors

| Factor | Examples |
| --- | --- |
| Access privilege | some TRPs may be for emergent access only or high priority access for certain UEs; |
| Charging policy | Different TRPs may exclusively be used by different UEs according to price rules. |
| Network configurations | Some UEs may be temporarily down prioritized, or some TRPs may be temporally blocked for maintenance or be temporarily becoming exclusively used by certain UEs. |

The way factors are used may be implementation dependent. Without loss of generality, one example is that the network entity that decides the NR mobility set may take a subset of above factors as input to define a qualitative selection criteria as below:

$$N=\{n_i : n_i \in C_1 \cap C_2 \cap C_3 \ldots\} \quad (1)$$

where N represents the selected NR mobility set, and $C_i$ represents the set of TRPs that satisfy the i-th selected qualitative condition from C. Formula (1) means that any TRP $n_i$ from the set N, is able to qualitatively satisfy all the conditions defined by C.

Another example is that the network entity may take another subset of above factors as input to define a quantitative selection criteria as below:

$$\forall n_i \in N \text{ and } \forall q_j \in Q, |Q_{i,j} - \omega_{i,j} * Th_j| > \text{offset}_{i,j} \quad (2)$$

Where $Q_j$ is any one of the selected quantitative conditions Q, $Q_{i,j}$ is the calculated value of TRP $n_i$ in terms of the characteristic related to $q_j$, $Th_j$ is the threshold value of condition $q_j$, and $\omega_{i,j}$ is a corresponding scaling factor and offset$_{i,j}$ is an offset value of condition $q_j$ that are specifically configured for TRP $n_i$. Formula (2) means that any TRP $n_i$ from the set N, is also able to quantitatively satisfy all the conditions defined by $Q^{\text{offset}_{i,j}}$, after being scaled by a weighting factor $\omega_{i,j}$.

Alternatively, on top of another exemplary selection criteria defined by the combination of (1) and (2), a further example could be that an NR mobility set initially configured to an eMBB UE is able to meet use case condition $c_1$, the Network topology condition $c_2$ (same shopping mall as UE), operator's charging policy condition $c_3$, real-time video conditions $q_1$ (RTT below 100 ms), $q_2$ (jitter buffer delay below 50 ms).

Apparently, the more factors are considered, the smaller size of the decided N mobility set will be, so it is up to the real implementation to make a balanced decision.

In an alternative embodiment, the entity that decides the NR mobility set may leave the flexibility to UE to balance among some factors, and provide a list of TRPs with different characteristics to UE for further selection, while the entity may still indirectly influence the selection process by configuring different thresholds or other parameters on UE. For example, in a list of TRPs, current traffic load and upper bounded queueing delay for each TRP are included, and threshold value of queueing delay that a UE may consider is also included.

It is straightforward to choose gNB as the entity who decides the NR mobility set for a UE, as gNB usually connects with all TRPs (see FIG. 30) within the network as well as core network and can directly collect information from both network and operator. Other network entities may also be capable to decide the NR mobility set, as long as the network entity can efficiently collect required information and is also appropriate for the RAN architecture or RAN/Network slicing management. The gNB may be the entity that decides NR mobility set for a UE. Actual implementation is not limited to this case.

Figure 33:
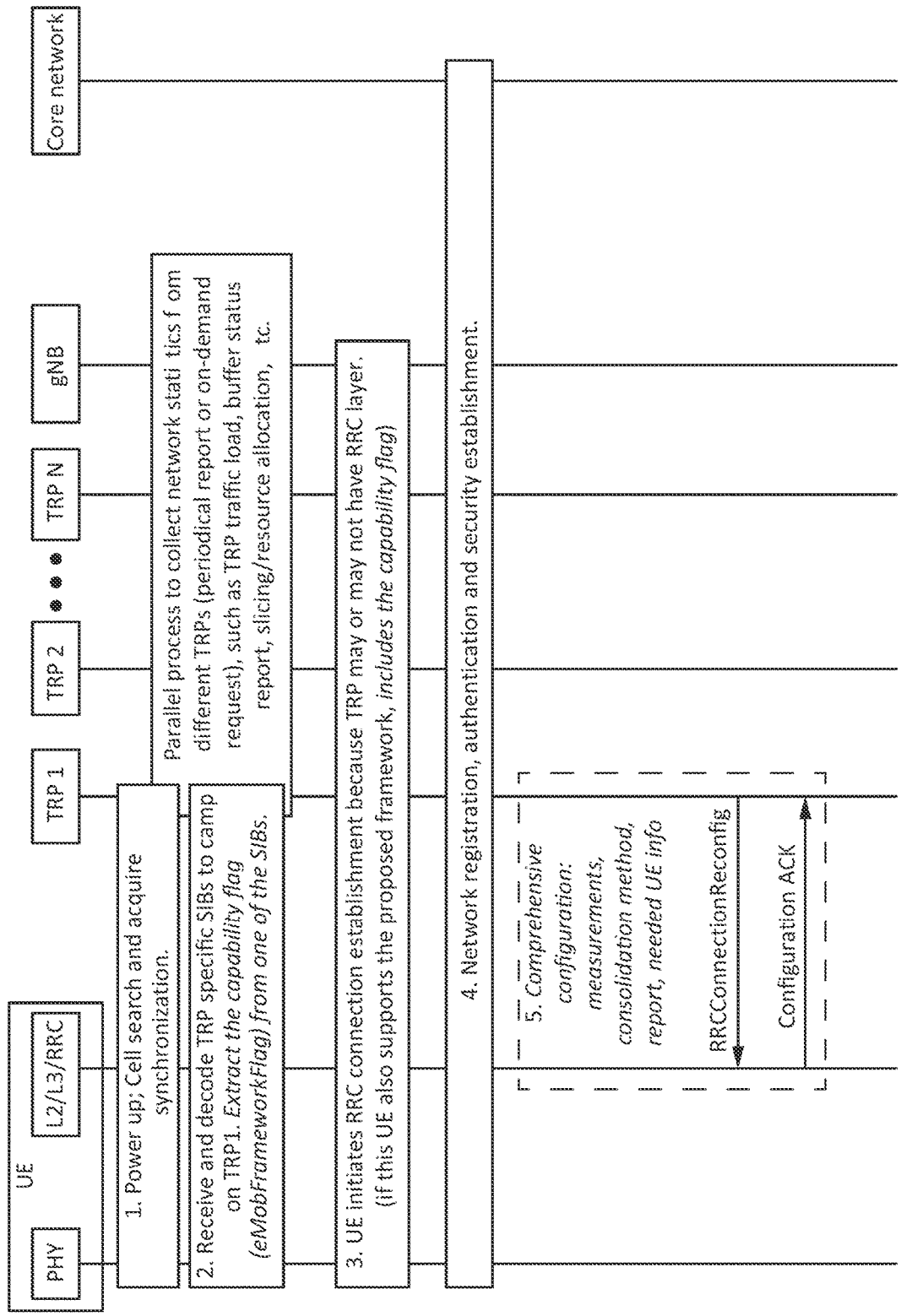
FIGS. 33 through 36 show an example call flow for configuration of mobility sets.
Figure 34:
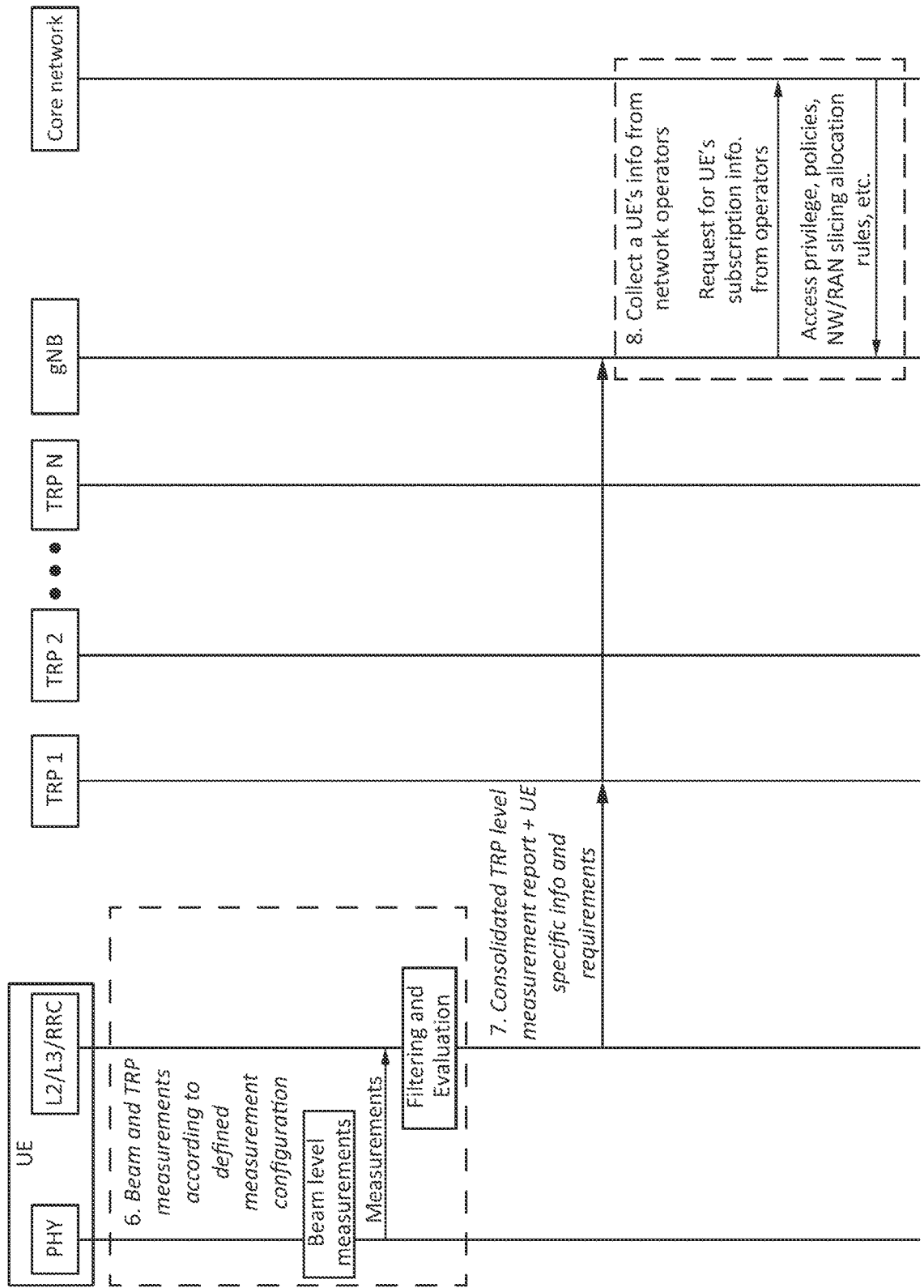
Figure 35:
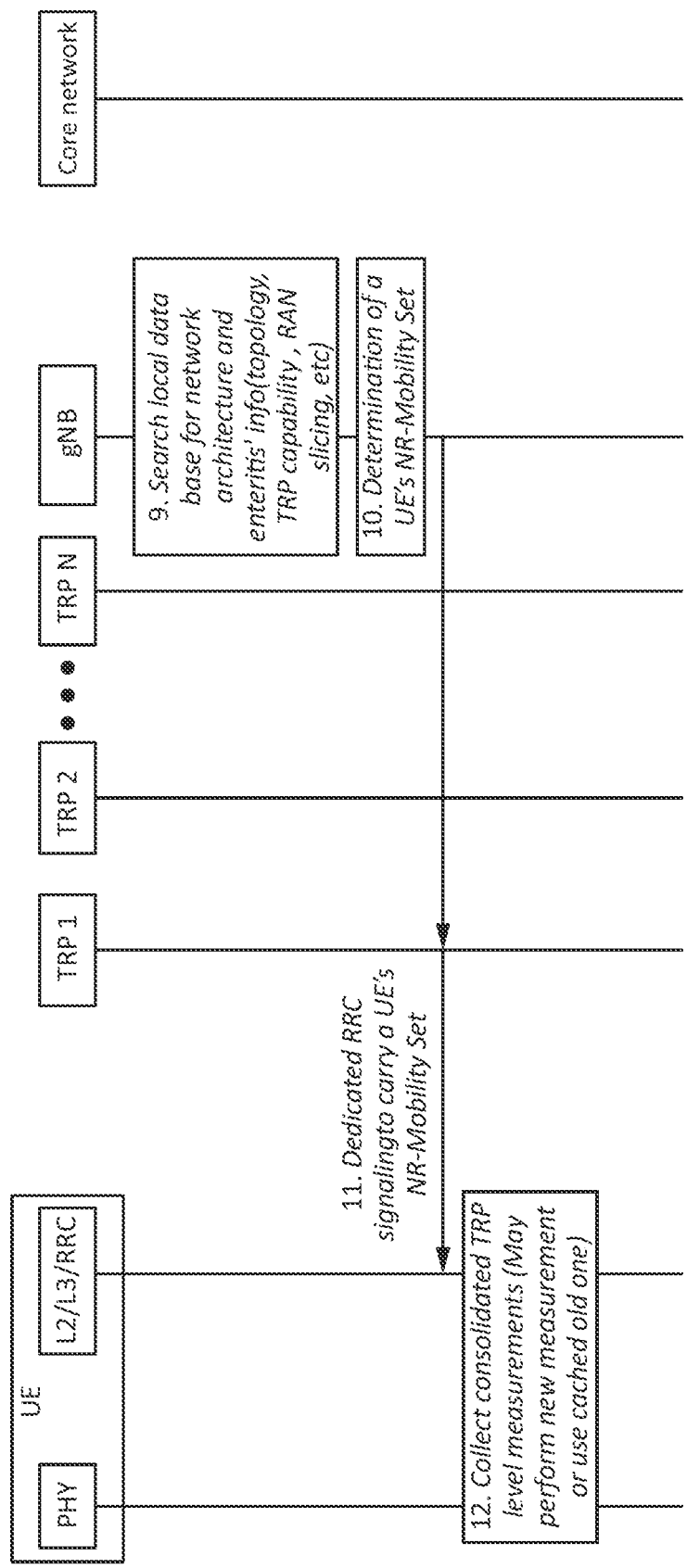
Figure 36:
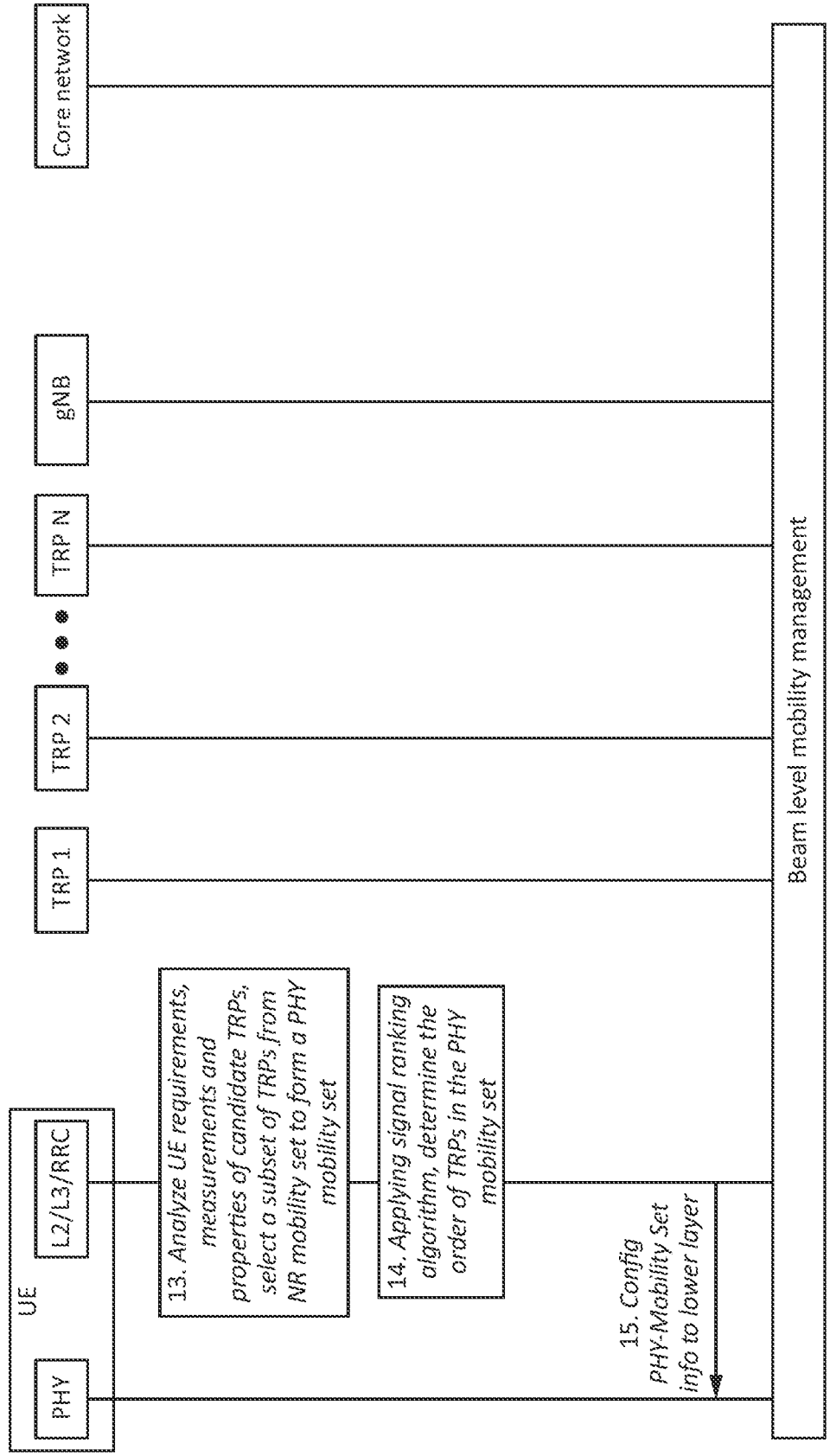

A UE that supports the mobility framework may need to acquire an initial configuration of NR mobility set, when initially accessing system. This initial system access may be due to, but not limited to power-up, reset or expired UE context after a long sleep. Similar to the idle mode measurement criteria, an eMobFrameworkFlag may also be carried inside of a SIB message. This flag lets the UE know (even if UE is in idle mode) whether the mobility framework is supported by the RAN and UE is required to send an explicit request for initial configuration of NR mobility set if the UE also supports the framework. Alternatively, the flag may also be carried inside of a dedicated RRCConnectionReconfiguration message from a corresponding TRP when UE is in connected mode. Note that measurements from a UE while at the IDLE mode during initial system access are mainly for cell selection and reselection process, and does not trigger measurement report like connected mode measurement. The flag may be carried inside of an SIB message and UE sets up an RRC connection to send a connected mode measurement report (the eMobFrameworkFlag is included as well, as shown in the step 2 of FIG. 33) and UE's specific requirements (e.g., QoS requirements, use case, if any) to gNB as an example of how UE triggers the request of an initial configuration of NR mobility set.

In HF-NR with beam operation, a cell may be covered by multiple beams either provided by one TRP or multiple TRPs, and each beam has its own reference signal. Measurement on the beam-specific reference signal is used not only by lower layer for beam administration (beam evaluation, beam change, etc.), but also used for cell-level mobility (either intra-TRP or inter-TRP). When UE performs measurement on different beams, UE can derive a set of measurement results with each element corresponding to one beam. It is necessary to determine a consolidation operation on the measurement results of the different beams to stand for the overall TRP/cell quality. This consolidation not only can be used as the metric for measurement report triggering and cell quality evaluation, but is also useful to determine the content of measurement report (report the measurement result after consolidation can significantly reduce the signaling overhead). One straightforward consolidation method is to always pick the best beam. Considering the fast channel variation of HF, the best beam may change very frequently, especially when UE is in high mobility status. In other words, consolidation based on best beam is not stable and reliable. Instead, some compound consolidation methods, where the number of beams for evaluation is not static and may adapt better to network conditions, as different measurements of Reference Signal Received Power (RSRP) bellows may be considered:

The averaged or moving averaged RSRP of N-best beams

The averaged or moving averaged RSRP of all detected beams

The averaged or moving averaged RSRP of the beams with RSRP above a threshold

The aggregate RSRP of the beams with RSRP above a threshold

The number of beams with RSRP above a threshold

The decided NR mobility set, e.g., including TRP IDs, and/or cell IDs and or beam IDs (UE's beams and TRP beams) and TRP or cell or beam related characteristics and configured thresholds/parameters, if any, may be signaled to the UE through dedicated RRC signaling or MAC Control Element (MAC CE) signaling. For example, using a dedicated RRC signaling, the set may be aperiodically unicasted by gNB via the connected TRP in an RRC message or MAC CE message as System Information on-demand. In an alternative embodiment, multicast or broadcast methods may also be applied. A UE may acquire this information either by searching the system information on DL broadcasting or multicasting channel transmitted from the connected TRP or requesting the camped TRP for it as on-demand system information.

Table 12 shows an example code listing of how information may be signaled to UEs in RadioResourceConfigDedicated, e.g., as described in 3GPP TS 36.331.

TABLE 12

| Example Code | | | |
|---|---|---|---|
| -- ASN1STOP | | | |
| RadioResourceConfigDedicated ::= | SEQUENCE { | | |
| srb-ToAddModList | SRB-ToAddModList | OPTIONAL, | -- |
| Cond HO-Conn | | | |
| drb-ToAddModList | DRB-ToAddModList | OPTIONAL, | -- |

TABLE 12-continued

Example Code

```
Cond HO-toEUTRA
        drb-ToReleaseList              DRB-ToReleaseList          OPTIONAL,         --
Need ON
        mac-MainConfig                 CHOICE {
                explicitValue          MAC-MainConfig,
                defaultValue           NULL
        }       OPTIONAL,                                                           -- Cond
HO-toEUTRA2
        NR-mobility-set-ToADDTRPList   NR-mob-set-ToADDTRPList    OPTIONAL,         -- Need
ON
        sps-Config                     SPS-Config                 OPTIONAL,         --
Need ON
        physicalConfigDedicated                                   OPTIONAL,         -- Need ON
        ...,
        [[      rlf-TimersAndConstants-r9   RLF-TimersAndConstants-r9     OPTIONAL   -
- Need ON
        ]],
        [[      measSubframePatternPCell-r10 MeasSubframePatternPCell-r10  OPTIONAL   --
Need ON
        ]],
        [[      neighCellsCRS-Information-r11         NeighCellsCRS-Information-r11
        OPTIONAL        -- Need ON
        ]],
        [[      naics-Information-r12        NAICS-AssistanceInfo-r12      OPTIONAL   -
- Need ON
        ]],
        [[      neighCellsCRS-Information-r13         NeighCellsCRS-Information-r13
        OPTIONAL        -- Cond CRSIM
        ]]
}
NR-mob-set-ToADDTRPList ::=            SEQUENCE (SIZE (1..2)) OF NR-mob-set-
ToADDTRP
NR-mob-set-ToADDTRP ::=        SEQUENCE {
        ConfigParameter1               INTEGER (1..8),
        ConfigParameter2               INTEGER (1..8),
        ...
        ConfigParameterX               INTEGER (1..8),
        NR-mobility-set-TRP                    SEQUENCE {
                TRPID          INTEGER (1..8),
                TRPChar1       INTEGER (1..8),
                TRPChar2       INTEGER (1..8),
                ...
                TRPCharX       INTEGER (1..8),
        }
        NR-mobility-set-TRP                    SEQUENCE {
                TRPID          INTEGER (1..8),
                TRPChar1       INTEGER (1..8),
                TRPChar2       INTEGER (1..8),
                ...
                TRPCharX       INTEGER (1..8),
        }
        ...
}
-- ASN1STOP
```

Once receiving the initial configuration of NR mobility set from gNB (forwarded by the serving TRP), UE starts to determine the initial configuration of PHY mobility set. Three aspects, among others, may be considered: consolidated measurement results based on measurement configuration; TRP characteristics included in NR mobility set; and UE's specific requirements.

Not all TRPs or beams or cells in the PHY mobility set are simultaneously used by a UE necessarily, but those TRPs or beams or cells must be detectable to the UE. When gNB decides the NR mobility set for a UE, more than detectable TRPs would be included in order to avoid frequent network signaling. A UE is configured to detect and measure neighbor cells/TRPs/beams, based on which a consolidated measurement result would be generated. The consolidation method is implementation specific. It is up to the UE that whether all TRPs or cells or beams meeting the criteria determined by the selected consolidation method (for example, average RSRP of N-best beams of a TRP is above a threshold) are put into the PHY mobility set, or the M-best TRPs are selected, where N and M are configurable parameters.

In addition, characteristics related to each individual TRP or cell or beam, if any is included in the NR mobility set, may also need to be considered. For example, if a TRP already has a traffic load/resource utilization above 80%, an eMBB UE requiring a big estimated bandwidth should not include this TRP into its PHY-mobility set.

Alternatively, a UE may choose to ignore some other characteristics depending on a UE's specific requirements. It is possible that a TRP that meets bandwidth requirement of an eMBB UE, somehow has a large average uplink access time. The UE may ignore the access time requirement since video streaming applications running on the UE, for example, may allow up to several seconds buffering time.

A combination of selected factors may be used to define selection criteria for UE to decide a PHY mobility set. And the designed selection criteria should be flexible enough to adapt to dynamic network conditions and UE's application requirements. In some scenarios, UE may compromise, or completely ignore part of the selection criteria, in order to make sure that enough candidate TRPs are present in the set so that basic connectivity can be maintained in the case of large channel variations. If some criteria are very important and should not be ignored by UEs, two methods can be used, for example. First, the gNB does not leave the options to UEs, and just determines the NR mobility set after considering those criteria. Second, a flag may be added, before those criteria, which requires UE's processing.

Mobility handling within PHY mobility set may use beam-level management. This beam level mobility management may be primarily done in PHY or L2 level (MAC CE signaling) by the UE, so that to minimize the involvement of higher layer protocols and network signaling. To support this design purpose, one way is to directly save the PHY mobility set information in the PHY or MAC layer. Therefore, future beam operations do not always require cross layer communication, leading to further minimized involvement of higher layer protocols. This PHY mobility set save operation may be initiated by UE's RRC layer, where NR mobility set information is received and PHY mobility set is determined after taking into account various factors. Depending on which layer is finally decided to perform the beam level management, the PHY mobility set may be sent to UE's MAC layer over MAC control signaling by RRC, or be sent to UE's PHY layer over L1 configurations.

Due to the fast channel variation in HF, as mentioned before, UEs in NR may experience frequent changes of beams" quality/detectability. Those different beams may come from the same TRP as the serving beam and are therefore synchronized, but may also come from different TRPs that are probably not synchronized. When UE has to change serving beam(s), it is typically preferable to perform intra-TRP beam change, because UE most likely does not need to perform initial access (including UL time alignment if needed as well), context transfer, TRP switching method and data forwarding (if lossless mobility management is needed), resulting in saved latency, energy and probably interruption time.

An option for supporting prioritized intra-TRP and inter-TRP beam changing is to assume that detected beams are distinguishable both when they come from the same TRP and when they come from different TRPs, for example, when attaching a TRP ID with each individual beam's reference signal. Alternatively, a beam ID may consist of two parts, where the first part, such as the first m bits (where m is a positive integer), is a TRP identifier, and the second part, such as the next m bits, is a beam identifier. Further, for present purposes, it may be assumed that all considered beams (e.g., not all detected beams) come from only the TRPs included in the UE's PHY mobility set, so that factors mentioned in Tables 9, Table 10, and Table 11, for example, may already have been treated.

For example, to support prioritized intra-TRP and inter-TRP beam changing, in addition to initial configuration of a PHY mobility set, the network may also configure a UE with two thresholds, e.g., beam_thd1 and beam_thd2 (beam_thd2>beam_thd1), in terms of the chosen measurement metric, e.g., RSRP, Reference Signal Received Quality (RSRQ). The considered beams that are above beam_thd1 will be put into a candidate set. If there is at least one candidate beam belonging to the serving TRP and also above beam_thd2, the best beam from the serving TRP will be selected as a new serving beam. Otherwise, an inter-TRP beam change needs to be considered.

If there is not at least one candidate beam belonging to the serving TRP and also above beam_thd2, then if all candidate beams belong to the same TRP and with measurement metric value also above beam_thd2, the best beam among all candidate beams will be selected. For example, this best beam may be from the serving TRP, or not. If no beams meet these criteria, then if there are candidate beams belonging to different TRPs and with measurement metric value also above beam_thd2, the beam from the TRP with highest rank is selected. If there are more than one such beams from the same ranked TRP, the best one of them is selected. The TRP ranking algorithm is implementation dependent. One suggested algorithm is to use the aggregate RSRP of the beams with RSRP above a threshold to represent the overall signal qualify of the TRP. Higher value of this aggregate RSRP means more acceptable beams are possibly available from this TRP. If UE selects this TRP, intra-TRP beam switching will be more likely to happen.

Figure 31:
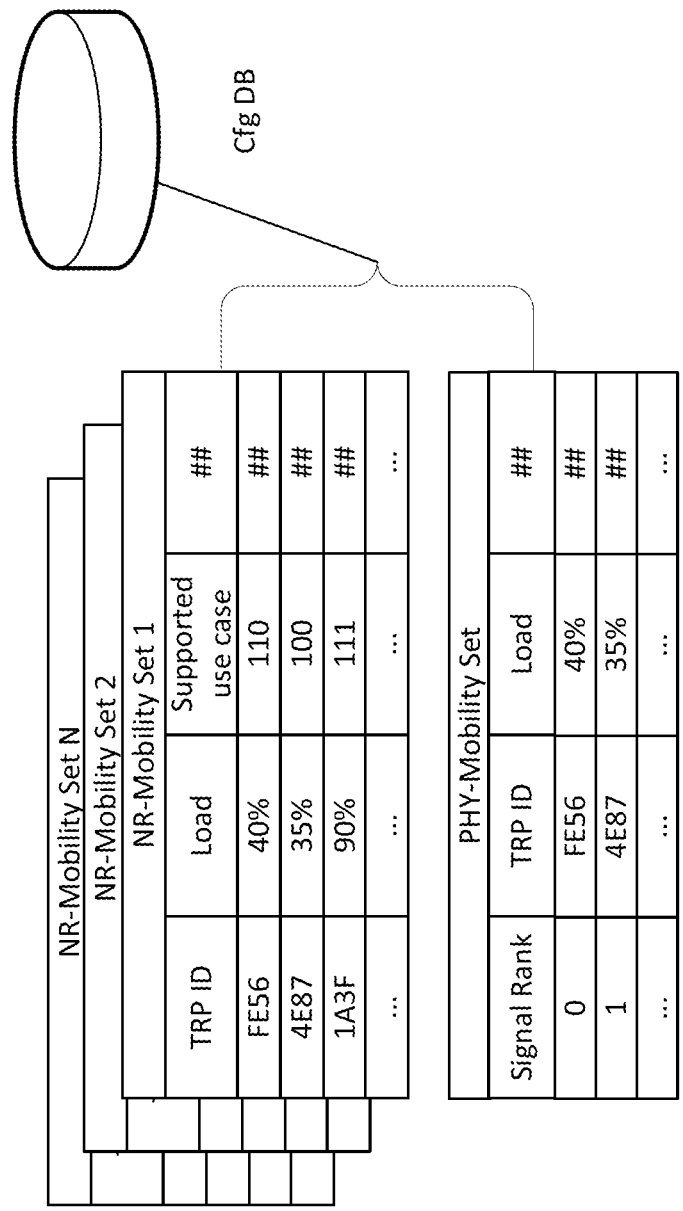
FIG. 31 illustrates components of an example database.
Figure 32:
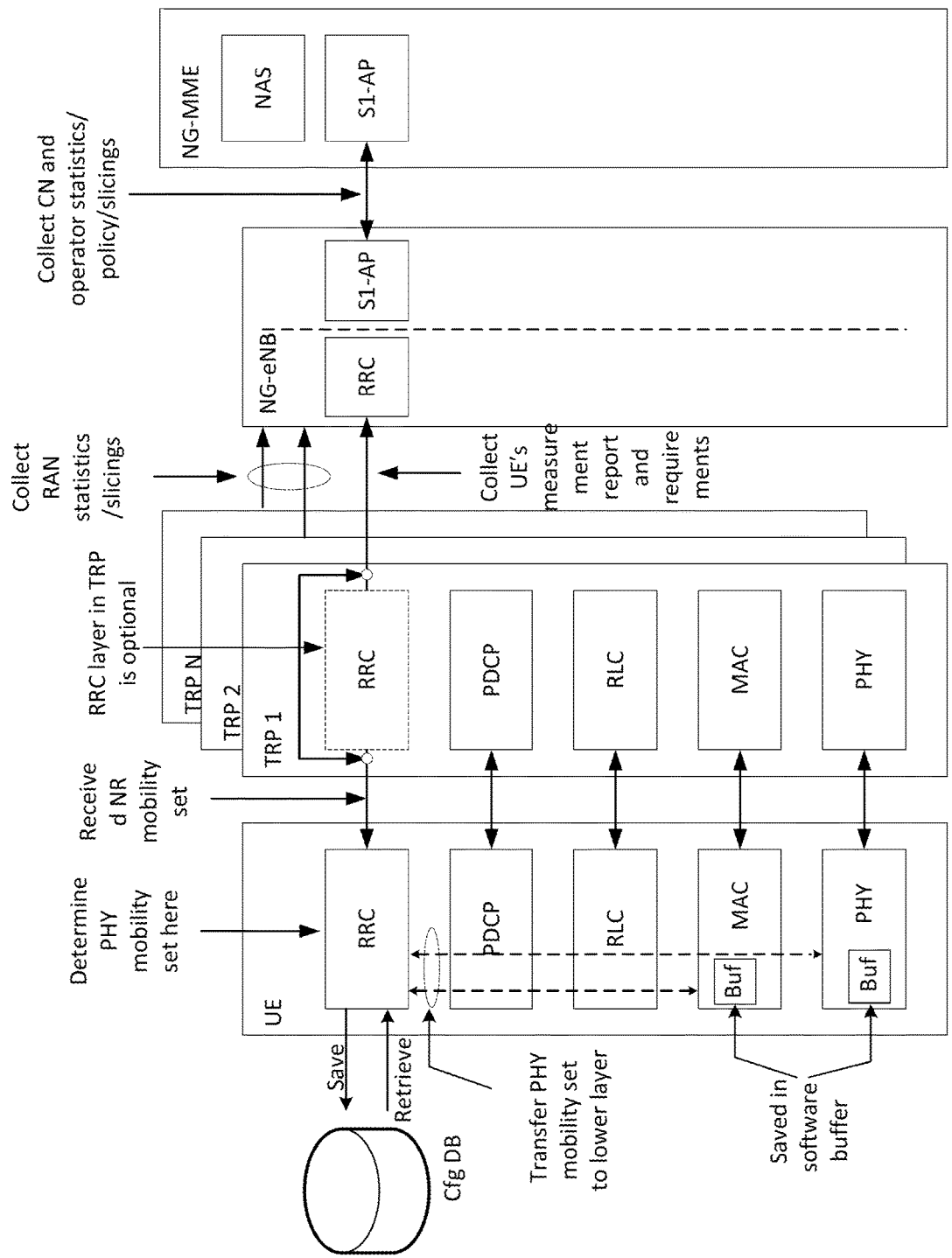
FIG. 32 illustrates interactions in an example control plane protocol stack.

FIGS. 31 and 32 describe an example of general interactions for initial configuration of a two-level mobility set, from the point of view of control plane protocol stack in NR. The network entity, gNB, by taking various inputs from the UE, network and operator, decides a specific NR mobility set for a UE and then signals this set to the UE across different entities in between. The UE examines its detailed requirements after considering the information from gNB and determines a suitable PHY mobility set at a higher layer (RRC layer in this exemplary figure). This PHY mobility set will then be transferred to low layers of the UE through dedicated cross layer signaling interfaces or configuration interfaces. Note that the size of the PHY mobility set should be relatively small, so that it can be saved in the super-fast on-chip ram, which is usually with a very limited storage, only where MAC and PHY layer have direct access to. In FIGS. 31 and 32, depending on which layer is doing beam level management, the PHY mobility set will be saved in the MAC or PHY layer software buffer (e.g., may be a kind of on-chip RAM). The received NR mobility set and generated PHY mobility may be saved in a local configuration database (for example, an external RAM or flash) for later reference.

From the system level control signaling perspective, the overall methods of initial configuration of the two-level mobility set may contain the steps shown in FIGS. 33-36.

As a UE moves around, network conditions, UE's application requirements and even network operators' policies/rules may change with the time. As a result, radio resource configuration to UE should also be adjusted accordingly in order to adapt to those dynamic changes from both UE and the network. Events may trigger update of the mobility sets.

Detected beams that may be evaluated and used by a UE need to come from the TRPs included in the UE's PHY mobility set. Since the PHY mobility set is selected from the UE's NR mobility set, it is important to make sure that NR mobility set is properly updated to capture those dynamic changes of UE and network. Network and UE triggered aspects should be considered.

Network triggered updates may result from network operations related events and network operator related events. An example of a network operations related event trigger is where a gNB receive overload indications from some TRPs. The gNB may decide to multicast the update messages (including the list of congested TRPs) to UEs that currently have those TRPs in the NR mobility set. If the gNB has no saved information about which UE should be notified, broadcast of the update messages is an alternative way. In some rare cases, if the number of affected TRPs is big, gNB may trigger an initial configuration process to completely replace the sets currently used by UEs.

Network operations related events may be signaled to the gNB periodically or aperiodically. For example, TRPs may inform gNB of the traffic loading periodically, but in case of congestions or other emergencies, one-time signaling may be needed as well. The frequency for the periodic report may be configured by the gNB on an individual TRP's basis.

Network operations related events may also be signaled to the gNB on demand. For the purpose of energy efficiency, some TRPs may be configured to report operation conditions in a larger period of time. In case gNB needs updated information right away, gNB may send an explicit update request.

At times, a gNB may need to speculate regarding network events. For example, some TRPs may experience complete failure due to earthquake, out of electricity, magnetic pulse attack, malware, etc. Therefore no active report or response to on demand request can be expected.

An example of network operator related events is where a UE needs to be prioritized or down prioritized due to change of service subscriptions, as a result, some access privilege classified TRPs may be added or removed from a UE's NR mobility set accordingly.

A UE triggered update may by triggered, for example, by: a periodic update request; the expiration of a current NR mobility set; the detection of new TRP(s) with favorable beams; when a UE is unable to maintain enough number of qualified TRPs in PHY mobility set after re-evaluating all TRPs in the current NR mobility set; due to a change of service type, use cases, QoS requirements, etc.; when radio link failures are detected; or an update of a UE's PHY mobility set. A periodic update request avoids expiration of a current NR mobility set. Further, to keep some information in the NR mobility set within certain accuracy of current network conditions, for example, the traffic load of TRPs in the NR mobility set needs to be updated. The periodicity may be configurable according to a UE's use case or service type. For example, mMTC UEs could use a large value of periodicity.

Regarding expiration of current NR mobility set, for example, a UE's NR mobility set may be expired after a validity period, or a certain distance away from previous location, or poor or failed measurements with the current serving beam or TRP. mMTC UEs typically have no or low mobility and are also delay tolerant, so may be configured to have a large expiration value.

Regarding detection of new TRPs with favorable beams, for example, some battery non-constrained UEs may pro-actively measure surrounding beams/TRPs in order to maintain a sufficient number (configurable threshold) of candidate TRPs (all TRPs in PHY mobility set are considered as candidate TRPs), so that alternative beams/TRPs can be quickly determined in the case of mobility and/or radio environment change. For this reason, if new TRPs with favorable beams (for example, high RSRP) are detected and not present in NR mobility set, also have not been blocked (for example, blacklist used by legacy LTE during mobility configuration, e.g., as in 3GPP TS 36.331), UE may trigger a update of NR mobility set.

Regarding situations where a UE is unable to maintain enough number of qualified TRPs in PHY mobility set after re-evaluating all TRPs in the current NR mobility set, for example, the qualification criteria may be implementation dependent. For example, a UE may take into account a subset of the factors listed in Tables 9, Table 10, and Table 11, and then determine a suitable qualification criteria.

Regarding change of service type, use cases, QoS requirements, etc., for example, the selection criteria on which a previous NR mobility set was determined may no longer be valid. As a result, a new NR mobility set may need to be determined based on new selection criteria. Alternatively, in this case a UE may choose to update its PHY mobility set first in case its NR mobility set already has included some TRPs that satisfy the new requirements. If qualified TRPs can be found after the update of PHY mobility set, then UE may stop there without requesting update of PHY mobility set; if not, UE may still have to send out the request for update PHY mobility set.

Regarding detection of radio link failures that are detected, for example, a UE may not be able to recover from the link failure, even after re-evaluating all TRPs in the current PHY mobility set and NR mobility set. A request of update of the NR mobility set is the next straightforward action.

When gNB configures a UE with an updated NR mobility set, it may reconfigure the RAN network for newer operations. For example, gNB may use the update as a trigger to transmit additional beam reference signals (e.g., new beams from additional TRPs) and/or it may re-configure the UE to measure on additional time/frequency resources accordingly. Those new TRPs may be silent previously (energy saving and/or interference avoidance). This network-side reconfiguration would remain transparent for the UE—except that it may detect and measure a new signal.

At the same time, network may also reconfigure the UE for newer measurement behaviors. For example, the network may, upon detecting that the UE is reaching the "cell edge", configure it to measure more frequently on additional time/frequency resources. Such a reconfiguration may be done by an RRCConnectionReconfiguration or other (faster) approaches, if any. The UE may also be configured to send a measurement report when one or more TRPs not included in the NR mobility set become better than the best serving TRP. On the other hand, the UE may also be configured to not measure one or more TRPs (e.g., blocked by operators for certain policies), similar to the blacklist and whitelist defined in legacy LTE measurement methods, e.g., as described in 3GPP TS 36.331. These types of measurement configurations, such as measurement objects, gaps, reporting configurations, would still be suitable in NR for configurations where the beam reference signals to be used for RRM measurements are periodically recurring.

In addition to periodically configured beam reference signals, NR should support more dynamically configured measurements. For example, the network may initiate one-time transmission of measurement reference signals, after configuring UEs to listen for those and to report measurements upon detection. Some available TRPs/beams may be temporarily not detectable due to beam sweeping, and this one-time transmission can make sure that those signals are active when UE is configured to measure them. Configurability of measurement reference signals (rather than being hard-coded in specifications) ensures low overhead/interference, lower energy consumption and easier extensibility in the future.

In order to achieve an effective and also efficient update, NR needs to carefully control the frequency of the update process for each UE. Updates of UEs' mobility set with lower value of recurrence interval provide prompt adaptation to various dynamics, but may cause higher signaling load, and the network is not scalable when the number of network entities increase. However, a higher value of recurrence interval may cause that, for example, part of a UE's mobility set is outdated without meeting some changing requirements from UE and network timely. In order to alleviate this issue, optimizations may be based on a UE's request. This may be done in a number of ways. The following are six illustrative examples.

First, each UE may maintain three variables at each UE, e.g., last Update Time, requestTimeout and updateInterval, where the value of the variables for each UE is configurable by the gNB or another appropriate entity in the network. The value of the three variables may be included in each request sent from the UE, or may be saved somewhere accessible to gNB.

Second, a UE typically does not request for update if (currentTime−lastUpdateTime)<updateInterval. There are some exceptions to be defined. For example, sudden change of use cases, service type, and/or no TRP in the current NR-mobility set satisfies a UE's requirements or radio link failure detected and not able to be recovered from current mobility set—e.g., the PHY Mobility Set is updated, etc.

Third, upon receiving an update request from a UE, gNB may accept or not, after taking into account multiple factors. For example, if gNB or network is already full of other control signals and the request is just a routine check.

Fourth, upon receiving a status report from network or operators, gNB may take actions or just ignore. For example, a report may be already addressed when another report is received.

Fourth, the gNB may delay the processing of an update request as long as the response to that UE is within a timeout value specified by requestTimeout. During the delay period, if there are several reasons (e.g., network reports, operator's request) causing a necessary update, gNB can process them and respond with a single merged update. If gNB decides not to perform an update after receiving a UE's request, an ACK message with empty content is sent out.

Fifth, a priority table may be used, so that different trigger events may result in different behaviors from gNB. For example, for some emergent requests, for example, a group of TRPs failed in an accident, an immediate update for involved UEs may be needed with a high priority.

Sixth, if a UE does not receive a response or an ACK within requestTimeout, it may delay for a pre-defined back-off time, and retransmit an update request later.

Figure 37:
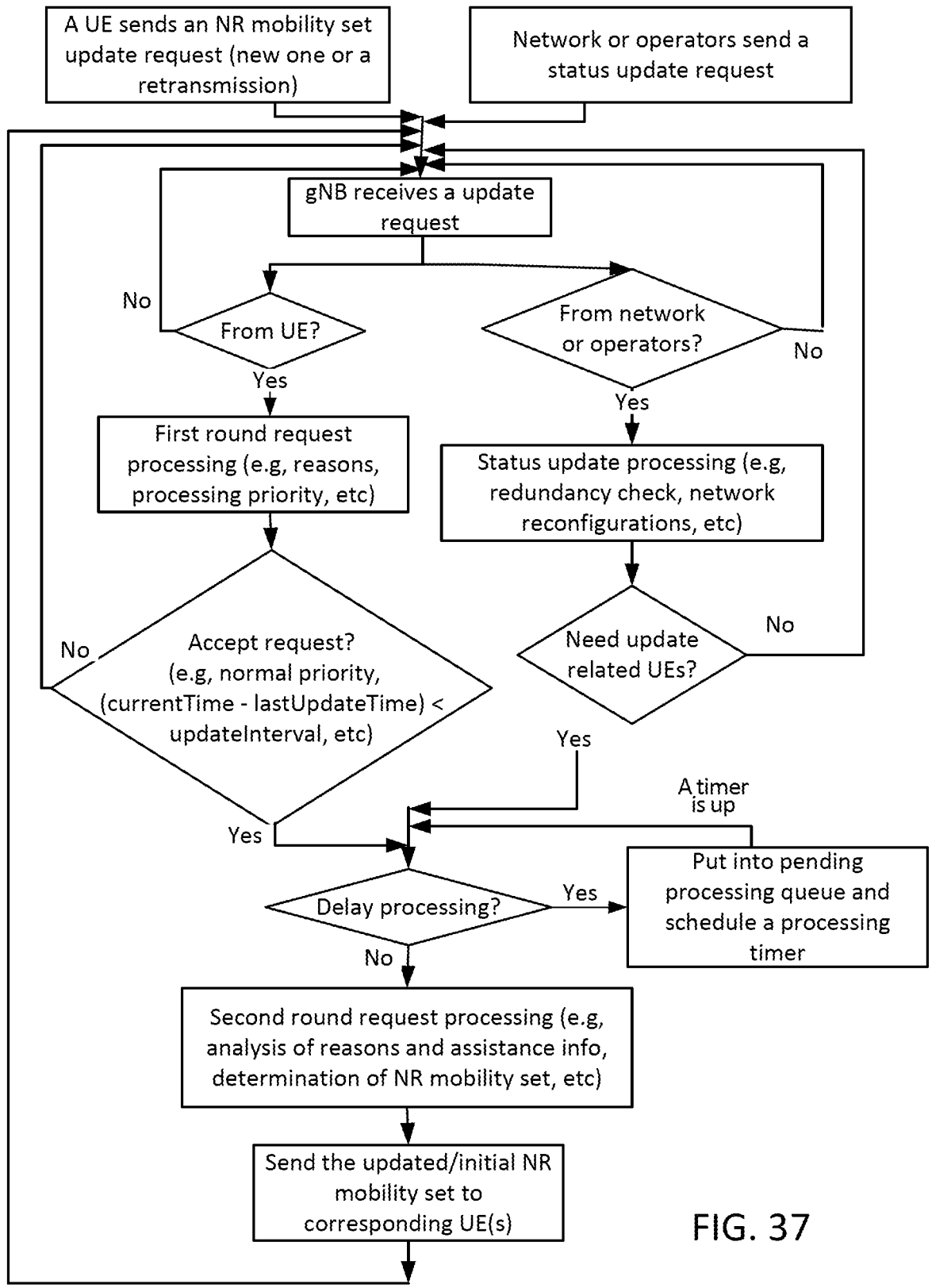
FIG. 37 shows a flow chart of an example optimization method.

An exemplary flow chart of optimization methods is shown in FIG. 37.

Once the PHY mobility set is initially configured for a UE, it may be necessary to update the PHY mobility set from time to time, due to mobility, radio environment change or UE's service change. NR may configure under which conditions/events a UE need to perform update of PHY mobility set. For example, an update may be necessary due to: arrival of an update to the NR mobility; a periodic update; expiration of current PHY mobility set; detection of one or more new TRPs with favorable beams; the number of TRPs, or beams from TRPs in the current set, is below a threshold; a change of service type, use case, QoS requirement, etc.; and detection of a radio link failure.

Various events and conditions may cause a UE's NR mobility set to be updated. In order to maintain the strict consistence between the two sets, PHY mobility set has to be updated as well. For example, a TRP present in the current PHY mobility set may need to be removed simply because the TRP is removed from the updated NR mobility set. In an alternative embodiment, a TRP may be added or removed from the current PHY mobility set because some characteristics of the TRP (after the update of NR mobility set) become qualified or unqualified by being evaluated with a defined selection criteria. For example, traffic load of TRP3 is changed from 70% to 90%, or is changed from 90% to 70%, and therefore TRP3 is removed from or added into the PHY mobility set after update.

Periodic recurring update may be used to avoid expiration of a PHY mobility set. It may be accompanied with a measurement of surrounding TRPs/beams, and an update of the current PHY mobility set according to the new consolidated TRP level measurement results.

A UE's PHY mobility set may expire after a validity period, or at a certain distance away from previous location. mMTC UEs typically have no or low mobility and are also delay tolerant, so may be configured to have a large expiration value.

Regarding detection of new TRP(s) with favorable beams, some battery non-constrained UEs may proactively measure surrounding beams/TRPs in order to maintain a required (configurable threshold) number of candidate TRPs (the TRPs in the PHY mobility set), so that alternative beams/TRPs can be quickly determined in the case of mobility and/or radio environment change. In this case, detection of new TRP(s) with favorable beams (for example, high RSRP) may reveal a chance to improve the overall quality of current candidate TRPs. Therefore an evaluation process of the new TRPs as well as update of PHY mobility set may be needed.

Regarding the number of TRPs, or beams from TRPs in the current set, falling below a threshold, UEs may proactively maintain a certain number of TRPs/beams for back up use. The number of TRPs may be reduced due to removals of TRPs from current PHY mobility set because not enough number of qualified beams from those removed TRPs have been found after periodic beam measurements. For example, less than n beams with RSRP value above m have been found from TRP x, then TRP x is removed from the current PHY mobility set, where both n and m are configurable. Note that the threshold is configurable and also UE specific.

Regarding change of service type, use case, QoS requirement, etc., due to these changes, the selection criteria, based on which previous NR mobility set was determined, may not be valid anymore. As a result, a new PHY mobility set may need to be determined based on new selection criteria.

Regarding radio link failure, the occurrence of radio link failure may or may not indicate that no alternative qualified beams/TRPs are available in the current PHY mobility set. UE may try to recover from the link failure by selecting and switching to another beam/TRP first if alternative beams are present from the TRPs in the PHY mobility set. If the connectivity is still not recovered after a configurable time window, an update of PHY mobility set is reasonably needed.

Figure 38:
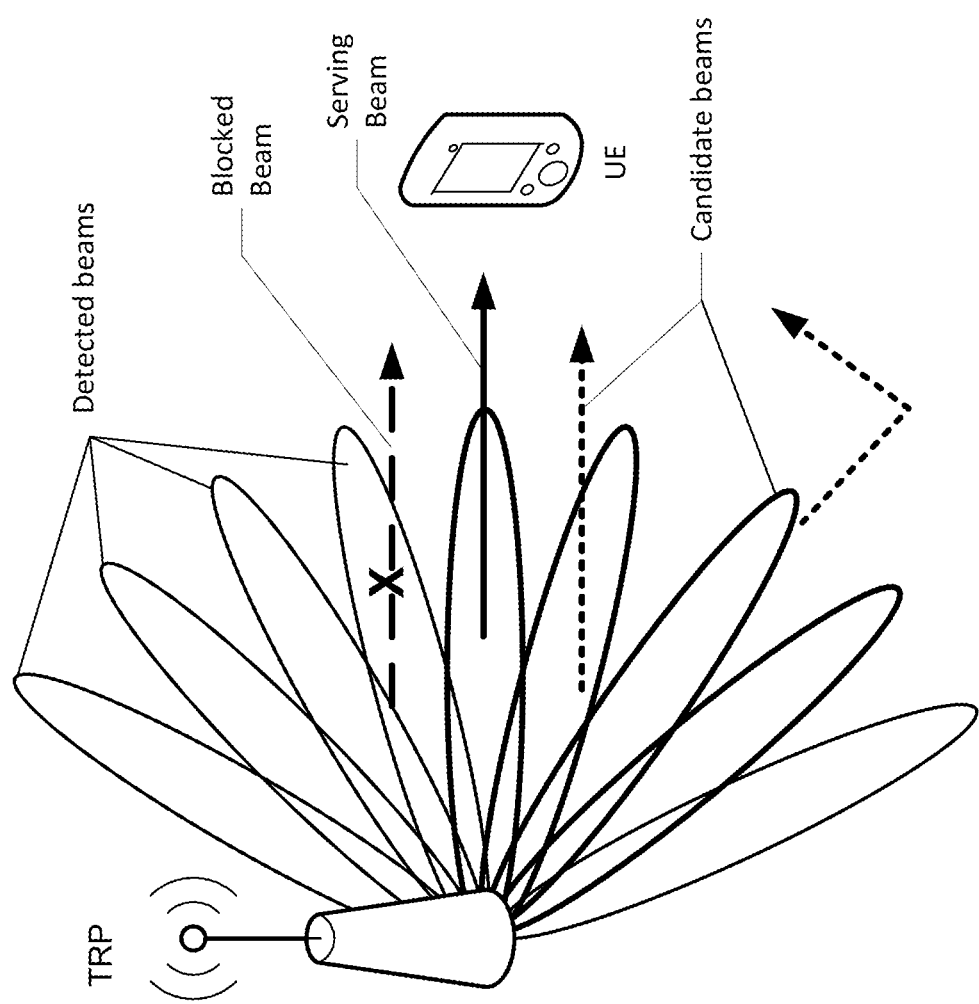
FIG. 38 illustrates a scenario where a UE sees multiple beams from a transmit-and-receive point (TRP).
Figure 39:
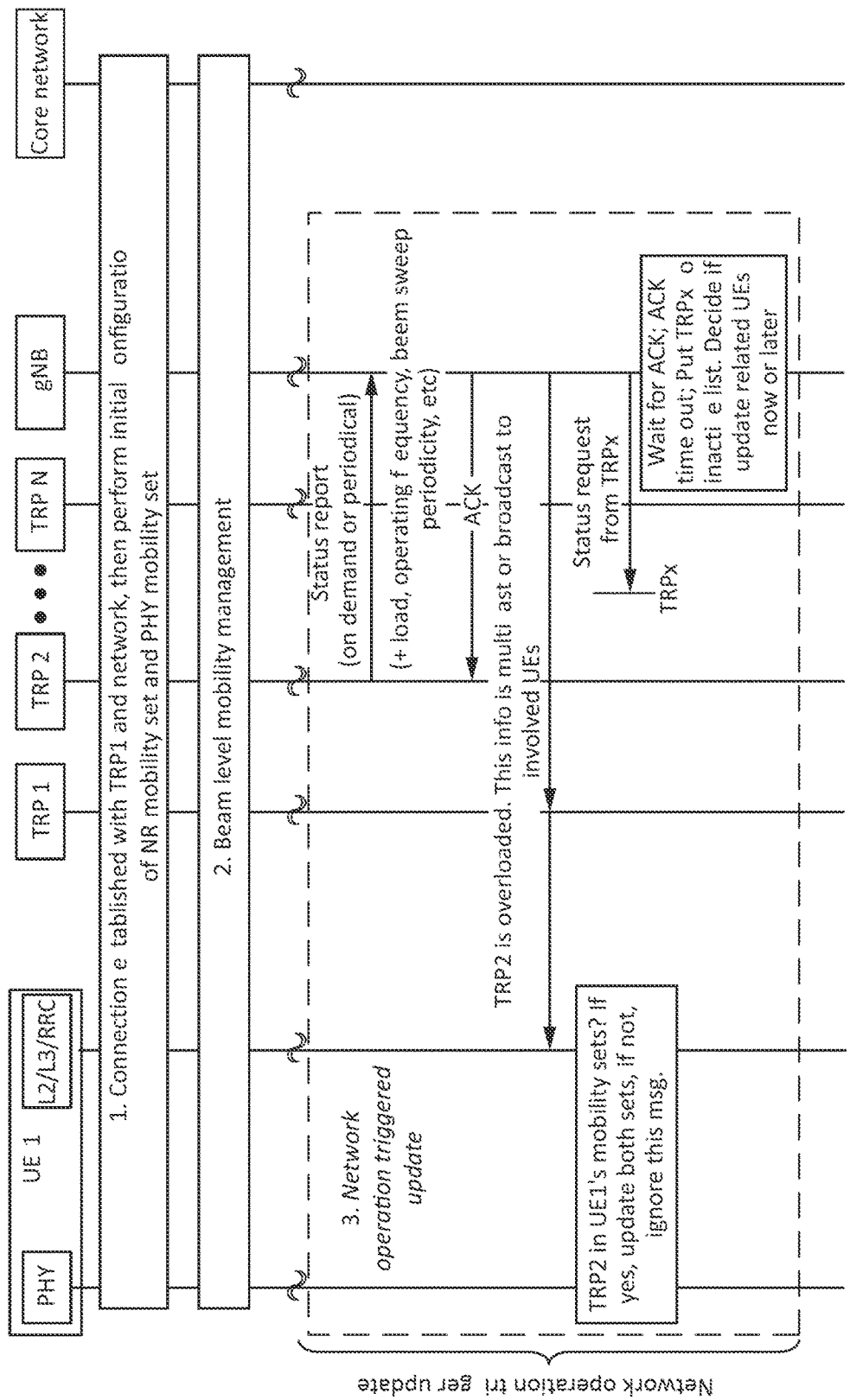
FIGS. 39 through 42 show a call flow of an example method for updating mobility sets.
Figure 40:
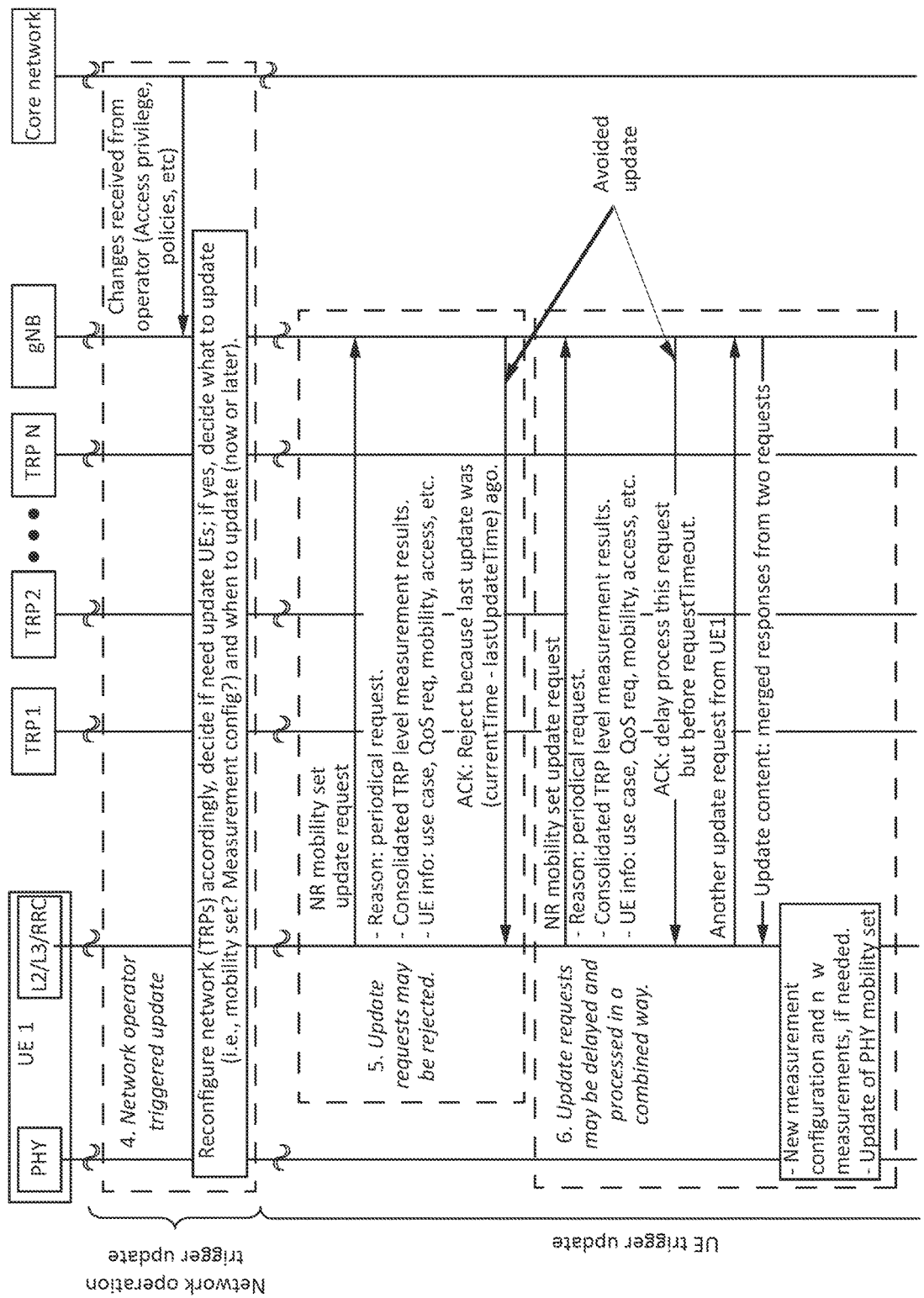
Figure 41:
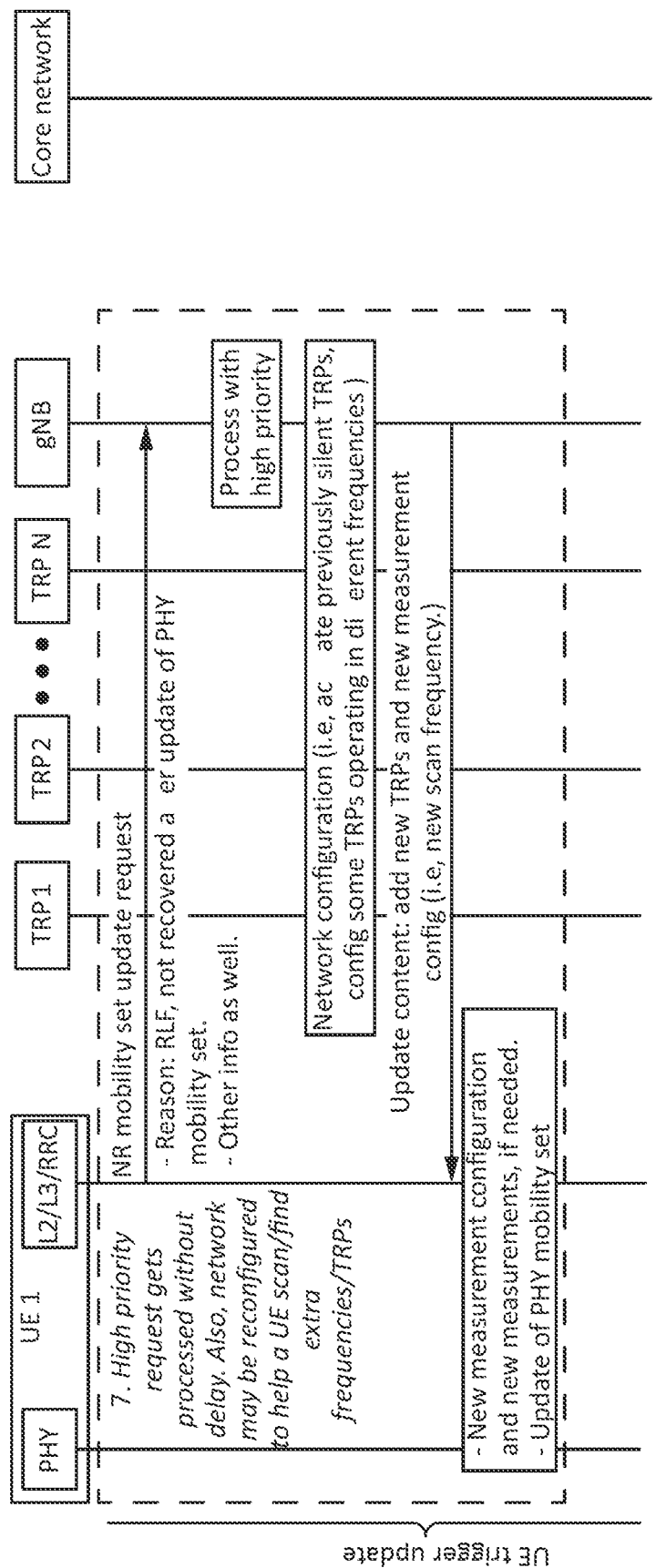
Figure 42:
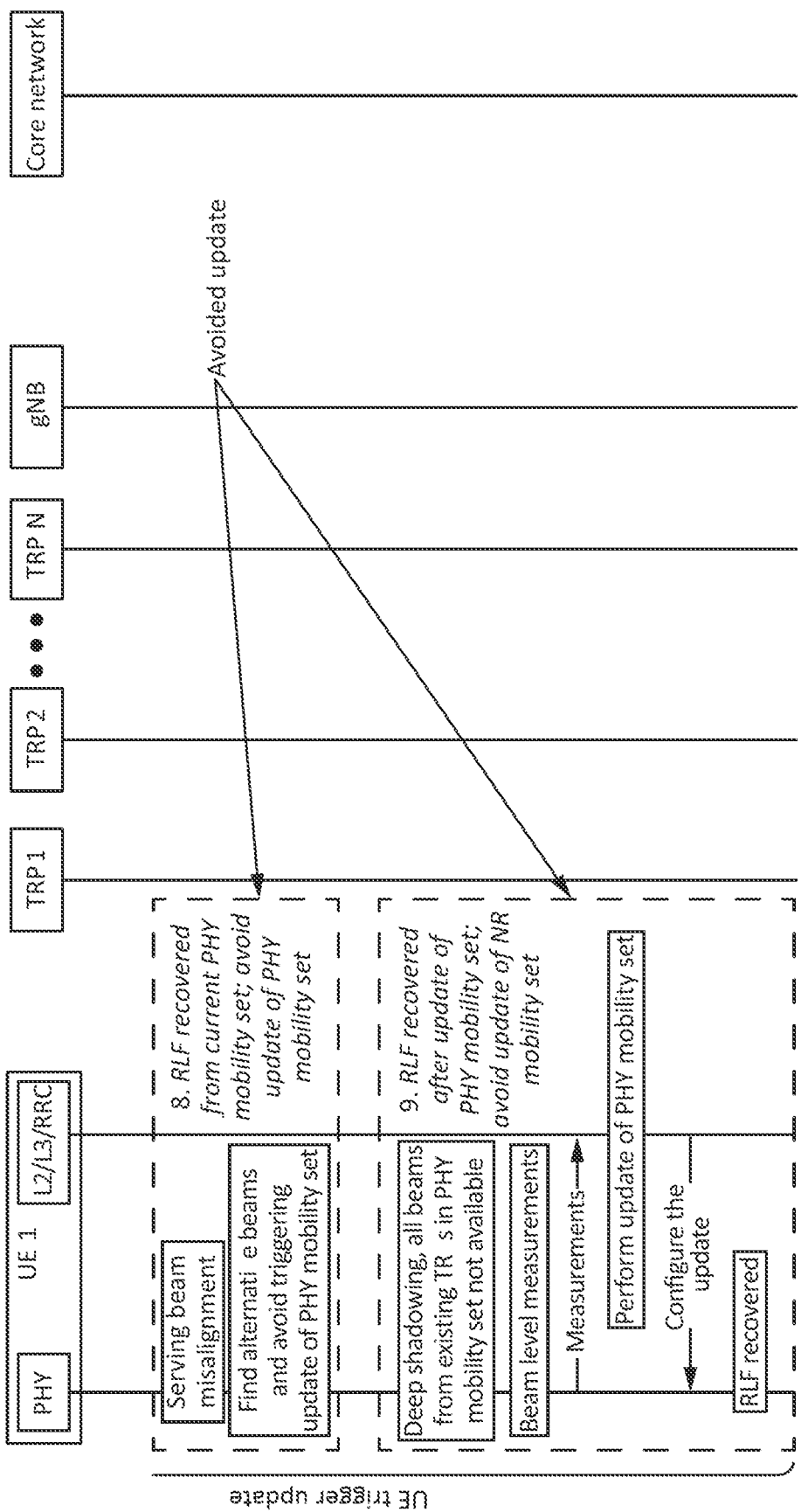
Figure 43:
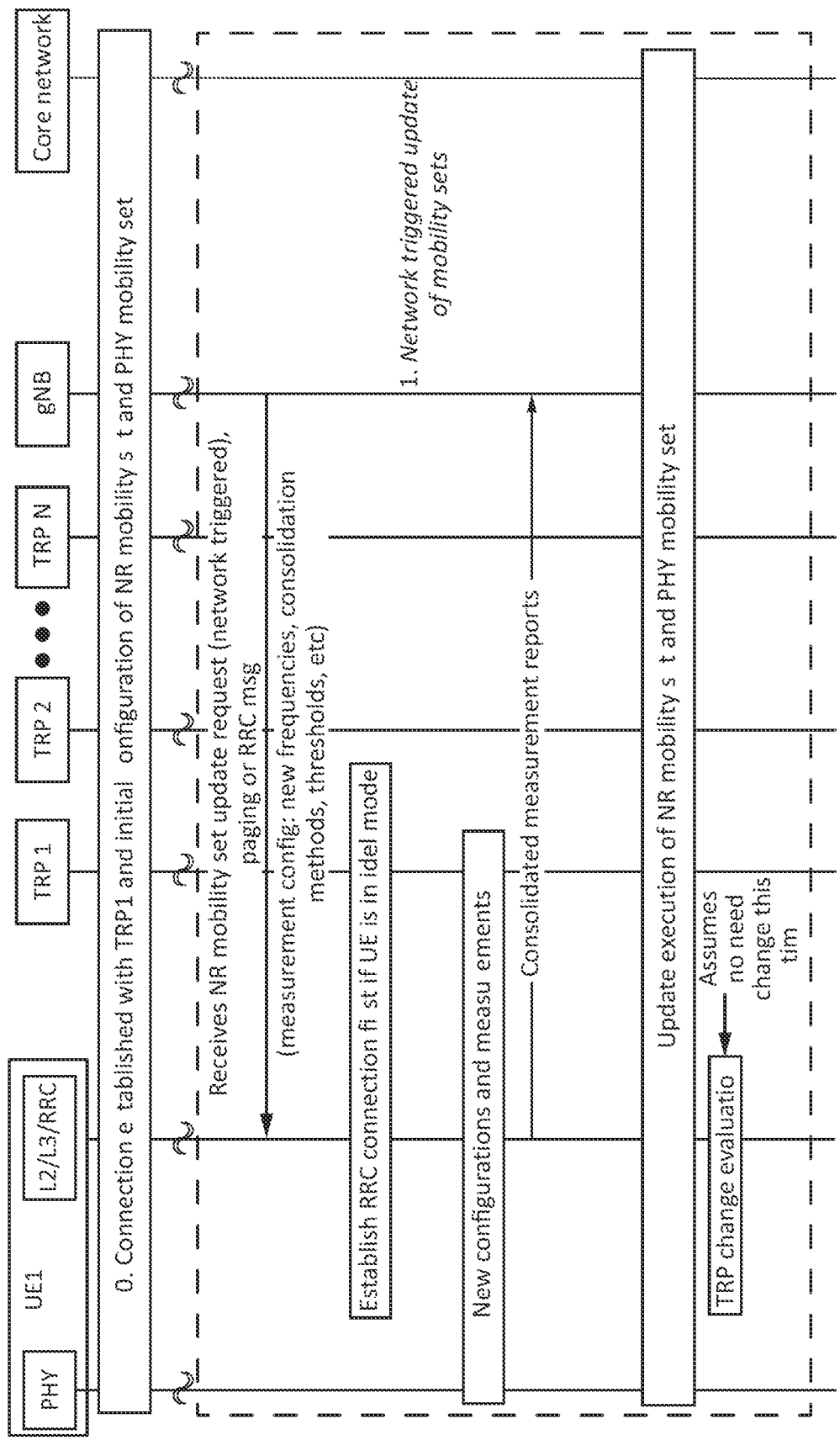
FIGS. 43 through 47 show a call flow of an example method for UE controlled beam change.
Figure 44:
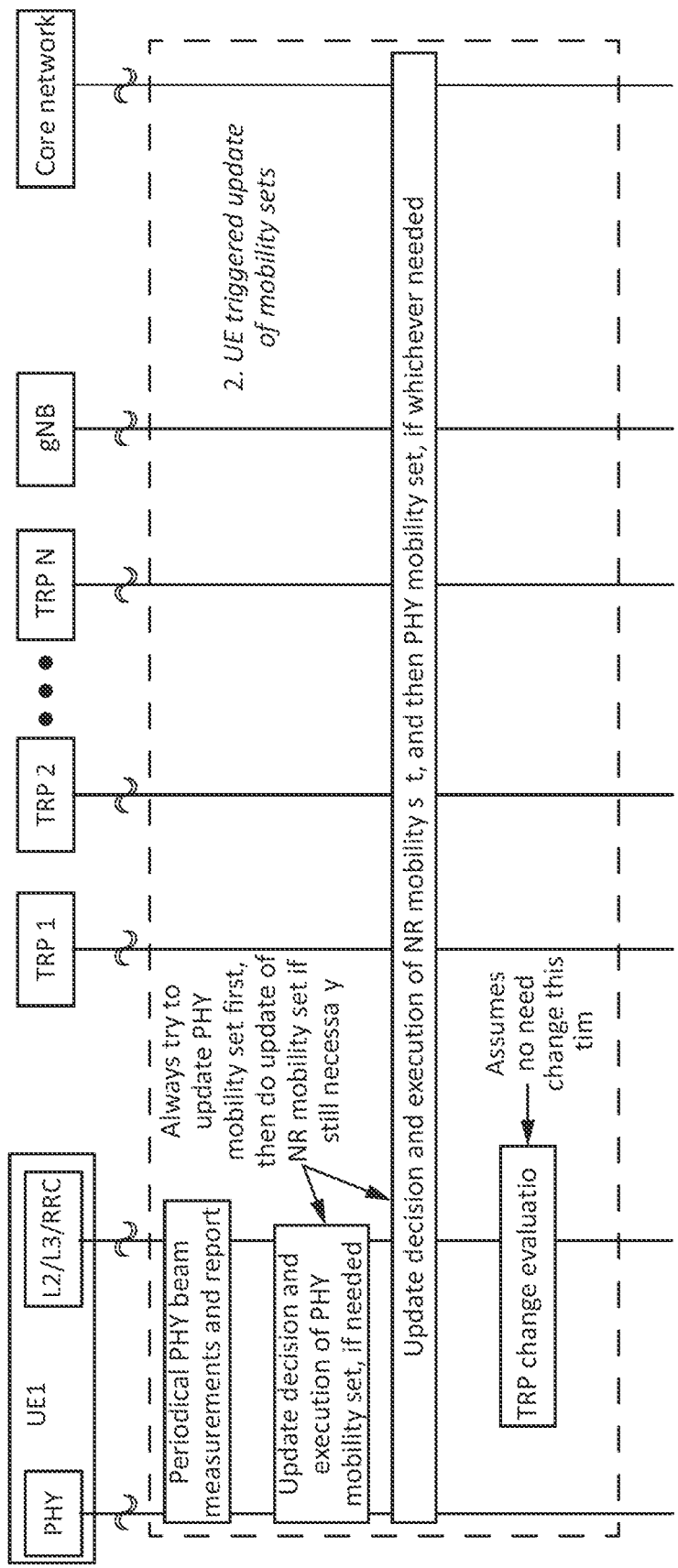
Figure 45:
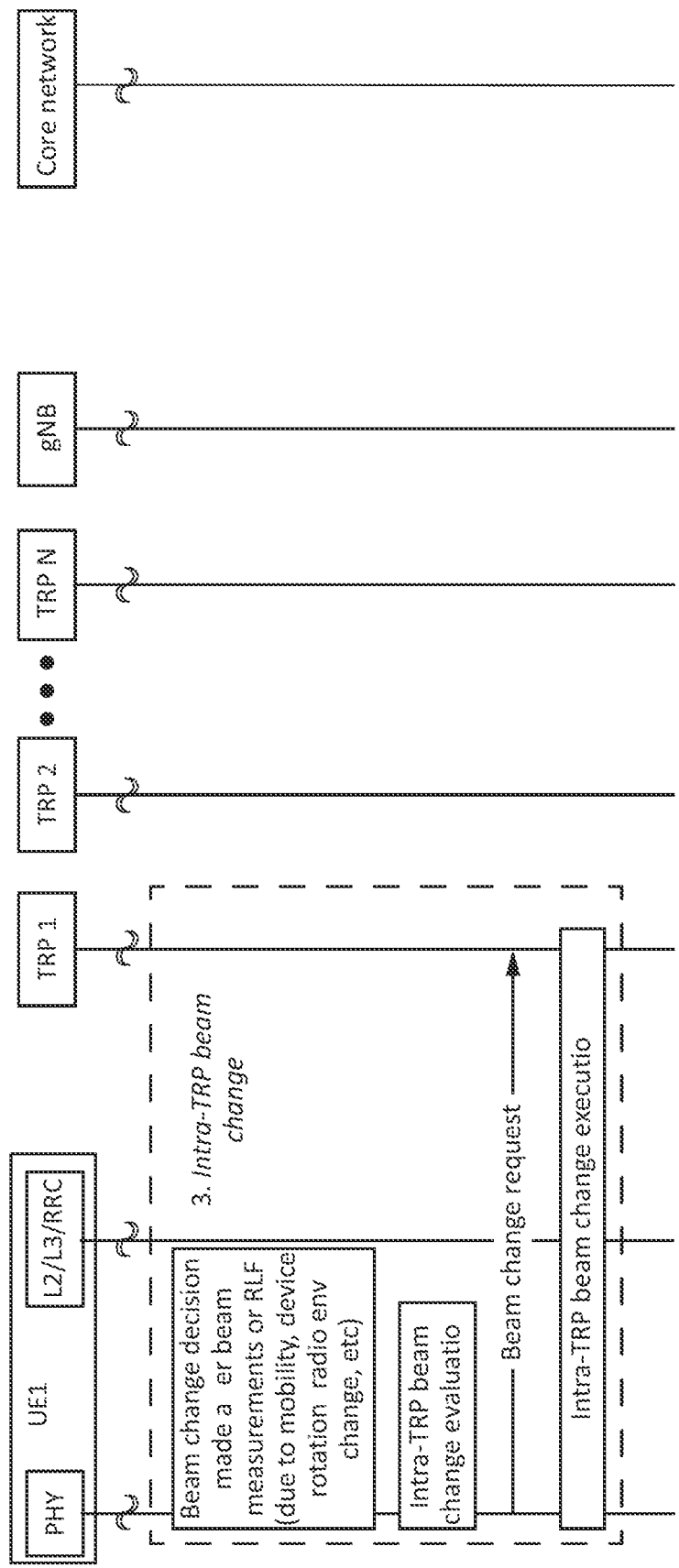
Figure 46:
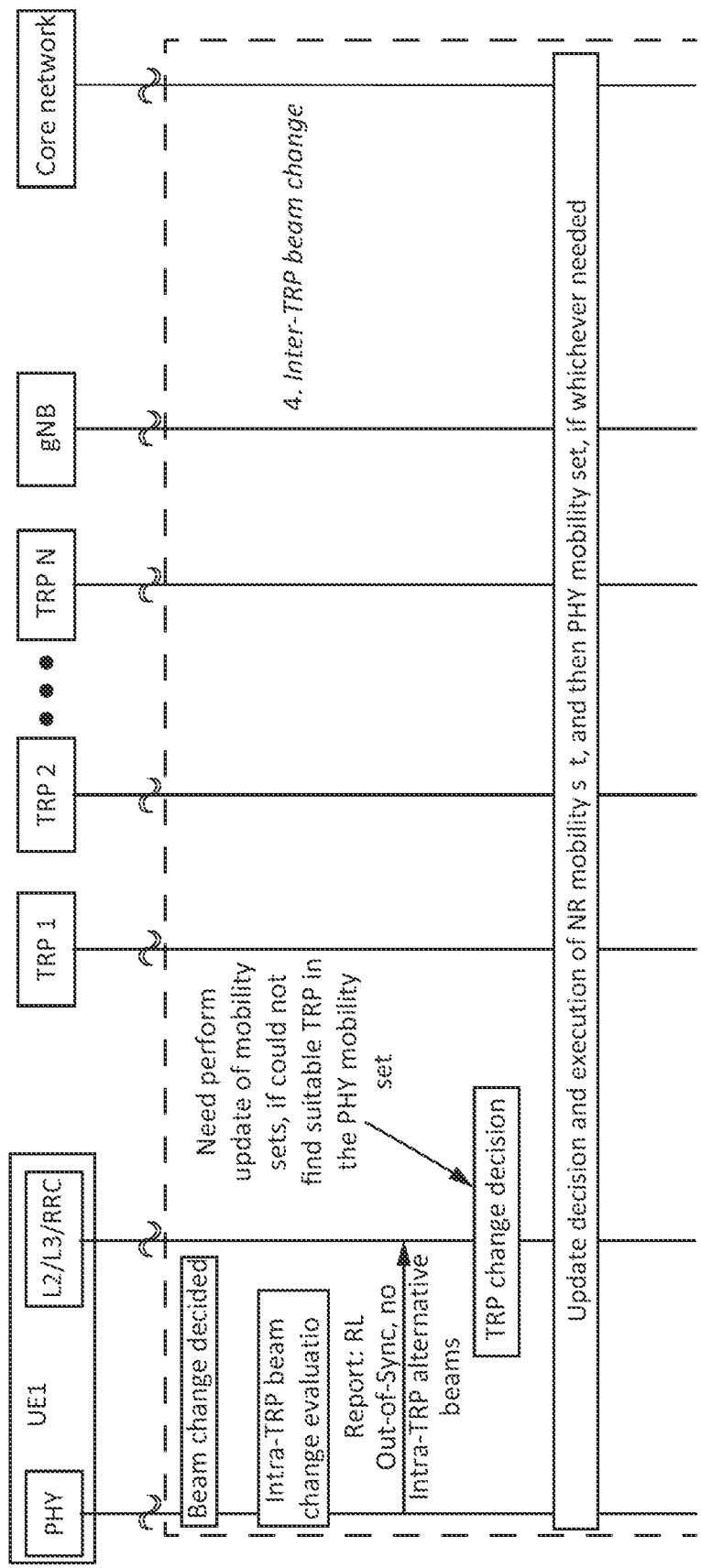
Figure 47:
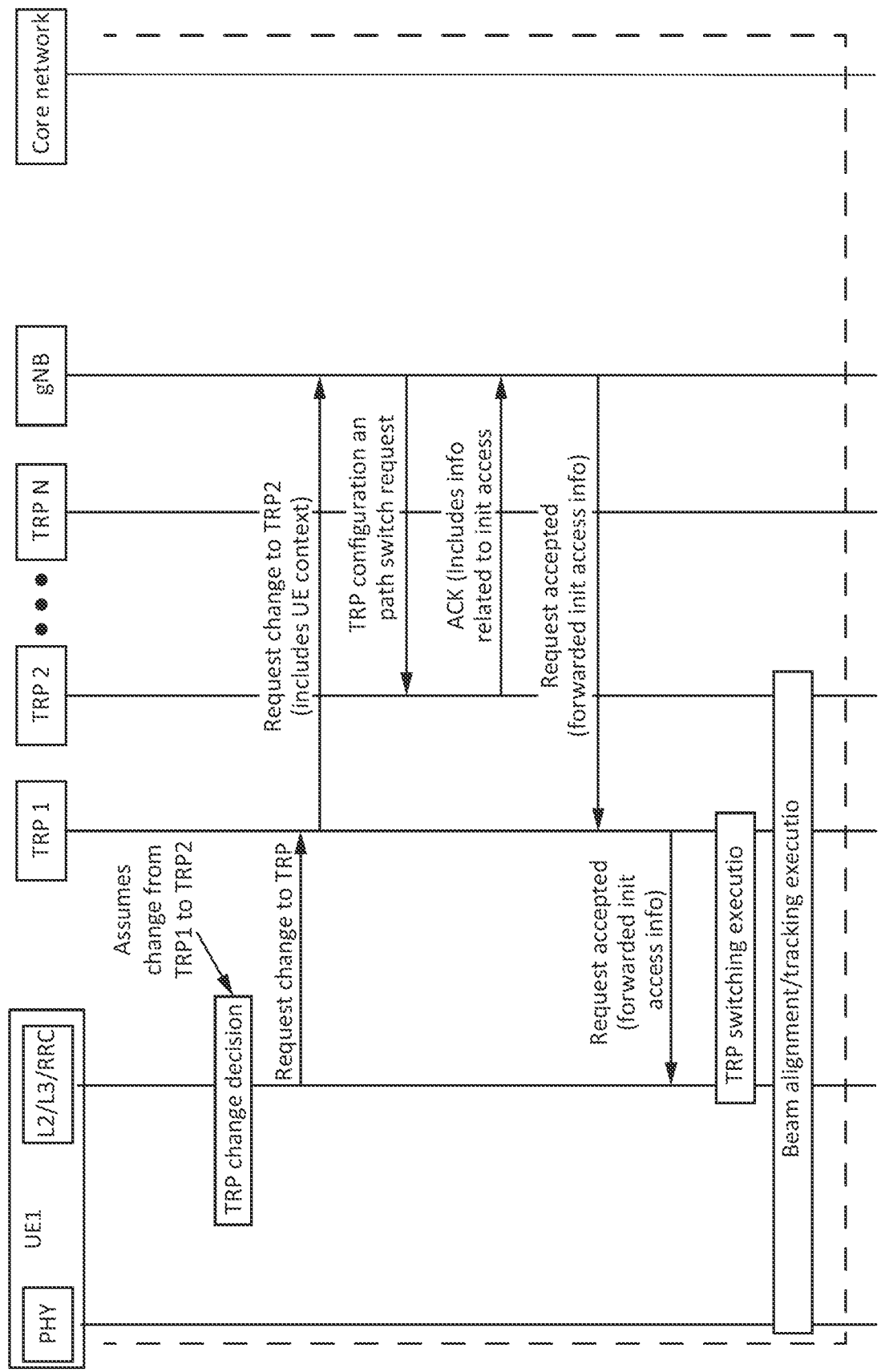

In HF-NR, narrow high gain beams would be largely used. As the radiation patterns of different beams overlap and due to radio environment (e.g., reflecting from surfaces, scattering in air), a UE may be under the coverage area of multiple beams from a single TRP. FIG. 38 illustrates a scenario where a UE sees multiple beams from a TRP, or even multiple beams of different TRPs. A candidate beam is a beam which could potentially be used for communication on downlink or/and uplink direction (uplink and downlink may use or may not use the same beam), selecting from detected beams based on a defined selection criteria after taking into account multiple factors (like the ones mentioned in Table 9, Table 10, and Table 11. A serving beam (or beams) is a beam which is currently used for transmitting or/and receiving information.

Currently, RLM in legacy LTE is used to detect the link quality of Primary Cell (Pcell)/Secondary Cell (Scell), which is covered by omni-directional beam or a wide beam and is considered as one radio link. For HF-NR with beam operations, a TRP area is covered by multiple beams as shown in FIG. 38 and beam switching is performed to maintain the connectivity. Per-beam based RLM functionality may be used, so that RLM is performed on different beams independently as multiple radio links.

Different from the traditional low frequency that RLF occurs because of deep shadowing, beam switching/tracking failure may also result in RLF for HF with beam operations. Due to the fast channel variation, it is possible that UE and the network loss of the beam between each other if any one of the signaling required for beam switching/tracking is not received timely and correctly.

Radio link recovery mechanism for those two events may be different. For the first case, the straightforward way is to initiate connection re-establishment by performing new measurements (measurement configurations may be needed as well) and update of PHY mobility set, because when a UE moves to an area with deep shadowing, other previous beams may also not be available. Even update of NR mobility set is probably needed, so that gNB gets informed of the RLF and may configure some TRPs transmitting reference signals in extra time/frequency domain, and/or also configure the UE to scan those extra frequencies. For the second case, UE may initiate beam alignment and try to acquire alternative beams from the existing TRPs in the PHY mobility set first.

Due to beam sweeping, the measurements of all beams from the same TRP should be performed in a sequential manner (multiple beams may have overlapping in both time and frequency domain so that more than one beam may be measured at a time, but overall beam level measurements are still performed in a sequential manner. For example, at time t1, beam x, y and z are measured; at time t2, beam s, q and w are measured at a UE. As a result, if the measurement period is not long enough to cover a full beam sweeping periodicity, a previously available beam with good quality may become temporarily undetectable, resulting in potential unnecessarily frequent beam changing, even frequent update of mobility set. However, an overly long measurement may result in a latency and energy efficiency problem, especially when the number of TRPs around a UE is increasing. Also note that, due to different capabilities of each TRP, it is hard to find a relatively small measurement time duration to cover all TRP's beam creeping periodicities. One solution could be to proactively maintain a configurable number of candidate TRPs with enough number of candidate beams, so that a UE may quickly find another candidate beam/TRP from the current PHY mobility set when a serving beam becomes temporarily unavailable, and avoid false alarms of RLF, without triggering updates of PHY mobility set, even expensive updates of NR mobility set.

From the system level control signaling perspective, the overall methods of update of the two-level mobility sets may contain the steps shown in FIGS. 39-42.

As shown in FIGS. 43-47, an exemplary flow chart of methods for mobility framework based NR networks is presented. Generally speaking, this figure consists of three parts: network triggered update of mobility sets, UE triggered update of mobility sets and mobility framework assisted beam centric mobility management (includes intra-TRP beam change and inter-TRP beam change).

Figure 48:
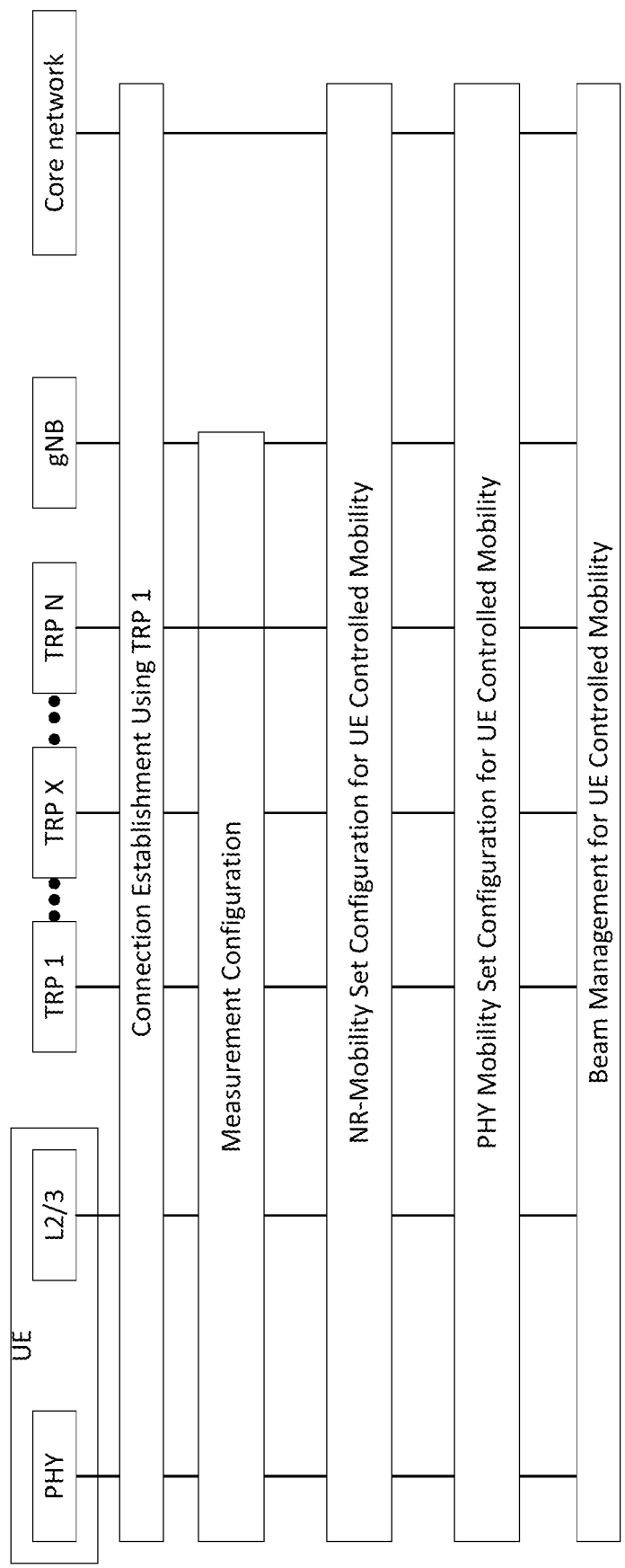
FIG. 48 illustrates an example UE controlled mobility method.

FIG. 48 illustrates a UE controlled mobility method. Step 1 is connection establishment. The UE has established a signaling connection toward the radio access network, e.g., via one or more signaling radio bearers such as SRBs, The UE is in connected state and has a context in the radio access network. Additionally, a signaling connection may be established between the UE and the core network. The UE may have a context in the core network. Furthermore, data bearers or IP flows or other forms of user data connections might be established between UE and the core network.

In step 1, operator policies for mobility management may be provided to the gNB by the core network. Such policies may be UE specific, bearer specific, service specific or service data flow or IP data flow specific. The policies may include policy related to for e.g., area restriction, user mobility profile, service usage profile, charging, service specific subscription level (e.g., platinum, gold, silver, bronze). The polices may alternatively or additionally include: discovery information including policies with respect to network and network slice discovery, access network discovery, service discovery; home network preferences for e.g., in relation with equivalent home service providers, preferred service providers, etc.; and validity criteria for each policy. QoS Information may be provided to the gNB by the core network. The operator's policies, e.g., as described herein, and QoS information may also be provided to the UE in support of UE controlled mobility for e.g., the UE may use this information in the determination or update of the PHY-mobility set.

2. Step 2 is measurement configuration. The UE may be configured by the NextGen RAN (e.g., gNB) to perform measurements in support of mobility decisions for e.g., in support of the configuration of NR-Mobility set(s). The measurements may include measurement types such as Intra-frequency measurements, Inter-frequency E-UTRAN measurements and Inter-RAT measurements. For each measurement type one or several measurement objects can be defined (a measurement object defines e.g., the carrier frequency to be monitored). The measurement objects can be configured using carrier frequency identifiers, cell identifiers, TRP identifiers, beam identifiers, country code and operating class. The measurements quantity may be one or more of the following: Reference Signal Received Power (RSRP), Reference Signal Received Quality (RSRQ), Reference Signal and Signal to Noise and Interference Ratio (RS-SINR), Received Signal Strength Indicator (RSSI), etc.

For example, the measurements may be configured to support: UE Controlled mobility activation, including the configuration of the initial NR-mobility set; an inter NR-mobility set mobility including an update to the NR-mobility set; an inter PHY-mobility set mobility including measurement in support of update to the PHY-mobility set; and UE controlled mobility deactivation.

Figure 49:
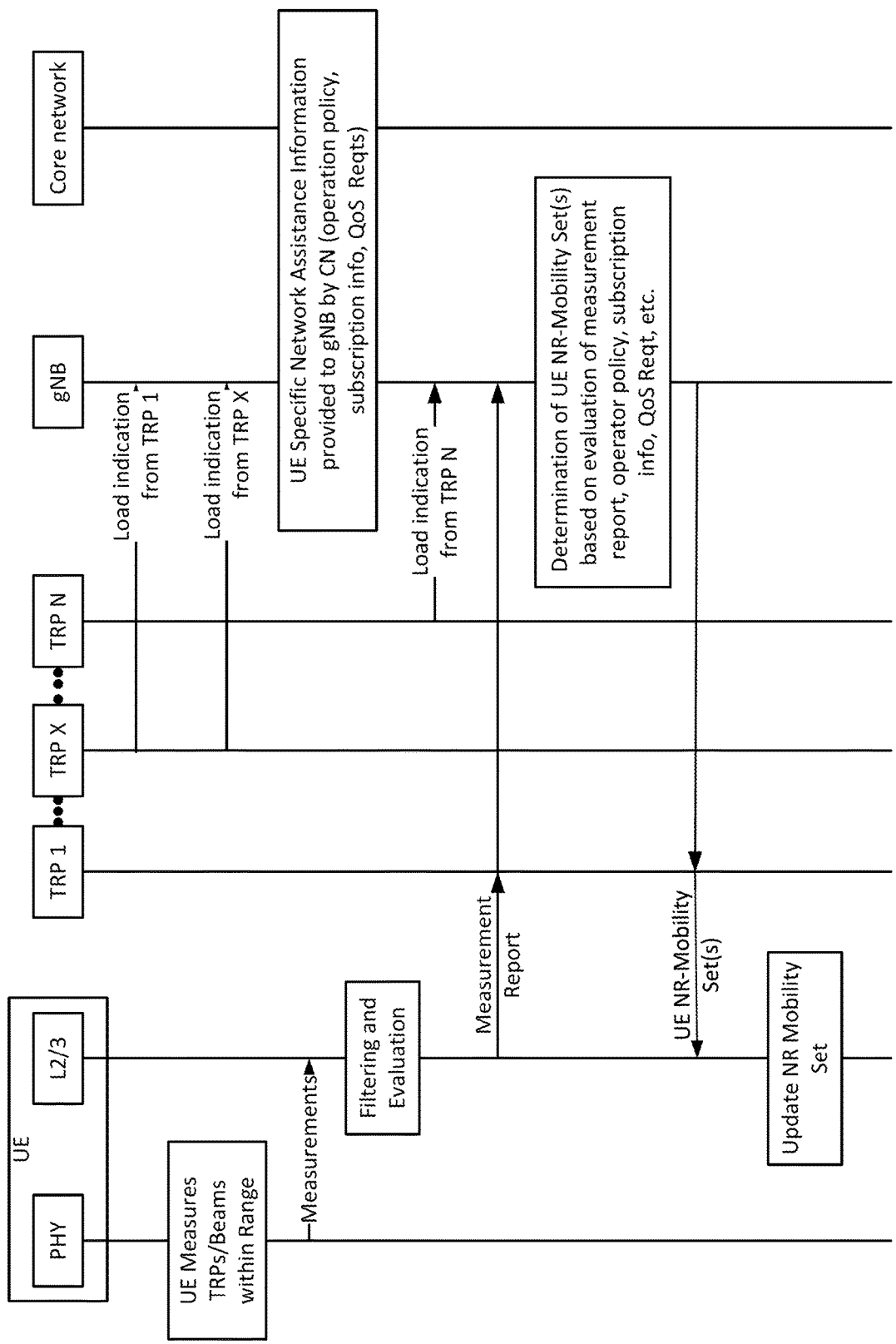
FIG. 49 shows a call flow of an example of mobility set configuration determined with a gNB.
Figure 50:
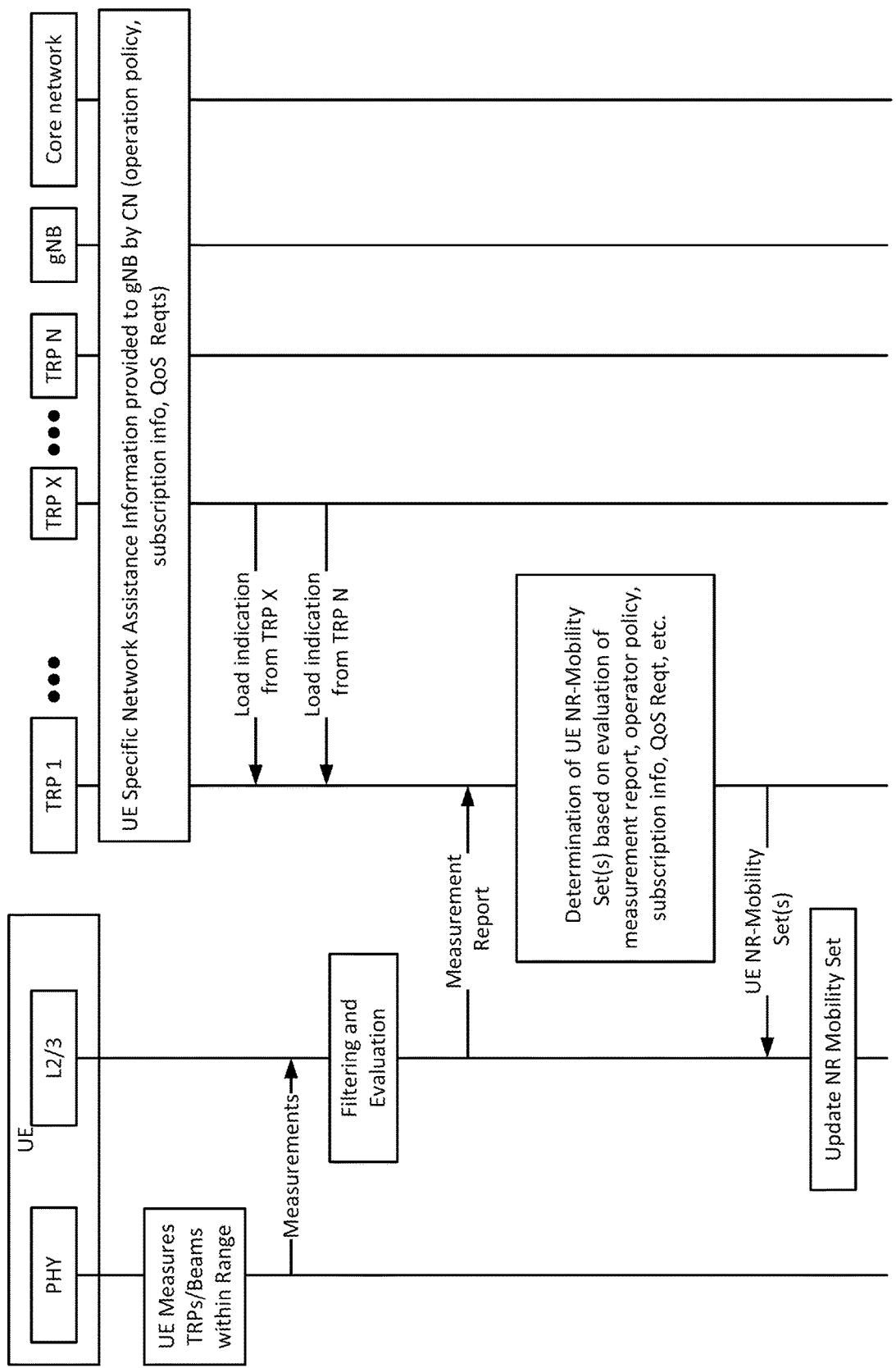
FIG. 50 shows a call flow of an example of mobility set configuration determined with a TRP.

Step 3 is NR-mobility set configuration for UE controlled mobility. Example NR-mobility set configuration methods are depicted in FIGS. 49 and 50.

Figure 51:
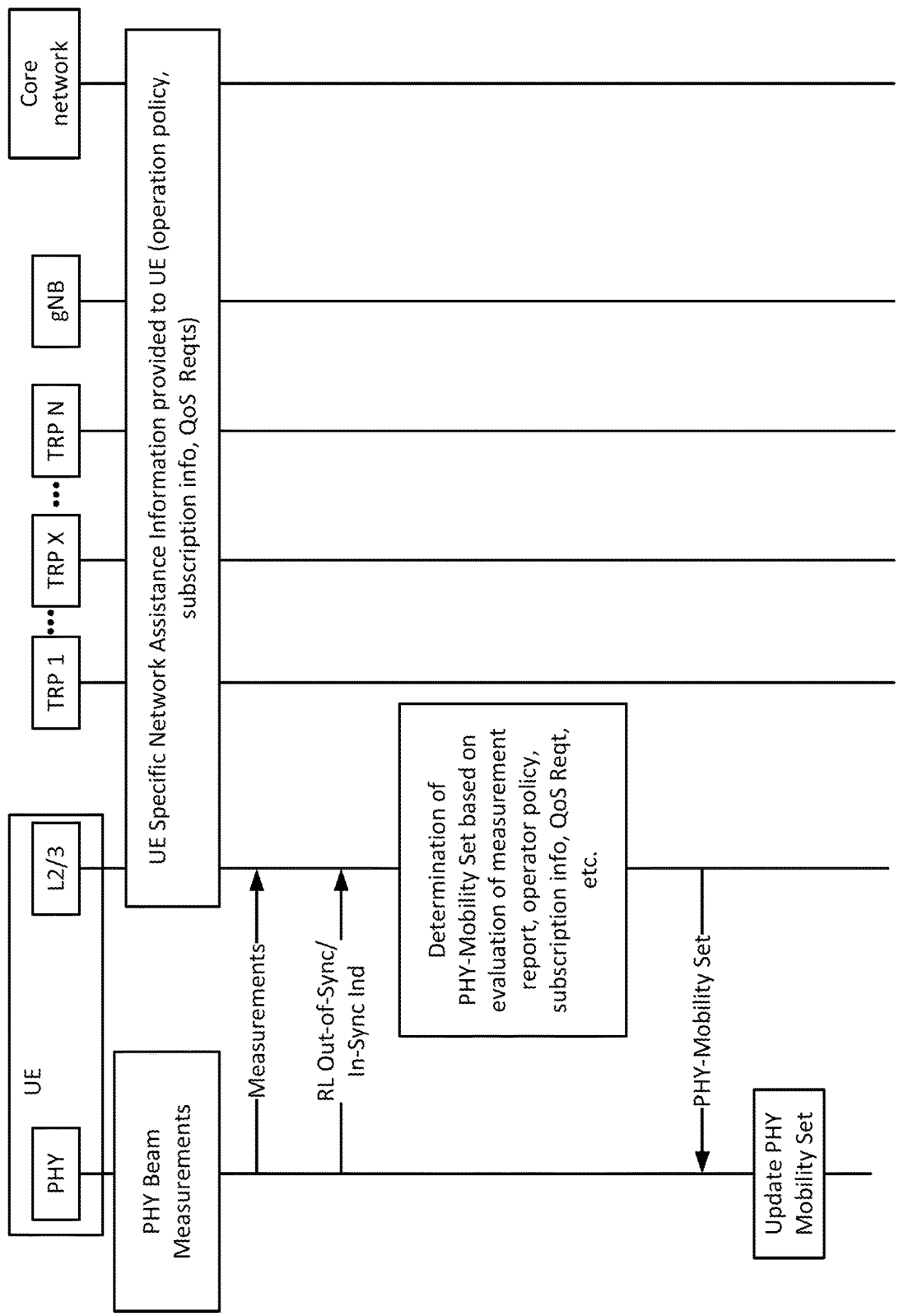
FIG. 51 shows a call flow of an example of mobility set configuration using a PHY-mobility set.

Step 4 is PHY mobility set configuration for UE controlled mobility. An example PHY mobility set configuration method is depicted in FIG. 51.

Figure 52:
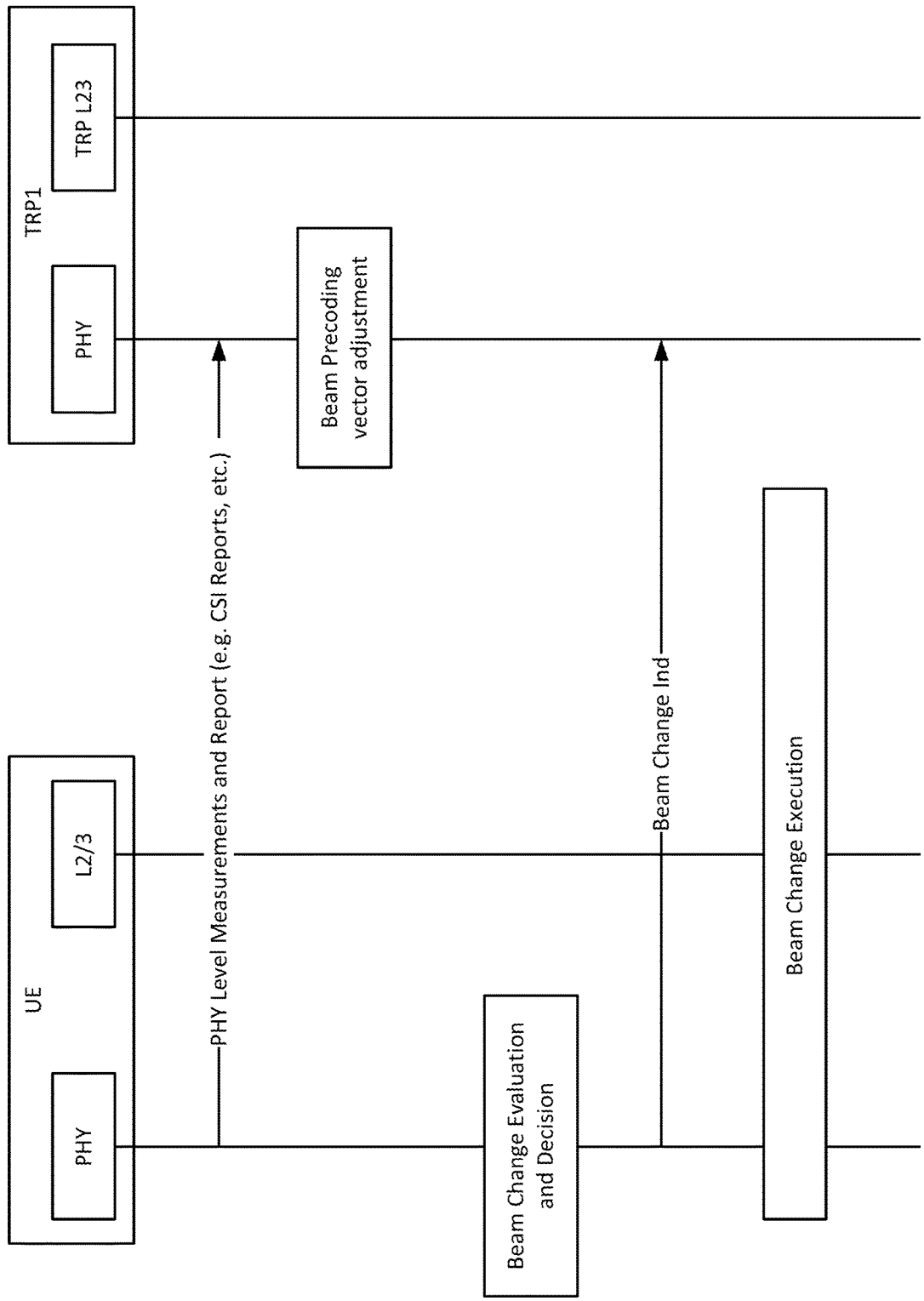
FIG. 52 shows a call flow of an example beam management method.

Step 5 is beam management for UE controlled mobility. An example beam management method for UE controlled mobility is depicted in FIG. 52.

The NR-Mobility set configuration method may be continuously running, e.g., looping through NR-mobility set update cycles. The following is an example method. The steps are not required to be in the exact order shown, for example.

First, radio access network loads (e.g., composite load potentially including air interface load, front haul load, backhaul load, CPU load, etc.) are reported to the gNB. The reporting may be event driven or periodic.

Second, the core network may provide to the radio access network (e.g., gNB), assistance information including operator policy information, user subscription information, QoS information, etc.

Third, the UE performs measurements using the measurement configuration received earlier from the radio access network. The measurements report from the UE physical layer to the UE L23 layer may be beam level measurement. The UE L23 layer may perform measurement aggregation from beam level measurement to TRP or cell level measurements. The UE L23 may perform L23 filtering on the measurements. The UE L23 may perform measurement evaluation according to the measurement reporting criteria, received from the radio access network. The measurement evaluation may be performed on the TRP or cell level measurements e.g., measurements that aggregated from beam level measurements into TRP or cell level measurement. Alternatively, the measurement evaluation may be performed directly on beam level measurements.

Measurement events for measurement reporting may be defined in support of: UE controlled mobility activation, including the configuration of the initial NR-mobility set; inter NR-mobility set mobility including update to NR-mobility set; inter PHY-mobility set mobility including measurement in support of update to PHY-mobility set; and UE controlled mobility deactivation.

Measurement events may take many forms, such as the following. Event NR-M1: TRP become better than threshold. This event may be used to trigger UE controlled mobility activation; similar event can be defined at cell level or beam level. Event NR-M2: All TRPs inside NR-Mobility set becomes worse than threshold1 and a TRP outside NR-Mobility set becomes better than threshold2. This event may be used to trigger Inter NR-Mobility Set mobility evaluation leading to NR-Mobility Set update; similar event can be defined at cell level or beam level. Event NR-M3: All TRP inside NR-Mobility set becomes worse than a threshold. This event may be used to trigger UE controlled mobility de-activation. The measurement event could be based on the expiry of a periodic timer. This may apply to periodic measurement report. The UE may be configured with a periodic measurement report timer for a given measurement configuration.

The measurement report may include identities of the TRPs (or cells or beams including possibly both TRP beams and UE beams) which satisfy the measurement reporting criteria. It may also include the TRPs (beams or cells) where the RE experience radio link failure.

Fourth, the radio access network (e.g., gNB, see FIG. 49 or TRP, see FIG. 50) determines the initial NR-mobility set or updated NR-mobility set based one or more of a measurement report, an operator policy, and QoS information.

The measurement report may include, e.g., new TRPs (cells or beams including possibly both TRP beams and UE beams) that are candidate for inclusion or removal from the NR-mobility set. An operator policy may include area restriction, user mobility profile, service usage profile, charging, service specific subscription level (e.g., platinum, gold, silver, bronze), network & network slice discovery policies, home network preferences for e.g., in relation with equivalent home service providers, preferred service providers, etc.

Fifth, the UE initializes or updates the NR-mobility set with the NR-Mobility set information from the radio access network. The reception of NR-Mobility set at the UE may trigger the update of the PHY mobility set. The UE may update the PHY mobility set upon updating the NR-mobility set.

The NR-mobility mobility set configuration method in FIG. 50 is similar to the method depicted in FIG. 49 with the following differences. The determination of NR-mobility set is performed at the TRP, and the network assistance information used in the determination of the NR-Mobility set is provided to the TRP.

The PHY mobility set configuration method is a method expected to be continuously running e.g., looping through PHY mobility set update cycles. These steps below are given by way of example, and the steps are not required to be performed in the exact order, for instance.

First, the core network or the radio access network may provide to the UE, assistance information including operator policy information, user subscription information, QoS information, etc.

Second, the UE PHY performs measurements based on the measurement configuration provided by UE L23 for the purpose of determining PHY mobility set. Measurements are reported by the UE physical layer to the UE L23. These measurements may include Channel State Information (CSI). Alternatively or additional, the measurements may include all beams (e.g., TRP beams)/TRPs inside PHY Mobility set becomes worse than threshold1 and a beam/TRP outside PHY mobility set but inside NR-mobility set becomes better than threshold2. This event may be used to trigger PHY mobility set mobility evaluation leading to PHY mobility set update. Measurements may also include all beams (e.g., TRP beams) inside the PHY-Mobility set become worse than threshold. This event may be used to trigger PHY mobility set mobility evaluation leading to PHY mobility set update. The measurement event could be based on the expiry of a periodic timer. This may apply to a periodic measurement report. The PHY may be configured with a periodic measurement report timer for a given measurement configuration.

Third, radio link status e.g., beam level radio link status is reported to the UE L23. The radio link status reporting may be in the form of radio link out-of-Sync or radio link In-Sync reporting from the physical layer radio link monitoring process.

Fourth The UE L23 determines the initial PHY mobility set or updated PHY mobility set as a subset of the NR-mobility set based one or more of the measurement report from the UE PHY layer, an operator policy, and QoS Information, etc. Operator's policies may include policies regarding area restriction, user mobility profile, service usage profile, charging, service specific subscription level (e.g., platinum, gold, silver, bronze), network & network slice discovery policies, home network preferences for, e.g., in relation with equivalent home service providers, preferred service providers, etc.

Fifth, the UE PHY initializes or updates the PHY mobility set with the PHY mobility set information from the UE L23. The reception of PHY mobility set at the UE PHY may trigger the update of the PHY mobility set. The UE PHY may update the PHY mobility set upon receiving new PHY mobility set information from UE L23.

The beam management method includes beam tracking, beam alignment/beam pairing and beam switching. The method may include one or more of the steps below. Herein, beam tracking may be inclusive of beam precoding vector adjustment, beams evaluation and beam change decision, and the supporting measurements, for example.

First, beam Precoding vector adjustment: the UE performs measurement on beams of the PHY mobility set and reports these measurements to the network PHY. An example of such measurement may be the channel state information (CSI) which include among other information the CQI and the RE recommendation of the precoder-matrix indication (PMI). The network may then adjust the beam precoding vector accordingly. This method is an ongoing method based on measurement report from the UE. The measurement may be event driven or periodic measurement similar to the one defined in support of PHY mobility set configuration.

Second, beam evaluation and beam change decision: this method is an ongoing method. The UE performs measurements for, e.g., CSI measurement and radio link status monitoring measurement. The UE PHY continuously evaluates candidate beams against the serving beam(s) and may decide to change serving beam(s) if serving beam(s) update criteria are fulfilled. An example of beam update criteria may be the following: a candidate is offset better than a serving beam or for, e.g., the serving beam become worse than threshold.

Third, once the beam change is decided, the UE may inform the network (e.g., gNB) of the new serving beam(s). Such information may also include the beam switch time e.g., the exact time interval or subframe when the switching from the old serving beam to the new serving beam should be executed such that there is an alignment between the UE and the network on the best/optimal beams. For example, assuming downlink (DL) transmission, the UE may identify the new best TX beam from the network. The UE may inform the network through beam change indication message of the optimal network side Tx beam from the UE perspective. The UE may also inform the network of the best Rx beam at the UE side, this way the pairing eNB Tx beam and UE Rx beam is known to both the UE and the network. Similar rational can be applied to the alignment and pairing of UE Tx beam and network side received beam. In this case the UE might still make the decision and inform the network. In an alternative embodiment, the network may select the optimal UL Tx beam(s) from the network perspective and inform the UE of these beams. The network may also inform the UE of the best Rx beam from the network side.

Fourth, at the time of the beam switching indicated in the third step, both UE and the network proceed with the switching/update of the serving beams and start transmitting and receiving on the new serving beams.

Another embodiment for UE controlled mobility is illustrated in FIGS. 53 to 56: Registration at Radio Access Network with the registration at RAN level.

Figure 53:
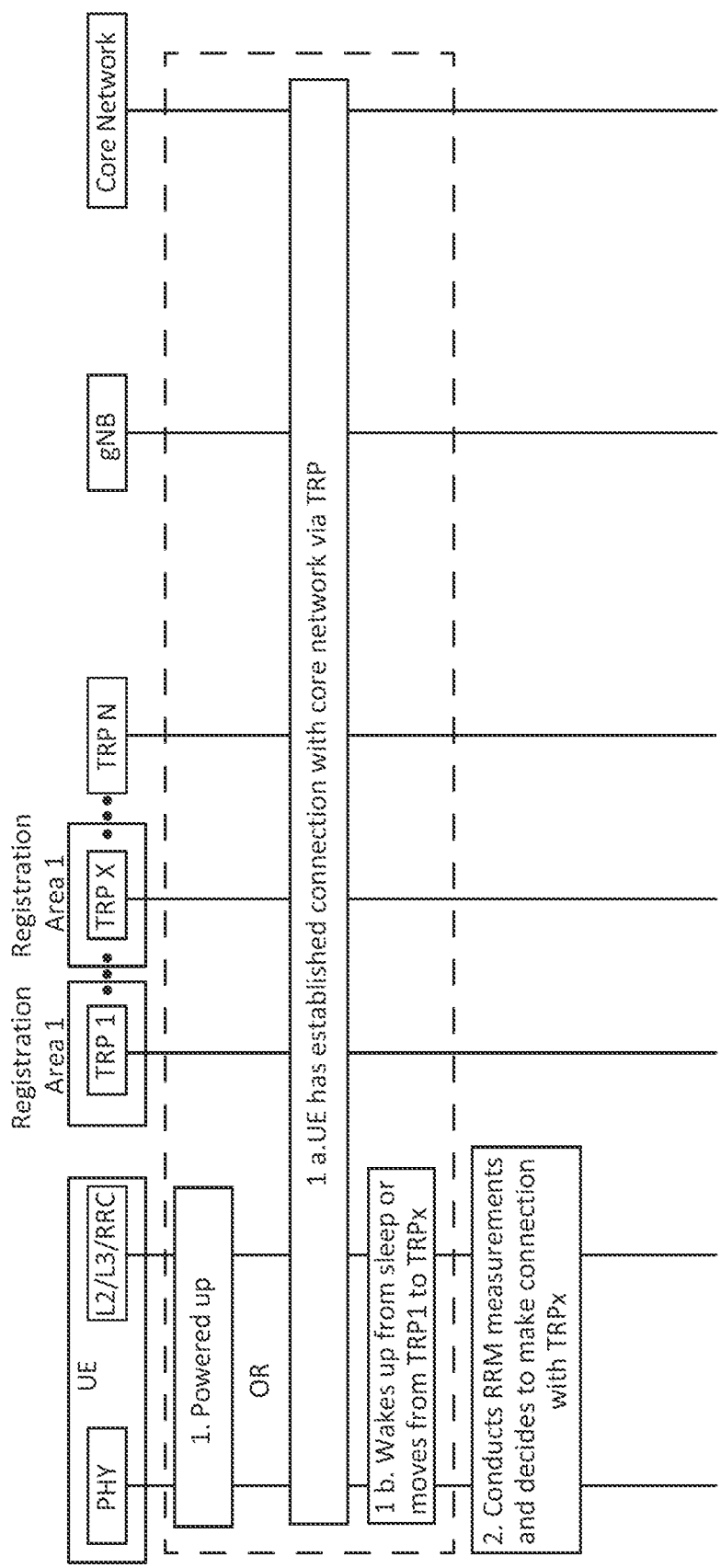
FIGS. 53 through 56 show a call flow of an example registration at a radio access network.

In step 1 of FIG. 53, either a UE is powered up and has no connection to any TRP, or the UE had established connection with TRP1 and core network already and wakes up after long time deep sleeping or moves into different area.

In step 2 of FIG. 53, the UE conducts RRM measurements, and decides to make connection or switch the connection to TRPx for the radio network accessing.

Figure 54:
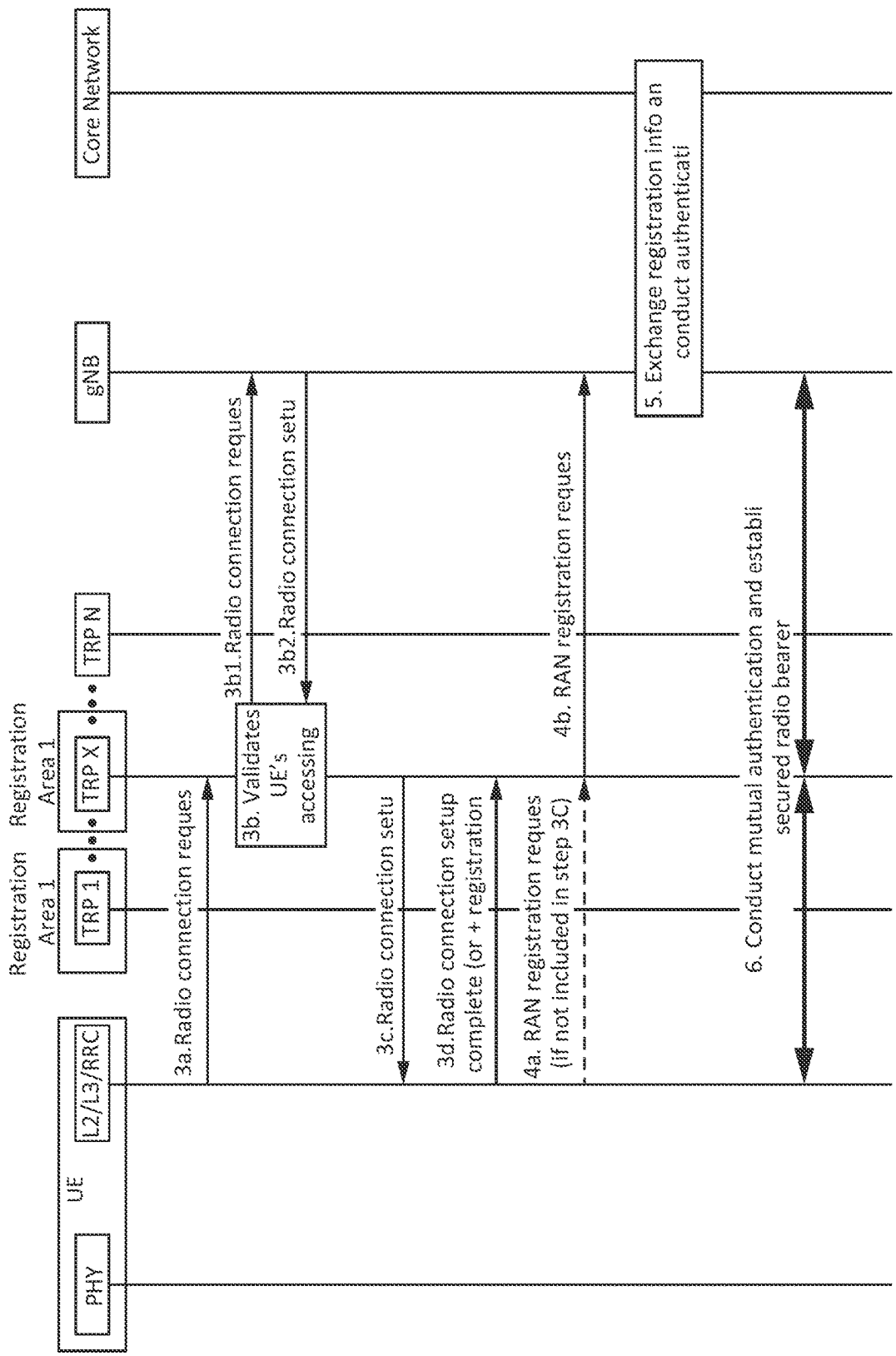

In steps 3a-3d of FIG. 54, The UE establishes connection with TRPx. In step 3a, the UE sends radio connection request to the TRPx with UE temporary ID or device ID, device type, service, access, etc. In step 3b, the TRPx validates UE's request either by the gNB or by itself if UE's context may be retrieved in the record at TRPx. In step 3c, the TRPx responds back to UE with constructions for radio configuration, as well as the TRPx ID and/or UE ID if applicable. In step 3d, the UE confirms the radio connection configuration completion and may also insert the registration at RAN in the Radio connection setup complete message.

In steps 4a and 4b, the UE sends registration to the gNB with the UE information, e.g., UE temporary ID or device ID, device type, service, schedule, data rate, mobility, location, radio network accessing priority, etc.

In step 5, the gNB exchanges UE registration information with the core network and conducts the authentication method with the core network.

In step 6, the UE and TRPx/RAN conduct mutual authentication and establish secured radio connection with the security key parameters derived from the authentication with the core network.

Figure 55:
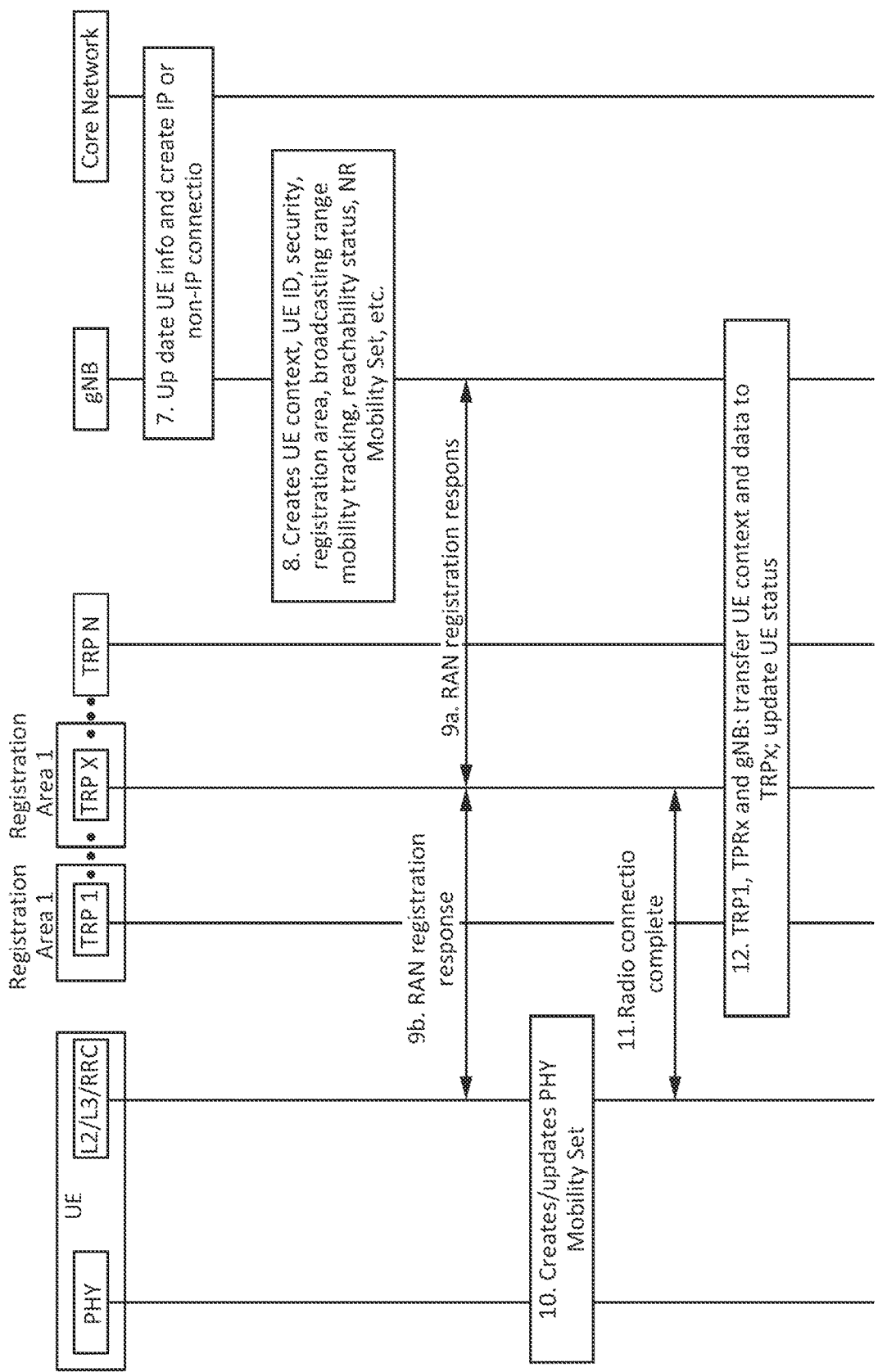

In step 7 of FIG. 55, the core network updates UE information and creates IP or non-IP connections for the UE.

In step 8, the gNB, creates or updates UE context with the UE related information (e.g., service subscription, charging policy, security, device type, scheduling, data rate, mobility, location, radio network accessing priority, etc.). The gNB also creates or updates UE registration area, broadcasting range, mobility tracking area, or reachability status, etc. The gNB further generates or updates the NR Mobility Set for the UE based on the UE information and the radio accessing network loading, slicing, accessing policy, scheduling etc.

In step 9, the gNB responds back to UE to confirm the registration at RAN with the NR Mobility Set, IP or non-IP connection information, etc.

In step 10, the UE creates or updates its PHY Mobility Set.

In step 11, the UE confirms the radio connection with the "Radio connection complete" message.

In step 12, TRP1, TRPx, and gNB transfer the UE context and data (if available) from TRP1 to TRPx and update the UE status such as location, reachability status, etc.

Figure 56:
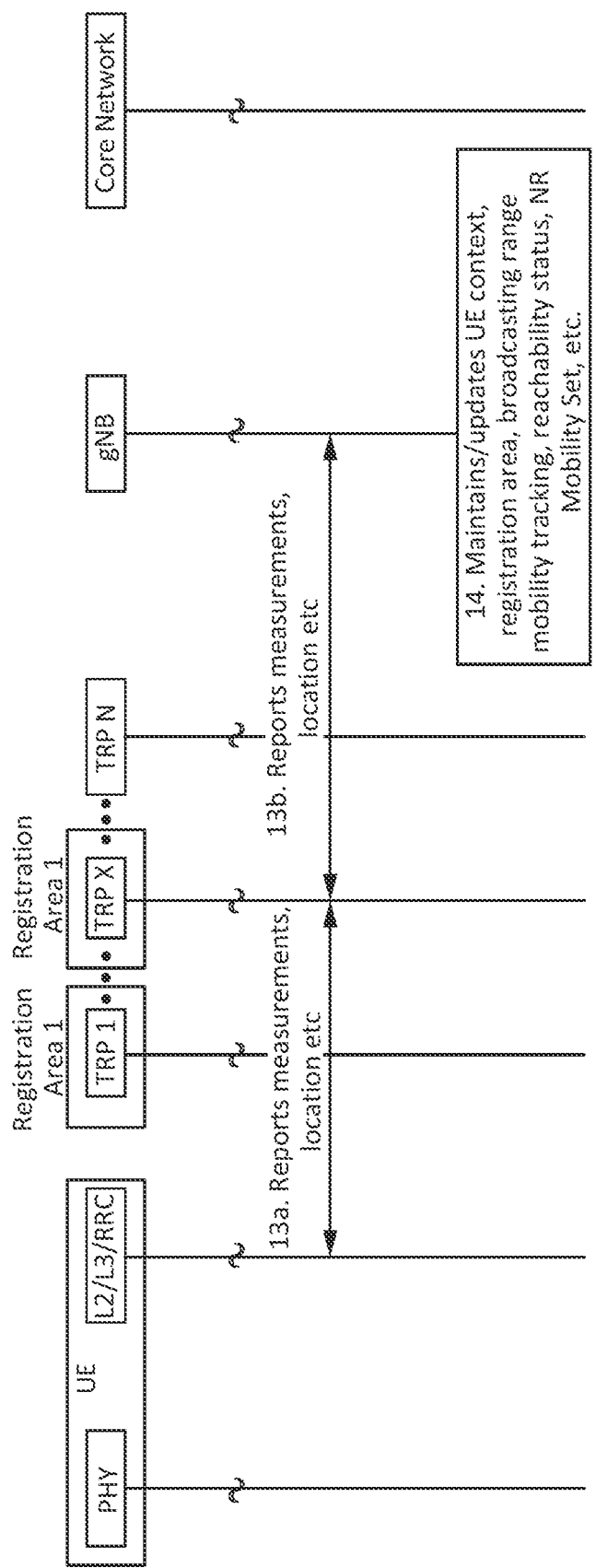

In steps 13a and 13b of FIG. 56, the UE reports measurements, location, etc.

In step 14, the gNB maintains/updates the UE registration area, broadcasting range, mobility tracking area, reachability status, NR Mobility Set, etc.

A UE may initiate a beam change. The UE will keep track of the device orientation or rotation angles by performing periodic measurement of the device orientation or rotation. Such a physical measurement can be implemented using gyroscope sensors. For example, multi-axis MEMS gyroscopes, which have been widely available in cell phones, may be used for the purpose of device orientation measurement. The device orientation measurement entity within the UE can report the change in device orientation to entity that manages beamforming in the UE as frequent as the measurement frequency since it is an internal reporting (not over the air interface). For example, the following methods may be used to handle beam misalignment caused by UE rotation First, during or after RRC connection setup, the UE obtains a pair of beams for both its uplink and downlink transmission with a TRP or NR-Node via beamforming training. In the reciprocal case, the Tx and Rx beams used by the UE are the same, and Tx and Rx beams used by the TRP are the same as well. For the purpose of illustration, procedures described below are based on the assumption of reciprocal Tx and Rx beams at the UE and the TRP. However, the procedures can be extended to the non-reciprocal case without of loss of generality.

Figure 57:
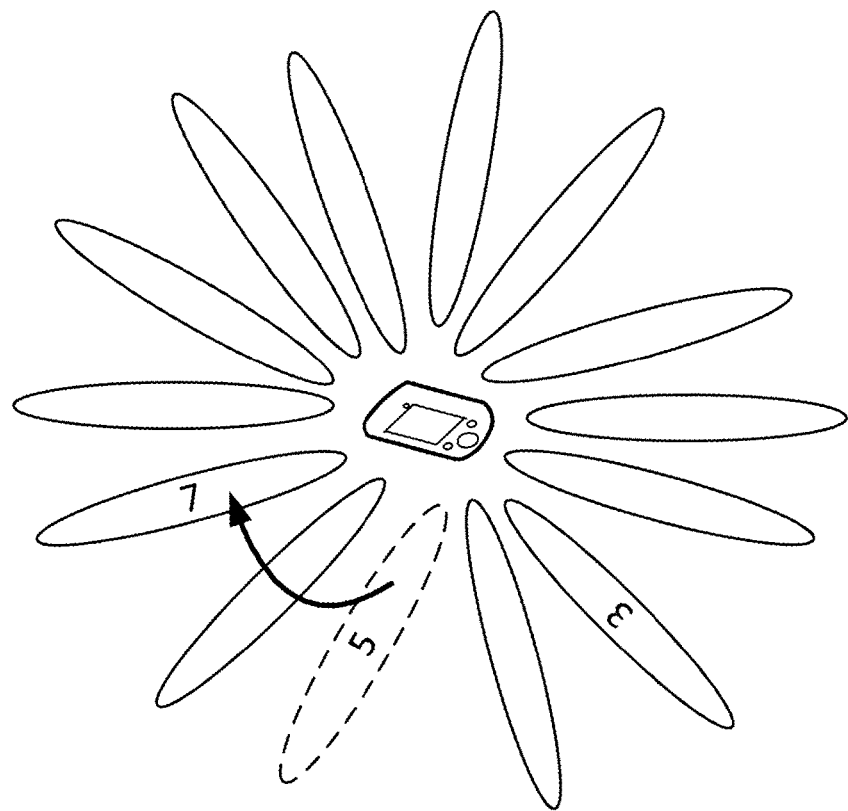
FIG. 57 illustrates a two dimensional example of UE beam and relative angles between them.
Figure 57:
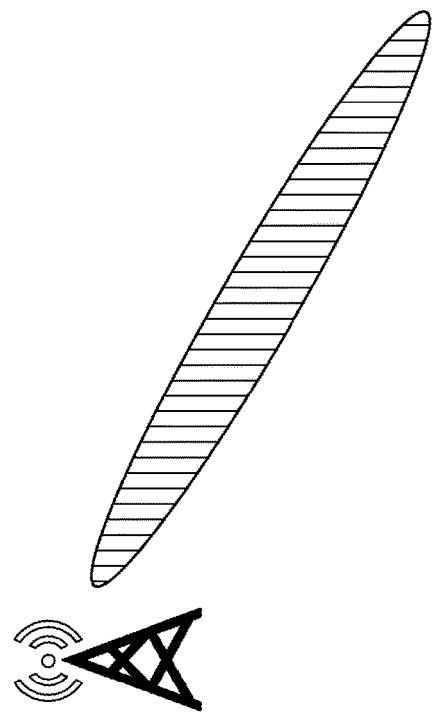

Second, for the UE side, during the RRC connected state (or equivalent state), the UE maintains a set of its own beams (used at UE's Tx and Rx beamforming) and the associated beam angles relative to the Tx or Rx beam being currently used. Those beams can be used for seamless switching or joint transceiving when beam misalignment is caused by UE rotation. For the simplicity of illustration, an example of two dimensional beams is shown in FIG. 57. However, it can be extended to 3D beams without of loss of generality. In this example in FIG. 57, beam 5 is the beam currently being used at the UE (for Tx and Rx beamforming). The UE maintains the database of its beams (1 to N) and their relative angles to the beam being used, e.g. beam 5. The angle between beams n and n+1 is denoted as On. For the case of uniformed distributed beams, the value of On is the same between each pair of adjacent beams.

Third, for the TRP side, the UE maintains a PHY-mobility or NR-mobility set of TRPs/NR-Nodes and their beams and the associated locations and/or angles detected to be used for TRP beam switching in the case of any beam misalignment.

Fourth, the UE keeps track of the device orientation or rotation angles by performing periodic measurement of the device orientation or rotation. The UE will also monitor RSRP/RSRQ/RS-SINR/RSSI of the current beams and other beams in the mobility set.

Fifth, the UE may perform beamforming adjustment when the UE detects its own rotation and/or angle change exceeding a threshold which will have non-negligible degradation of beamformed signal quality. Such a threshold in terms of rotation degree (or orientation change degree) may depend on the beam width of the beam currently being used. The threshold value for a narrow beam will be smaller than that for a wide beam.

The UE may also perform beamforming adjustment when, from the measurement of RSRP/RSRQ/RS-SINR/RSSI of the current beams or SINR of beamformed signals, the UE detects that the change of received beamforming signals quality exceeds a threshold. This can be used jointly with device orientation measurement by the UE to decide whether to perform beamforming adjustment.

Figure 58:
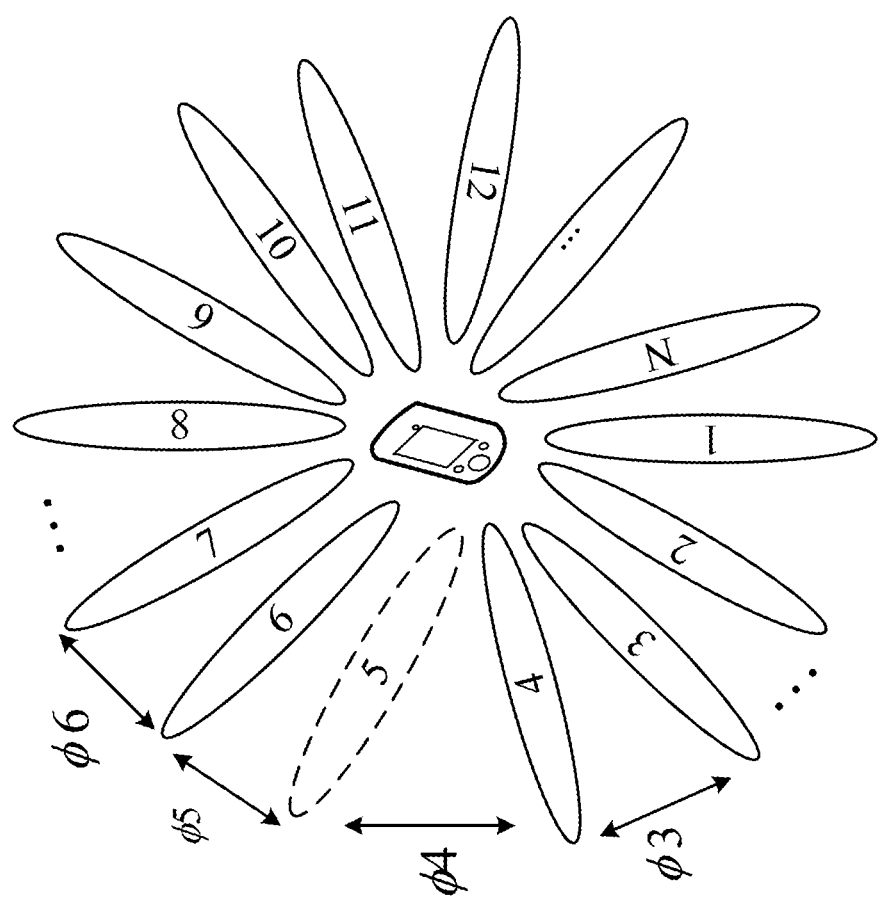
FIG. 58 illustrates a two dimensional example of UE rotation.

Sixth, when the UE decides to perform beamforming adjustment due to beamforming misalignment caused by the UE's rotation. The UE will autonomously switch its beam (used in Tx and Rx beamforming) according to the measured angle and/or orientation change caused by the UE rotation. One method is to continue to use narrow beam in UE's beamforming based transmission and receiving with seamless beam switching. According to the measured angle or orientation change, and the database of UE's other beams and associated beam angles relative to the Tx or Rx beam being currently used, the UE can calculate the index (or beam ID) of an appropriate new beam should be used. For example as shown in FIG. 58, due to UE rotation, the beam 5 used in the UE's Tx and Rx beamforming will point to the direction of beam 7 prior to the rotation, which will cause beamforming misalignment. The UE can seamlessly switch from beam 5 to beam 3 to re-align the beamforming, and use beam 3 in subsequent beamforming based transmission. In UE's beamforming transmission, it may use a modulation and coding scheme (MCS) back-off until beamforming training is performed again.

Another method is to use several narrow beams jointly in UE's transmission with a potential MCS back-off. The beams may belong to multiple TRPs as in coordinate multipoint transmission (CoMP) so that at least a subset of TRPs receive the beam(s).

Figure 59:
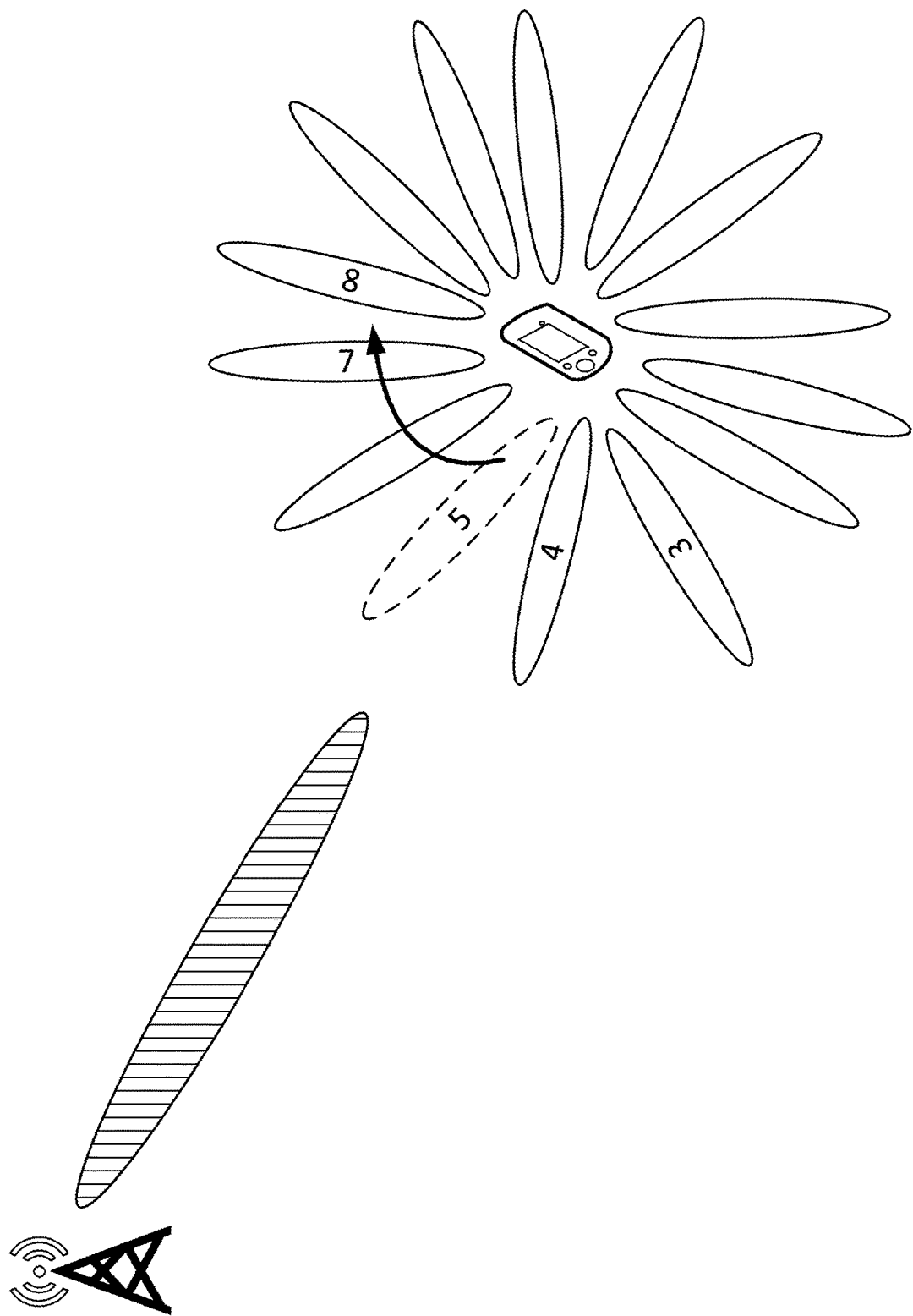
FIG. 59 illustrates a two dimensional example of UE rotation where the rotated angle will overlap with two beams.

A further method is to use a beam with wider beam width (i.e., a wide beam) in UE's beamforming based transmission and receiving. According to the measured angle or orientation change, and the database of UE's other beams and associated beam angles relative to the Tx or Rx beam being currently used, the UE can calculate the index (or beam ID) of an appropriate new beam should be used. In UE's beamforming transmission, it may use a MCS back-off until beamforming training is performed again. An example is shown in FIG. 59. For example as shown in FIG. 59, due to UE rotation, the beam 5 used in the UE's Tx and Rx beamforming will point to the direction that overlaps with the beams 7 and 8 prior to the rotation, which will cause beamforming misalignment. The UE can choose to use a wide beam x which covers both narrow beams 2 and 3 according to the measurement of UE rotation, shown as an example in FIG. 60. And the UE will use wide beam X in subsequent beamforming based transmission.

Seventh, the UE report its rotation and beam change. The UE should report to its serving TRP/NR-Node regarding its rotation with one or more parameters such as beam IDs, UE's angle For example, the UE may report beam ID of UE's switched beam (narrow, wide or joint beams) and corresponding SINR, CSI measurements, etc.

The UE may report UE's angle or direction change (in terms of degree) caused by UE's rotation. An approximate angle may also be computed from the measurement of device orientation/rotation (for example, measured by the gyroscope sensors) and reported to the NR-Node prior to performing an on-demand beamforming training procedure. Upon receiving the UE reporting of rotation and beam change, the TRP or NR-Node will realize the UE beam was changed by the UE autonomously, and may choose to initiate on-demand beamforming training session.

Eighth, the UE may choose to request on-demand beamforming training from the TRP or NR-Node. Such an on-demand beamforming training request can be transmitted piggyback on UE's uplink data transmission or other control channels, or as a separate control channel. Upon receiving an on-demand beamforming training request, the TRP/NR-Node will perform a session of beamforming training. In order to save signaling overhead, such beamforming training may sweep only a selected subset of TRP beams and UE beams. For example, the TRM beams to sweep in beamforming training may include current TRP beam and several of its adjacent beams. And the UE beams to sweep in beamforming training may include the new switched beam and several of its adjacent beams.

Ninth, after the on-demand beamforming training, the UE may update its data base of mobility set of TRP beams and UE beams and associated angles.

Figure 61:
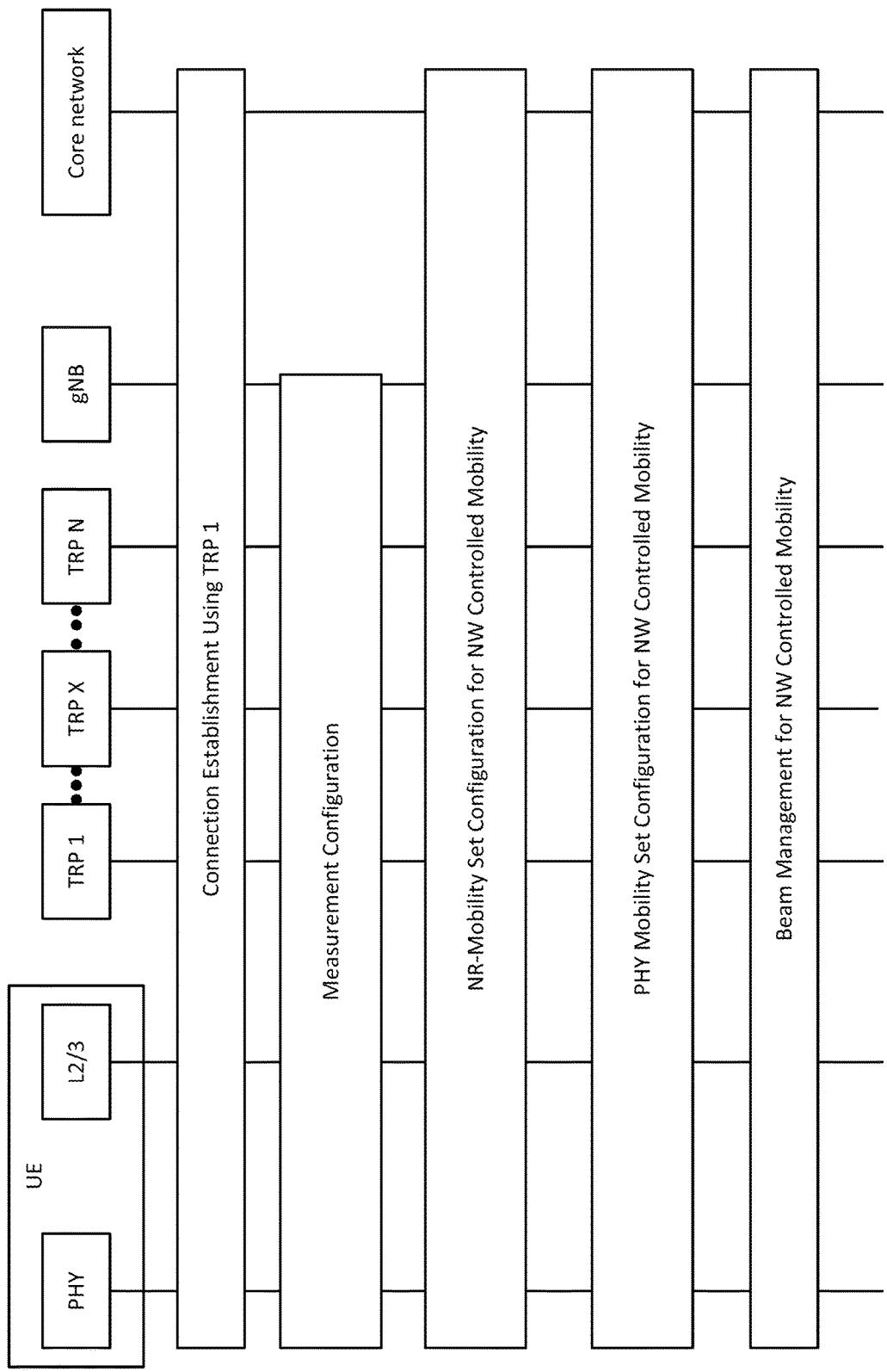
FIG. 61 illustrates an example network-controlled mobility method.

FIG. 61 shows an example network controlled mobility method. First is connection establishment, which is the same as that for the UE controlled mobility method described earlier.

Second is measurement configuration. The UE may be configured by the NextGen RAN (e.g., gNB) to perform measurements in support of mobility decisions for, e.g., in support of the configuration of NR-Mobility set(s). For e.g., in a distributed network controlled mobility scheme, the gNB may configure to the TRP, with an NR-mobility set, see FIGS. 62 and 63. In this case, local mobility decision is delegated by the gNB to the TRPs underneath the gNB. The measurements may include measurement types such as Intra-frequency measurements, Inter-frequency E-UTRAN measurements and Inter-RAT measurements. For each measurement type one or several measurement objects can be defined (a measurement object defines, e.g., the carrier frequency to be monitored). The measurement objects can be configured using carrier frequency identifiers, cell identifiers, TRP identifiers, beam identifiers, country code and operating class. The measurements quantity may be one or more of the following: Reference Signal Received Power (RSRP), Reference Signal Received Quality (RSRQ), Reference Signal and Signal to Noise and Interference Ratio (RS-SINR), Received Signal Strength Indicator (RSSI), etc.

The measurements may be configured to support, for example: TRP-controlled mobility activation, including the configuration of the initial NR-Mobility Set at the TRP; inter NR-Mobility Set mobility including update to NR-Mobility Set in the TRP; inter PHY-mobility Set mobility including measurement in support of update to PHY-mobility set; and TRP Controlled mobility deactivation. NR-Mobility Set Configuration for TRP controlled Mobility: the NR-Mobility Set Configuration method is depicted in FIGS. 29A and 29B.

Third is NR-Mobility Set Configuration for network controlled Mobility. An example NR-Mobility Set Configuration method is depicted in FIGS. 62 and 63.

Figure 64:
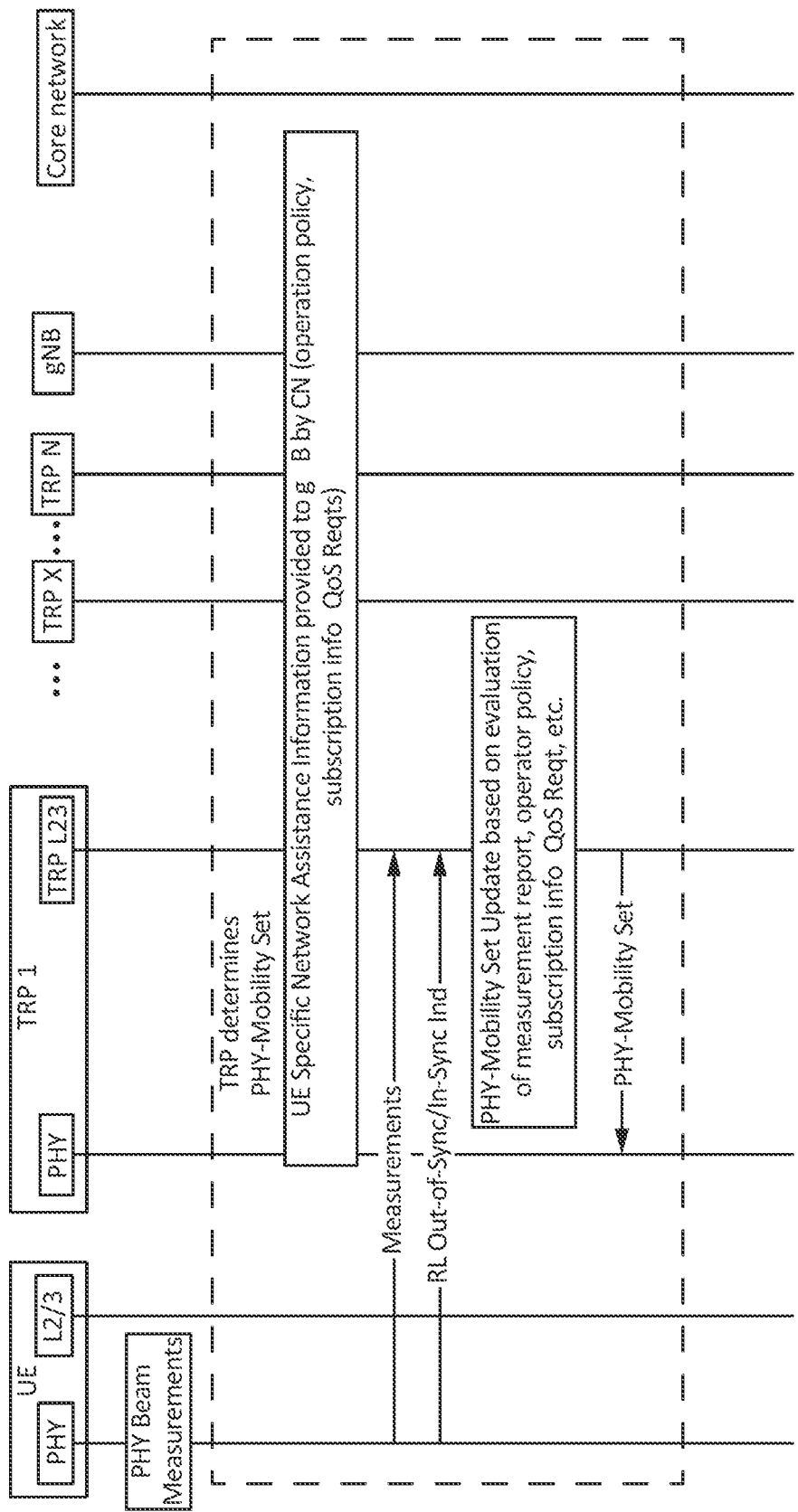
FIGS. 64 and 65 show a call flow for an example network-controlled mobility method using a PHY-mobility set.
Figure 65:
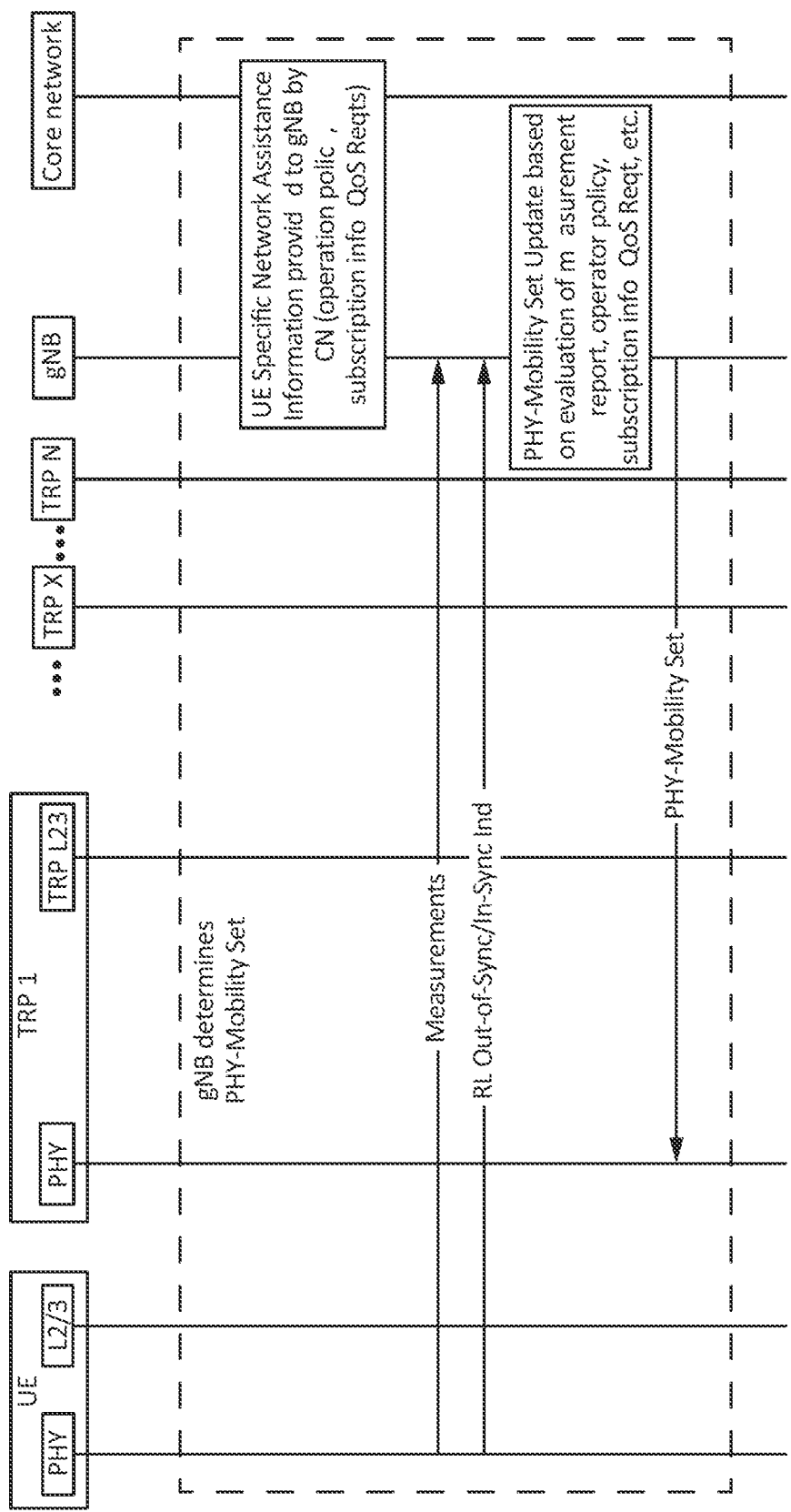

Fourth is PHY Mobility Set Configuration for network controlled mobility. An example PHY Mobility Set Configuration method is depicted in FIGS. 64 and 65.

Figure 60:
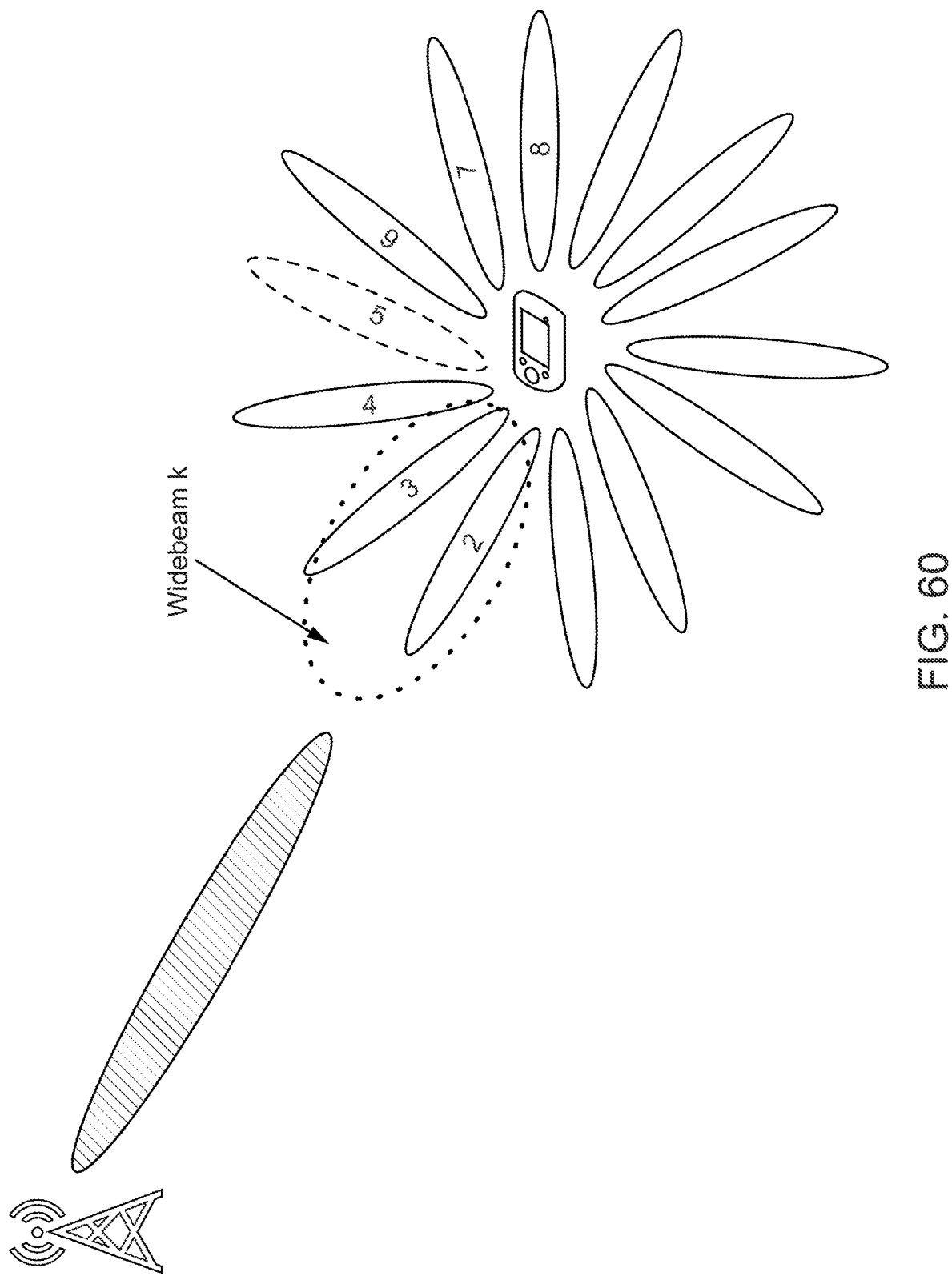
FIG. 60 illustrates a two dimensional example of a wide beam being used after UE rotation.

Fifth is beam management for network controlled mobility. An example beam management method for network controlled mobility is depicted in FIG. 60.

Figure 62:
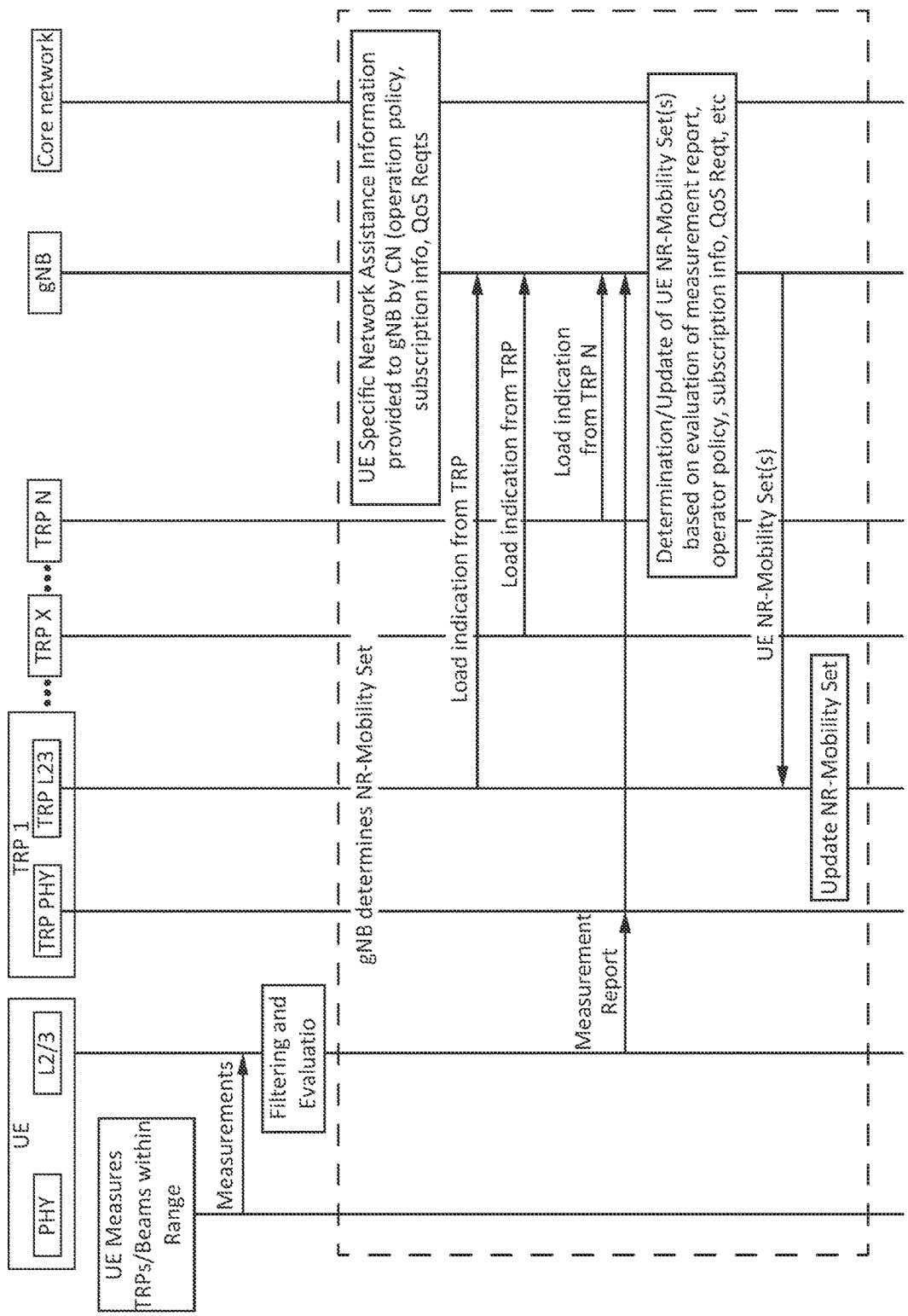
FIGS. 62 and 63 show a call flow for an example network-controlled mobility method.
Figure 63:
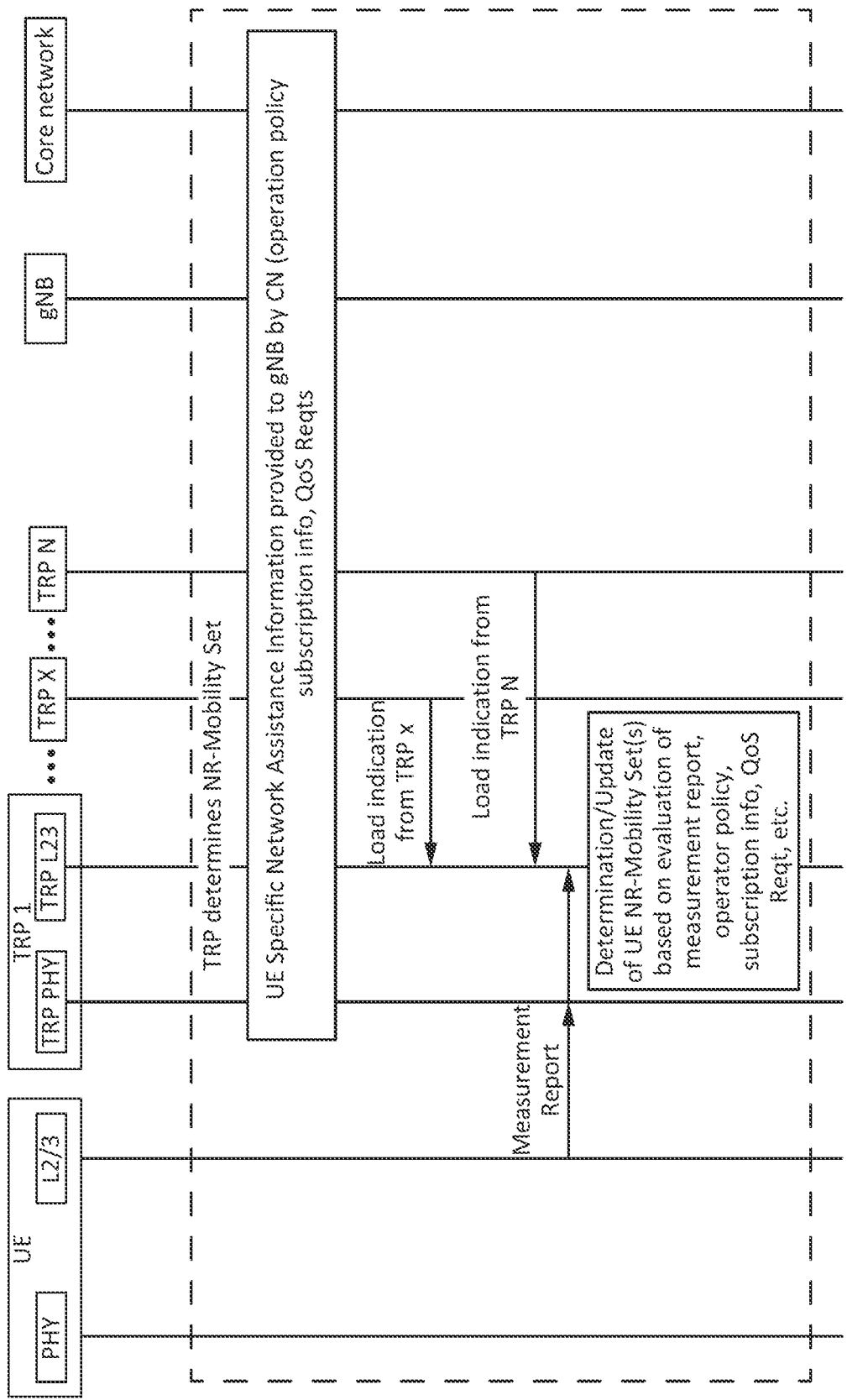

FIGS. 62 and 63 show an example NR-mobility set configuration method for network controlled mobility. This method is expected to be running continuously, e.g., looping through NR-mobility set update cycles. This method should be viewed as an example. The steps, for instance, are not required to be performed in the exact order shown.

Where the gNB determines the NR mobility set, the radio access network loads (e.g., composite load potentially including air interface load, front haul load, backhaul load, CPU load, etc.) are reported to the gNB. The reporting may be event driven or periodic. In the alternate embodiment, where the NR mobility set is determined by the serving TRP, the radio access network loads (e.g., composite load potentially including air interface load, front haul load, backhaul load, CPU load, etc.) are reported to the serving TRP.

The core network may provide to the radio access network (e.g., serving TRP), assistance information including operator policy information, user subscription information, QoS information, etc.

The UE performs measurements using the measurement configuration received earlier from the radio access network. The measurements report from the UE physical layer to the UE L23 layer may be beam level measurement. The UE L23 layer may perform measurement aggregation from beam level measurement to TRP or cell level measurements. The UE L23 may perform L23 filtering on the measurements. The UE L23 may perform measurement evaluation according to the measurement reporting criteria, received from the radio access network. The measurement evaluation may be performed on the TRP or cell level measurements e.g., measurements that aggregated from beam level measurements into TRP or cell level measurement. Alternatively, the measurement evaluation may be performed directly on beam level measurements. Measurement events for measurement reporting. for example, may be defined in support of the following: TRP-controlled mobility activation, including the configuration of the initial NR-Mobility Set at the TRP; Inter NR-Mobility Set mobility including update to NR-Mobility Set in the TRP; Inter PHY-mobility Set mobility including measurement in support of update to PHY-mobility set; and TRP Controlled mobility deactivation Example of measurement event may include one or more of the following. Event NR-M4: TRP become better than TRP controlled mobility threshold. This event may be used to trigger TRP controlled mobility activation; similar event can be defined at cell level or beam level. Event NR-M5: All TRPs inside NR-Mobility set becomes worse than TRP control mobility threshold 1 and a TRP outside NR-Mobility set becomes better than TRP control mobility threshold2. This event may be used to trigger Inter NR-Mobility Set mobility evaluation leading to NR-Mobility Set update; similar event can be defined at cell level or beam level. Event NR-M6: All TRP inside NR-Mobility set becomes worse than a TRP control mobility threshold. This event may be used to trigger TRP controlled mobility de-activation. The measurement event could be based on the expiry of a periodic timer. This may apply to periodic measurement report. The UE may be configured with a periodic measurement report timer for a given measurement configuration.

The measurement report may include identities of the TRPs (or cells or beams) which satisfy the measurement reporting criteria. It may also include the TRPs (beams or cells) where the RE experience radio link failure.

In some embodiments, the gNB (see FIGS. 62 and 63) determines the initial NR-mobility set or updated NR-mobility set based one or more of the measurement report, operator policies, and QoS information, for example. The measurement report may include, e.g., new TRPs (cells or beams) that are candidate for inclusion or removal from the NR-mobility set. Operator's policies may include policy regarding area restriction, user mobility profile, service usage profile, charging, service specific subscription level (e.g., platinum, gold, silver, bronze), network & network slice discovery policies, home network preferences for, e.g., in relation with equivalent home service providers, preferred service providers, etc.

In other embodiments, the serving TRP determines the initial NR-mobility set or updated NR-mobility set.

In embodiments where the gNB determines the NR-mobility set, the serving TRP shall initialize or update the NR-mobility set with the NR-Mobility set information from the gNB. The reception of NR-Mobility set at the TRP may trigger the update of the PHY mobility set. The serving TRP may update the PHY mobility set upon updating the NR-mobility set.

FIGS. 64 and 65 show an example PHY-mobility set configuration method for network controlled mobility, which may run continuously running e.g., looping through PHY mobility set update cycles. The steps are not required to be in the exact order shown in FIGS. 64 and 65. First in FIG. 64, the serving TRP may be provisioned with assistance information including operator policy information, user subscription information, QoS information, etc.

Next, The UE performs measurements based on the measurement configuration received from the network for the purpose of determining PHY mobility set. In the embodiment where the TRP determines the PHY mobility set, the measurements are reported back to the serving TRP. In the embodiment where the gNB determines the PHY mobility set, the measurements are reported back to the gNB. These measurements may include Channel State Information (CSI). The measurements may additionally or alternatively include thresholds, e.g., sensing where all beams (e.g., TRP beams)/TRPs inside PHY Mobility set becomes worse than threshold1 and a beam/TRP outside PHY mobility set but inside NR-mobility set becomes better than threshold2. This event may be used to trigger PHY mobility set mobility evaluation leading to PHY mobility set update. For example, a measurement may be taken to detect all beams (e.g., TRP beams) inside PHY-Mobility set become worse than threshold. This event may be used to trigger PHY mobility set mobility evaluation leading to PHY mobility set update. The measurement event could be based on the expiry of a periodic timer. This may apply to periodic measurement report. The PHY may be configured with a periodic measurement report timer for a given measurement configuration.

Next. the UE may report Radio link status, e.g., beam level radio link status to the serving TRP. The radio link status reporting may be in the form of radio link out-of-Sync or radio link In-Sync reporting from the physical layer radio link monitoring process.

In one embodiment, the serving TRP L23 determines the initial PHY mobility set or updated PHY mobility set as a subset of the NR-mobility. In another embodiment, the gNB determines the initial PHY mobility set or updated PHY mobility set as a subset of the NR-mobility. One or more of the following information may be used to determine the NR-Mobility set: the measurement report from the UE; operator's policies; and QoS information, etc. Operator's policies may include, e.g., policy regarding area restriction, user mobility profile, service usage profile, charging, service specific subscription level (e.g., platinum, gold, silver, bronze), network & network slice discovery policies, home network preferences for, e.g., in relation with equivalent home service providers, preferred service providers, etc.

For example, where the gNB determines the PHY mobility set, the serving TRP may initialize or update the PHY mobility set with the PHY mobility set information from the gNB. The reception of PHY mobility set by the serving TRP may trigger the update of the PHY mobility set. The serving TRP may update the PHY mobility set upon receiving new mobility PHY mobility set information from the gNB.

Similar to the beam management for UE control based mobility, the beam management method for network control mobility includes beam tracking, beam alignment/beam pairing and beam switching. The method may include one or more of the steps below. Beam tracking may include beam precoding vector adjustment, beams evaluation and beam change decision, and the supporting measurements.

First, regarding beam precoding vector adjustment, the UE may perform measurements on beams of the PHY mobility set and reports these measurements to the network PHY. An example of such measurement may be the channel state information (CSI) which include among other information the CQI and the RE recommendation of the precoder-matrix indication (PMI). The network then adjusts the beam precoding vector accordingly. This method is an ongoing method based on measurement report from the UE. The measurement may be event driven or periodic measurement similar to the one defined in support of PHY mobility set configuration.

Second, regarding beams evaluation and beam change decision, evaluation may be ongoing. The UE performs measurements for, e.g., CSI measurement and radio link status monitoring measurement. The measurements are reported to the TRP based on the reporting criteria the UE is configured with. The measurement report may be periodic or event driven. An example of an event might be a beam is offset between than the serving beam, or for, e.g., the serving beam becomes worse than threshold. The UE may also recommend best/optimal beam(s). The TRP evaluate candidate beams and select the best or optimal beam(s) based on the measurement reports and other beam selection criteria such as operator policies and QoS requirement.

Third, once the beam change is decided by the TRP, the TRP may inform the UE of the new serving beam(s). Such information may also include the beam switch time e.g., the exact time interval or subframe when the switching from the old serving beam(s) to the new serving beam(s) should be executed such that there is an alignment between the UE and the network on the best/optimal beams. For example, assuming downlink (DL) transmission, the UE may identify the new best TX beam from the network. The UE may inform the network through measurement report, the optimal network side Tx beam(s) from the UE perspective. The UE may also inform the network of the best Rx beam(s) at the UE side. The TRP makes the final beam selection decision and inform the UE, this way the pairing eNB Tx beam and UE Rx beam is known to both the UE and the network. Similarly, for the uplink, the TRP determines the best or optimal UE Tx beam(s) from the network perspective and the corresponding optimal TRP received beam(s). rational can be apply to the alignment and pairing of UE Tx beam and network side received The network then inform the UE of these beams.

Fourth, at the time of the beam switching, both UE and the network proceed with the switching/update of the serving beams and start transmitting and receiving on the new serving beams.

NR supports both LF-NR, i.e., sub 6 GHz and HF-NR, i.e., above 6 GHz deployment. In LF-NR, a single wide beam may be sufficient for coverage. However, in HF-NR, a single wide beam might not be sufficient for coverage thus multiple narrow beams are a preferred solution for enhancing the coverage. Hence, NR may support both single beam based (or single sector) and multi-beams (multi-sectors) based deployments.

In NR, the Initial access refers to procedures between when UE is switched on and before UE is able to transmit UE specific signaling and data. The main steps are cell search and synchronization, cell selection, reception of system information and random access procedure. For UE initial access, cell selection process should be common both in single-beam and multi-beam operation in NR systems. On the other hand, UE IDLE state mobility measurements are usually based on the synchronization signals used for initial access. Cell selection and reselection related definitions and procedures for beam centric NR networks may be implemented under a unified framework to work in both single-beam (e.g., NR-LF, LTE-NR interworking, etc.) and multi-beam based deployments.

Herein, beam sweeping based NR networks are used in examples for easier illustrations, but the techniques may also be used in single-beam based NR networks. Single-beam based NR networks can be considered to be a special case of multi-beam based NR networks, where the number N of multiple beams is equal to 1.

Herein, we refer to the "new RRC state" described in R2-165722 as the INACTIVE state, and refer to the equivalents of RRC-IDLE state and RRC-CONNECTED states defined in LTE as the IDLE state and the CONNECTED state respectively.

In LTE, the network controlled mobility is used for the UE in CONNECTED mode and the UE based mobility is used for the UE in IDLE mode. In the network controlled mobility, the mobility will be triggered by the eNB according to the measurement result reported by UE; on the other hand, in the UE based mobility, the mobility decision will be made by UE itself according to the rules defined in the protocol (the cell selection and reselection process defined in 3GPP TS 36.304). Since dedicated resources are not available for the UE in "new RAN controlled state", if the network controlled mobility will be used for the UE in "new RAN controlled state", in order to transfer the measurement result and receive the mobility command, the UE may have to be transferred from the INACTIVE mode to CONNECTED mode. For this reason, although there may be variations in practice, it is reasonable to assume that UE controlled mobility (e.g., the proposed cell selection and reselection solution for NR networks) applies in both UE IDLE mode the new INACTIVE mode.

As captured in RAN1 #85, for example, one of the critical reasons to introduce the New state is to start data transfer with low delay (e.g., data transfer within the New state or quicker transition to CONNECTEDD mode than IDLE mode) as required by RAN requirements, but still enable comparable energy efficiency to that of IDLE mode. Therefore, UE cell reselection processes in the New state may require fast and simple procedures. For example, if system information of the neighboring cell is provided in advance by dedicated signaling before entering this New state, the UE should be able to identify cell unambiguously to decide which configuration to be used and whether to update location to network. If this can be done without system information reading after cell reselection both interruption time as well as UE power consumption would be optimized.

The New state is envisaged to still maintain the low delay of data transfer and energy efficiency even under diverse service requirements from the UE. The services can be characterized based on the diverse requirements of mobility, reliability, latency, bandwidth, security & privacy and battery life. Therefore, the UE cell reselection process in the New state should be configurable and flexible enough to fulfil diverse and dynamic service requirements of the UE.

With the introduction of the New state, it is possible that the main state for energy saving in NR would be the New state, while the IDLE mode could be used as an intermediate state before a suitable cell is found. Entering the NR IDLE mode by the UE would be performed mainly for initial network access and fault management, e.g., upon UE power on/off; Detach; Attach reject; no recovery from Radio Link Failure or any other error scenarios under the limited service (e.g., only emergency calls would be possible and possibility to receive warning notifications); etc. Since adding extra fault recovery mechanisms to the New state will no doubt increase its design complexity, in case of sudden fault or network failure, a UE may still have to revert or fall back to IDLE state for smooth recovery purposes. During most inactivity or low activity periods, a UE may stay at the New state instead of the IDLE mode. In other words, the New state may be considered as the NR main state for energy saving when UE is under normal service where suitable cells are available, and as a result the UE cell reselection process may be mainly performed for INACTIVE mode UEs. In our solution, we do not preclude the possibility that IDLE mode UEs may also perform cell reselection process.

Basically, there are two fundamental aspects to be considered when designing the cell reselection process for the 5G RAT: supporting a diverse set of use cases and supporting beamforming at least for high frequency deployment scenarios.

NR supports diversity of use cases (e.g., eMBB, mMTC, URLLC), and this also directly results in diversity of UE capabilities (e.g., supported channel bandwidth and affordable power consumption, etc.) and network used numerologies (e.g., subcarrier spacing, symbol/subframe/frame length, etc., to support of multiplexing of different services). However, in a typical NR deployment, all services may not be supported on all frequencies. For example, eMBB service may be supported only on Frequency X (e.g., a high frequency) while mMTC service may be supported on Frequency Y (e.g., a low frequency). So, in NR a UE needs to select or reselect a cell not only the suitability criteria (see 3GPP TS 36.304) as defined in LTE but also if the cell supports the UE requested services. In the meantime, cells in NR networks should also come out a way (e.g., broadcast in Minimum SI, etc.) to let UEs know the services supported by each cell. Cells may also broadcast services supported in neighboring frequencies/cells.

From the numerology perspective, a UE may not support all numerologies, and the UE should not camp on a cell which does not provide its supporting numerology. When the UE does not support a default numerology, it may fail at the cell detection process so that cell is not considered as a candidate cell for selection and reselection. When the UE supports a default numerology and the default numerology is used by a cell for initial access, the UE happens to be able to detect and select the cell. However, the cell may use other numerologies for later dedicated services. In this case, UE may need to know this information as soon as possible so as to deprioritize the cell. For example, put the list of supported numerologies in the Minimum SI, so that a UE won't request "attach" to this cell and/or put this this cell on UE's candidate cell list.

In NR, the second fundamental aspect we should also consider is the use of beamforming. In case of NR multi-beam based operation, the cell measurement has to be performed over multiple signals from different beams within a cell. In order for cell (re)selection, having a single representative measurement metric to evaluate the overall radio quality of each cell is desirable. With a single representative measurement metric of each cell, a UE is able to compare different cells with different numbers of Tx beams fairly. As an example, cell measurement could be based on a function which derives the single representative measurement metric of a cell out of multiple measurements of signals from different beams. In case of NR single-beam based operation, cell measurement could be done using a single signal from a single beam, like LTE. This can be considered as a special case of multi-beam based operation.

If SFN is actually used for the transmission of initial access signals, there may be coverage difference between the common control channel (for transmitting initial access signals) and UE dedicated channels (for later control and data transmissions) due to SFN gain. For example, a UE may choose a cell because the cell's signal quality is good due to SFN gain (e.g., all TRPs/beams of this cell are transmitting initial access signals), but later when only one or multiple beams are used by the UE, the signal quality or coverage is totally different. On the other hand, if beams are actually used for the transmission of initial access signals, it can be conducted whether beam-tracking can be started once initial access was triggered or a kind of periodic beam-tracking is required after the initial access.

Herein, the term "available PLMN(s)" generally refers to one or more PLMN(s) for which an IDLE/INACTIVE UE has found at least one cell and read its PLMN identity or identities.

Herein, the term "selected PLMN" generally refers to a PLMN that has been selected by the NAS layer of an IDLE/INACTIVE UE, either manually or automatically.

Herein, the term "registration area" generally refers to a (NAS) registration area as an area in which an IDLE/

INACTIVE UE may roam without a need to perform location registration, which is a NAS procedure.

Herein, the term "camped on a cell" generally refers to when an IDLE/INACTIVE UE has completed the cell selection/reselection process and has chosen a cell. The UE monitors system information and (in most cases) paging information.

Herein, the term "camped on any cell" generally refers to a UE is in IDLE mode and has completed the cell selection/reselection process and has chosen a cell irrespective of PLMN identity. An INACTIVE mode UE, for example, would have to switch to IDLE mode before camped on any cell.

Herein, the term "service type" generally refers to the level of service that may be provided by the network to a UE in IDLE or INACTIVE mode. The action of camping on a cell is necessary to get access to some services. Example levels of services a UE include: limited service, e.g., for emergency calls, ETWS and CMAS on an acceptable cell, such as for an IDLE mode UE; normal service, e.g., for public use on a suitable cell, such as for both an IDLE mode UE and an INACTIVE mode UE; and operator service, e.g., for operators on a reserved cell, such as for both IDLE mode UE and INACTIVE mode UE.

Herein, the term "barred cell" generally refers to a cell that a UE is not allowed to camp on, which may be specified by operators.

Herein, the term "acceptable cell" generally refers to a cell on which an IDLE UE may camp to obtain limited service (originate emergency calls and receive ETWS and CMAS notifications). Such a cell shall fulfil the following requirements, which is the minimum set of requirements to initiate an emergency call and to receive ETWS and CMAS notification in a NR network. The cell is not barred. Minimum radio quality as determined by the cell selection/reselection criteria discussed in reference to FIGS. 70-79.

Herein, the term "suitable cell" generally refers to a cell on which a UE may camp on to obtain normal service. The cell may need to fulfil one or more of the following requirements: the cell is part of either the selected PLMN, or the registered PLMN, or a PLMN of the Equivalent PLMN list; the cell is not barred; the cell is part of at least one non-forbidden tracking area; the cell is not on the UE's blacklist; the cell provides a minimum radio quality as determined by the cell selection/reselection criteria discussed in reference to FIGS. 70-79.

Herein, the term "serving cell" generally refers to a cell on which an IDLE/INACTIVE UE is currently camped.

Herein, the term "reserved cell" generally refers to a cell on which camping is not allowed, except for particular UEs which may be specified by operators, if so indicated in the system information.

Herein, the term "serving beam" generally refers to a beam transmitted by the serving cell that is being used by an IDLE/INACTIVE UE for synchronization, RAN paging/notification, and/or SI acquisition.

Herein, the term "qualified beam" generally refers to a beam with signal strength above a given threshold.

Herein, the term "candidate beam" generally refers to a beam transmitted by the serving cell that meets the qualified beam criteria, but is not being used by the IDLE/INACTIVE UE for synchronization, RAN paging/notification, and/or SI acquisition. A candidate beam is a suitable beam: it is transmitted by a suitable cell that happens to be the serving cell. It is important for a UE to be able to distinguish between suitable beams that are transmitted by the serving cell and those that are transmitted by other suitable cells.

This will allow the UE to treat suitable beams transmitted by the serving cell differently than those transmitted by other suitable cells.

Herein, the term "strongest beam" generally refers to the beam transmitted by a particular cell that is considered the strongest according to the beam measurement procedure.

Herein, the term "suitable beam" generally refers to a beam transmitted by a suitable cell that meets the qualified beam criteria.

Figure 66:
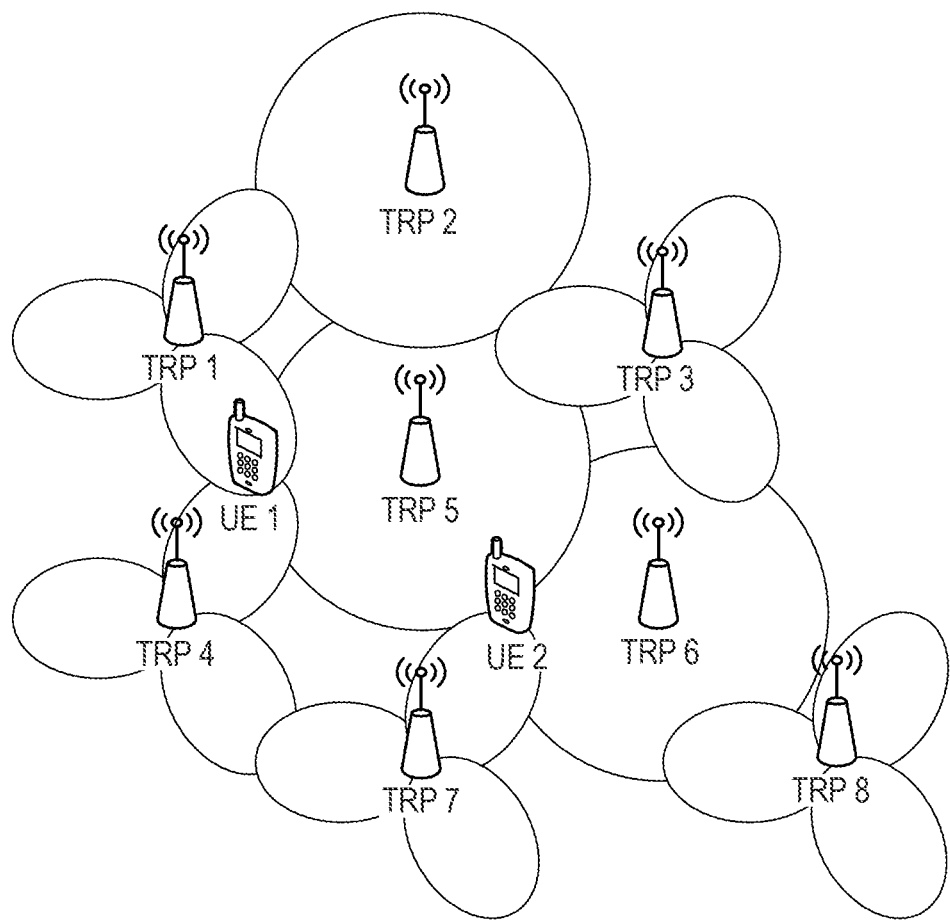
FIG. 66 illustrates coverages in an example NR deployment scenario for SFN broadcast of initial access signals without beam sweeping.

In NR, Single Frequency Network (SFN) techniques may be used to improve the cell coverage for the initial access signals; i.e. PSS, SSS, PBCH. Whether the initial access signals are beamformed or not may be transparent to the UE. In fact, it is possible for some TRPs to use beamforming, while others do not; which is beneficial since it would allow an NR cell to consist of TRPs with different multi-antenna capabilities. In one embodiment, which is illustrated in FIG. 66, all TRPs/beams used for initial access in an NR cell transmit the initial access signals simultaneously. This embodiment may be used for deployments where the TRPs do not need to use beam sweeping to provide full coverage.

Figure 67:
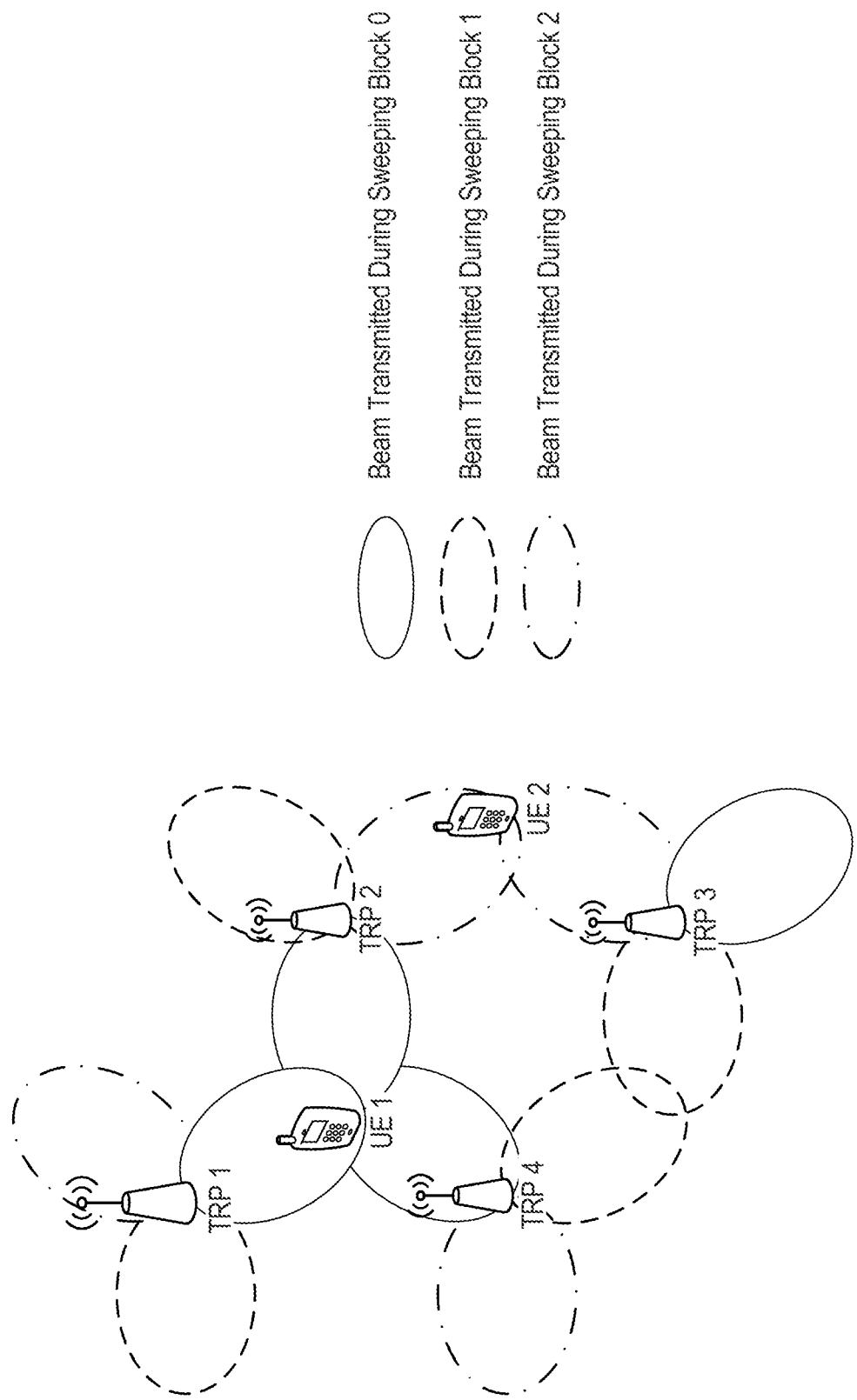
FIGS. 67 and 68 illustrate coverages in example NR deployment scenarios for SFN broadcast of initial access signals with beam sweeping.

Alternatively, for deployments where beam sweeping is required, which is expected to be the case for HF-NR deployments, we propose that SFN techniques are used during the sweeping blocks; i.e. the beams transmitted during a given sweeping block transmit identical initial access signals. To maximize the SINR of the initial access signals received at the UE, the beam sweeping may be coordinated between TRPs such that beams with overlapping coverage are transmitted simultaneously, as shown in FIG. 67. In this example, transmissions from TRP-1, TRP-2 and TRP-3 during sweeping block 0 form a virtual beam that would be received by UE-1 with a higher SNR than if they were transmitted using a single TRP/beam. Transmissions from TRP-2 and TRP-3 during sweeping block 2 form a virtual beam that would be received by UE-2. Since only two TRPs/beams are contributing to this transmission, the SINR will not be as good as for UE-1, which is receiving transmissions from 3 TRPs/beams, but it is still better than the case where only a single TRP/beam is received.

Figure 68:
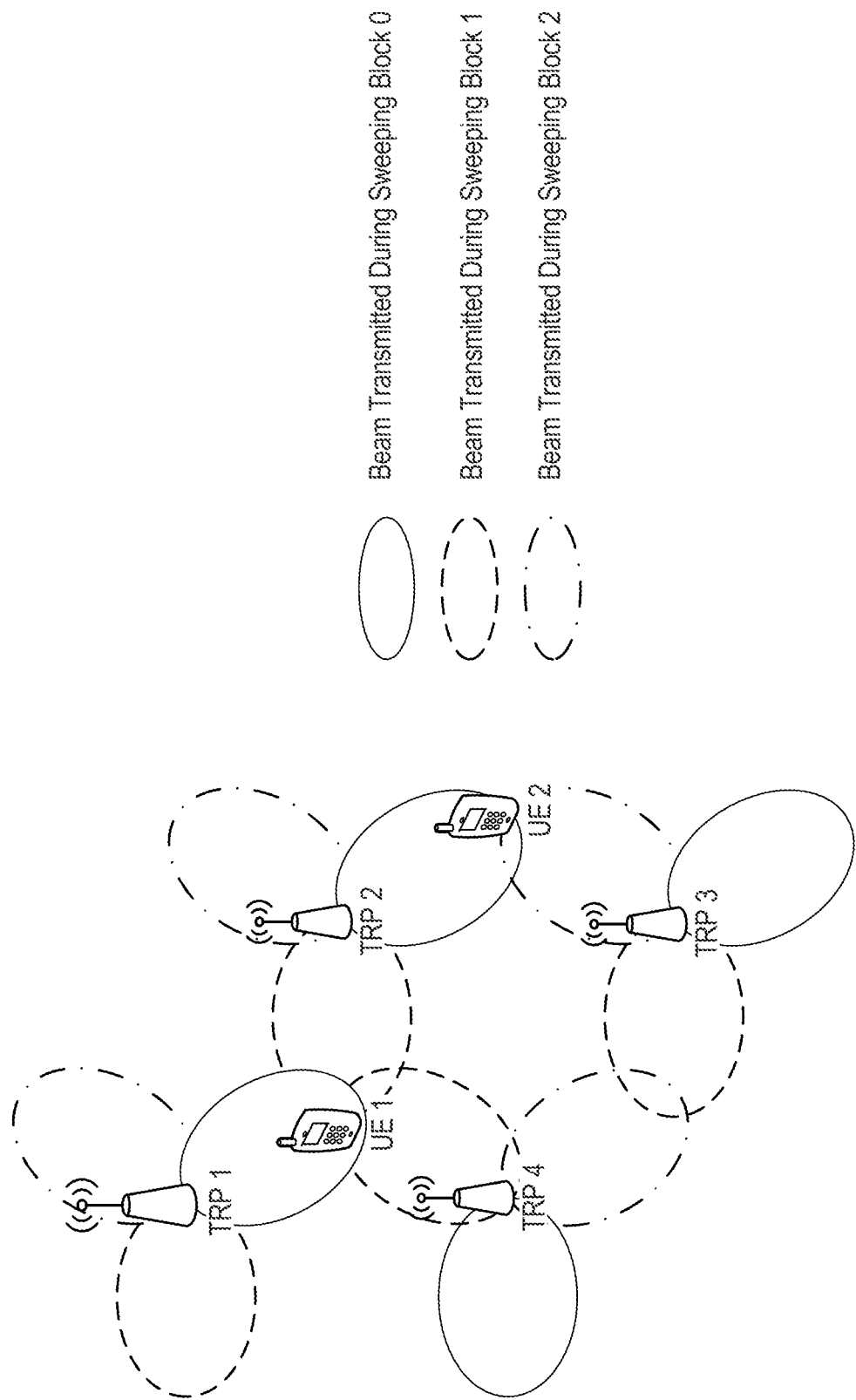

Other deployments such as the one shown in FIG. 68 are also possible. In this deployment, beams with overlapping coverage are not necessarily transmitted during the same sweeping block. For example, UE-1 is capable of receiving signals from TRP-1, TRP-2 and TRP-4, as is the case for the coordinated sweeping scenario, but since only TRP-2 and TRP-4 are transmitted during the same sweeping block.

Figure 69:
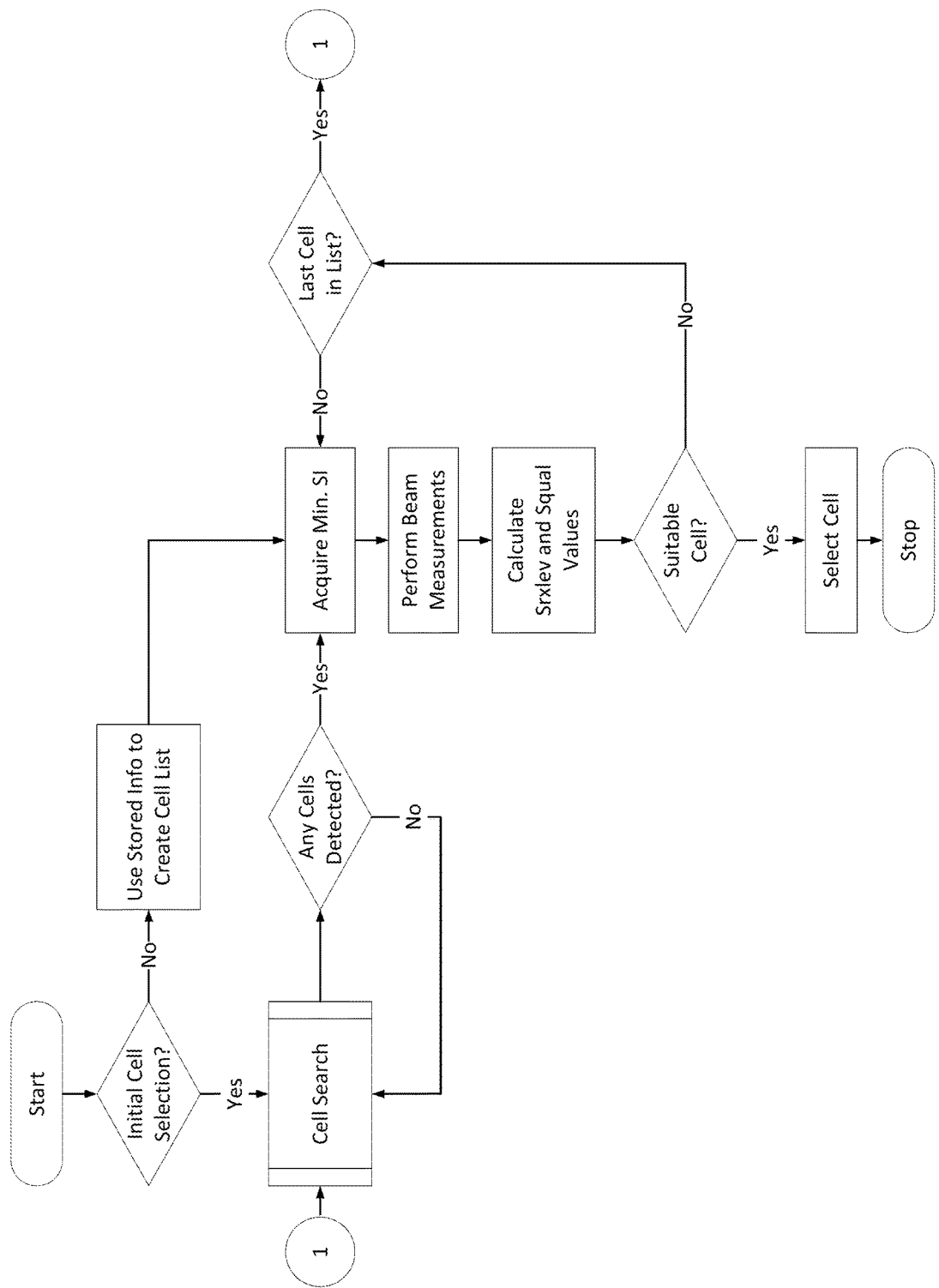
FIG. 69 shows a flow chart of an example method for NR cell selection.

In LTE, after a UE has switched on and a PLMN has been selected, the Cell selection process takes place, as described in 3GPP TS 36.304. This process allows the UE to select a suitable cell where to camp on in order to access available services. Similar to LTE IDLE mode UEs, IDLE/INACTIVE mode UEs in NR perform similar cell selection process to search for a suitable cell for camping. A high level flow chart illustrating the processing that takes place during the NR Cell Selection procedure is shown in FIG. 69.

A UE performs measurements for cell selection purposes. The UE selects a cell based on these measurements and the cell selection criteria. For NR, we propose that the synchronization signals; e.g. PSS and SSS, are used by the UE to acquire time and frequency synchronization with an NR cell and to detect the Physical Cell Identifier (PCI) of that cell. The synchronization signals may also be used to compute a detection metric; e.g., signal strength, SNR, etc. that may be used to determine the strongest cell and/or rank the cells on a particular carrier frequency. In NR, a Tertiary Synchronization Signal (TSS) may also be transmitted. This signal, together with the PSS and SSS, may be used for detection of the beam ID in addition to being used for synchronization purposes and for detection of the PCI.

In NR, the initial access signals may be beamformed and DL sweeping subframes may be used to provide coverage to different areas of the cell in a time division fashion. For NR, we propose the UE searches for cells by attempting to detect the initial access signals transmitted during the DL sweeping blocks. During a given DL sweeping block, a UE may be within the coverage area of one or more beams, which may correspond to one or more cells. It may also be possible for the UE to be within the coverage area of one or more beams transmitted by the same cell during different DL sweeping blocks. The UE may therefore detect initial access signals corresponding to the same cell in one or more DL sweeping blocks.

In one embodiment, the beams transmitted by a cell during a given DL sweeping block may not be resolvable by the UE. If the UE is within the coverage area multiple beams transmitted from the same cell during the DL sweeping block, the signals will combine at the UE to form a composite signal or virtual beam, assuming the beams carry identical initial access signals and arrive at the UE within the Cyclic Prefix (CP). In this case, a single detection metric would be computed for each cell detected during a given DL sweeping block. If the UE detects the same cell in multiple DL sweeping blocks, each of these detections can be considered to be associated with a different virtual beam of the same cell, each with a separate detection metric.

Alternatively, if the beams transmitted by a cell during a given DL sweeping block are resolvable by the UE, the UE may compute metrics based on Beam Specific Reference Signals (BRS), or any other signal that may be unique to a beam, in addition to the detection metrics based on the synchronization signals.

The metrics $Q_{rxlevmeas}$ and $Q_{qualmeas}$, where $Q_{rxlevmeas,beam}$ and $Q_{qualmeas,beam}$ are the beam-specific received signal level measurement and received signal quality measurement respectively, are used in the calculations to determine if the cell selection criterion S is fulfilled for a given cell. For NR, we propose to consider beam-specific metrics when determining the values for $Q_{rxlevmeas}$ and $Q_{qualmeas}$. In one embodiment, the metrics $Q_{rxlevmeas}$ and $Q_{qualmeas}$ correspond to beam-specific measurements of the beam with the maximum Rx level, $$Q_{rxlevmeas} = \text{MAX}\{Q_{rxlevmeas,beam}\}$$

$$Q_{qualmeas} = Q_{qualmeas,beam} \mid_{beam=beam\ with\ max\ rxlevmeas}$$

Alternatively, the metrics $Q_{rxlevmeas}$ and $Q_{qualmeas}$ may correspond to beam-specific measurements of the beam with the maximum quality.

$$Q_{rxlevmeas} = Q_{rxlevmeas,beam} \mid_{beam=beam\ with\ max\ qualmeas}$$

$$Q_{qualmeas} = \text{MAX}\{Q_{qualmeas,beam}\}$$

In another embodiment, the metrics may be defined as an average of the beam specific metrics.

$$Q_{rxlevmeas} = \text{AVG}\{Q_{rxlevmeas,beam}\}$$

$$Q_{qualmeas} = \text{AVG}\{Q_{qualmeas,beam}\}$$

The average may be based on all the detected beams, or a subset of the detected beams, where the subset may correspond to beams with a detection metric above some threshold. The average may be an ordinary average, where each beam is weighted equally, or a weighted average where each beam is weighted differently.

If the beams transmitted by a cell during a given DL sweeping block aren't resolvable by the UE, we propose the beam specific metrics correspond to measurements of the initial access signals of the virtual beam(s) received during the DL sweeping blocks. In one embodiment, the metrics Qrxlevmeas,beam and Qqualmeas,beam may correspond to the signal strength and SINR determined from the synchronization signals of the received virtual beam(s).

Alternatively, if the beams transmitted by a cell during a given DL sweeping block are resolvable by the UE, we propose the beam-specific metrics correspond to measurements based on BRSs or any other signal unique to the beam. In one embodiment, the metric $Q_{rxlevmeas,beam}$ corresponds to the linear average over the power contributions (in [W]) of the resource elements that carry beam-specific reference signals within the considered measurement frequency bandwidth and the metric $Q_{qualmeas,beam}$ corresponds to the ratio N×RSRP/(NR carrier RSSI), where N is the number of RB's of the NR carrier RSSI measurement bandwidth and the RSSI comprises the linear average of the total received power (in [W]) observed during the sweeping block.

For NR, we propose to include the SI that is needed for cell selection; i.e. $Q_{rxlevmin}$, $Q_{rxlevminoffset}$, $Q_{qualmin}$, $Q_{qualminoffset}$, p-Max and NS-PmaxList, as part of the Minimum SI that is broadcast periodically by an NR cell. In one embodiment, the cell selection SI could be indicated to the UE using a configuration index that may be used to "look up" a predetermined configuration set of cell selection SI. In this embodiment, the configuration index may be signaled to the UE via the MIB/PBCH. Alternatively, the cell selection SI could be signaled to the UE explicitly. In this embodiment, the cell selection Ies may be signaled via the MIB/PBCH and/or via another SIB that is transmitted on the PDSCH.

To improve the robustness of the Minimum SI transmission, SFN techniques may be used for transmission of the physical channels used to transmit the Minimum SI; e.g. PBCH, PDSCH. In one embodiment, initial access beams transmit identical information on the PBCH during a given DL sweeping block. If the PDSCH is also used to some or all of the Minimum SI, the initial access beams may also be configured to signal identical information on the PDSCH used to transmit the Minimum SI and use identical PRBs for the transmissions. Alternatively, if SFN techniques are not used for the PBCH and/or PDSCH, the received channel bits from each beam may be soft combined before being decoded. Soft combining may also be used to combine received channel bits from beams transmitted during different sweeping blocks of the same DL sweeping subframe, assuming identical Minimum SI is transmitted on each of the beams. In another embodiment, different redundancy versions may be used for transmissions of the Minimum SI during different sweeping blocks of a DL sweeping subframe and Incremental Redundancy (IR) may be used to combine the received channel bits from different beams.

Figure 70:
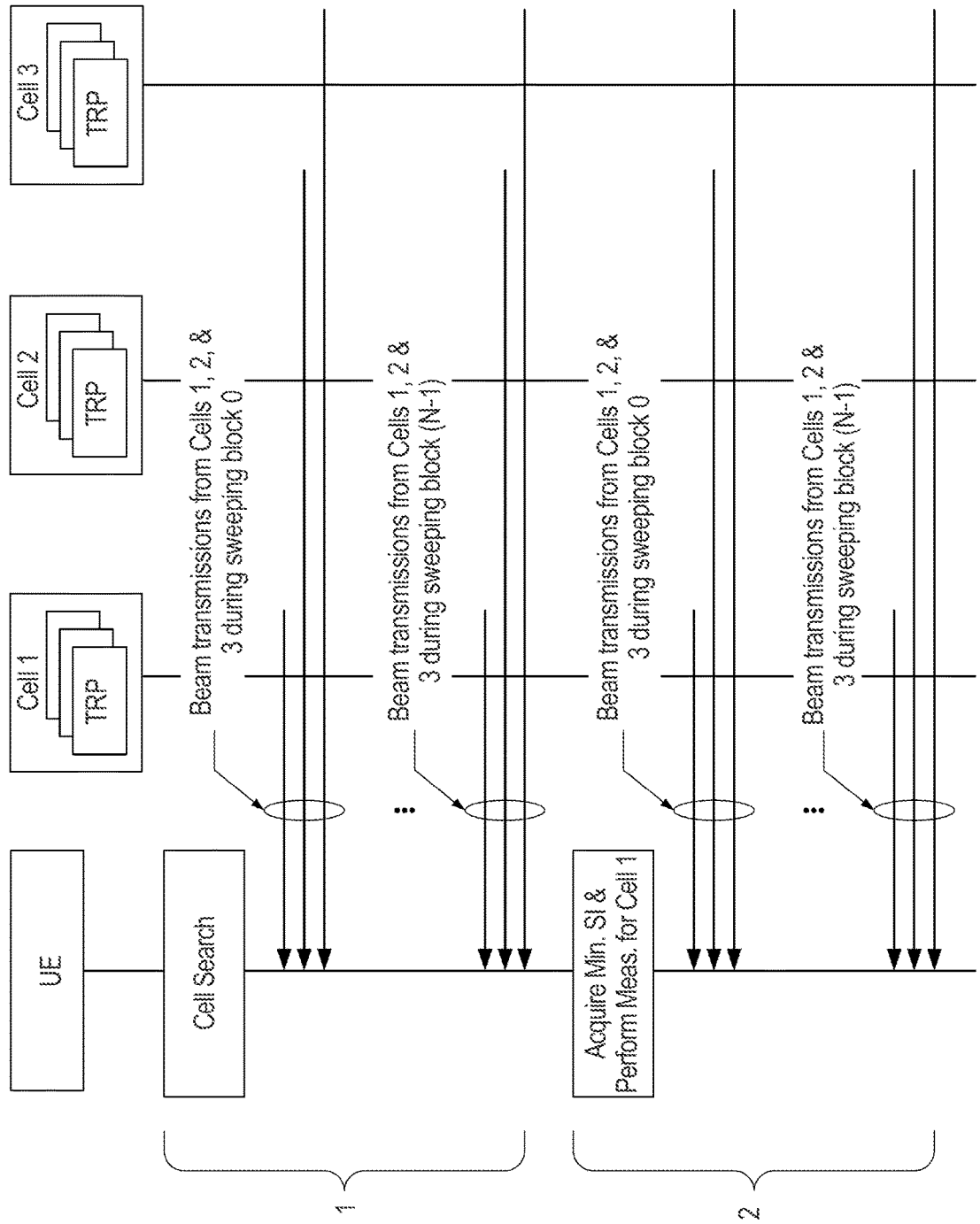
FIGS. 70 and 71 show a call flow for an example method for NR cell selection.
Figure 71:
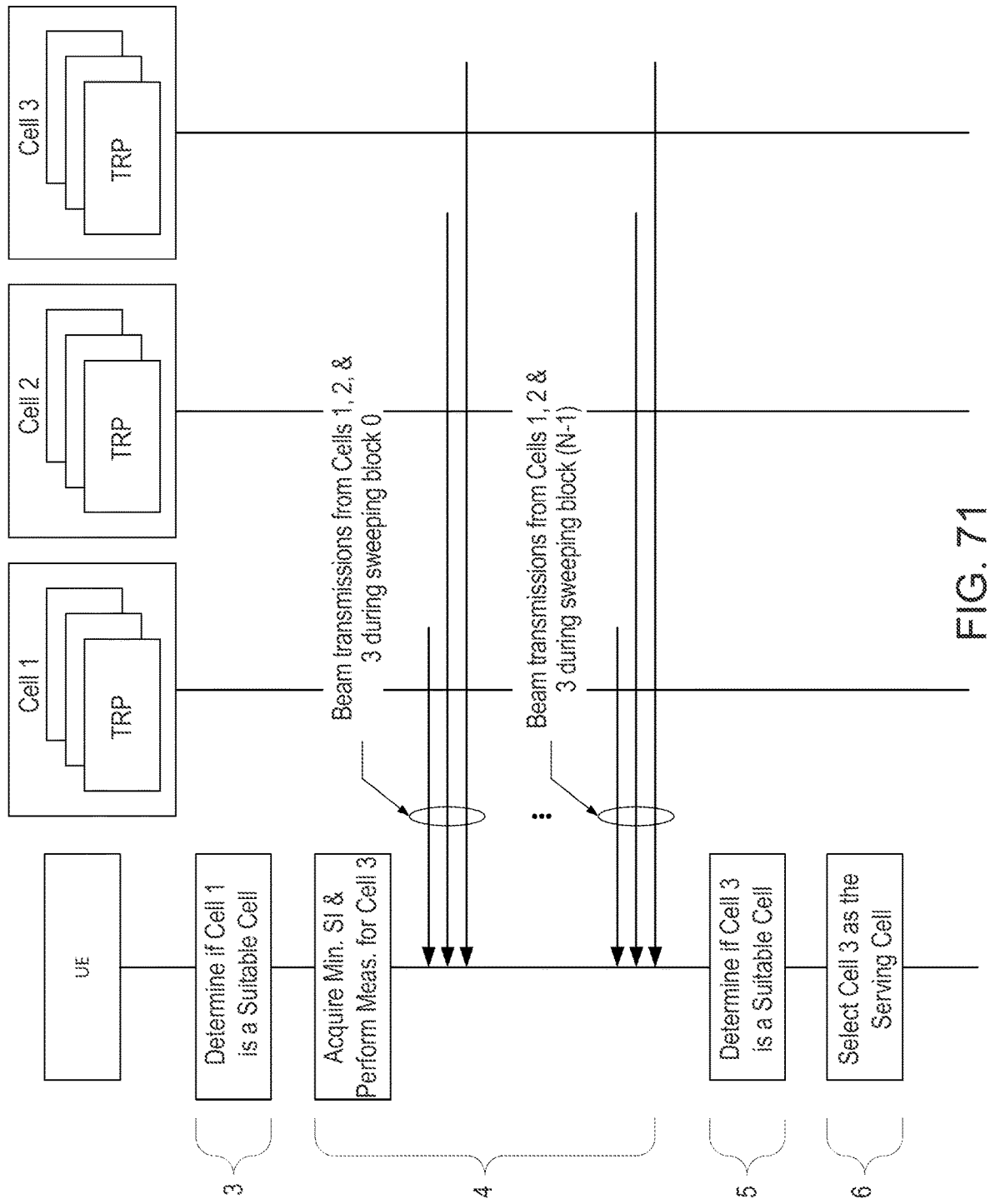

FIGS. 70 and 71 illustrate an example NR cell selection method. In Step 1 UE searches for cells during DL sweeping blocks; Cells 1 & 3 are detected. Note: Cell Search is only performed for Initial Cell Selection. The UE searches for cells by attempting to detect the initial access signals transmitted during the N DL sweeping blocks, where N is dependent on the number of beams needed to provide comprehensive cell coverage and the capabilities of the TRP; e.g. the number of simultaneous beams the TRP can transmit. If the cell does not need to perform beam sweeping, the cell may be configured with N=1.

In step 1 of FIG. 70, a cell may transmit multiple beams during a given DL sweeping block. In NR, in addition to transmitting the PSS and SSS, a cell may also transmit a TSS that is unique to each beam transmitted during a given DL sweeping block, thereby allowing the UE to resolve and identify the beams transmitted by the cell during a given DL sweeping block. In one embodiment, the PSS and SSS are used to determine the PCI of the cell and the TSS is used to determine the beam ID. We define the term $B_{PCI,n,x}$ to refer to the beams of an NR cell, where the subscript PCI refers to the cell identity indicated by the PSS/SSS, n refers to the DL sweeping block in which the beam was transmitted, and x refers to the beam ID indicated by the TSS. If the TSS is not transmitted, the beams transmitted by a cell during a given DL sweeping will not be resolvable, but instead may form a virtual beam that may be identified by the PCI indicated by the PSS/SSS and the DL sweeping block n during which the beam was transmitted. We may refer to these virtual beams using the PCI and DL sweeping block n; e.g. $B_{PCI,n}$. We also define the term $D_{PCI,n,x}$ to refer to the detection metric of the NR cell detected on a given beam. The detection metric may be based on measurements of the TSS. Alternatively, the detection metric may be based on measurements of Beam Reference Signals (BRS), where the beam ID indicated via the TSS may be used to determine which BRSs to measure. If the beams transmitted during a given DL sweeping block are not resolvable, the detection metric may be based on measurements of the PSS and/or SSS, and may be referred to as $D_{PCI,n}$.

A list of detected cells is created, where the cells may be ranked according to some criterion; e.g. signal strength. In one embodiment, the list includes at most one entry for each detected cell, and the cell list is ordered according to the strongest beam detected for the cell. Alternatively, if the UE detects multiple beams for a given cell, the detection metrics for a given cell may be averaged and the cell list can be ordered using the averaged detection metrics.

For illustrative purposes, we assume the beams are resolvable by the UE, and the UE detects initial access signals transmitted on B1,0,0, B3,2,0 and B3,2,1, with detection metrics D1,0,0>D3,2,1>D3,2,0; and the list of detected cells includes 1 entry for each detected cell, where the list is ranked using a detection metric corresponding to the RSRP of the beam; i.e. the list consists of two cells, Cell 1 and Cell 2, with Cell 1 being first in the list and Cell 2 being second in the list.

In step 2 of FIG. 70, the UE acquires minimum SI and performs measurements for Cell 1 during DL sweeping blocks. Multiple DL sweeping subframes may be needed to acquire Min. SI and perform meas. The UE attempts to acquire the Minimum SI and performs cell selection measurements for the first cell in the list, which is Cell 1 in this example.

The UE may attempt to acquire the Minimum SI from and perform measurements on one or more of the detected beams. In one embodiment, the UE attempts to acquire the Minimum SI from the strongest beam. Alternatively, if multiple beams were detected the UE may attempt to acquire the Minimum SI from multiple beams, and possibly combine the received symbols before performing the decoding, to increase the probability of successful detection. The UE may perform cell selection measurements on the strongest beam, all the beams, all the detected beams, or a subset of the detected beams, where the subset may correspond to beams with a detection metric above some threshold.

For illustrative purposes, we assume the UE acquires the Minimum SI from B1,0,0. The UE also performs measurements on B1,0,0, and sets the cell selection metrics $Q_{rxlevmeas}$ and $Q_{qualmeas}$ to the corresponding measurements of B1,0,0:

$$Q_{rxlevmeas} = B_{1,0,0,rxlevmeas}$$

$$Q_{qualmeas} = B_{1,0,0,qualmeas}$$

The example method of FIG. 70 continues on in FIG. 71. In step 3 of FIG. 71, Cell 1 is not considered a suitable cell. After acquiring the Minimum SI and performing cell selection measurements, the UE determines if Cell 1 is a suitable cell. A cell is considered a suitable cell if it meets the requirements for a suitable cell specified in section 4.3 of 3GPP TS 36.304. For illustrative purposes, we assume Cell 1 is not considered a suitable cell. This may be because the cell is barred, the PLMN and/or TA aren't allowed, the S-criterion is not fulfilled, etc.

In step 4 of FIG. 71, UE acquires minimum SI and performs measurements for Cell 3 during DL sweeping blocks. Multiple DL sweeping subframes may be needed to acquire minimum SI and perform measurements. The UE attempts to acquire the minimum SI and performs cell selection measurements for the next cell in the list, which is Cell 3 in this example. The methods described in step two for acquiring the Minimum SI and performing cell selection measurements may be applied in this step. For illustrative purposes, we assume the UE acquires the Minimum SI from B3,2,1. The UE also performs measurements on B3,2,1, and sets the cell selection metrics Qrxlevmeas and Qqualmeas to the corresponding measurements of B3,2,1:

$$Q_{rxlevmeas} = B_{3,2,1,rxlevmeas}$$

$$Q_{qualmeas} = B_{3,2,1,qualmeas}$$

In step 5, Cell 3 is considered a suitable cell. After acquiring the Minimum SI and performing cell selection measurements, the UE determines if Cell 3 is a suitable cell. The methods described in step three to determine if the cell is a suitable cell may be applied in this step. For illustrative purposes, we assume Cell 3 is a suitable cell.

In step 6, the UE selects Cell as the serving cell. The UE selects Cell 3 as the serving cell and camps on the cell.

Cell reselection methods, such as those described herein, allow a UE to select a more suitable cell and camp on it. It may be used on beam-centric NR networks. Features may include: a general set of cell reselection procedures and measurement rules which addresses the impact of three fundamental aspects in NR networks, such as beamforming, diverse use cases, and the New RAN controlled state; configurable priority handling and cell ranking mechanisms, which considers both network controlled case and UE controlled case to facilitate diverse use cases; different mechanisms for cell reselection information acquisition, which consider different information carriers (e.g. Minimum SI or Other SI, etc.), transmission methods (e.g. broadcast or unicast, periodic or on-demand, etc.); configurable optimizations to support different application scenarios in NR networks, which considers measurements, acquisition of cell reselection related system Information and signals, and normal or reduced cell reselection process and balanced beam tracking procedures.

Generally speaking, when an NR IDLE/INACTIVE UE is in either a camped normally state or camped on any cell state on a cell, the UE may attempt to detect, synchronize, and monitor intra-frequency, inter-frequency and inter-RAT cells indicated by the serving cell. For intra-frequency and inter-frequency NR cells, the serving cell may not provide explicit neighbor list but carrier frequency information and bandwidth information only.

High level cell reselection methods may be used for NR IDLE/INACTIVE UEs when performing cell reselection process. For example, reselection methods may include: intra-frequency reselection within a NR frequency is based on ranking of cells; inter-frequency reselection among different NR frequencies and inter-RAT-frequency reselection are both based on absolute priorities; frequency specific cell reselection parameters common to all neighboring cells on a frequency within the same RAT; a concept of neighbor cell lists and black cell lists; speed dependent cell reselection process; and a unified framework for both single-beam based and multi-beam based operations.

In NR, the overall cell reselection method may consist of three phases, for example. In the first phase, the UE checks for measurement rules. In the second phase, the UE checks for radio quality of each detected and measured cell. In phase three, the UE checks for suitability criteria, e.g., PLMN, cell barring status, UE interested services, etc.

Measurement rules are used to reduce needed measurements so that UE can maintain power efficiency as much as possible. An exemplary set of measurement rules includes: measurement and evaluation of serving cell; intra-frequency measurements; and inter-frequency measurements within NR and inter-RAT frequency measurements.

Regarding measurement and evaluation of serving cell, a UE may measure the RSRP and RSRQ level of the serving cell and evaluate the cell selection criteria S ($Q_{rxlevmeas}$ and $Q_{qualmeas}$) discussed in reference to FIGS. 69-78 at least every NR DRX cycle. If the serving cell does not fulfil the cell selection criterion S for the time duration specified by NNR_serv consecutive NR DRX cycles defined in Table 12, the UE shall measure all neighbor cells indicated by the serving cell, regardless of the measurement rules currently limiting UE measurement activities. If the UE is configured with NR_eDRX (Extended DRX cycle) cycle, the time duration may be changed accordingly.

Regarding intra-frequency measurements, neighbor cells are usually indicated in the neighbor cell list in the system information transmitted (over either broadcast or unicast) by the serving cell. Other intra-frequency neighbor cells not in the list may not be measured. For inter-frequency and inter-RAT measurements, UE may measure any neighbor cells. This is because network operators usually have enough information for intra-frequency deployments, and the neighbor cell list can offer network certain level of controllability of UEs. If the serving cell fulfils Qrxlevmeas>SNR_IntraSearchP and Qqualmeas>SNR_IntraSearchQ, the UE may choose not to perform intra-frequency measurements. Otherwise, the UE will perform intra-frequency measurements.

Regarding inter-frequency measurements within NR and inter-RAT frequency measurements, priorities of frequencies from different RATs cannot be the same. UE always perform inter-frequency and inter-RAT frequency measurements which have higher priority than the priority of the frequency of the serving cell. If the priority of inter-frequency within NR or inter-RAT frequencies is lower, UE will perform the measurements, if the serving cell does not fulfil Qrxlevmeas>SNR_NonIntraSearchP and Qqualmeas>SNR_NonIntraSearchQ, or the UE is triggered to measure a frequency which is configured with a dedicated signaling. Otherwise, the UE will not perform inter-frequency within NR or inter-RAT frequency measurements.

If the UE cannot find any new suitable cell based on searches and measurements using the intra-frequency, inter-frequency and inter-RAT information indicated in the system information after a time period $T_{NR\_sel}$, the UE shall initiate cell selection procedures for the selected PLMN.

Note that all the threshold values (e.g., $S_{NR\_IntraSearchP}$, $S_{NR\_NonIntraSearchP}$, $T_{NR\_sel}$, etc.) used in the measurement rules are supposed to be defined as configurable parameters. And the value of each parameter may be scaled when a UE is in different mobility state. For example, UE is in the high mobility state, the value of some parameters may be adjusted so that cell reselection process could be performed more frequently to react fast to channel degradation.

Absolute priorities of different NR frequencies or inter-RAT frequencies may be provided to the UE in the system information, in dedicated signaling message, or by inheriting from another RAT at inter-RAT cell (re)selection. If the priority of a frequency is provided in dedicated signaling, the UE shall ignore the value of the priority provided in system information.

A UE shall only perform cell reselection evaluation for NR frequencies and inter-RAT frequencies that are given in system information and for which the UE has a priority value provided.

TABLE 12

Example definition of $N_{NR\_serv}$

| IDLE mode DRX cycle length (s) | INACTIVE mode DRX cycle length (s) | $N_{NR\_serv}$ (number of DRX cycles) |
|---|---|---|
| 0.02 | 0.01 | 4 |
| 0.04 | 0.02 | 4 |
| 0.08 | 0.04 | 2 |

In phase 2, the evaluation process is to select the best suitable cell from the perspective of radio conditions. Radio conditions of non-serving cells are also determined by measuring the RSRP and RSRQ level, such as Qrxlevmeas and Qqualmeas value. A UE shall not consider any black listed cells as candidates for cell reselection. When evaluating Qrxlevmeas and Qqualmeas of non-serving cells for reselection purposes, the UE shall use parameters provided by the serving cell. A UE has camped on the current serving cell for at least a time duration TNR_minResel, before the UE evaluate other measured cell's radio quality. When a UE evaluates radio quality of a new cell on a same frequency of the serving cell or equal priority of different NR frequencies, a cell ranking algorithm may be used. When a UE evaluates radio quality of a new cell on a higher priority NR frequency or inter-RAT frequency, the cell may be reselected if it fulfils Qrxlevmeas>Thresh NR_new_highP for a time duration TNR_resel_t; or Qqualmeas>ThreshNR_new_highQ for a time duration TNR_resel_t. When a UE evaluates radio quality of a new cell on a lower priority NR frequency or inter-RAT frequency, the cell may be reselected if the serving cell fulfils Qrxlevmeas>Thresh NR_ser_lowP and the new cell fulfils Qrxlevmeas>Thresh NR_new_lowP for a time duration TNR_resel_t; or the serving cell fulfils Qqualmeas>Thresh NR_ser_lowQ and the new cell fulfils Qqualmeas>ThreshNR_new_lowQ for a time duration TNR_resel_t. If multiple cells of different priorities fulfil the radio quality criteria, cells from higher priority frequency will be selected first; if multiple cells of the same priority frequency or frequencies, cells will be selected based on a cell ranking algorithm. Priorities of frequencies from different RATs will not be the same.

Again, the threshold values (e.g., $Thresh_{NR\_ser\_lowP}$, $T_{NR\_reset\_t}$, etc.) used in the radio quality evaluation rules are supposed to be defined as configurable parameters as well. And the value of each parameter may be scaled when a UE is in different mobility state, for example, UE is in the high mobility state, the value of some parameters may be adjusted so that cell reselection process could be performed less frequently to reduce power consumption and/or signaling overhead.

In phase 3, due to the selection of the target best cell from the phase 2, the UE then reads essential system information from that cell in order to check other suitability criteria (e.g. PLMN, cell barring status, supported services, etc.) before actual camping. Details of the check are the same as the procedures discussed in reference to FIGS. 69-78.

Figure 72:
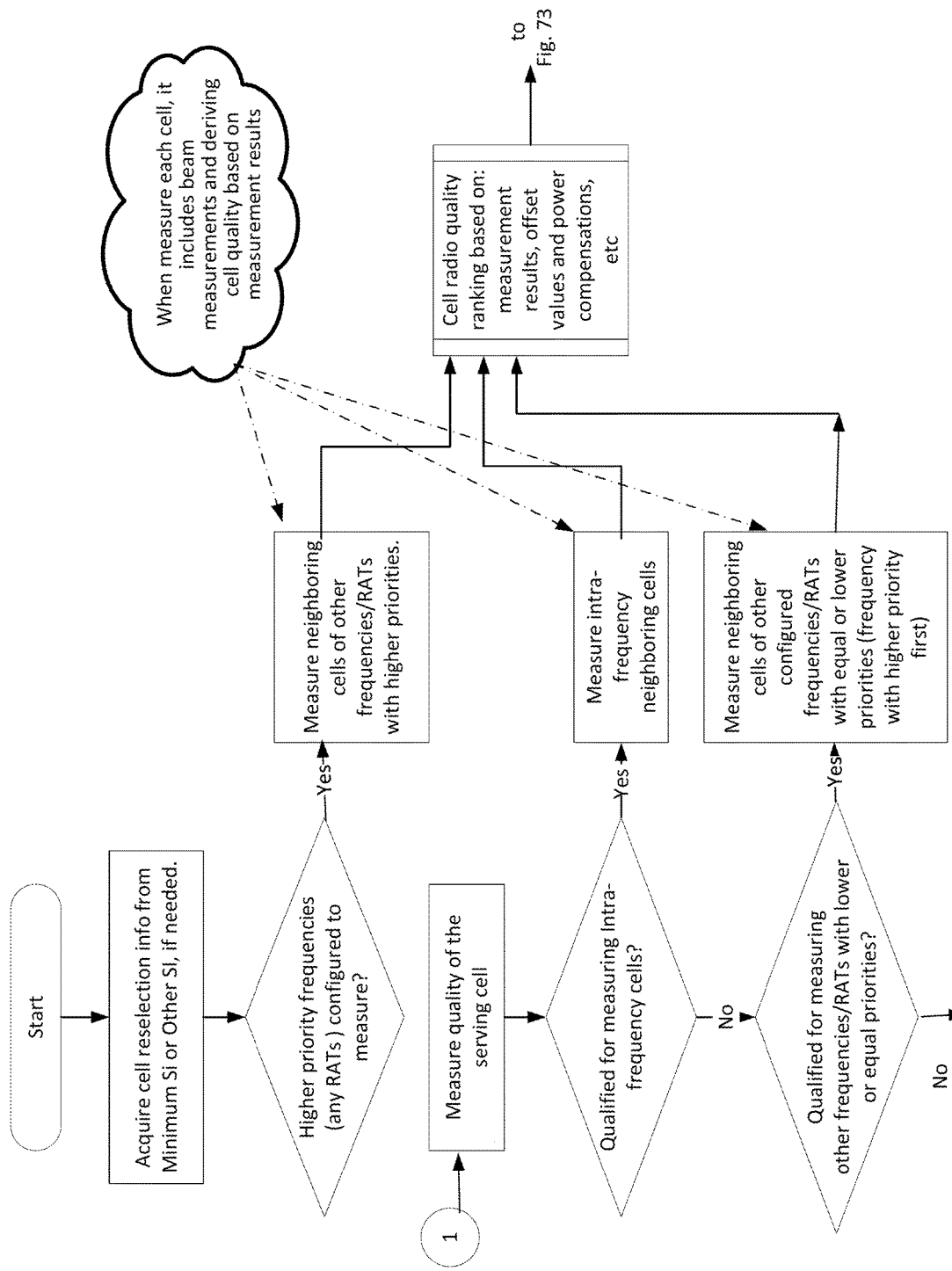
FIGS. 72 and 73 show a flow chart of an example method for NR cell reselection.
Figure 73:
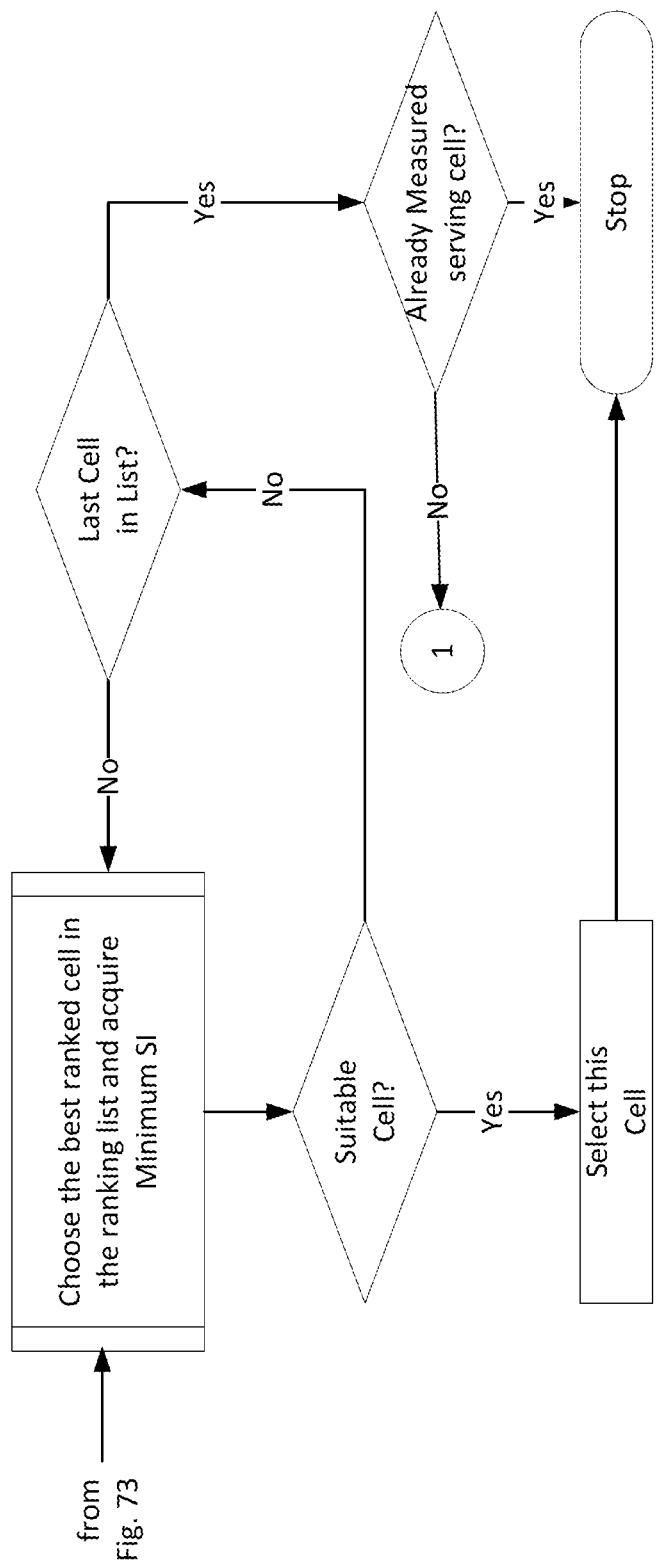

A high level flow chart illustrating the processing that takes place during the NR Cell Reselection procedure is shown in FIGS. 72 and 73.

When beam sweeping is used for NR multi-beam based operation, maintaining the DL beam pair for the serving cell may be performed by the cell reselection function; i.e. making sure the "best" DL Tx beam is paired with the "best" DL Rx beam so as to maximize the SNR of the received signal at the UE (e.g., UE receives network paging/notification messages, etc.) From another perspective, one of the main purposes of the IDLE/INACTIVE MODE is for power saving, it is not power efficient for an UE to continuously perform beam pairing. Given diverse use cases and UE capabilities in NR, different UEs may put different priorities on energy efficiency and low delay of data transfer (includes both data sending and receiving) due to actively updated beam paring. This beam pairing process is better to be configurable so that different levels of periodicities and granularities of beam refinement can be achieved. For example, INACTIVE UEs requires low delay of data transfer and may request a burst of small data transmissions within the INACTIVE state, it is preferable to have certain level of beam refinement for data transmission while tolerate certain level of energy consumption.

In NR, priorities of different NR frequencies or inter-RAT frequencies are typically provided to the UE in the system information, in dedicated signal messages, or by inheriting from another RAT at inter-RAT cell (re)selection. Under these cases, priorities of different frequencies are all determined by the network/operators.

On the other hand, NR is expected to support broad range of use cases with different performance requirements and various services such as proximity service (e.g., D2D), V2X, MBMS, etc. There may be some cases under which UEs may want to adjust frequency priorities on their own. For example, some frequencies may support only limited set of services and a UE may not find its interested service supported by those frequencies. Alternatively, the UE may consider another frequency supporting UE's interested services to be a higher priority regardless of the priority value signaled by network. This may enable the UE to reselect and camp on a cell supporting its desired service even if the quality of serving is above a threshold and serving frequency has a higher priority. Without this UE controlled priority adjustment, the UE may not able to reselect that cell according to the cell reselection procedures discussed, e.g., in reference to FIGS. 72 and 73.

Examples of factors that may favor a UE controlled priority handling rule are load balancing, network configuration, interference level, services, and numerologies. Regarding load balancing, traffic may need to be split into different cells with different frequencies. Regarding network reconfiguration, due to instances such as earthquake, electricity outage, or terrorist attack, for example, some cells on frequencies with higher priority value than current serving frequency are not operational, or operators temporarily switch on some cells on frequencies with lower priority and those cells are originally turned off for energy saving. Dense deployment of small cells on some frequencies may result in increased interference levels. Regarding services, some frequencies with high priorities may not support a UE's interested services. Regarding numerologies, some frequencies with high priorities may not support a UE's interested Numerologies.

Cell ranking rules are used to find the best suitable cell for a UE to camp on. A UE ranks intra-frequency cells and the cells on other frequencies having equal priority which fulfil the S-criterion using a criterion known as the NR_Resel-criterion. The NR_R-criterion generates rankings NR_Rs and NR_Rn for serving cell and neighbor cells respectively. For a NR UE's serving cell, $NR\_Rs = P_{meas,s} + P_{hyst} - P_{offset}$. For a NR UE's measured neighbor cells, $NR\_Rm = P_{meas,m} - P_{offset}$.

Where, $P_{meas}$ is the RSRP measurement quantity (this value may be a aggregated value from multiple beam-level measurements if in NR multi-beam deployment scenarios), $P_{hyst}$ is the power domain hysteresis to avoid ping-pong and Poffset is an offset value to control different frequency specific characteristics (e.g., propagation properties of different carrier frequencies) and/or cell specific characteristics (e.g., number of active TRPs and beams, traffic loading, etc.) In the time domain, $T_{NR\_reset\_t}$ is used to limit overly frequent reselections. The reselection occurs to the best ranked neighbor cell if it is better ranked than the serving cell for a longer time than $T_{NR\_reset\_t}$. The $P_{hyst}$ provides hysteresis by requiring any neighbor cell to be better than the serving cell by configurable amount before reselection can occur. The Poffset make it possible to bias the reselection toward particular cells and/or frequencies. For example, UEs or network may increase the value of $P_{hyst}$ so that UEs are more likely to stay at the current serving cell and later beam pairing/tracking operations for multi-beam based NR networks more likely to be intra-cell/TRP beam switching rather than inter-cell beam switching.

In RAN2 #95 meeting, information related to cell reselection process (e.g., parameters and threshold values discussed, e.g., in reference to FIGS. 72 and 73 for IDLE mode UEs and INACTIVE mode UEs, scaling factor for high speed UEs, etc.) is not yet agreed to be included in the Minimum SI.

Figure 74:
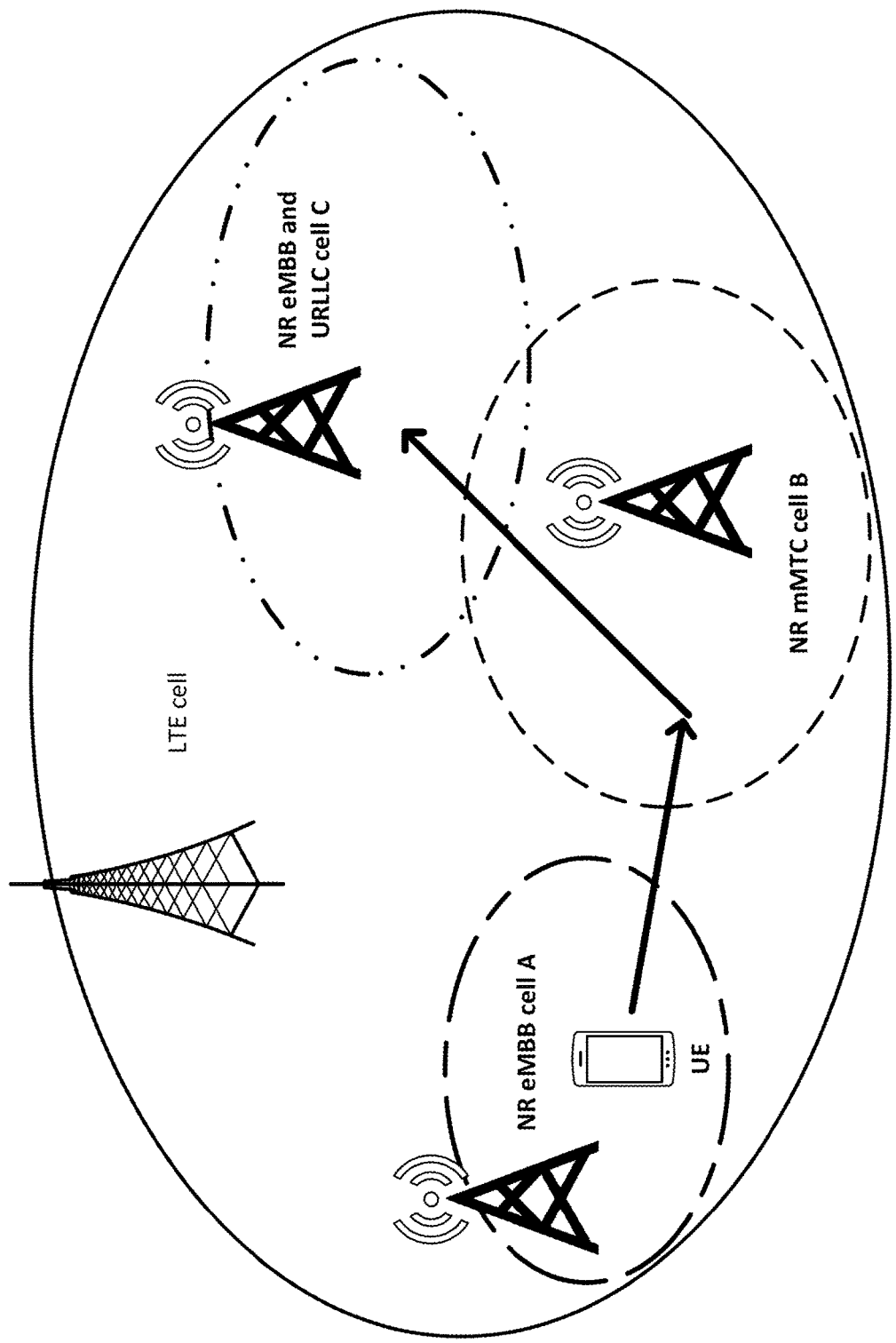
FIG. 74 illustrates an example arrangement of cells for reselection scenarios for a UE in NR IDLE/INACTIVE modes.

As shown in FIG. 74, in the progress of 5G deployment, a UE may see different cells from different frequencies and different RATs (e.g., 5G and LTE) while moving around. For example, in FIG. 74, NR eMBB cell A may be viable and preferable for the UE which has a subscription of eMBB services. The UE falls back to LTE while moving and before arriving at cell C which supports eMBB and URLLC services. Acquisition of cell reselection information is needed when UE moves into a different cell or stored information is invalid. Acquisition of cell reselection information may have options for periodic transmission as included in minimum SI, and for on-demand transmission as included in other SI.

Regarding periodic transmission as included in minimum SI, minimum SI is one of the always-on signals, and RAN1/RAN2 has agreed to control the overhead of always-on signals. The amount of reselection information that is included as part of MI mum SI needs to be reasonably controlled, since any increase of minimum SI could potentially increase the overall broadcast overhead. The use of periodic transmission does not introduce new signals, hence there is no additional signaling overhead.

Regarding on-demand transmission as included in other SI, if the cell reselection information is included in Other SI and has to be obtained on demand, an IDLE/INACTIVE state UE in NR may need to obtain the information either by UE controlled acquisition (e.g., UE sends a specific request, etc.) or Network controlled acquisition (e.g., UE monitors the DL channel to see if paging like signals arriving, etc.). In the UE controlled case, the UE has to send a request to trigger the serving cell for delivery of cell reselection information. The request may be sent during random access procedures (e.g., the request is transmitted on the granted resources in random access response, etc.) or grantless transmission (e.g. contention based transmission.) Once the request is received, the serving cell may choose to send cell reselection information over one-time broadcast or UE specific signaling. In the network controlled case, the network has the flexibility to trigger the reselection information delivery when neighbor network topology or/and network configurations update, or/and when a tracking area (IDLE mode UEs) or RAN controlled area (INACTIVE mode UEs) update is received. Again, the information also may be sent to UEs over one-time broadcast or UE specific signaling. If one-time broadcast is selected for either case to deliver the reselection information, mechanisms (e.g., a tag variable) used to indicate the new or old content of information are needed so that UEs can decided to accept the information or not.

Figure 75:
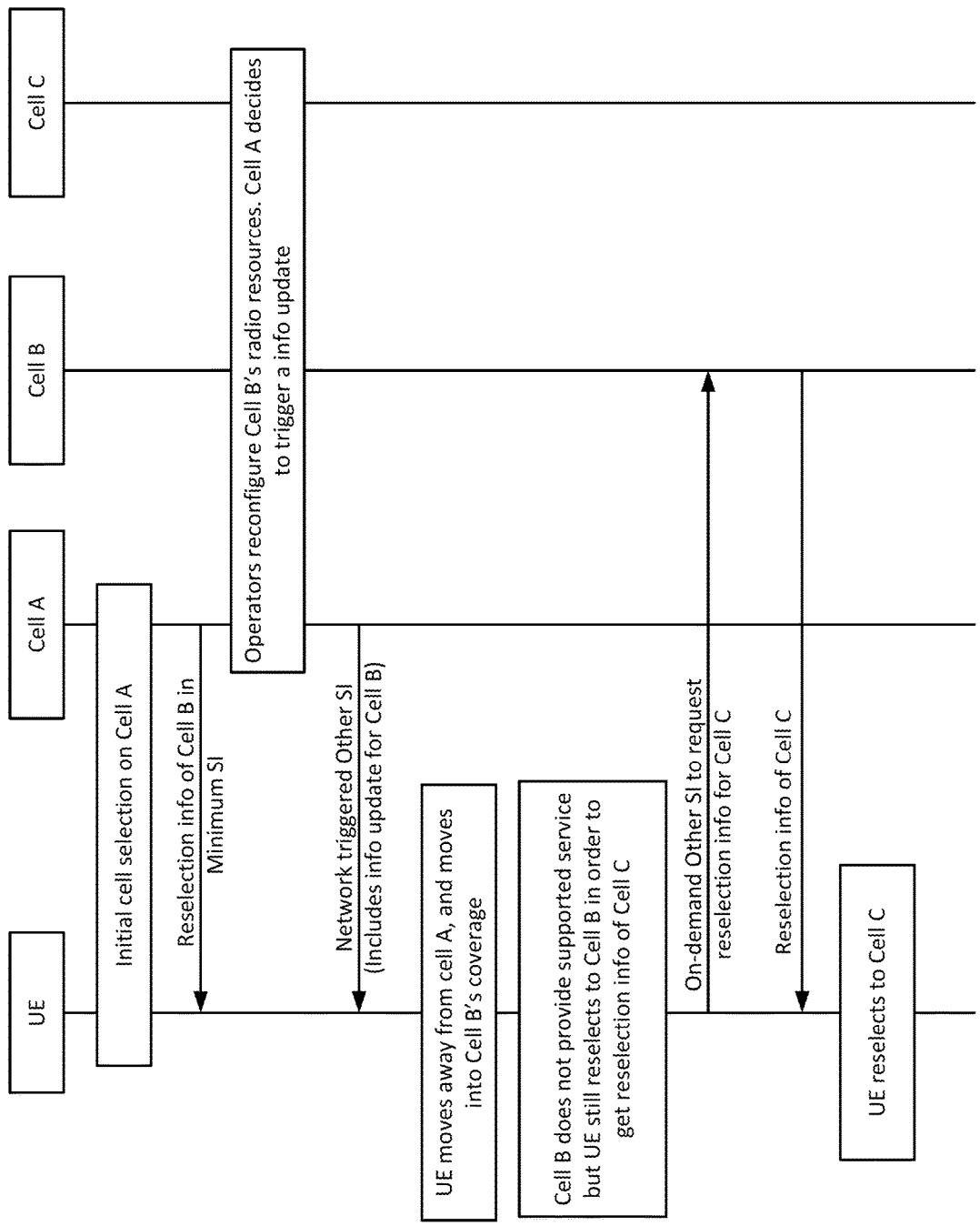
FIG. 75 shows a call flow for various scenarios for acquisition of cell reselection information.

It is up to real implementations which option is used. In one embodiment, a hybrid approach may be used, where part of the reselection information (e.g., some preferred neighboring frequencies and priorities) may be included in the Minimum SI and broadcasted periodically, and other reselection information (e.g., some back-up frequencies) may be sent to UEs on demand in case UEs could not find suitable cells after measure all existing frequencies and cells, due to, for example, UE's interested services are not supported in any of already measured cells. FIG. 75 represents exemplary procedures how the UE in FIG. 74 acquires cell reselection related information by using different approaches.

Considering the diverse and sometimes contradictory requirements of 5G use cases, it is important to ensure the system flexible and capable enough to support the diverse service requirements of next generation UEs. For example, mMTC devices are expected to be quite stationary most of the time. As a result, it should be possible to minimize idle mode mobility functions (e.g., cell reselection process) of the stationary IoT devices for low power consumption. On the other hand, URLLC UEs have a very low latency requirement as shown in Table 1. As a result, URLLC UEs may benefit from minimal or even zero cell reselection interruptions/minimal IDLE/INACTIVE to CONNECTED transition time, which requires cell reselection process to react fast to sudden channel changes and reliably reselect to best suitable cells in NR, leading to frequent measurements, fast evaluation and reselection process.

The new INACTIVE state may need to start data transfer with low delay (e.g., data transfer within the New state or quick transition to CONNECTEDD mode than IDLE mode) as required by RAN requirements, and also has to support comparable energy efficiency to that of IDLE mode. In addition, plus considering extra delay and signaling load due to potential context fetch and path switch procedures for camping on a new cell, the UE cell reselection process in the New state better consists of fast and simple procedures.

The overall cell reselection process discussed, e.g., in reference to FIGS. 72 and 73, may be optimized in a number of ways, such as via: measurements; acquisition of cell reselection related system information and signals; normal or reduced cell reselection process in terms of occurrence or delay; and balanced beam tracking procedures for beam-sweeping based NR networks. Typically, measurements for cell reselection are averaged in time and relatively slow in order to avoid ping-pong effects. According to 3GPP TS 36.133, the intra frequency handover measurements period is 200 ms and inter frequency measurements period is 480 mS. In NR, the measurement period may be even longer if reuse the approach used by 3GPP TS 36.133, due to beam sweeping mechanism used in multi-beam based NR networks and aggregating beam level measurements into cell level quality measurements. As a result, these measurements (RSRP, RSRQ) may be too slow to be able to react to the sudden channel changes in NR, and faster measurement is needed.

In LTE, the UE shall filter the RSRP and RSRQ measurements using at least 2 measurements. Within the set of measurements used for the filtering, at least two measurements shall be spaced by, at least DRX cycle/2. See 3GPP TS 36.133. In one embodiment, NR UEs may support configurable measurement configurations for different measurement periods for both intra, inter frequency and inter-RAT measurements. For example, two adjacent measurements may be spaced by a smaller time duration, such as by DRX cycle/4, or reducing the value of DRX cycle as shown in Table 12. The configurable different measurement periods allow faster measurements for some UEs which need to react fast and also slower measurement periods for other UEs which may need to save battery efficiency. In another embodiment, number of measured carrier frequencies belonging to the same RAT or different RATs may be configurable depending on service type, latency requirements, mobility speed, battery level, etc.

Optimizations related to the acquisition of cell-reselection-related system information and signals may be achieved from a number of perspectives, such as: index based cell reselection system information; configurable periodicity for broadcast of Minimum SI; and a hybrid acquisition method.

Regarding index based cell reselection system information, a UE typically uses reselection information provided by a serving cell. When UE reselects a new cell, the reselection information included in Other SI needs to be re-acquired. So UE's serving cell changing rate impacts SI request rate, and thus has significant impact on the performance of on-demand SI delivery. If each set of reselection information has a unique Index, and the set of reselection information covers a flexibly large area, when a UE changes a serving cell, there is no need to always re-acquire SIs, as long as UE moves within an area covered by a same Index. In case a UE moves out of an Index covered area, the UE may send SI request with the index, so that a serving cell can compare two sets of SI and only sends the differences in the new SI. Either way, signaling overhead and delay are reduced.

Regarding configurable periodicity for broadcast of minimum SI, in NR, not all frequencies support all diverse services. For cell support delay-tolerant services (e.g., mMTC), sparsely transmitted Minimum SI may be beneficial. Sparse transmissions may reduce interference and also allow the network to configure long DTX cycles for energy saving. This is particularly important in situations with low traffics in the network. In case part of cell reselection related system information is included in the Minimum SI, sparse transmission is helpful in terms of power efficiency for delay tolerant UEs. In cases where UEs or networks need faster transmission, the periodicity may be reduced from reconfigurations so that more frequent transmissions are possible. If always-on signals have to be controlled as agreed in RAN1 meetings but still need faster acquisition of some SIs, on-demand SI delivery is another option.

Regarding hybrid acquisition method, there may are at least two options for on-demand SI delivery: network controlled and UE controlled, as discussed, e.g., in reference to FIGS. 74 and 75. The network can make an appropriate decision when and what information needs to be transmitted to a UE and prepare ahead of reselection to a new cell which could lead to a smaller interruption time. For example, network may activate/deactivate some TRPs/cells on certain frequencies, and reconfigure what and when a UE should measure. A UE can react fast enough to channel degradation to reduce reselection failures. The network can still control the cell reselection process since UE selects the best target cell among candidate frequencies and cells decided by the network and the network can control the policy, threshold values and parameters of the UE's cell selection.

There may be conditions when UE favors reduced occurrence of cell reselection process, such as energy saving, or staying on current serving cell as much as possible in order to not miss any paging/notifications messages, etc. There may be also conditions when UE favors reduced procedures/delay of cell reselection process, such as low delay of notification reception and data transfer for INACTIVE mode UEs.

Optimization proposed on measurements is one embodiment to serve the purpose. In an alternative embodiment, UEs that may not require high capacity and bandwidth may be configured to select/reselect cells in lower frequencies which have better coverage, better reliability and stability of channel degradation than higher frequencies, such as URLLC devices. In another embodiment, IDLE/INACTIVIE UEs may prefer staying in the serving cell so that future transition back to CONNECTED mode may not need to perform beam tracking/training again if those beam level operations are already done before transitions. If beam switching is still needed when transition back to CONNECTED mode, at least intra-cell beam switching other than inter-cell beam switching is performed. Note that inter-cell beam switch usually comes with UE context transfer, data forwarding and path switching operations.

As discussed, e.g., in reference to FIGS. 72 and 73, when beam sweeping is used for NR multi-beam based operation, maintaining the DL beam pair for the serving cell should be considered to be part of the cell reselection function. There is a conflict when doing beam paring/refinement for IDLE/INACTIVE UEs. From the performance point of view (e.g., data transfer, paging/notification reception), finer and updated beam pairing/tracking is preferred. But from the energy efficiency perspective, beam paring/tracking operations need to be limited. Therefore, events (e.g., L1/L2 beam measurements triggered beam paring/tracking) or/and timers (e.g., the time UE waits to perform continuous beam measurements) related to beam paring/tracking need to be configurable and tuned for different use cases, UE capabilities, etc. In another embodiment, paging/notification messages for IDLE/INACTIVE UEs may be transferred by using SFN (e.g., as discussed in reference to FIGS. 66 to 68) instead of resolvable beam-level transmission.

Figure 76:
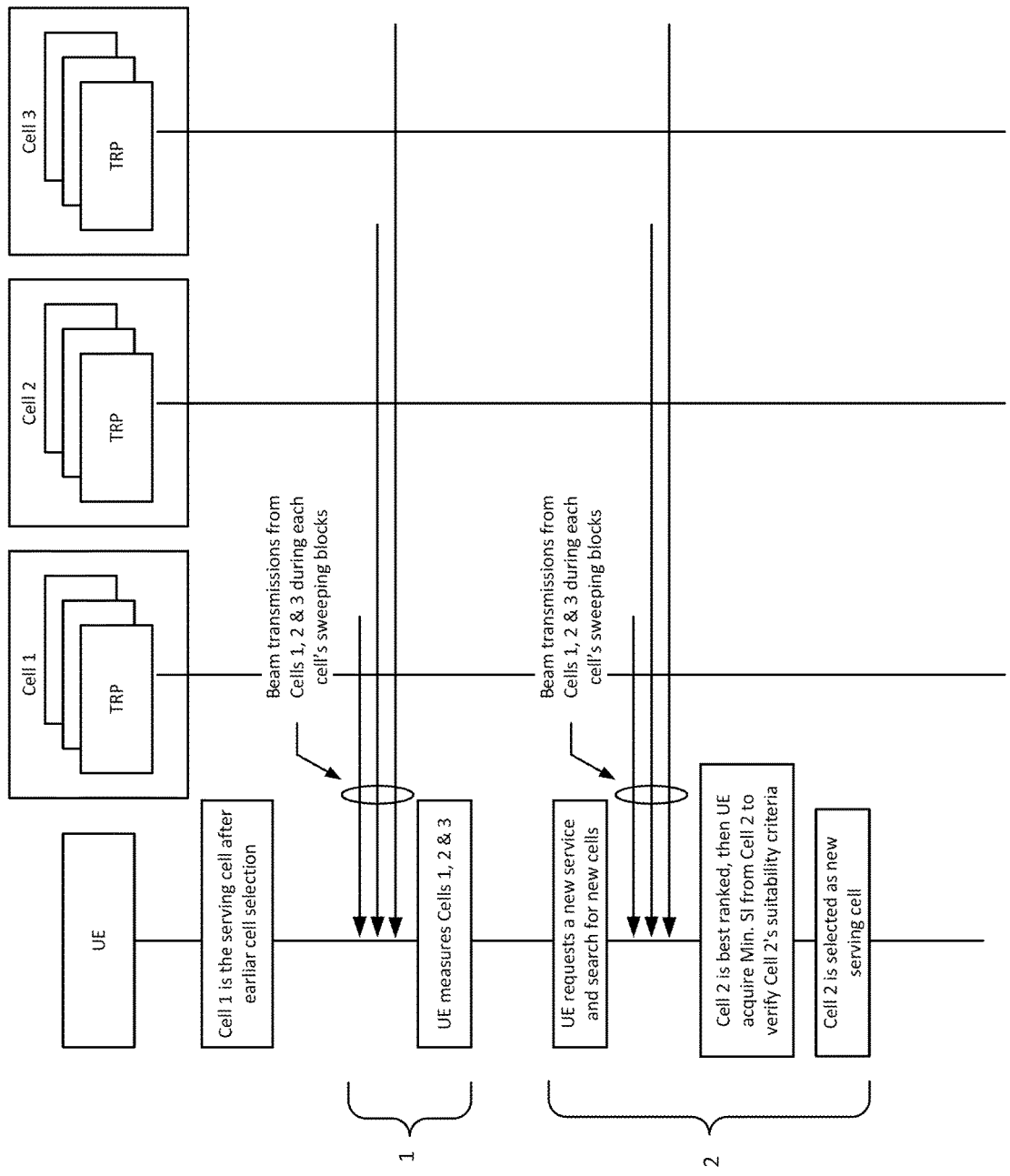
FIGS. 76 to 78 show an example call flow for methods of NR cell reselection.
Figure 77:
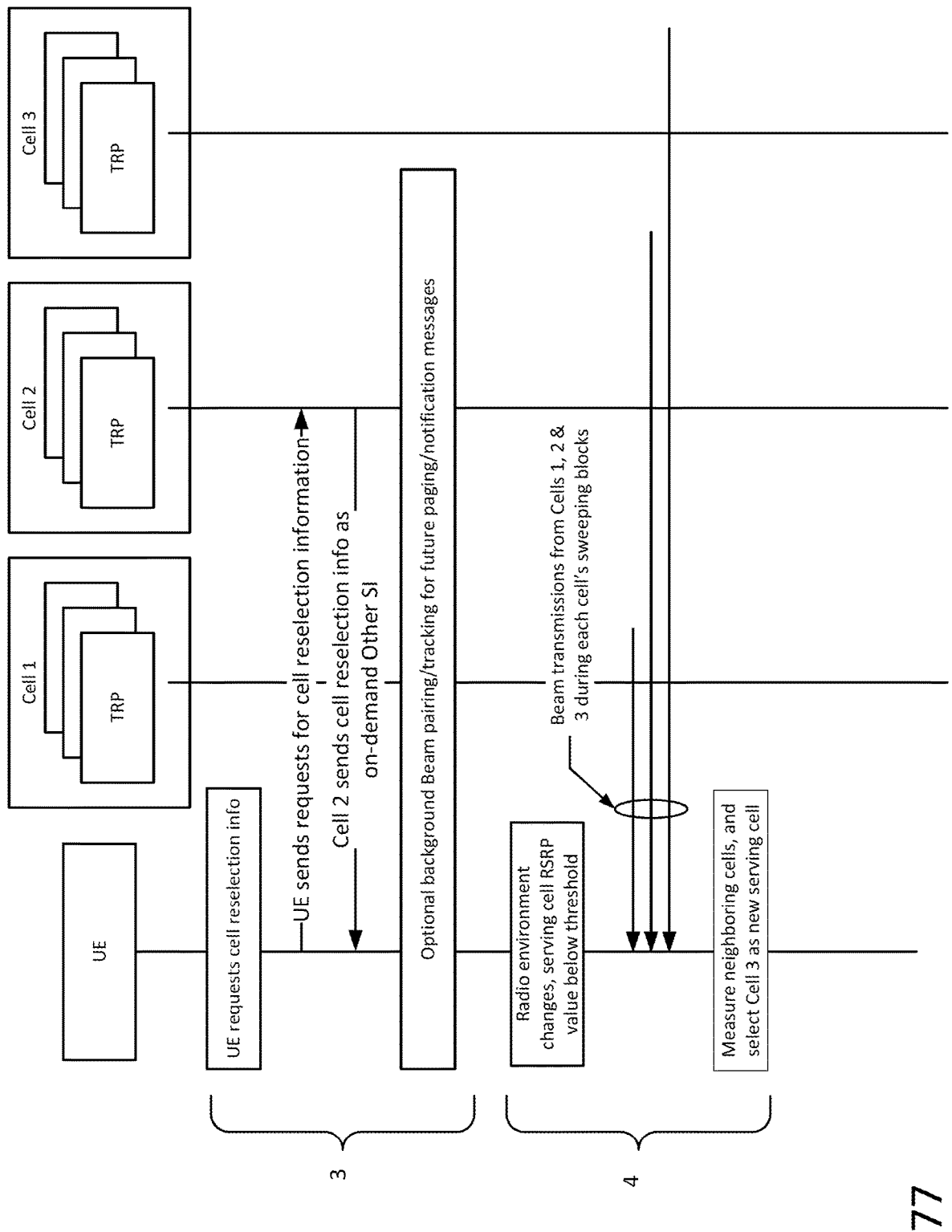
Figure 78:
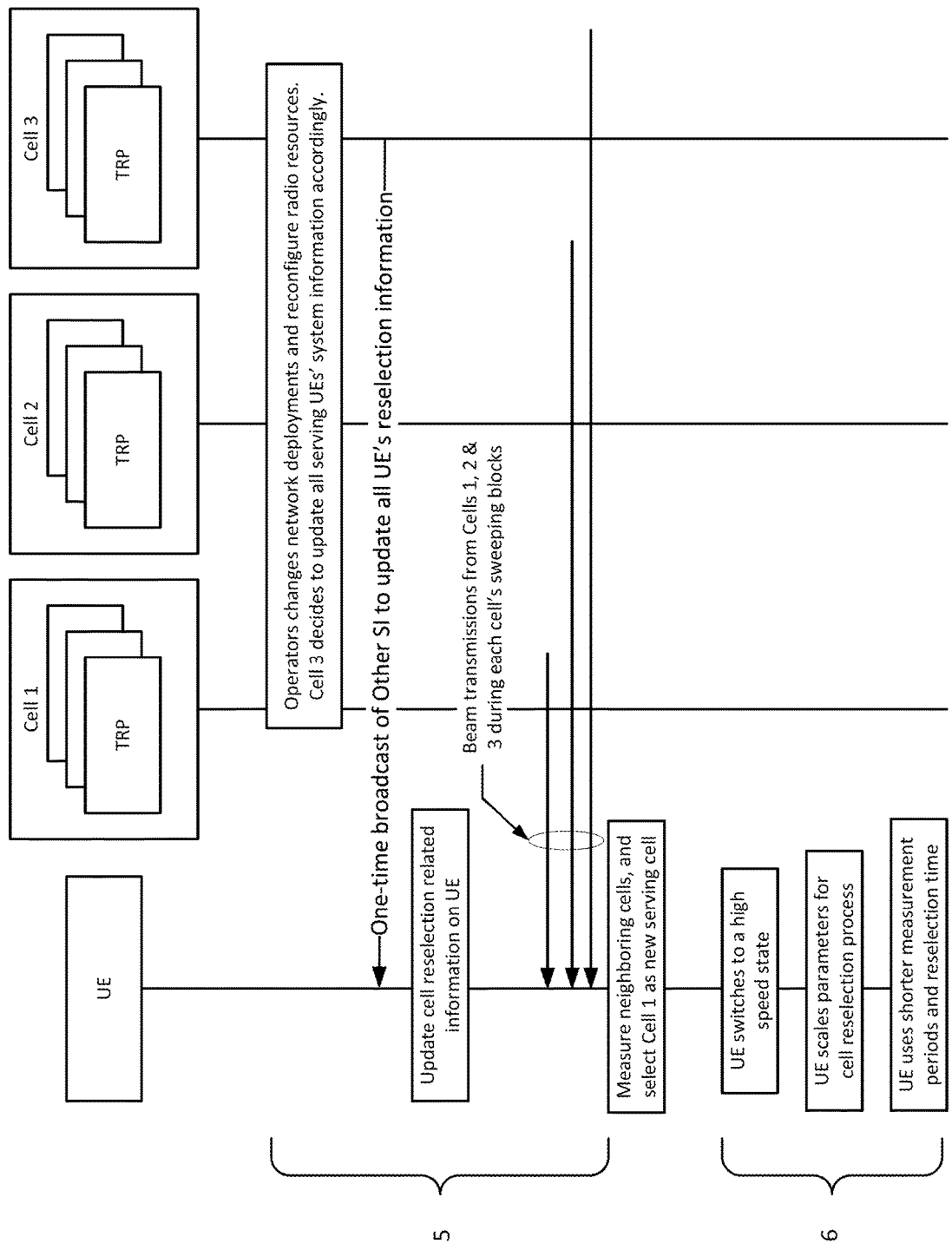

FIGS. 76 to 78 illustrate exemplary methods that may be used during NR cell reselection process. In the case of single-beam based NR networks or beam sweeping not being used, the number N in FIGS. 76 to 78 can be set to 1, and remaining procedures are still valid. At the beginning, the UE camps on Cell 1 due to earlier cell selection process.

In step 1 of FIG. 76, the UE measures neighboring frequencies/cells according to measurements rules. UE initiates cell reselection process to search and select a more suitable cell and camp on it. The search process is started by measuring neighboring frequencies/cells according to the measurement rules. In this example, cell 1 the best suitable cell among all detected cells (Cell 1, 2 and 3) after performing the evaluation process and cell ranking rules.

In step 2, Cell 1 is on frequency with highest priority but does not support UE interested service. Cell 2 is measured, ranked, verified, and reselected as serving cell after suitability check. UE launches a new application which requests a new service. According to measurement rules, highest priority frequencies are measured first. The current serving Cell 1 is on frequency with highest priority but UE requested service is not supported by current serving cell. On the other hand, the radio quality of Cell 1 does not satisfy network defined intra-frequency measurement rules as discussed, e.g., in reference to FIGS. 72 and 73. A UE may temporarily decrease the priority of current serving frequency/cell (Cell 1 in this example) irrespective of its original priority signaled by network, and measure other neighboring frequencies/cell. This enables UE to reselect and camp on a cell supporting its requested service even if quality of the serving cell is above a threshold and serving frequency has a higher priority than frequencies supporting the desired service. Cell 2 is best ranked based on UE's measurements. Now UE acquires Minimum SI from Cell 2 in order to check other suitability criteria (e.g., PLMN, cell barring, forbidden TA, etc.) before actual camping. Cell 2 passes the suitability check and is selected as UE's new serving cell.

In FIG. 77, at step 3, once camping on Cell 2, the UE acquires reselection information from Cell 2, and also maintain best DL beam pair for future paging/notification messages. The cell reselection information may or may not be included in the Minimum SI, or even part of it is included in Minimum SI. In this example, cell reselection information is carried in Other SI, and UE has to request it from Cell 2 as an on-demand basis. In this example, we also consider that maintaining the DL beam pair (e.g., as discussed in reference to FIG. 18) by the UE is to be part of the cell reselection function once UE camps on cell providing normal service, since this UE is in INACTIVE mode and beam pairing process running background is able to reduce the delay of future data transfer.

In step 4, Due to channel degradation, UE searches for better cells. Cell 3 is selected as the new serving cell. UE regularly measures its serving cell's radio quality, and finds that signal strength $Q_{rxlevmeas}$ now is below a configurable threshold. UE starts another round of cell reselection process and then selects Cell 3 as the new serving cell. This is an example of UE initiated cell reselection process.

In step 5, due to network triggered update of reselection information. UE measures neighboring frequencies/cells and find Cell 1 is the best suitable cell, thus cell 1 is selected as the new serving cell. Operators decide update network deployments and reconfigure radio resources. Once the actions are finished, Cell 3 decides to update all its serving UEs with updated system information as part of Other SI. And this update is sent to UE over a one-time broadcast. UE updates related cell reselection information saved locally and performs a new round of cell reselection process by using the new information. As a output of cell reselection process, UE selects Cell 1 as the new serving cell, since Cell 1 fulfills the cell selection criterion, works on high priority frequency and more importantly, supports UE's requested service after network reconfigurations.

In step 6, in high-mobility state, UE uses speed dependent scaling rules to perform cell reselection process. UE detects that it is in a high-mobility state, so UE uses speed dependent scaling rules to adjust cell reselection related parameters and thresholds, so that later cell reselection process would be performed properly as defined in high-mobility state.

NR may include new schemes to support flexible frame structure, HARQ, Ack/Nack operation in a beam centric architecture. These may require new approaches to address various problems related to scheduling in NR.

A single common control region (search spaces) or multiple common control regions may be defined within the bandwidth. Each of the common control regions be limited in bandwidth, i.e. confined to one or more sub-bands especially when there are multiple common control regions. The common control region's resources may be limited in spectrum or span the entire bandwidth for the case when only a single common control region is defined.

Figure 80:
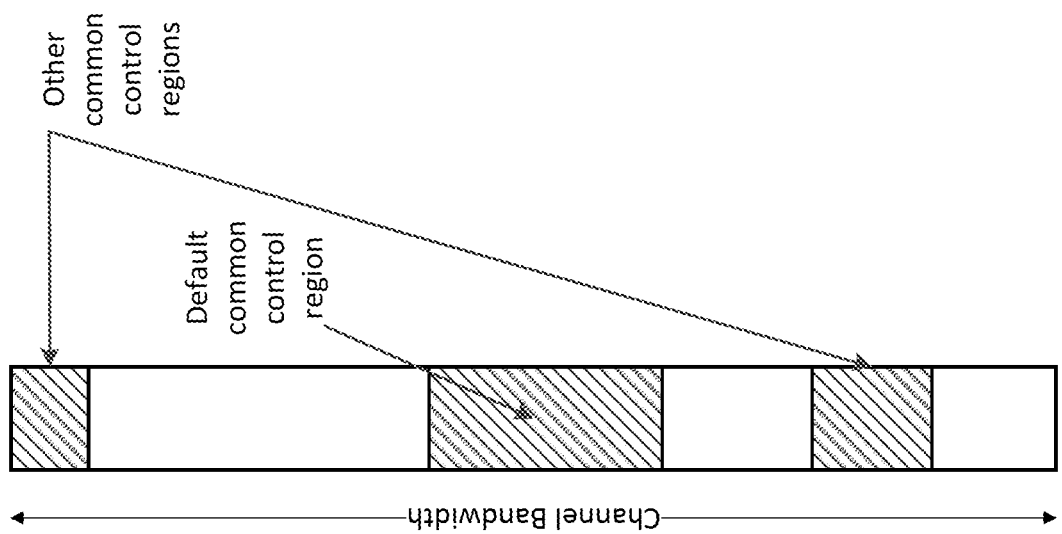
FIG. 80 shows an example of a default common control region with multiple common control regions with a default common control region allocated at the center of the bandwidth.
Figure 79:
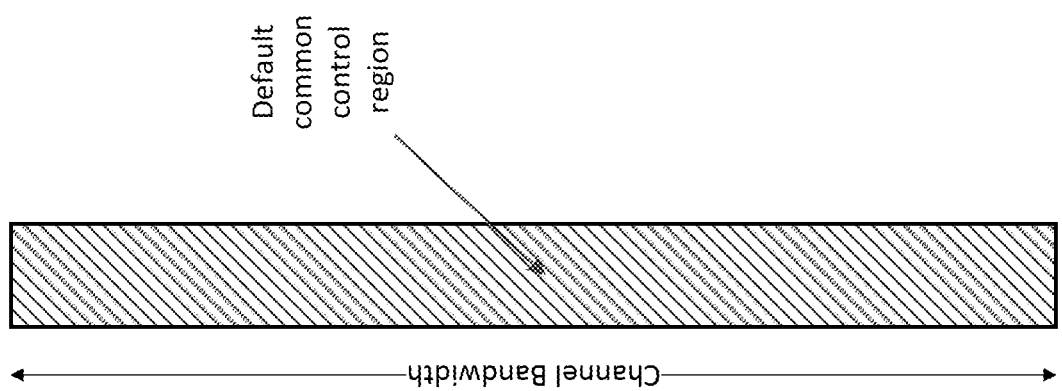
FIG. 79 shows an example of a default common control region with a single default common control region with resources spread through the entire bandwidth.

Of these, at least one common control region's configuration information such as location, numerology will be known to the UE either through the definition in the spec or though information in the MIB or a combination of the two. Henceforth we refer to this common control region as 'default' common control region. FIGS. 79 and 80 show example of default common control regions defined for cases with single and multiple common control configurations.

For example, the location of the default common control channel may be fixed to N PRBs in the center of the band.

Alternatively, the MIB may indicate the numerology and carrier bandwidth and the spec may predefine the location of the default common control channel for a given numerology and carrier bandwidth.

Thus a UE performing initial access will receive its common control signaling information such as RAR and paging through the default common control region.

Its UE-specific sub-bands where it can monitor its UE-specific DCI or common control signaling or both may be configured through RRC or through some signaling accompanying a paging or RAR message.

Once it obtains the UE-specific sub-band configuration, it monitors those configured sub-bands for its UE-specific DCI or common control DCI or both. The reason for including common control signaling in the UE-specific sub-bands is to ensure that the sub-band allocation to the UE is limited and enough to monitor both common and UE-specific DCIs to keep RF processing and latency acceptable.

Figure 82:
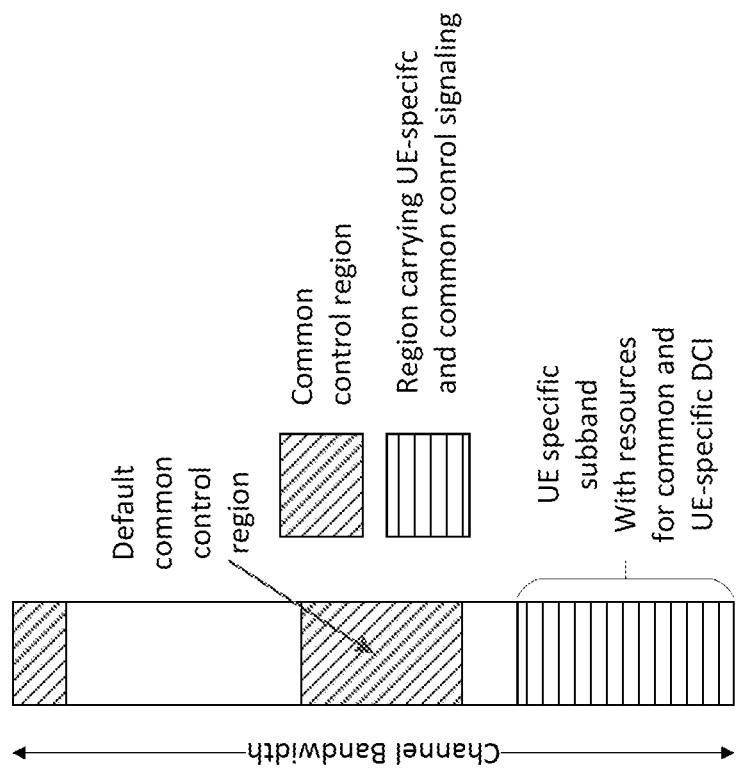
FIG. 82 shows an example of configuration of a UE-specific sub-band with resources for common control and UE-specific DCI multiplexed within the UE-specific sub-band.
Figure 81:
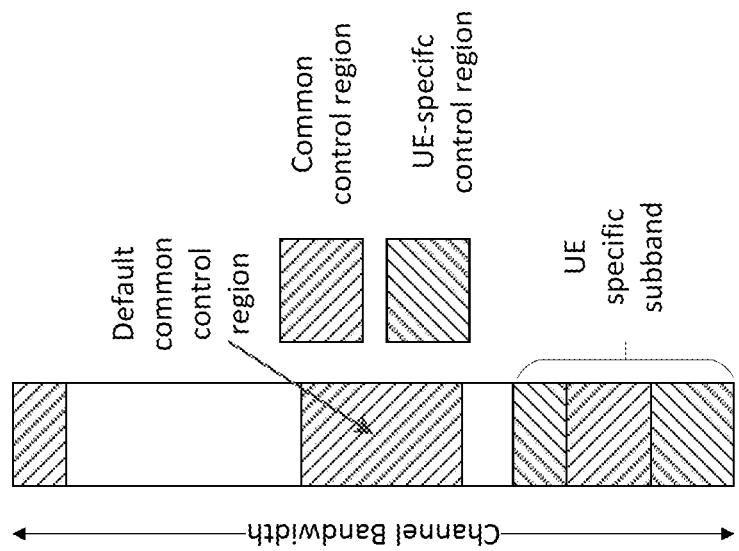
FIG. 81 shows an example of configuration of a UE-specific sub-band with separate common control and UE-specific DCI regions.

Examples of configuring the resources for UE-specific DCI and common control signaling for a UCI within the UE-specific sub-band are shown in FIGS. 81 and 82. In FIG. 81 the common control and UE-specific control targeted for the UE are contained in separate regions whereas in FIG. 82, the sub-band resources are multiplexed in FDM manner between common and UE-specific control resources.

Note that the common and UE-specific control regions may be separated in the spectrum or may share portions of the bandwidth with their REs multiplexed in the time or frequency domain. Also note that the solution may accommodate a scenario where the UE-specific sub-band may encompass wholly or partly the default common control region.

Slot format indication may be achieved through DL control information. NR is likely to keep significant flexibility in the frame structure. As the slot/mini-slot configuration can change dynamically, there has to be an indicator for the slot format. A Physical Slot configuration Indicator channel (PSCICH) may be used to indicate one or more parameters of the slot, such as DL region, UL region, guard period, blank regions, and numerologies of data and control in UL and DL. DL region parameters may include one or more of: number of DL control symbols; number of DL shared channel symbols; beam ID for shared channel symbols; control symbol numerology; and data symbol numerology. UL region parameters may include one or more of: number of UL control symbols; number of UL shared channel symbols; UL beam ID for shared channel symbols; control symbol numerology; and data symbol numerology.

Figure 83:
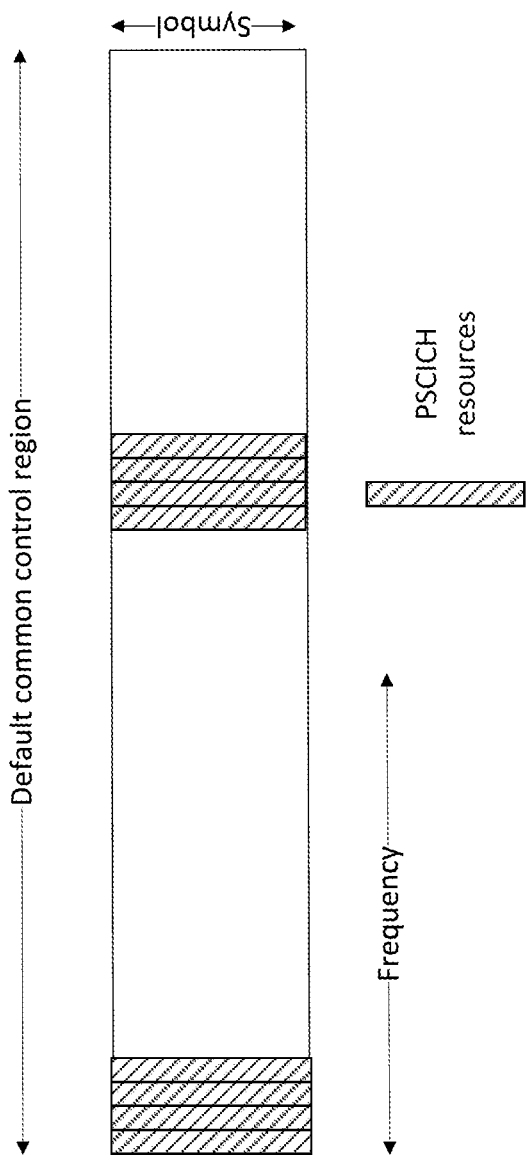
FIG. 83 shows an example of PSCICH resources restricted within a sub-band in a default common control region.

The PSCICH may be signaled in resources spread through the entire transmission bandwidth. But for wide bands, UEs with limit RF processing power may not be able to support the bandwidth. In this case, the PSCICH may be signaled within a limited band such as the span of the default common control region whose numerology and resources are known to the UEs either through definition in the specifications of the MIB or SIB. This example is illustrated in FIG. 83.

The PSCICH may be repeated in the analog beams when beam-centric signaling of control symbols is deployed. In this case the PSCICH in different beams may carry the same or different contents depending on the slot structure in the different beams and PSCICH signals may be tied to the cell ID or beam ID or both.

A data channel may be used for beam indication. Shared channels and RS embedded in a beam should be tied to the beam ID or cell ID or both to randomize interference from other TRPs within the cell and other cells. This dependency may be introduced through RE locations and scrambling codes which incorporate the cell ID or beam ID or both in their sequence generation.

If the same beams are used for DL control and DL shared channel signaling, no explicit indication of the beam ID is required for shared channel decoding. However if the beams (beam-width, steering angles, beams IDs) are different between the control and shared channel, the UE must be configured to use the correct beam ID to decode the shared channel.

One way to indicate this is through PSCICH as discussed in the previous section.

Another solution may be used to indicate the beam ID for the shared channel resources to the UE. The DCI making the DL grant may indicate the beam ID to the UE. If this indicator is absent the UE may assume the same beam ID as the control channel for the shared channel.

Alternatively, the beam ID for shared channel may be configured semi-statically through the RRC.

Figure 84:
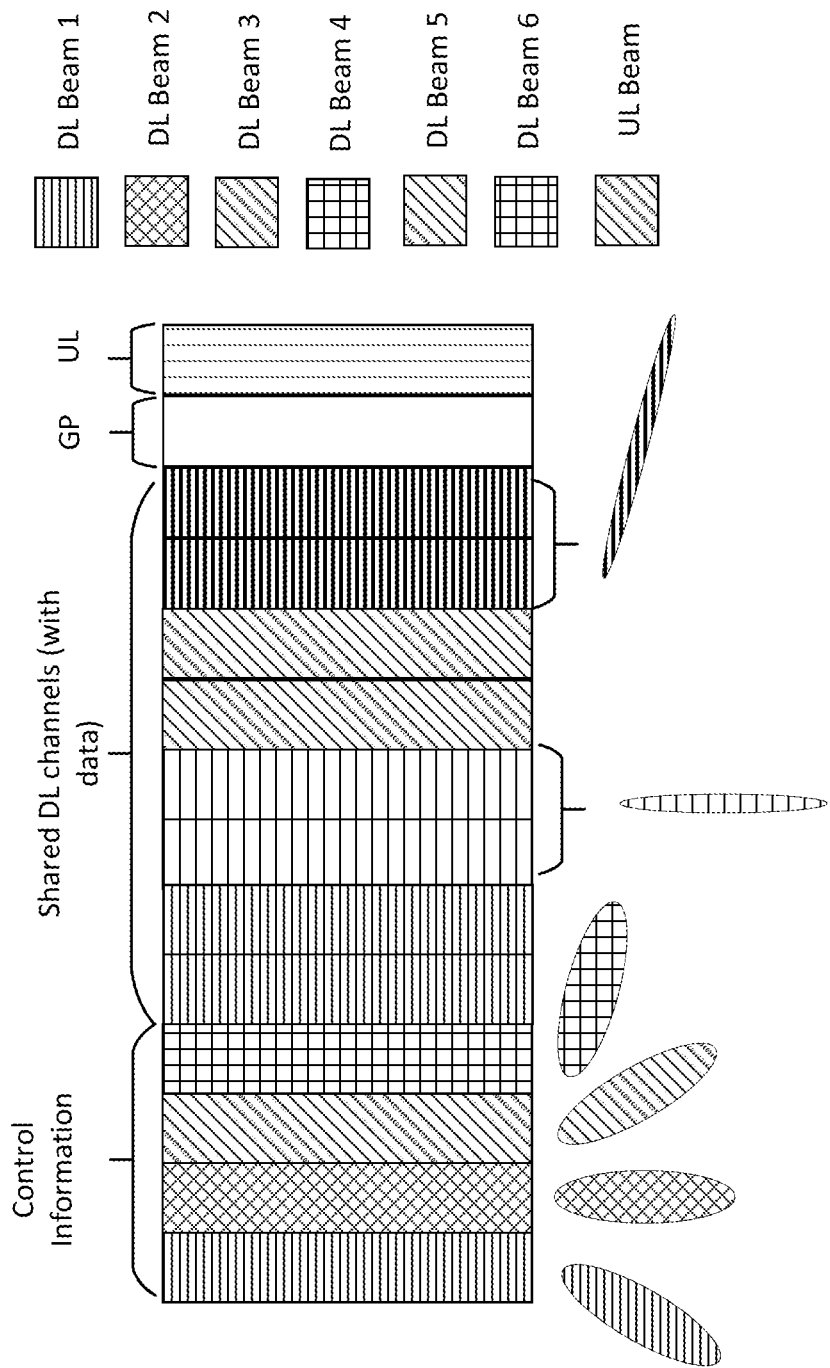
FIG. 84 shows an example of shared channel beams that may be the same of different from those of the corresponding control symbols

FIG. 84 shows an example where the DL beam sweeps through 4 control symbols (beam 1 through 4). The DL beam for the shared channel grants from control symbols of beams 1,3 are the same as those of the control symbols but different (beams 5,6) for grants from control symbols on beams 2, 4.

A UE may be configured through RRC to use common or UE-specific RS to decode its UE-specific DCI.

Guard period (GP) and symbol duration can be reduced if subcarrier spacing (SCS) is increased—so higher SCS is desired for better resource utilization. When SCS is doubled, 2 symbols are available while keeping the number of grid resources unchanged. This allows the TDM of RS and UCI especially for DFT-s-OFDM without requiring extra resources.

NR may be defined to allow for UCI transmission on double the SCS used for data. But the UE may be configured by the NR-Node to operate in this mode depending on its capability. This configuration may be specified through RRC.

Figure 85:
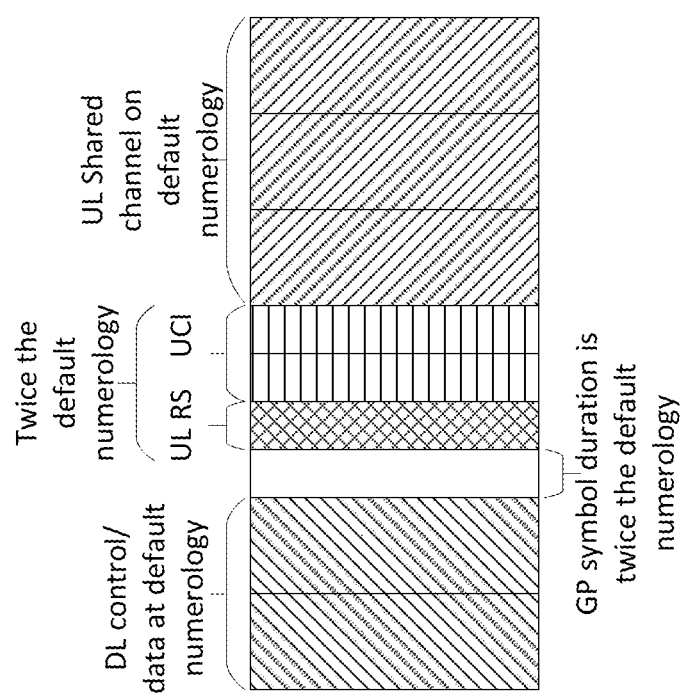
FIG. 85 shows an example of long signaling formats for UCI where UCI uses twice the subcarrier spacing and half the symbol length as the default numerology used for shared channel.
Figure 86:
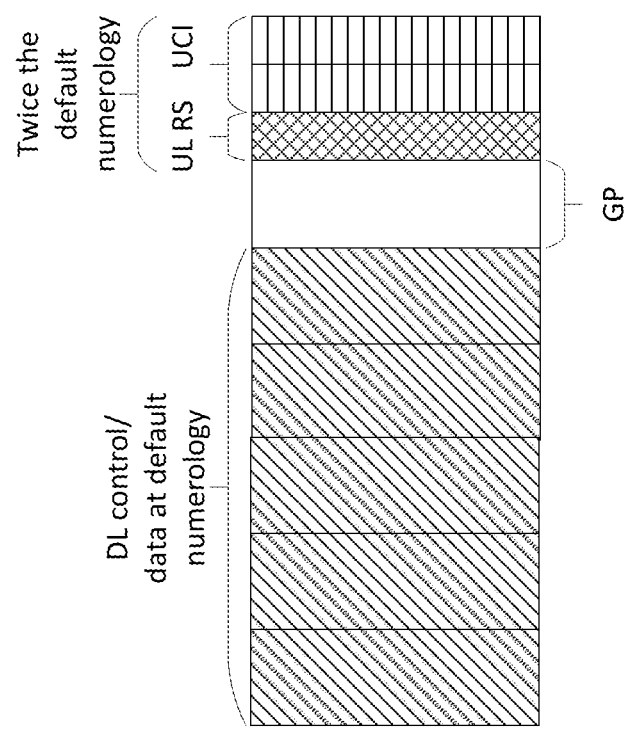
FIG. 86 shows an example of short signaling formats for UCI where UCI uses twice the subcarrier spacing and half the symbol length as the default numerology used for shared channel.

Both long and short format UL transmissions may use this architecture. FIGS. 85 and 86 shows examples of long and short formats, respectively, where the numerology for the UCI and UL RS uses twice the subcarrier spacing (and half the symbol duration) of the DL/UL shared channel. The GP may be adjusted to as small as the symbol for the UL UCI.

A UE may be configured in a number of ways to transmit UCI using long or short formats. For example, a UE may be configured semi-statically through RRC configuration. A UE may be configured dynamically through DCI. 1 bit in the DCI may indicate the long or short format, especially if the resources for UCI are implicitly derived from the DCI or a corresponding DL grant (for Ack/Nack) or UL grant (concurrent control and data transmission). If resources (including number of symbols/PRBs/REs) are explicitly indicated, the UE may deduce the format from the number of resources/symbols assigned. NR may consider overriding the RRC assignment by a dynamic configuration through the DCI.

Figure 87:
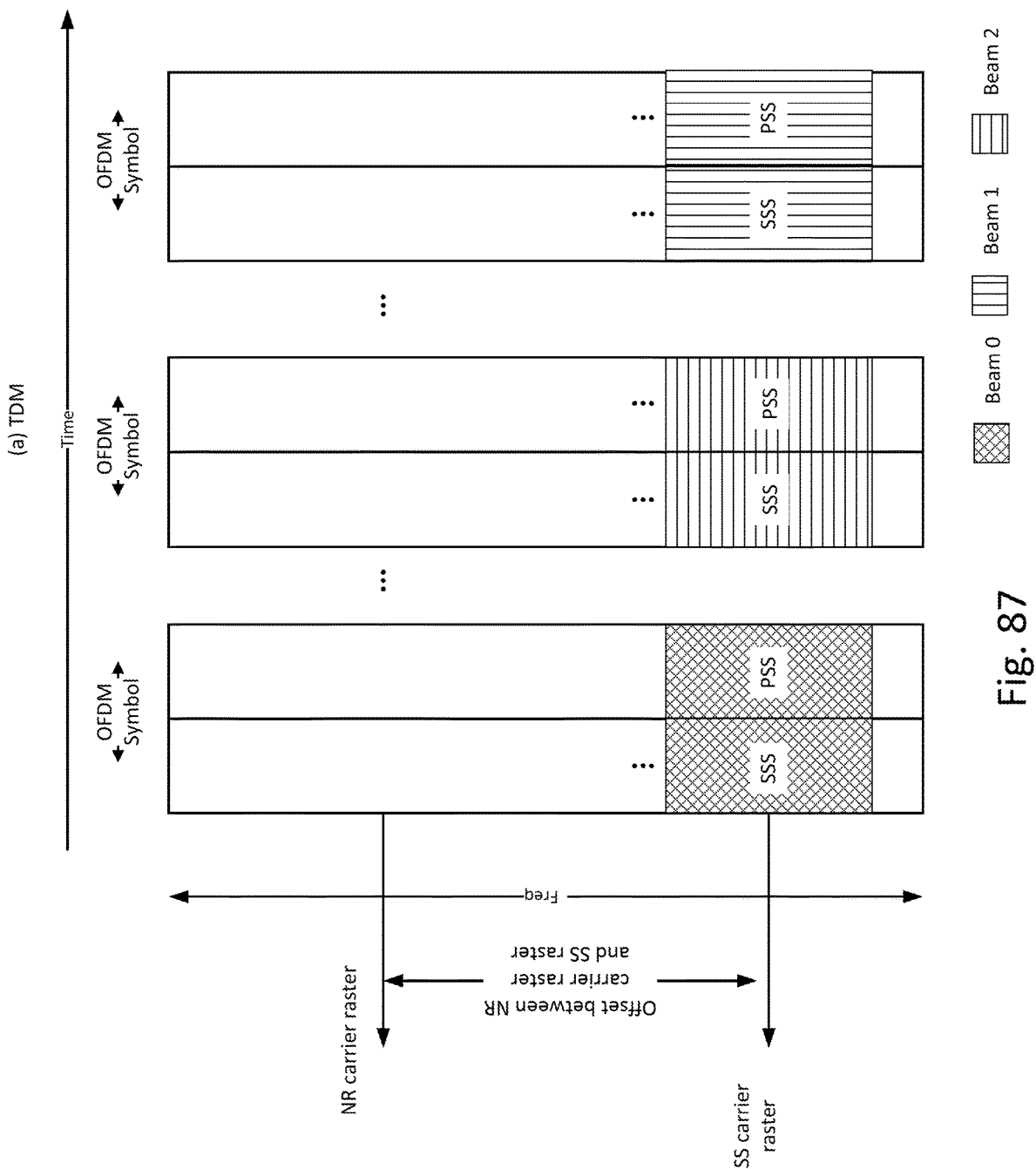
FIG. 87 shows an example of frequency offset between the SS raster and NR carrier raster in NR-PSS and NR-SSS are in TDM.
Figure 88:
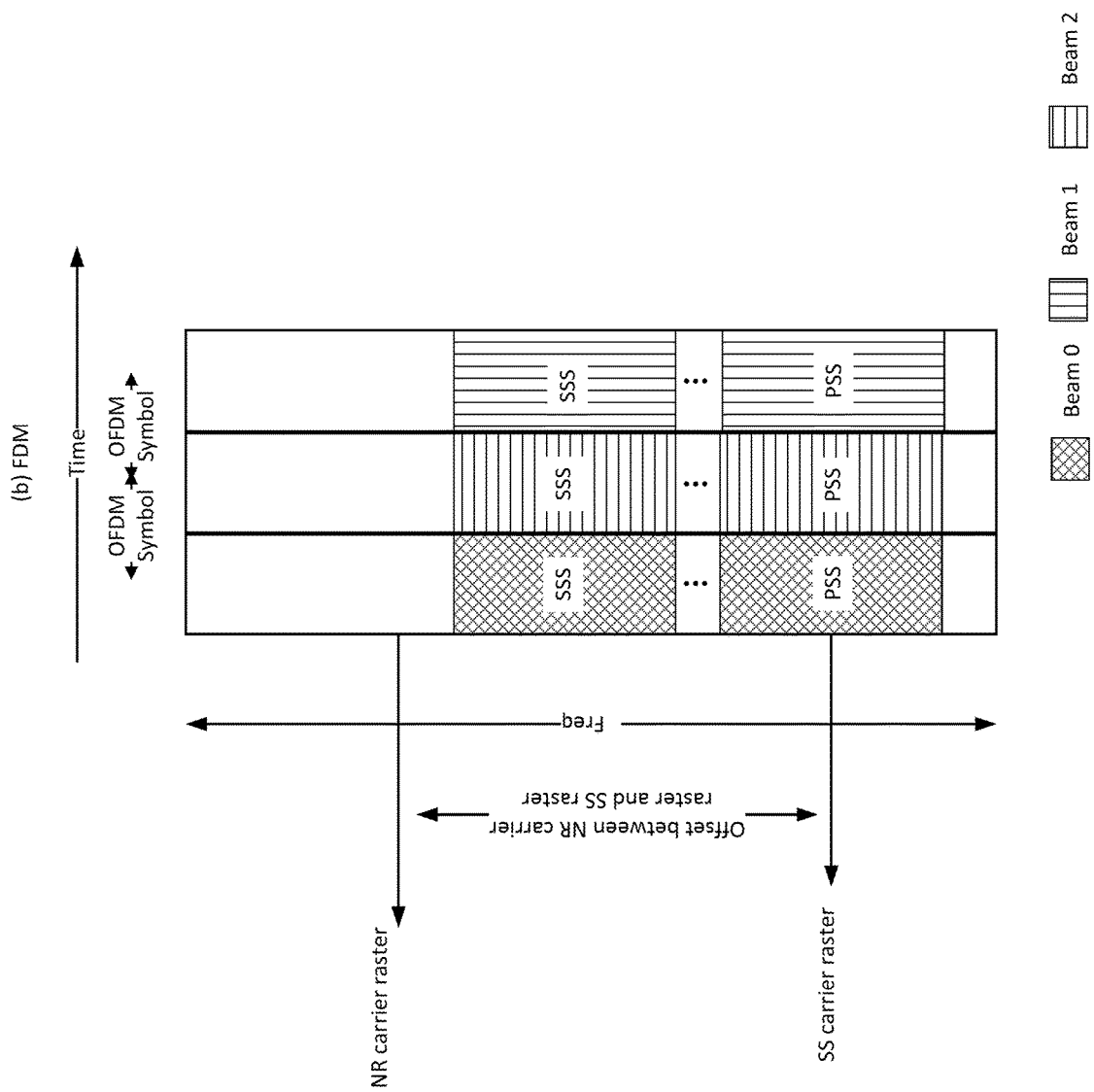
FIG. 88 shows an example of frequency offset between the SS raster and NR carrier raster in NR-PSS and NR-SSS are in FDM cases.
Figure 89:
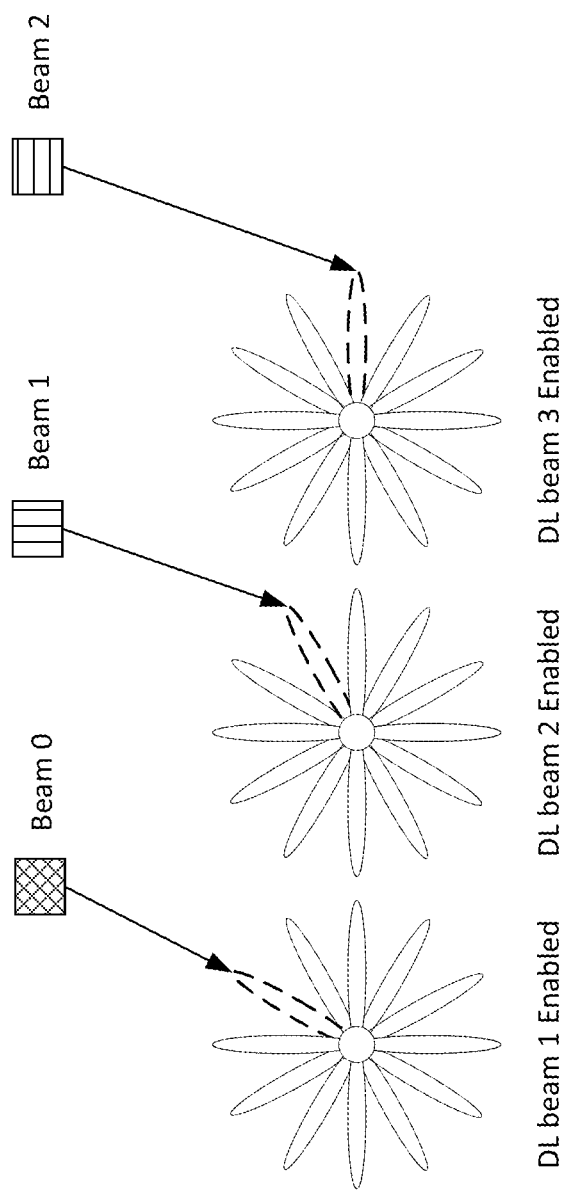
FIG. 89 is a legend for the beam indications in FIGS. 87 and 88.

In this section, we address the DL synchronization channel raster design for initial signal design in NR systems. A NR system may support both single beam based (or single sector) and multi-beams (multi-sectors) based approaches for initial access signal transmission. The initial access signal includes DL synchronization channels, i.e. PSS/SSS and/or PBCH channel. In LTE, the DL synchronization and PBCH signals central frequency (or here, we name the synchronization central frequency as the synchronization signal raster/SS raster) is always aligned to their carrier central frequency (i.e., carrier raster). In NR, the carrier raster may or may not align with the SS raster. Please see FIGS. 87 to 89 for illustration. Hence, the SS raster and NR carrier raster can have a frequency offset between them.

A number of detection methods for finding the frequency offset between the NR carrier raster and SS raster may be used. The SS raster may be based on the NR-PSS signal central frequency location. This is because the NR-PSS and NR-SSS may be FDM in a same CP-OFDM symbol so the SS raster is based on NR-PSS The offset between SS raster and NR carrier raster can be predefined by the operating frequency range. For example, if a NR is operated under sub 6 GHz then the offset may be set to a fixed value called as x and if a NR is operated under above 30 GHz then the offset may be set to a fixed value called as y.

SSS can be used for signaling the offset between the SS raster and NR carrier raster. Part of SSS IS can be used for signaling the offset between SS raster and NR carrier raster Serving cell MIB and/or SIB can be used for signaling the offset between the SS raster and NR carrier raster. In addition, the frequency offset between SS raster and NR raster of neighbor cells can be included in the MIB and/or SIB of the serving cell.

A paging beam sweeping block can be treated as a unit of beam sweeping time unit for paging channel during the idle mode. Each paging block may consist of at least one or more CP-OFDM symbols. Multiple blocks can form a paging beam sweeping burst or a paging occasion (PO). Here, the length of a sweeping burst refers to the number of paging beam sweeping blocks in a burst. For an example, if a paging beam sweeping burst/PO length is equal to M then there are M sweeping blocks existing in a PO.

Figure 90:
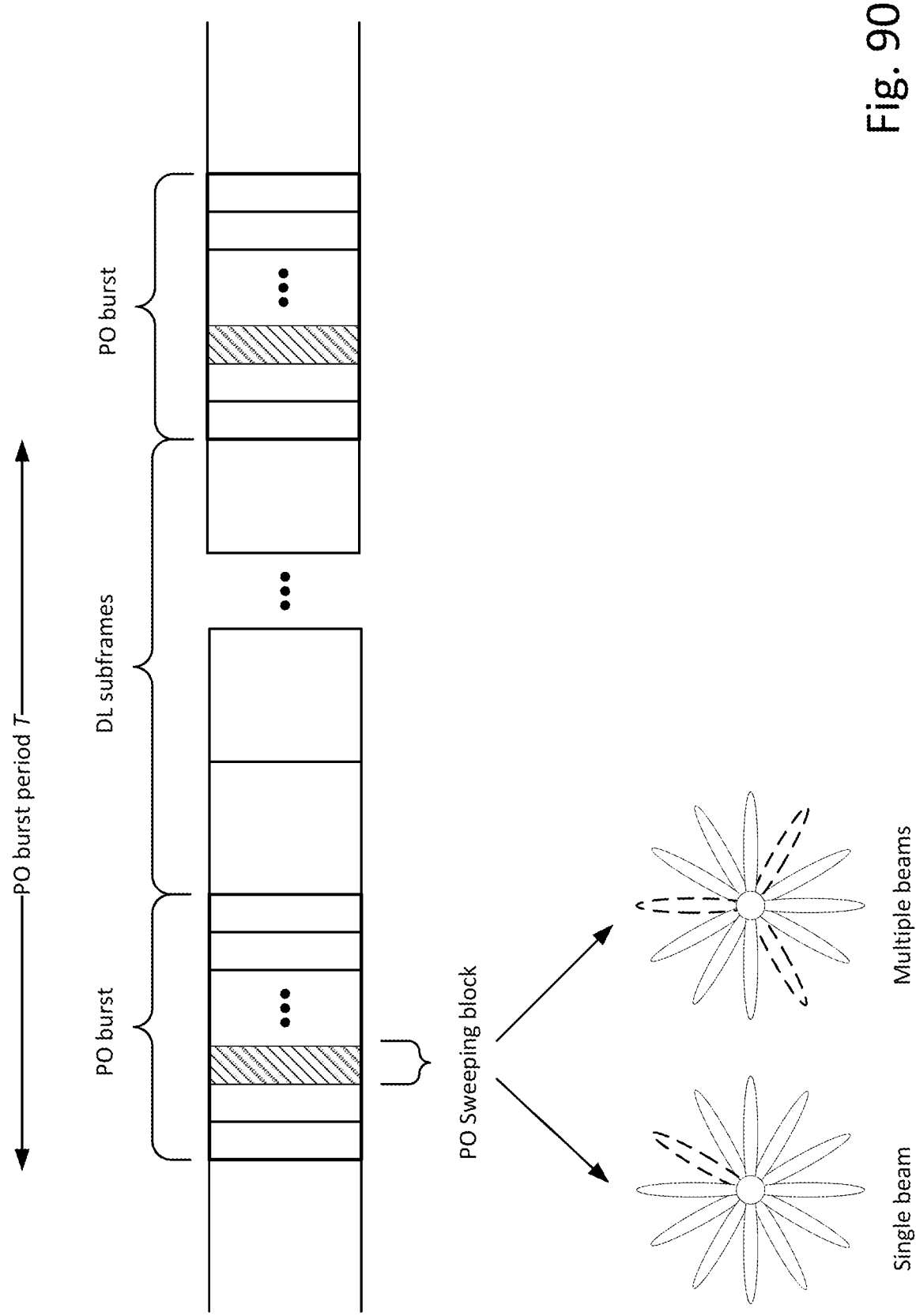
FIGS. 90 and 91 show examples of paging PO resource allocation without DCI and with DCI indication, respectively.

FIG. 90 illustrate a case where PO resource allocations are achieved without DCI configuration. FIG. 90 depicts paging sweeping burst/PO and block. The paging beam sweeping burst/PO can be configured either via periodically or aperiodically transmission. Each paging beam sweeping block can be associated with single beam or multiple beams and the association method can be dependent on with or without downlink control information (DCI).

If a PO without using any DCI indication, the beam association method can be aligned with initial access channel such as NR-PSS/NR-SSS and/or NR-PBCH. In this case, the beamforming for demodulation reference (DMRS) for paging channel can be aligned with NR-PBCH and/or SS The beamforming for resource allocation methods can be aligned with SS and/or PBCH setup if there is involving with DCI. In addition, the paging channel may support transmit diversity such as SFBC as NR-PBCH or NR-SSS. The demodulation reference signal for paging channel with transmit diversity can be assumed as QCL. The ports mapping for paging channel can be setup to 2m ports, $m \geq 0 \in \mathbb{Z}^+$.

If there is no involving DCI for PO configuration, the resource allocation of PO can be either FDM with SS or TDM with SS or having a dedicated resource allocation.

If paging channel is FDM with NR-PBCH and/or NR-SS then the DMRS for paging channel can be shared with NR-PBCH or have their own dedicated DMRS.

If paging channel is TDM with NR-PBCH and/or NR-SS then the DMRS for paging channel can be shared with NR-PBCH (if paging channel is close to NR-PBCH and/or NR-SS) or have their own dedicated DMRS.

Figure 91:
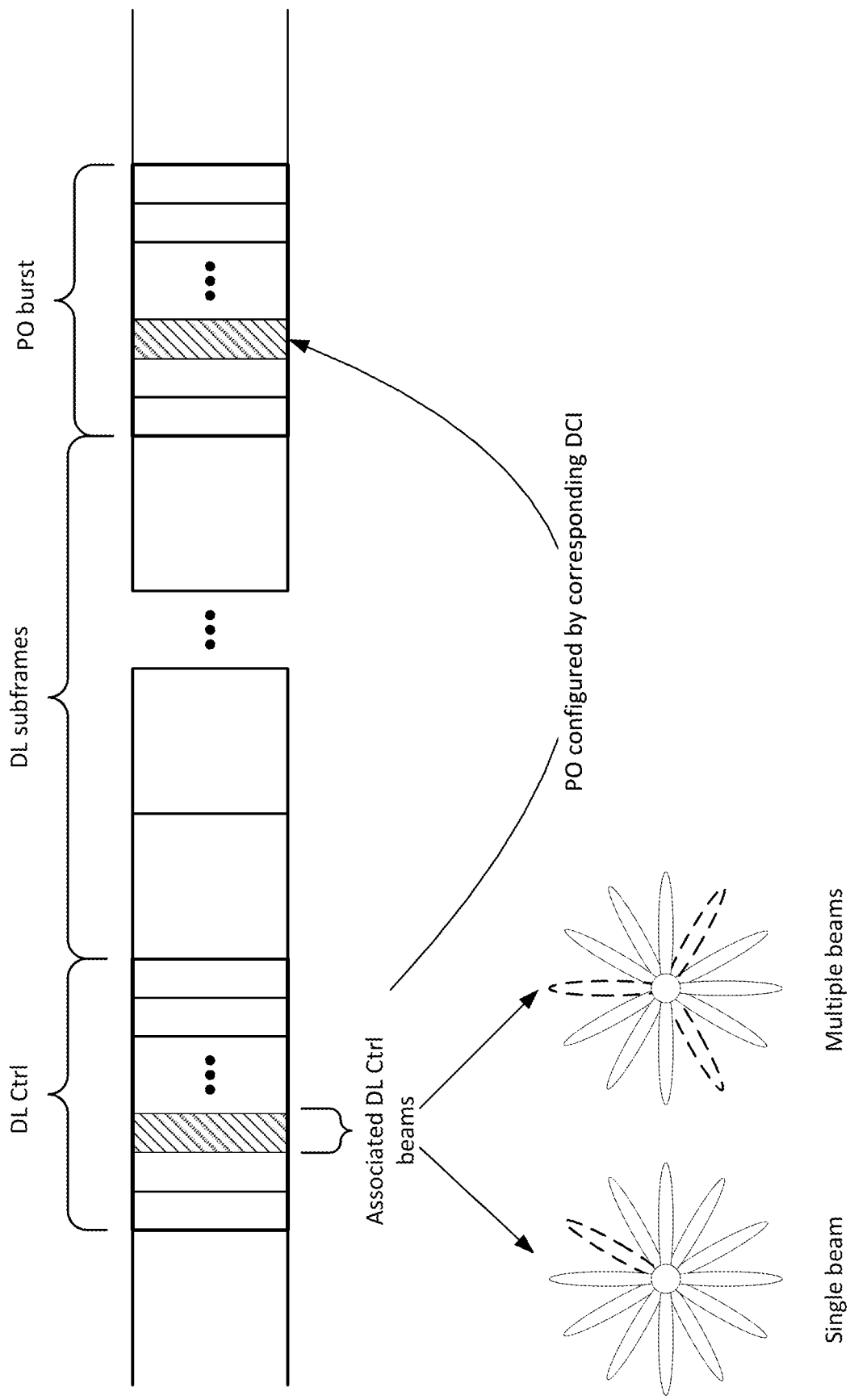

FIG. 91 illustrate a case where PO resource allocations are achieved with DCI configuration. If the PO is indicated/configured by DCI then the allocated PO resources can be configured by DCI and the PO DMRS can be either shared with its corresponding DL control channel or have their own dedicated DMRS. The paging channel ports mapping can be aligned with DL control signals in this case. The transmission scheme can be aligned (or be the same) with corresponding DL control channel. In addition, it can allow fall back to use transmit diversity as default. The PO resources can be assigned via RRC signaling as well.

The invention claimed is:

1. A first apparatus comprising a processor, communication circuitry, a memory, and computer-executable instructions stored in the memory which, when executed by the processor, cause the first apparatus to:
   establish a connection with a second apparatus, the second apparatus comprising an entity managing operations of a first radio access network;
   obtain, via communications with the second apparatus, a first mobility set comprising a first list of beams of a set of target cells in the first radio access network; and
   obtain first mobility set measurements pertaining to communications conditions with beams of target cells indicated by the first mobility set; and
   select, based on the measurements, a target cell from the set of target cells;
   update a second mobility set with information pertaining to one or more beams of the target cell.

2. The first apparatus of claim 1, wherein:
the instructions further cause the first apparatus to send a first report of communications measurements to the second apparatus; and
the first mobility set is based, at least in part, on the first report.

3. The first apparatus of claim 2, wherein the instructions further cause the first apparatus to observe a status change of the first apparatus, where the status change is a mobility event or a change in the angle or orientation of the first apparatus.

4. The first apparatus of claim 3, wherein the computer-executable instructions further cause the first apparatus to use joint transmission or reception via a plurality of beams.

5. The first apparatus of claim 3, wherein the computer-executable instructions further cause the first apparatus to determine a threshold for the status change, where the threshold is based at least in part on the width of the second beam.

6. A second apparatus, comprising an entity managing operations of a first radio access network, the second apparatus further comprising a processor, communication circuitry, a memory, and computer-executable instructions stored in the memory which, when executed by the processor, cause the second apparatus to:
establish a connection with a first apparatus;
receive, from the first apparatus, a first report of communications conditions of the first apparatus; and
send, to the first apparatus and based on the first report, a first mobility set comprising a first list of beams of a set of target cells in the first radio access.

7. The first apparatus of claim 6, wherein the computer-executable instructions further cause the first apparatus to:
receive, from the first apparatus, a second report of communications conditions of the first apparatus;
send, to the first apparatus and based on the second report, an update to the first mobility set.

* * * * *